(12) United States Patent
Zuckerman

(10) Patent No.: US 11,565,807 B1
(45) Date of Patent: Jan. 31, 2023

(54) SYSTEMS AND METHODS FACILITATING STREET-LEVEL INTERACTIONS BETWEEN FLYING DRONES AND ON-ROAD VEHICLES

(71) Applicant: Gal Zuckerman, Holon (IL)

(72) Inventor: Gal Zuckerman, Holon (IL)

( * ) Notice: Subject to any disclaimer, the term of this patent is extended or adjusted under 35 U.S.C. 154(b) by 218 days.

(21) Appl. No.: 15/931,630

(22) Filed: May 14, 2020

Related U.S. Application Data

(60) Provisional application No. 62/857,290, filed on Jun. 5, 2019.

(51) Int. Cl.
| | |
|---|---|
| *B64C 39/02* | (2006.01) |
| *G05D 1/10* | (2006.01) |
| *G05D 1/12* | (2006.01) |
| *B64F 1/36* | (2017.01) |
| *G06Q 50/28* | (2012.01) |
| *H04N 5/225* | (2006.01) |
| *B64D 47/08* | (2006.01) |
| *H04N 5/247* | (2006.01) |
| *G06V 20/10* | (2022.01) |

(52) U.S. Cl.
CPC ............ *B64C 39/024* (2013.01); *B64F 1/362* (2013.01); *G05D 1/101* (2013.01); *G05D 1/12* (2013.01); *G06Q 50/28* (2013.01); *B64C 2201/027* (2013.01); *B64C 2201/042* (2013.01); *B64C 2201/128* (2013.01); *B64C 2201/141* (2013.01); *B64D 47/08* (2013.01); *G06V 20/10* (2022.01); *H04N 5/2253* (2013.01); *H04N 5/247* (2013.01)

(58) Field of Classification Search
CPC ............ B64C 39/024; B64C 2201/027; B64C 2201/042; B64C 2201/128; B64C 2201/141; B64F 1/362; G05D 1/101; G05D 1/12; G06Q 50/28; G06V 20/10; B64D 47/08; H04N 5/2253; H04N 5/247
See application file for complete search history.

(56) References Cited

U.S. PATENT DOCUMENTS

| | | |
|---|---|---|
| 7,228,232 B2 | 6/2007 | Bodin et al. |
| 8,473,125 B2 | 6/2013 | Rischmuller et al. |
| 8,515,596 B2 | 8/2013 | Hamke |
| 8,626,361 B2 | 1/2014 | Gerlock |

(Continued)

*Primary Examiner* — Dale W Hilgendorf
*Assistant Examiner* — Frank T Glenn, III
(74) *Attorney, Agent, or Firm* — Active Knowledge Ltd.

(57) ABSTRACT

An exchange network comprising a plurality of exchange stations, in which each of the exchange stations comprises at least one drone operative to function as a flying crane, a temporary storage space, and at least one designated stopping area for on-road vehicles operative to carry cargo. Each of the exchange stations uses the respective local crane-drones to unload cargo from certain vehicles arriving at one of the respective local designated stopping areas, temporary store the cargo, and then load the cargo onboard certain other vehicles arriving at one of the respective local designated stopping areas, thereby exchanging carriers, and thus generating a transport route for the cargo which is the combination of different parts of transport routes of different carriers. The exchange network may use predetermined routes of many scheduled carriers to plan a routing scheme for the cargo, thereby propagating the cargo between exchange stations in a networked fashion.

8 Claims, 37 Drawing Sheets

(56) References Cited

U.S. PATENT DOCUMENTS

| | | |
|---|---|---|
| 8,768,555 B2 | 7/2014 | Duggan et al. |
| 9,056,676 B1 | 6/2015 | Wang |
| 9,262,929 B1 | 2/2016 | Roy et al. |
| 9,371,133 B2 | 6/2016 | Mays |
| 9,412,280 B1 | 8/2016 | Zwillinger et al. |
| 9,459,622 B2 | 10/2016 | Abhyanker |
| 9,494,937 B2 | 11/2016 | Siegel et al. |
| 9,513,125 B2 | 12/2016 | Ravenscroft |
| 9,542,849 B1 | 1/2017 | Bertram et al. |
| 9,548,626 B1* | 1/2017 | Ramirez ............... H02J 7/35 |
| 9,581,999 B2 | 2/2017 | Zhou |
| 9,618,940 B1 | 4/2017 | Michini et al. |
| 9,630,715 B2 | 4/2017 | Takayama et al. |
| 9,632,509 B1 | 4/2017 | Aphek et al. |
| 9,691,285 B2 | 6/2017 | Jarrell |
| 9,704,409 B2 | 7/2017 | Prakash et al. |
| 9,718,564 B1* | 8/2017 | Beckman ............... B61L 23/00 |
| 9,731,821 B2 | 8/2017 | Hoareau et al. |
| 9,754,496 B2 | 9/2017 | Chan et al. |
| 9,778,662 B2 | 10/2017 | Tang et al. |
| 9,817,405 B2 | 11/2017 | Li |
| 9,823,654 B2 | 11/2017 | Peeters et al. |
| 9,836,049 B1* | 12/2017 | Tu ............... G01S 19/13 |
| 9,841,757 B2 | 12/2017 | Mikan et al. |
| 10,008,123 B2 | 6/2018 | Chen |
| 10,019,907 B2 | 7/2018 | Kanade et al. |
| 10,114,384 B2 | 10/2018 | Liu et al. |
| 10,134,290 B2 | 11/2018 | Mikan et al. |
| 10,134,291 B2 | 11/2018 | Chan et al. |
| 10,140,874 B2 | 11/2018 | Yang et al. |
| 10,152,059 B2 | 12/2018 | Banerjee et al. |
| 10,223,914 B2 | 3/2019 | Park |
| 10,254,755 B2 | 4/2019 | Chow et al. |
| 10,266,263 B2 | 4/2019 | Zhang et al. |
| 10,414,494 B2 | 9/2019 | Jourdan |
| 10,462,689 B2 | 10/2019 | Condeixa et al. |
| 10,467,885 B2 | 11/2019 | Trundle et al. |
| 10,520,944 B2 | 12/2019 | Kunzi et al. |
| 10,585,441 B2 | 3/2020 | Qin et al. |
| 10,586,464 B2 | 3/2020 | Dupray et al. |
| 10,629,082 B1 | 4/2020 | Paczan |
| 10,633,091 B2 | 4/2020 | Lavie et al. |
| 10,642,279 B2 | 5/2020 | Lockwood et al. |
| 10,665,115 B2 | 5/2020 | Fragoso et al. |
| 2010/0198514 A1* | 8/2010 | Miralles ............... F41G 7/2206 701/302 |
| 2013/0325217 A1 | 12/2013 | Seydoux et al. |
| 2014/0032034 A1 | 1/2014 | Raptopoulos et al. |
| 2014/0164126 A1 | 6/2014 | Nicholas et al. |
| 2015/0158599 A1 | 6/2015 | Sisko |
| 2015/0248640 A1 | 9/2015 | Srinivasan |
| 2015/0323933 A1 | 11/2015 | Darbois et al. |
| 2016/0023762 A1 | 1/2016 | Wang |
| 2016/0033966 A1 | 2/2016 | Farris et al. |
| 2016/0085238 A1 | 3/2016 | Hayes |
| 2016/0107750 A1* | 4/2016 | Yates ............... B64C 39/024 244/2 |
| 2016/0253808 A1 | 9/2016 | Metzler et al. |
| 2016/0257401 A1* | 9/2016 | Buchmueller ....... G06Q 10/047 |
| 2016/0275801 A1 | 9/2016 | Kopardekar |
| 2016/0284221 A1 | 9/2016 | Hinkle et al. |
| 2016/0307447 A1 | 10/2016 | Johnson et al. |
| 2016/0327956 A1 | 11/2016 | Zhang et al. |
| 2016/0360360 A1 | 12/2016 | Jones |
| 2017/0011340 A1* | 1/2017 | Gabbai ............... G08G 5/0034 |
| 2017/0090484 A1 | 3/2017 | Obaidi |
| 2017/0129603 A1 | 5/2017 | Raptopoulos et al. |
| 2017/0175413 A1 | 6/2017 | Curlander et al. |
| 2017/0177937 A1 | 6/2017 | Harmsen et al. |
| 2017/0271926 A1* | 9/2017 | Plekhanov ............... H01Q 7/00 |
| 2017/0309191 A1 | 10/2017 | Marcus |
| 2017/0313332 A1 | 11/2017 | Paget et al. |
| 2018/0009549 A1 | 1/2018 | Sullivan et al. |
| 2018/0046187 A1 | 2/2018 | Martirosyan et al. |
| 2018/0050800 A1 | 2/2018 | Boykin et al. |
| 2018/0053054 A1 | 2/2018 | Schultz et al. |
| 2018/0068187 A1 | 3/2018 | Schultz et al. |
| 2018/0088597 A1 | 3/2018 | Shen |
| 2018/0189717 A1 | 7/2018 | Cao |
| 2018/0246529 A1 | 8/2018 | Hu et al. |
| 2018/0322749 A1 | 11/2018 | Kempel et al. |
| 2018/0357909 A1 | 12/2018 | Eyhorn |
| 2018/0374034 A1 | 12/2018 | Dreano, Jr. |
| 2019/0011921 A1 | 1/2019 | Wang et al. |
| 2019/0066503 A1 | 2/2019 | Li et al. |
| 2019/0101934 A1 | 4/2019 | Tuukkanen et al. |
| 2019/0138013 A1 | 5/2019 | Wu et al. |
| 2019/0227555 A1 | 7/2019 | Sun et al. |
| 2019/0287051 A1* | 9/2019 | Heinla ............... G06Q 50/28 |
| 2019/0322367 A1 | 10/2019 | El Idrissi |
| 2020/0066142 A1 | 2/2020 | Fowe et al. |
| 2020/0130510 A1* | 4/2020 | Eck ............... G08G 5/0026 |
| 2020/0160735 A1 | 5/2020 | Kim et al. |
| 2020/0356114 A1* | 11/2020 | Uçar et al. ........... G08G 5/0021 |

* cited by examiner

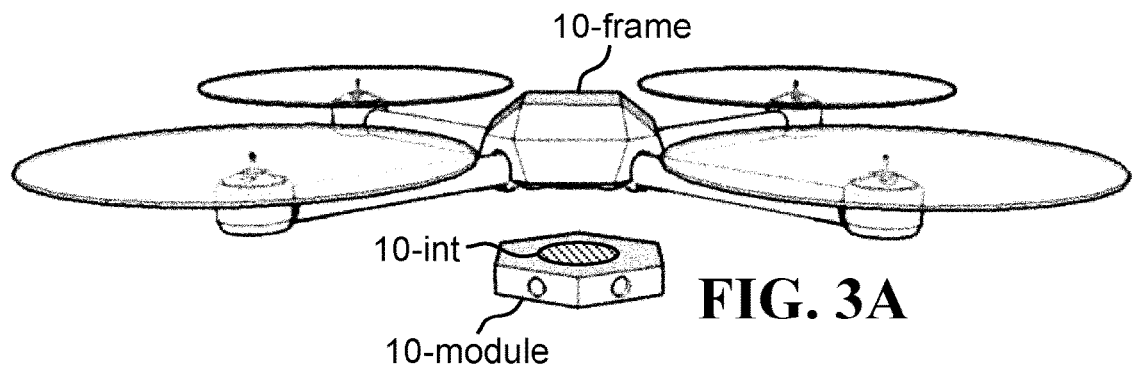
FIG. 3A
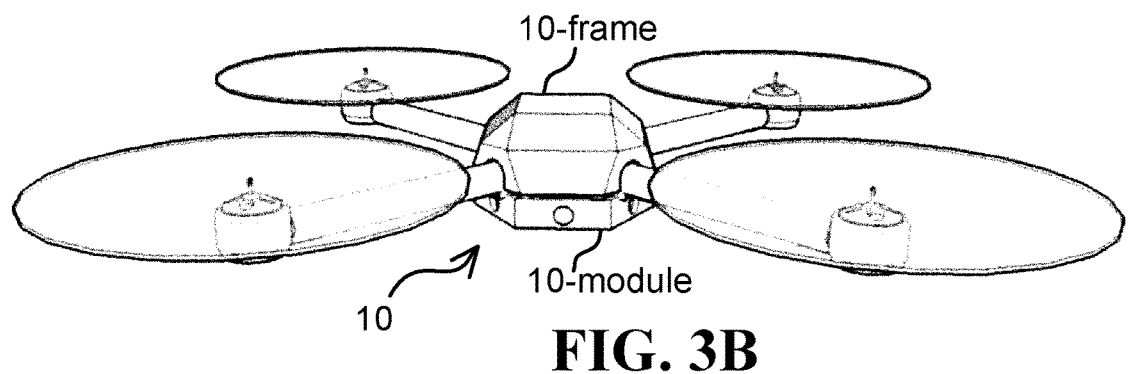
FIG. 3B
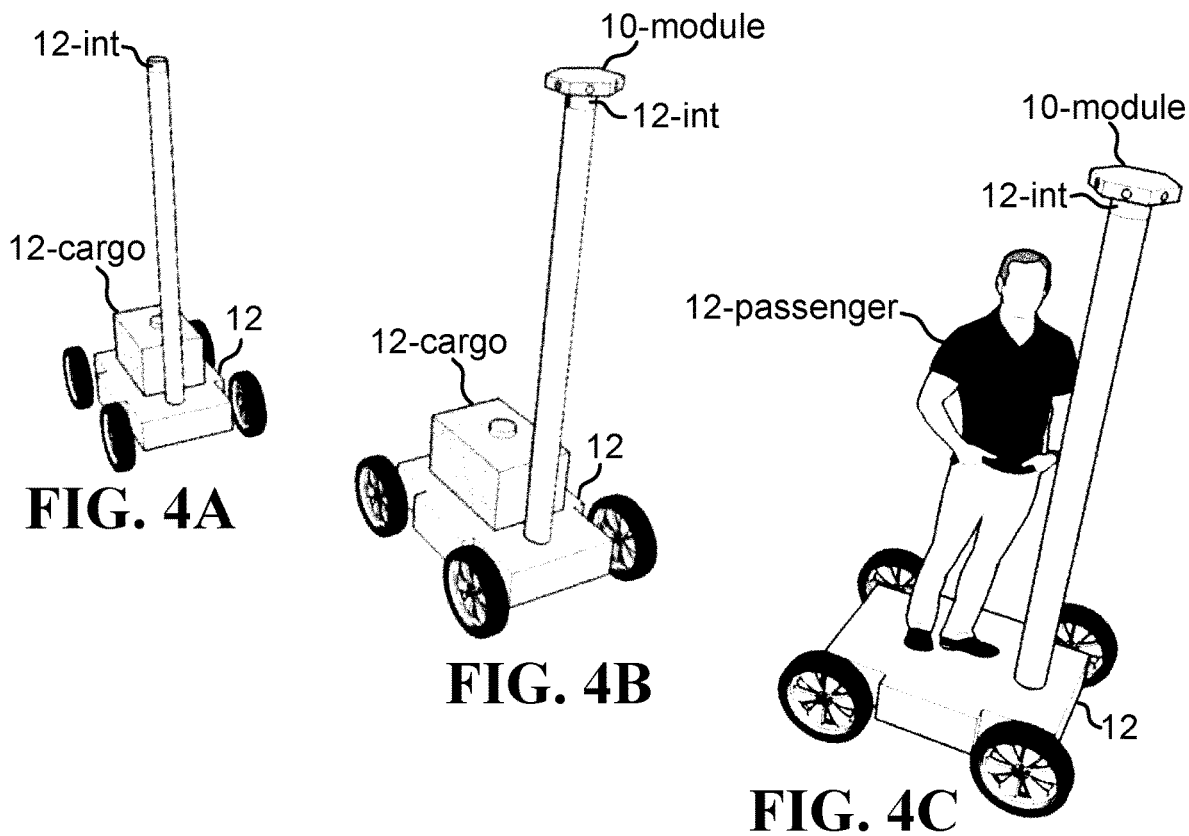
FIG. 4A
FIG. 4B
FIG. 4C

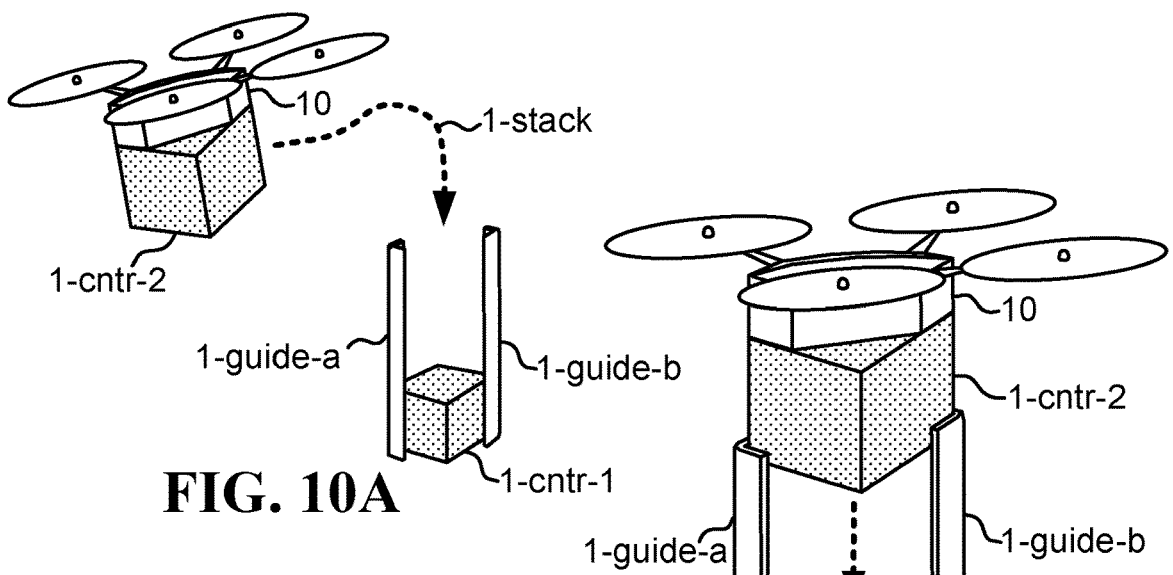
FIG. 10A
FIG. 10B
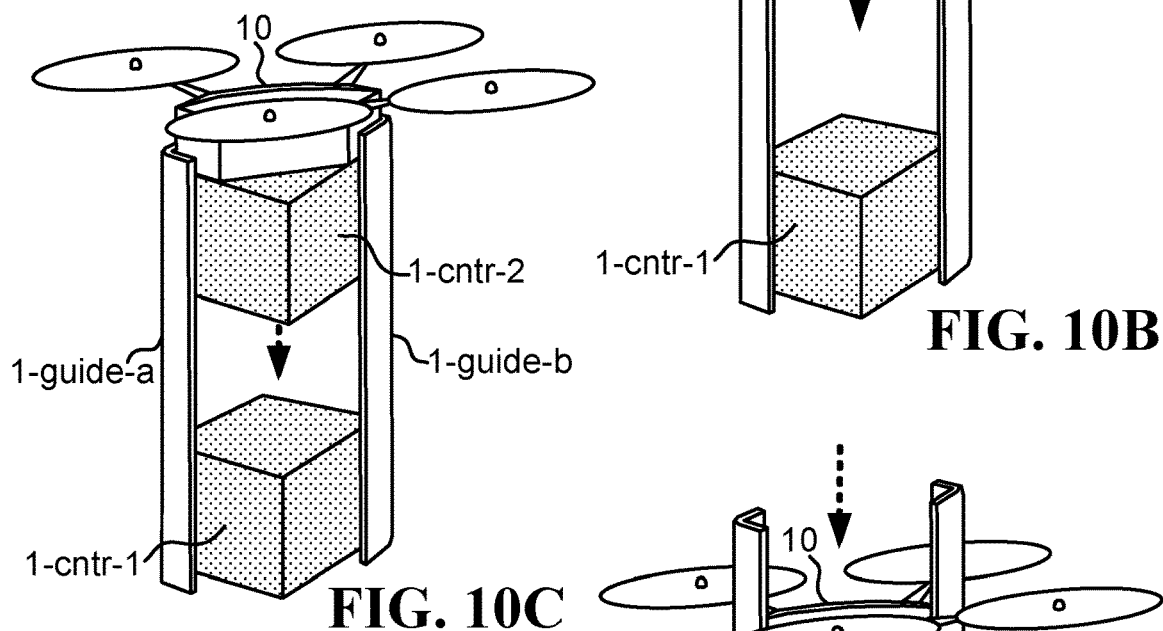
FIG. 10C
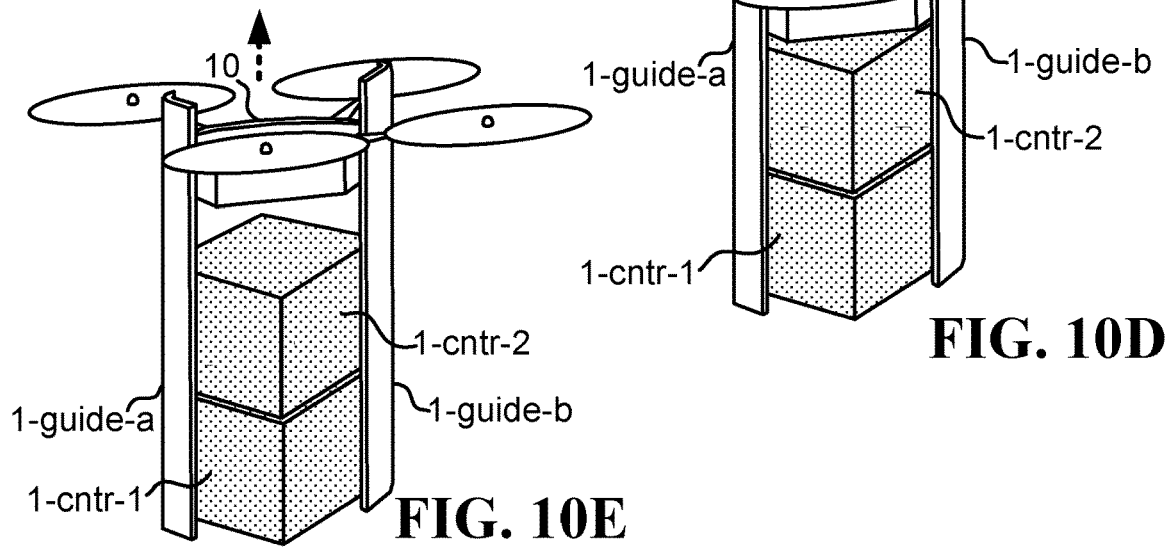
FIG. 10D
FIG. 10E

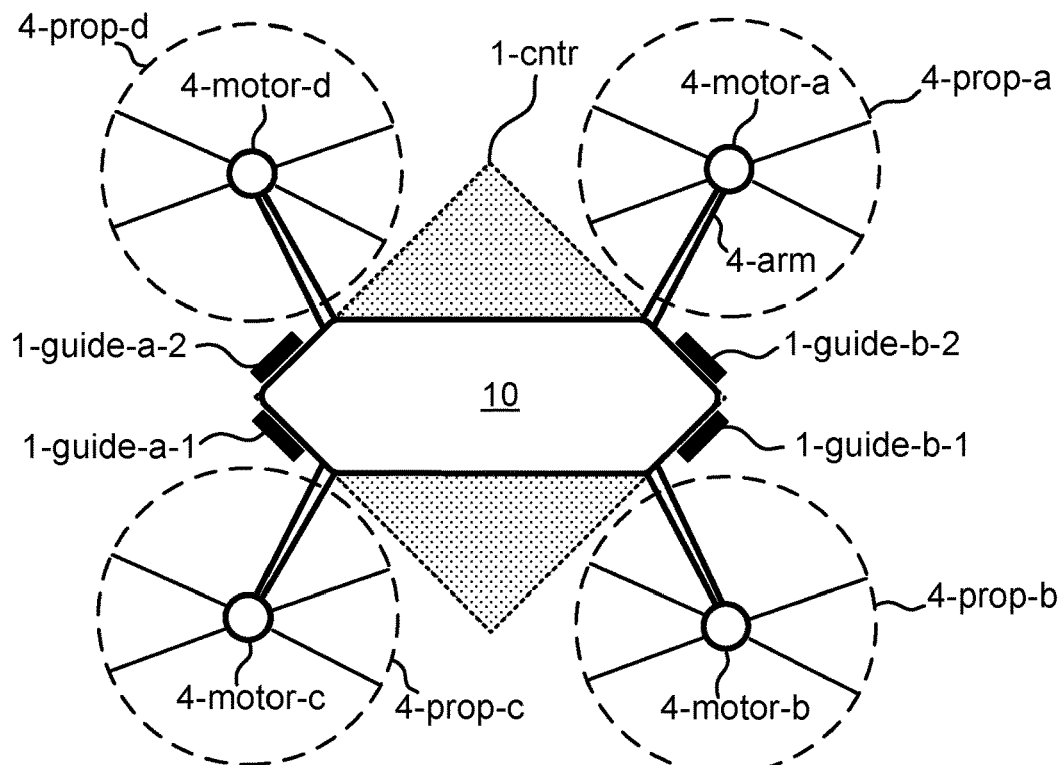
FIG. 10M
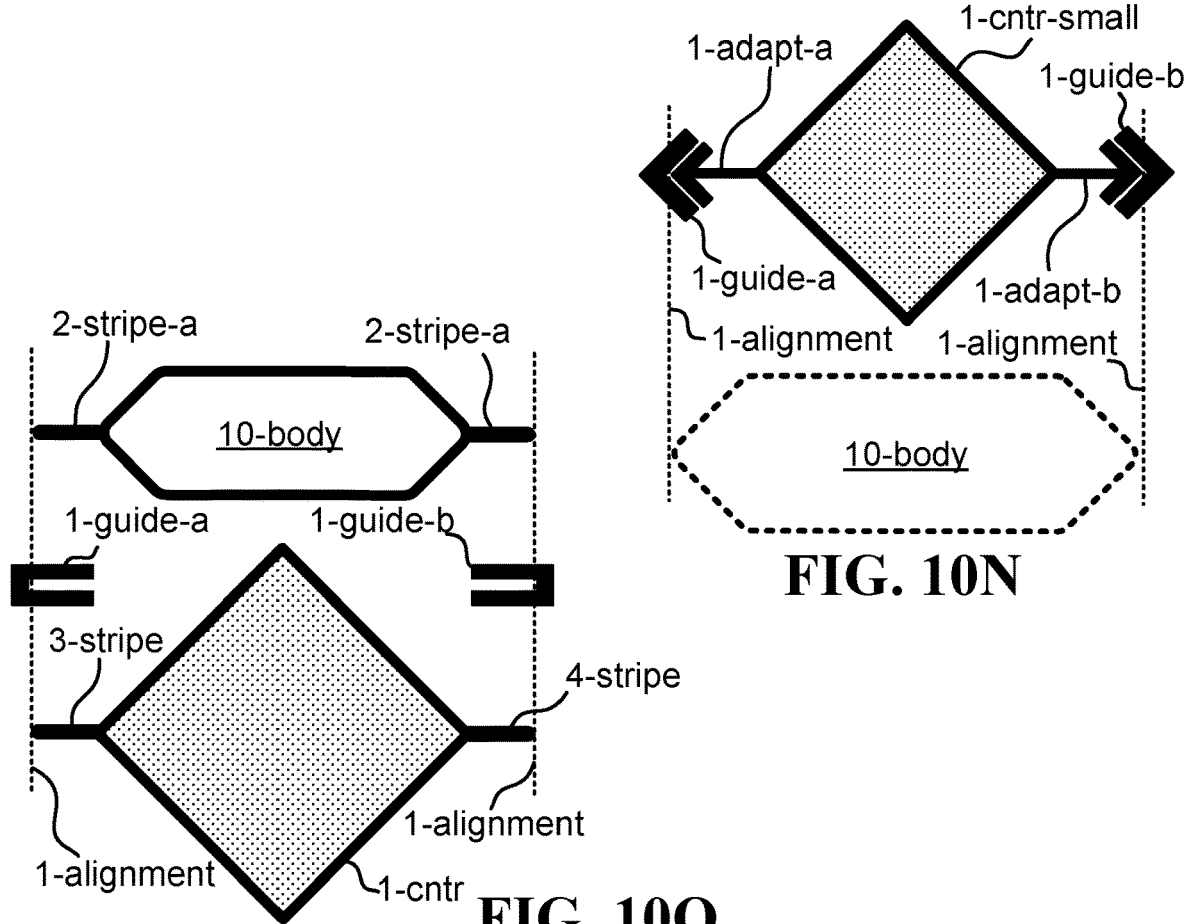
FIG. 10N
FIG. 10O

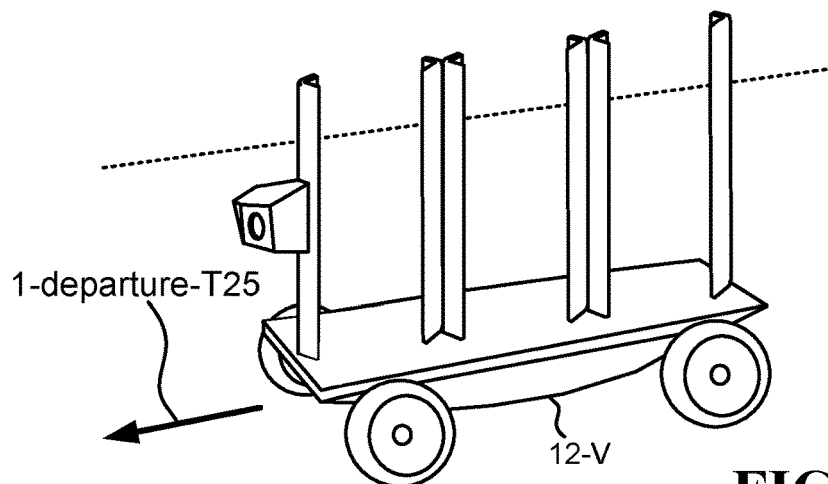
FIG. 11F
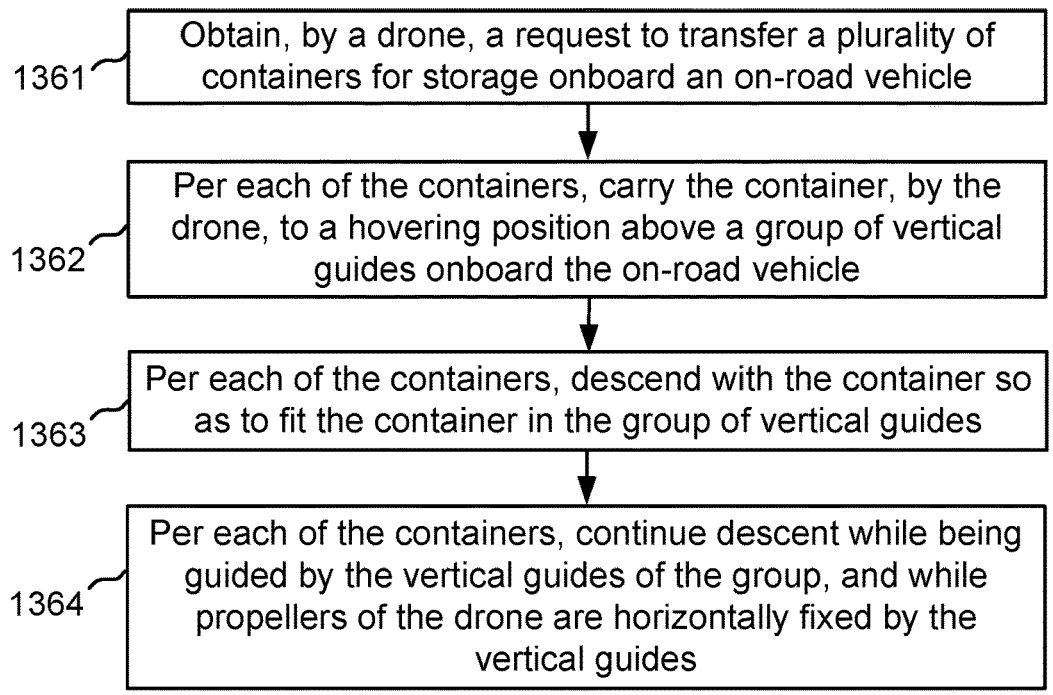
FIG. 11G
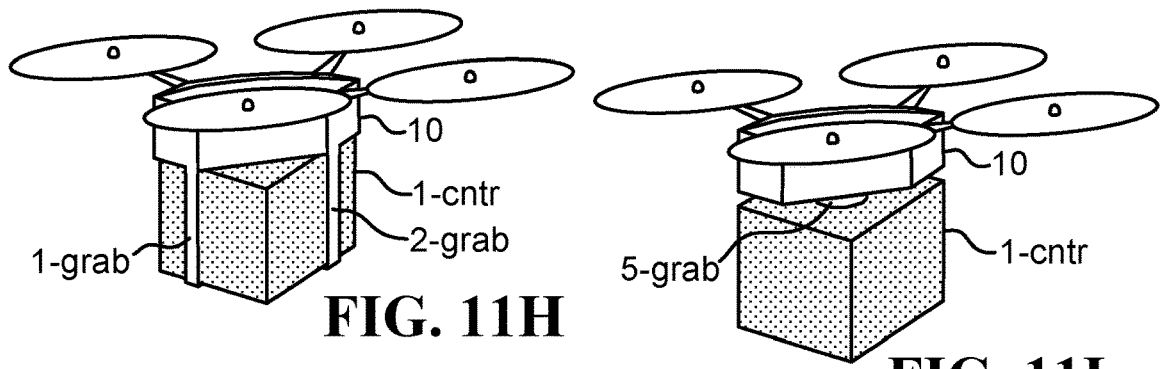
FIG. 11H    FIG. 11I

SYSTEMS AND METHODS FACILITATING STREET-LEVEL INTERACTIONS BETWEEN FLYING DRONES AND ON-ROAD VEHICLES

CROSS REFERENCE TO RELATED APPLICATIONS

This application claims priority to U.S. Provisional Patent Application No. 62/857,290, filed on Jun. 5, 2019, which is hereby incorporated by reference.

BACKGROUND

Some street-level tasks are best achieved by flying drones that are highly maneuverable and can operate in three-dimensions, while other street-level tasks are best performed by on-road vehicles that have a relatively long range and capacity. Needed are systems and methods to allow coexistence between flying drones and on-road vehicles at the street level, and to also allow cooperation and interaction between the two types of platforms and between the platforms are other street-level objects, thereby facilitating new types of street-level services and capabilities.

SUMMARY

One embodiment is a system (FIG. 9A, FIG. 9B, FIG. 9C, FIG. 9D, FIG. 9E, FIG. 9F) constituting an exchange network operative to transport cargo between different locations, comprising: an exchange network comprising a plurality of exchange stations situated respectively at a plurality of different locations, in which each of the exchange stations comprises: (i) at least one respective drone and (ii) a respective temporary storage space, and in which each of the exchange stations is associated with, and is located in a certain proximity to, at least one respective designated on-road stopping area. In one embodiment, each of the exchange stations is configured to initiate and conclude an exchange procedure in conjunction with each of a plurality of containers that: (i) arrives onboard an on-road vehicle at one of the respective designated on-road stopping areas, and (ii) is to be temporarily stored at the respective storage space; in which as part of said initiation of the exchange procedure, one of the respective drones is configured to: fly from the exchange station toward the on-road vehicle; pick up the container from the on-road vehicle that has just arrived and stopped; fly to the respective temporary storage space while carrying the container; and release the container for temporary storage at the respective temporary storage space; and in which as part of said conclusion of the exchange procedure, one of the respective drones is configured to convey the container from the respective temporary storage space to another on-road vehicle that has just arrived at one of the respective designated on-road stopping areas and is to transport the container to another location.

One embodiment is a method (FIG. 9G) for using an exchange network to transport cargo between different locations, comprising: planning, by an exchange network, a propagation scheme for a container, in which the propagation scheme is operative to identify, out of a plurality of exchange stations, at least a first and a second exchange stations to participate in propagating the container; and executing, by at least one drone associated with the first exchange station, upon an indication that the container is arriving onboard a first on-road vehicle to a first designated stopping area associated with the first exchange station, a first tripartite exchange procedure comprising: flying from the first exchange station toward the first on-road vehicle; picking up the container from the first on-road vehicle that has just arrived and stopped at the first designated stopping area; flying back to the first exchange station while carrying the container; releasing the container for temporary storage at the first exchange station; waiting for an indication that a second on-road vehicle, which is scheduled to travel between the first designated stopping area to a second designated stopping area associated with the second exchange station, is arriving to the first designated stopping area; flying from the first exchange station, with the container, toward the second on-road vehicle; and releasing the container to the second on-road vehicle that has just arrived and stopped at the first designated stopping area, thereby completing the first tripartite exchange procedure, and facilitating arrival of the container to the second designated stopping area onboard the second on-road vehicle.

One embodiment is a method (FIG. 9I) for using an exchange network to transport cargo between different locations, comprising: accessing, by a planning agent of an exchange network, a schedule operative to describe future movement of a plurality of on-road vehicles between different designated stopping areas, and further accessing a description of a target location at which a container is scheduled to be delivered; planning, by the planning agent, according to said schedule and target location, a transport and exchange plan for the container, in which the transport and exchange plan is operative identify at least a first one of the on-road vehicles scheduled to move from the first of the designated stopping areas to a second of the designated stopping areas, and a second one of the on-road vehicles scheduled to move from a third of the designated stopping areas to a fourth of the designated stopping areas, in which the second and third designated stopping areas are located in close proximity to each other, and the fourth designated stopping area is located in close proximity to the target location; and facilitating the transport and exchange plan by at least three different drones, in which said facilitation comprises: flying, by a first of the drones associated with the first designated stopping area and currently carrying the container, toward the first designated stopping area, thereby rendezvousing with the first on-road vehicle and leaving the container therewith, consequently causing the container to arrive at the second designated stopping area together with the first on-road vehicle; upon said arrival: picking up and flying with the container, by a second of the drones associated with the second and third designated stopping areas, from the first on-road vehicle to a temporary landing and storage area located in close proximity to both the second and third designated stopping areas, and waiting for the second on-road vehicle to arrive; upon arrival of the second on-road vehicle to the third designated stopping area: flying with the container, by the second drone and/or by a companion drone, from the temporary landing and storage area toward the third designated stopping area, thereby rendezvousing with the second on-road vehicle and leaving the container therewith, consequently causing the container to arrive at the fourth designated stopping area together with the second on-road vehicle; and upon arrival of the second on-road vehicle with the container to the fourth designated stopping area: picking up and flying with the container, by a third of the drones associated with the fourth designated stopping area, from the second on-road vehicle to the target location.

BRIEF DESCRIPTION OF THE DRAWINGS

The embodiments are herein described by way of example only, with reference to the accompanying drawings. No attempt is made to show structural details of the embodiments in more detail than is necessary for a fundamental understanding of the embodiments. In the drawings:

FIG. 1O illustrates one embodiment of a method for facilitating a precision low-altitude flight in an urban environment while avoiding collisions with various ground-related objects;

FIG. 3A illustrates one embodiment of a drone configured to integrate with an autonomy module;

FIG. 3B illustrates one embodiment of the drone integrated with the autonomy module;

FIG. 4A illustrates one embodiment of an on-road vehicle carrying a cargo and currently not integrated with an autonomy module;

FIG. 4B illustrates one embodiment of an on-road vehicle carrying a cargo and currently integrated with an autonomy module;

FIG. 4C illustrates one embodiment of an on-road vehicle carrying a passenger and currently integrated with an autonomy module;

FIG. 11F illustrates one embodiment the on-road vehicle departing after delivery of the containers;

FIG. 11G illustrates one embodiment of a method for temporary stacking and transporting containers in conjunction with flying drones and on-road vehicles;

FIG. 11H illustrates one embodiment of a drone grabbing a container in a certain way; and FIG. 11I illustrates one embodiment of a drone grabbing a container in a different way.

DETAILED DESCRIPTION

Figure 1A:
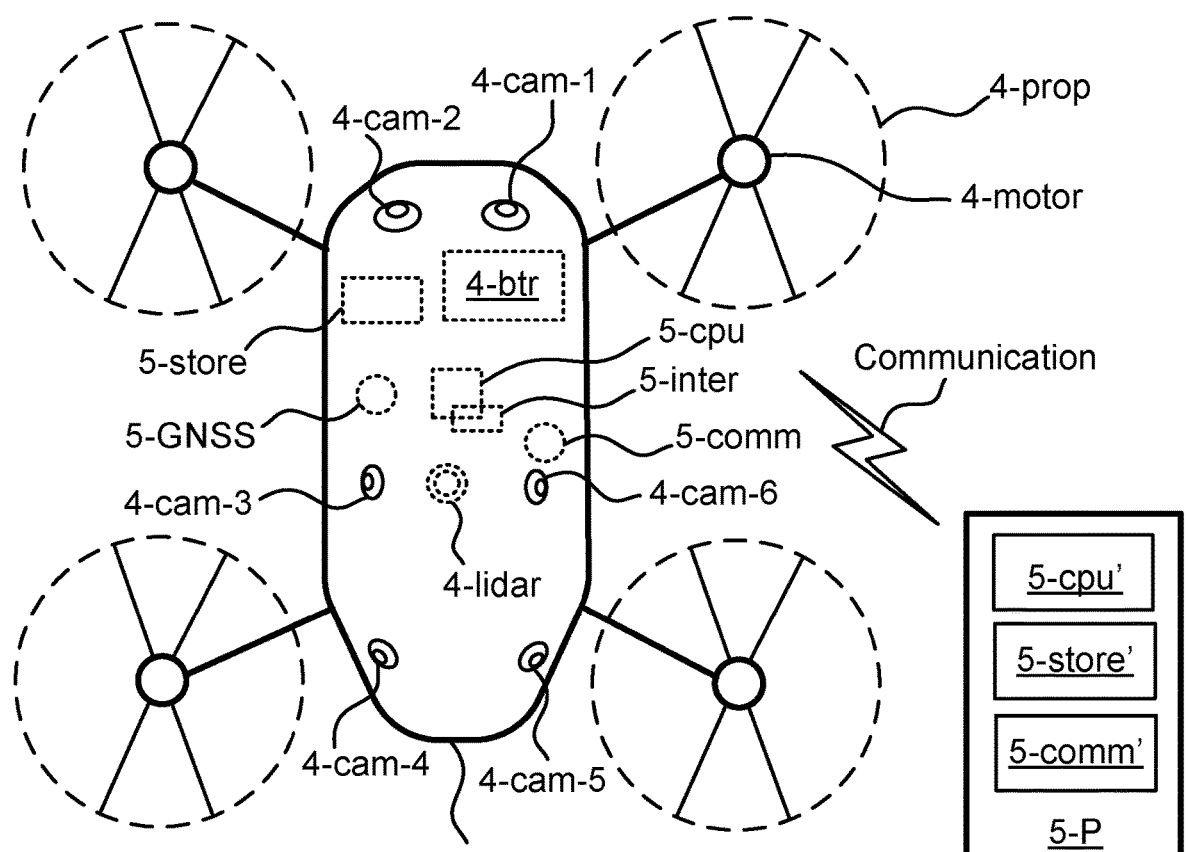
FIG. 1A illustrates one embodiment of a drone employing various resources and sensors and operative to communicate with an external computing platform.

FIG. 1A illustrates one embodiment of a drone 10 employing various resources and multiple sensors including cameras with image sensors 4-cam-1, 4-cam-2, 4-cam-3, 4-cam-4, 4-cam-5, 4-cam-6, a lidar (Light Detection And Ranging) sensor 4-lidar, a global navigation satellite system (GNSS) receiver 5-GNSS such as a global positioning system (GPS) receiver, various communication interfaces 5-comm that may include cellular communication devices and drone peer-to-peer communication devices, data processing components 5-cpu that may include various computational resources such as graphical image processors (GPUs) and general purpose/neural/tensor processors (CPUs/NPUs/TPUs), and a data storage space 5-store that may include flash memory and magnetic disks, in which all or part of the resources and sensors may be used by the drone in conjunction with flying itself autonomously or semi autonomously, for example along roads and slightly above car traffic, and in which all of the various resources and multiple sensors may be integrated in-drone. A data interface 5-inter is also shown, in which the data interface may utilize the various resources and multiple sensors in facilitating functionality that is beyond autonomous or semi autonomous flight, as will be later explained. The data interface 5-inter may be a physical part of the data processing components 5-cpu, or it may be a dedicated mechanism executed in conjunction with the data processing components. Drone 10 may be referred to as an autonomous drone, which means that drone 10 may be fully autonomous, or it may be semi autonomous, with various possible degrees of flying automation, starting with simple car traffic and obstacle avoidance and going all the way up to full autonomous flight and interaction with various static and non-static ground-related objects using minimal or zero pilot intervention. The terms autonomous drone and a drone having autonomous capabilities do not necessarily imply full autonomous flying capabilities, but the term does imply at least the on-board presence (and the utilization for autonomous flight functions) of at least some of the various resources and multiple sensors mentioned above, which are either integrated into the drone or carried by the drone in a detachable module. The drone 10 may be referred to as a low-flying road-following drone, which indicates that the drone is capable of flying low and above roads while possibly interacting with various ground related objects, but it does not necessarily imply that the drone has to always fly low above roads or that the drone is incapable of flying elsewhere.

Figure 1B:
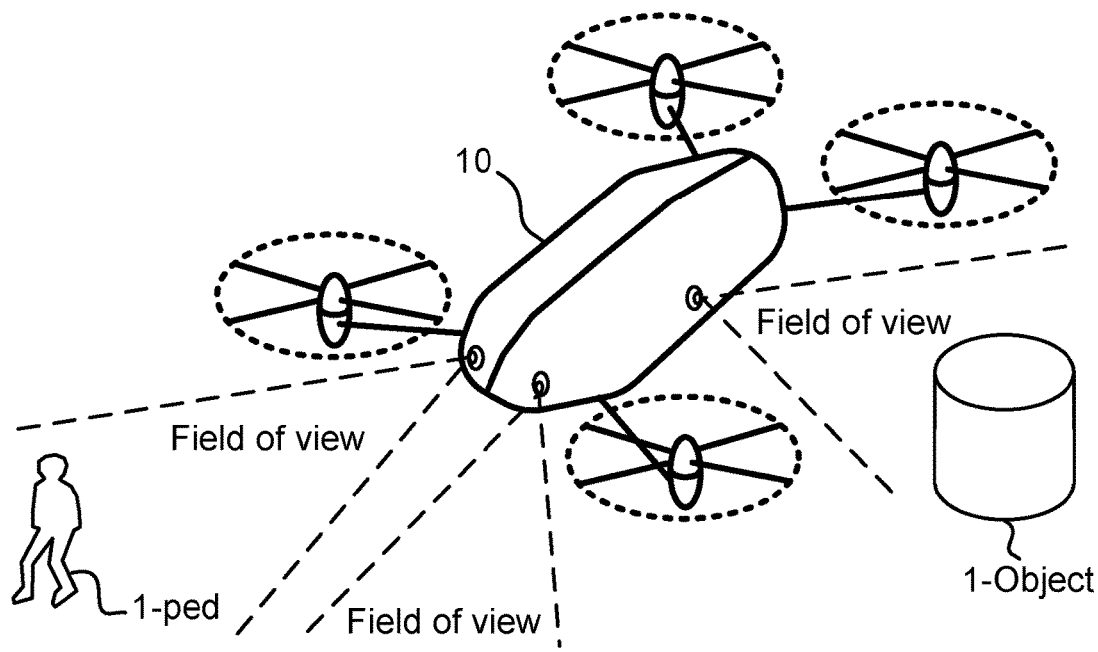
FIG. 1B illustrates one embodiment of a drone employing several image sensors facilitating visual coverage of surrounding environment.

FIG. 1B illustrates one embodiment of a drone 10 employing several image sensors facilitating visual coverage and three-dimensional modeling of surrounding environment. Three image sensors are shown, but any number of image sensors may be utilized, in which each of the image sensors is depicted has having an associated field of view. Objects within a line of sight of the image sensors, such as pedestrians 1-ped and structures 1-object, may be captured as imagery data by the drone 10, and stored onboard as visual records for later use by data extraction and three-dimensional modeling systems, and/or processed onboard the drone in real-time for image recognition and image-based navigation.

Figure 1C:
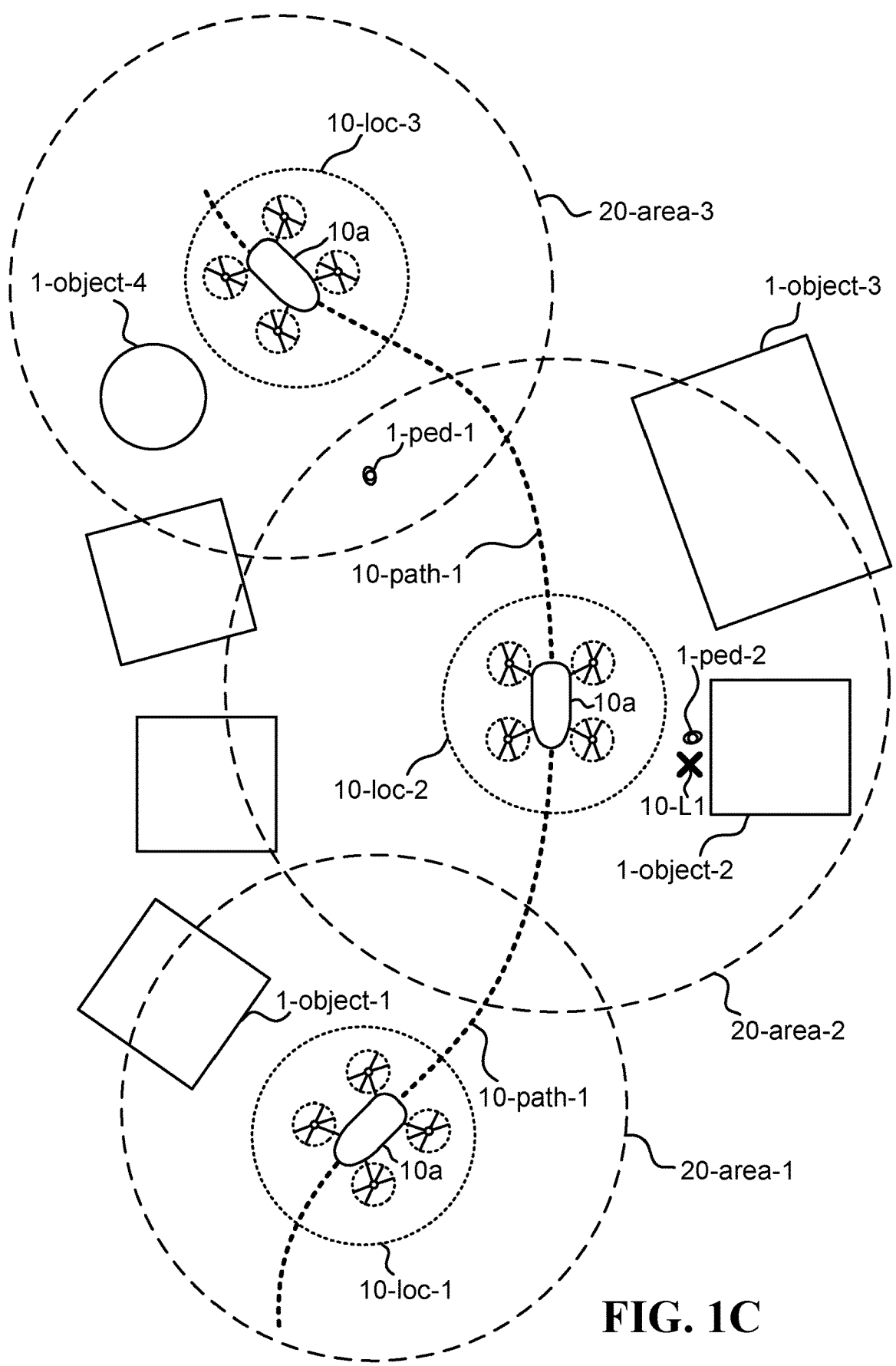
FIG. 1C illustrates one embodiment of a low-flying road-following drone flying along a path above a road and capturing visual records of surrounding environments at different times and different locations along the path of progression.

FIG. 1C illustrates one embodiment of a low-flying road-following drone 10a flying low along a path 10-path-1 that follows a road, a street, or a highway, and capturing visual records of surrounding environments at different times and different locations along the path of flight. For example, when the drone 10a is located at 10-loc-1, the on-board image sensors may capture visual records in the surrounding area 20-area-1, in which such visual records my include imagery data associated with object 1-object-1, which is perhaps a building. When the drone 10a is located at 10-loc-2, the on-board image sensors may capture visual records in the surrounding area 20-area-2, in which such visual records my include imagery data associated with object 1-object-3, which is perhaps another building, and imagery data associated with pedestrians 1-ped-1, 1-ped-2. When the drone 10a is located at 10-loc-3, the on-board image sensors may capture visual records in the surrounding area 20-area-3, in which such visual records my include imagery data associated with object 1-object-4, which is perhaps a tree, and imagery data associated again with 1-ped-1. It is noted that the same pedestrian 1-ped-1 may be seen at two different points in time by the same drone 10a from two different direction, as the drone flies from location 10-loc-2 to location 10-loc-3. It is noted that pedestrian 1-ped-2 is located at 10-L1, in which such location can be determined by the drone 10a, to some degree of accuracy, by knowing the drone's position and orientation, perhaps by using an on-board GPS receiver, and by knowing the direction at which the relevant imagery data was captured. The images captured along the path of flight 10-path-1 may be used to generate three-dimensional data of the objects 1-object and help with navigating the drone 10 using techniques such as visual simultaneous localization and mapping (VSLAM).

Figure 1D:
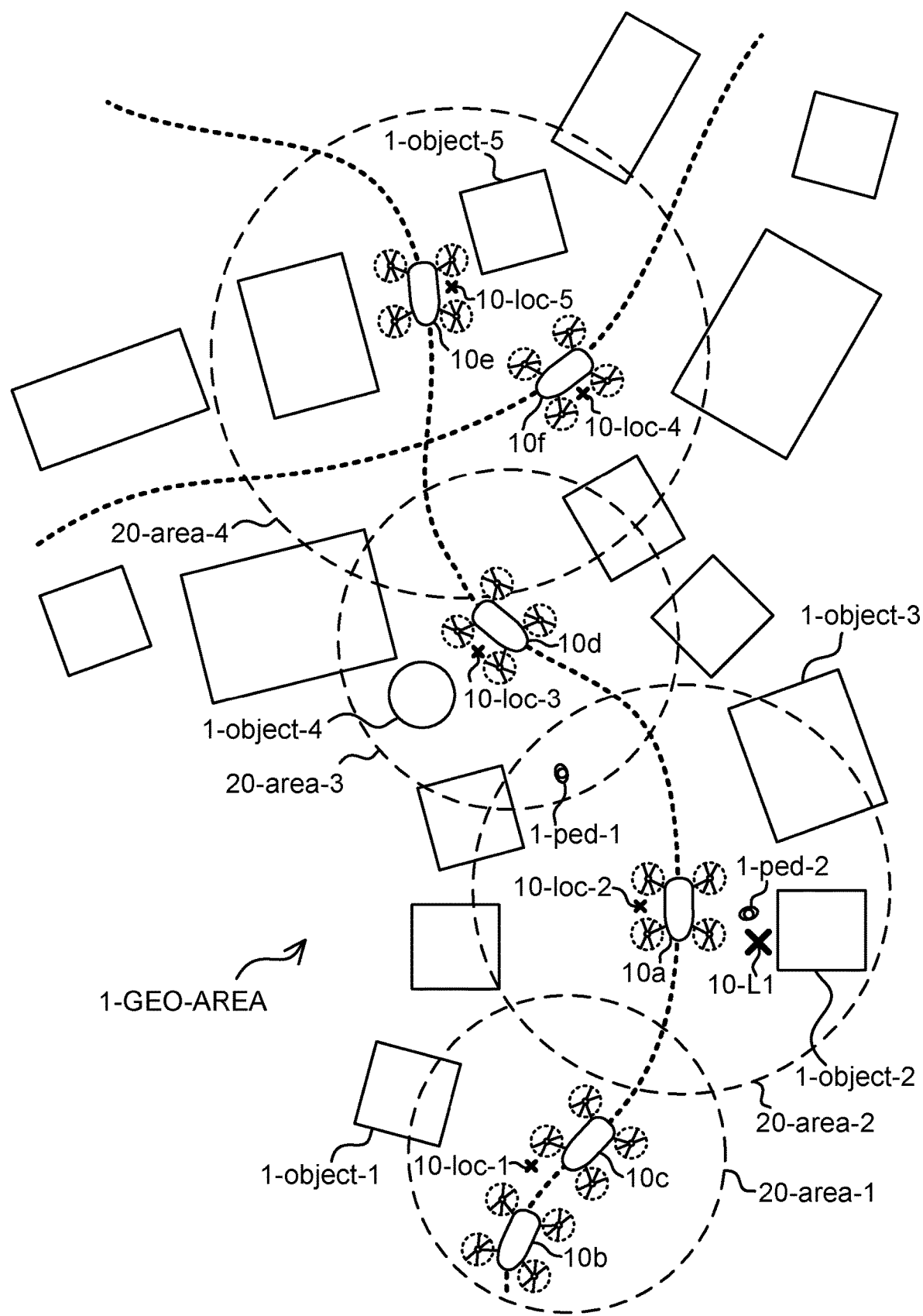
FIG. 1D illustrates one embodiment of a plurality of low-flying road-following drones traversing a certain geographical area while each of the low-flying road-following drones captures visual records of environments surrounding the drone.

FIG. 1D illustrates one embodiment of a plurality of low-flying road-following drones 10a, 10b, 10c, 10d, 10e, 10f traversing a certain geographical area 1-GEO-AREA, while each of the low-flying road-following drones 10a, 10b, 10c, 10d, 10e, 10f captures visual records of environments surrounding the drone. Drones 10b, 10c are depicted as being located at location 10-loc-1 and having visual access to area 20-area-1, drone 10a is depicted as being located at 10-loc-2 and having visual access to area 20-area-2, drone 10d is depicted as being located at 10-loc-3 and having visual access to area 20-area-3, and drones 10e, 10f are depicted as being located respectively at locations 10-loc-5, 10-loc-4 and having visual access to area 20-area-4, but at a later time the drones may be located at other locations and have visual access to other areas within the a certain geographical area 1-GEO-AREA. Over time, the drones 10a, 10b, 10c, 10d, 10e, 10f fly and capture visual records of various objects at various times and from various angles and distances, in which such objects 1-object-1, 1-object-2, 1-object-3, 1-object-4, 1-object-5, 1-ped-1, 1-ped-2 may be static or dynamic. Over time, data fusion techniques may be used to construct a very accurate and detailed three-dimensional model of the area 1-GEO-AREA and the ground related objects, in which such model can be later used by drones flying various missions to determine an accurate drone position and to accurately interact with some of the objects.

Figure 1E:
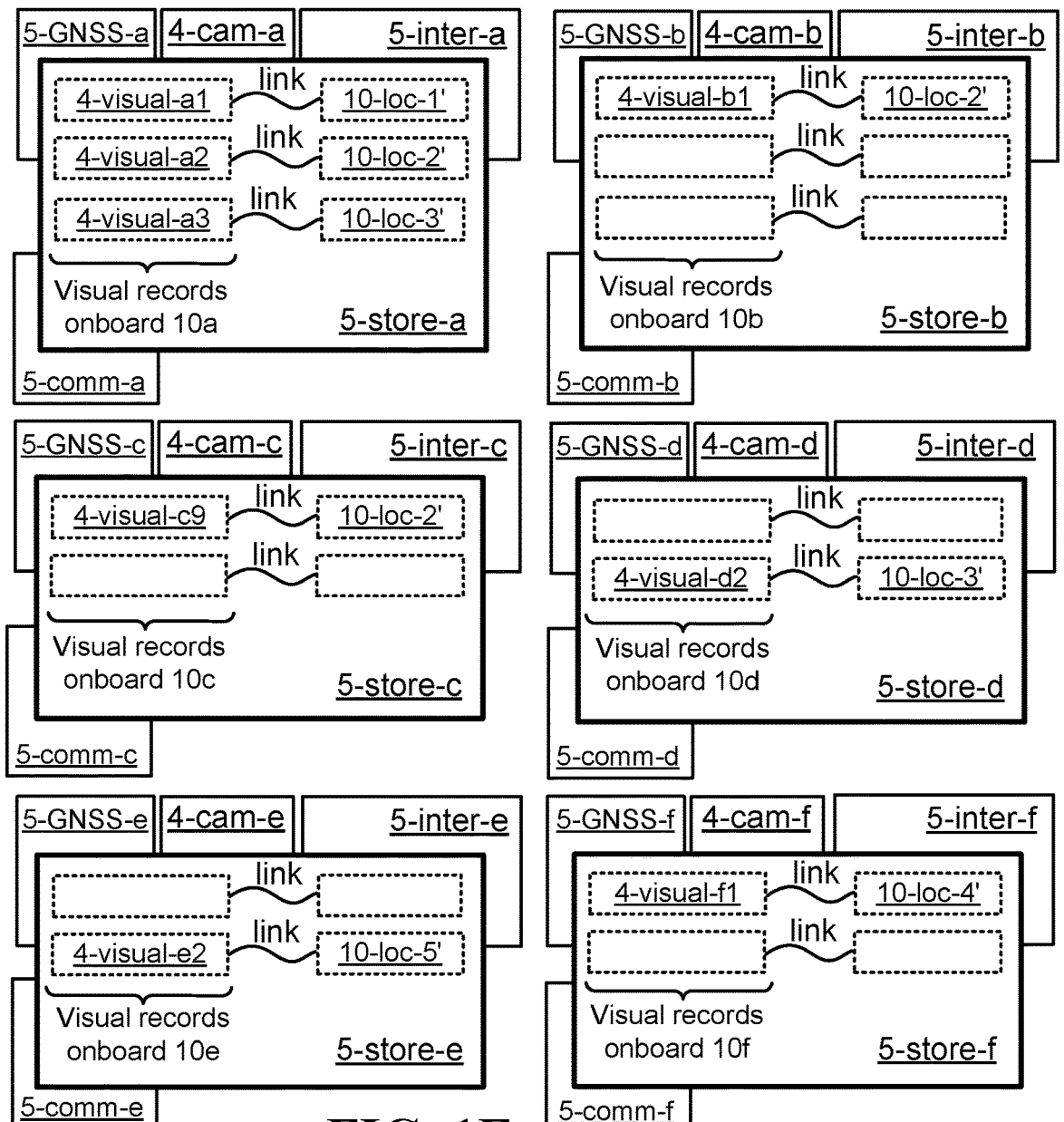
FIG. 1E illustrates one embodiment of visual records taken by the low-flying road-following drones and stored locally in which each of the visual records is associated with a particular geo-location.

FIG. 1E illustrates one embodiment of visual records taken by the low-flying road-following drones 10a, 10b, 10c, 10d, 10e, 10f (FIG. 1D) and stored locally, in which each of the visual records is associated with a particular geo-location. For example, drone 10a has stored the visual records 4-visual-a1, 4-visual-a2, 4-visual-a3 in storage space 5-store-a that is on-board 10a, in which 4-visual-a1 may be associated with the location 10-loc-1, which appears as coordinates 10-loc-1', 4-visual-a2 may be associated with a location 10-loc-2, which appears as coordinates 10-loc-2', and 4-visual-a3 may be associated with a location 10-loc-3, which appears as coordinates 10-loc-3'. Drone 10b has stored the visual record 4-visual-b1 in on-board storage space 5-store-b, in which 4-visual-b1 may be associated with the location 10-loc-2, which appears as coordinates 10-loc-2'. Drone 10c has stored the visual record 4-visual-c9 in on-board storage space 5-store-c, in which 4-visual-c9 may be associated with the location 10-loc-2, which appears as coordinates 10-loc-2'. Drone 10d has stored the visual record 4-visual-d2 in on-board storage space 5-store-d, in which 4-visual-d2 may be associated with the location 10-loc-3, which appears as coordinates 10-loc-3'. Drone 10e has stored the visual record 4-visual-e2 in on-board storage space 5-store-e, in which 4-visual-e2 may be associated with the location 10-loc-5, which appears as coordinates 10-loc-5'. Drone 10f has stored the visual record 4-visual-f1 in on-board storage space 5-store-f, in which 4-visual-f1 may be associated with the location 10-loc-4, which appears as coordinates 10-loc-4'. Each of the drones 10a, 10b, 10c, 10d, 10e, 10f (FIG. 1D) is equipped with its own on-board resources and sensors. For example, 10a is equipped with a storage space 5-store-a, a GNSS device 5-GNSS-a, a set of cameras 4-cam-a, a data interface 5-inter-a, and a communication interface 5-comm-a. 10b is equipped with a storage space 5-store-b, a GNSS device 5-GNSS-b, a set of cameras 4-cam-b, a data interface 5-inter-b, and a communication interface 5-comm-b. 10c is equipped with a storage space 5-store-c, a GNSS device 5-GNSS-c, a set of cameras 4-cam-c, a data interface 5-inter-c, and a communication interface 5-comm-c. 10d is equipped with a storage space 5-store-d, a GNSS device 5-GNSS-d, a set of cameras 4-cam-d, a data interface 5-inter-d, and a communication interface 5-comm-d. 10e is equipped with a storage space 5-store-e, a GNSS device 5-GNSS-e, a set of cameras 4-cam-e, a data interface 5-inter-e, and a communication interface 5-comm-e. 10f is equipped with a storage space 5-store-f, a GNSS device 5-GNSS-f, a set of cameras 4-cam-f, a data interface 5-inter-f, and a communication interface 5-comm-f.

Figure 1F:
FIG. 1F illustrates one embodiment of accurately determining location of a structure using imagery data taken by a plurality of drones and later fused together.

FIG. 1F illustrates one embodiment of accurately determining location 10-L1-accurate of a structure 1-object-2 using imagery data taken by a plurality of drones and later fused together, e.g., using point cloud combining in conjunction with visual simultaneous localization and mapping (VSLAM) techniques. For example, object 1-object-2 may be a building with a roof that can function as a landing site (e.g., 2-temp, FIG. 1J) for drones, in which case data derived from 4-visual-a2, 4-visual-c9, 4-visual-b1 can accurately describe a relative location of the roof and thereby allowing drones to safely locate and land on the roof in accordance with some embodiments. Such accuracy 10-L1-accurate may be a sub-meter accuracy relative to other elements/objects in the environment.

Figure 1G:
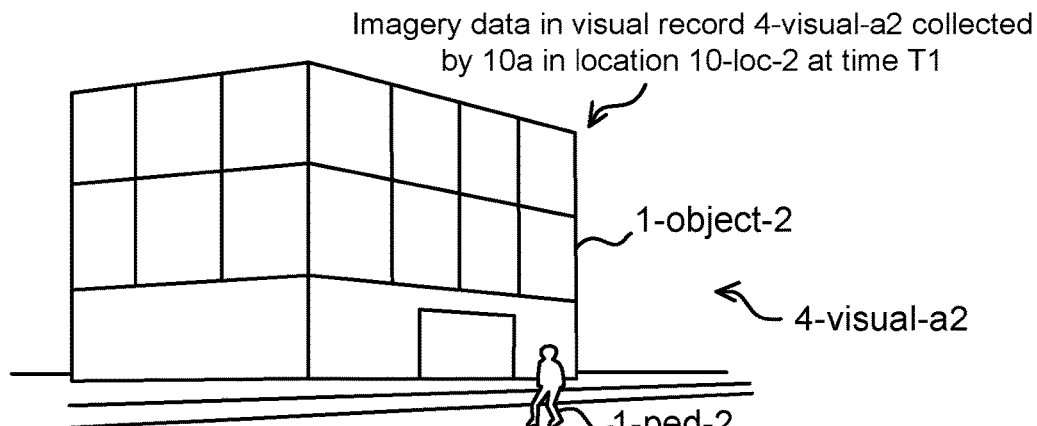
FIG. 1G illustrates one embodiment of imagery data in a visual record collected by a certain low-flying road-following drone at a particular time and in conjunction with a specific geo-location.

FIG. 1G illustrates one embodiment of imagery data in a visual record 4-visual-a2 collected by a certain low-flying road-following drone 10a (FIG. 1D) at a particular time T1 and in conjunction with a specific geo-location 10-loc-2 (FIG. 1D). Object 1-object-2 and pedestrian 1-ped-2 appear in this visual record.

Figure 1H:
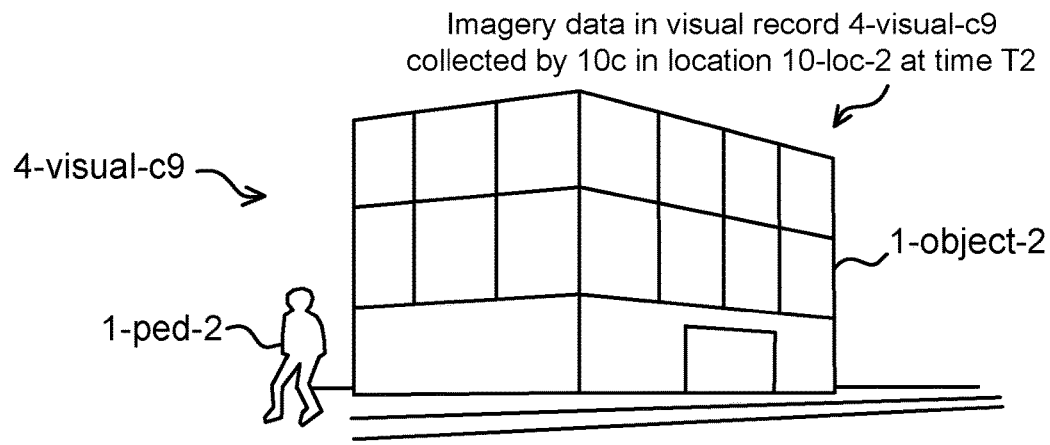
FIG. 1H illustrates one embodiment of imagery data in a visual record collected by another low-flying road-following drone at a later time and in conjunction with the same specific geo-location.

FIG. 1H illustrates one embodiment of imagery data in a visual record 4-visual-c9 collected by another low-flying road-following drone 10c at a later time T2 (when 10c has flown from 10-loc-1 in FIG. 1D to 10-loc-2) and in conjunction with the same specific geo-location 10-loc-2. Object 1-object-2 and pedestrian 1-ped-2 appear again in this visual record.

Figure 1I:
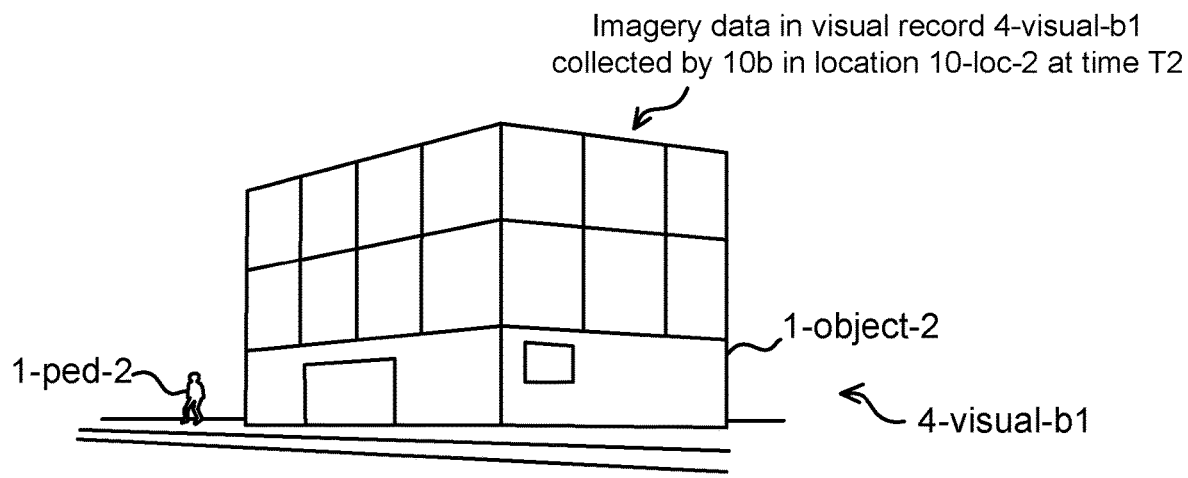
FIG. 1I illustrates one embodiment of imagery data in a visual record collected by yet another low-flying road-following drone at the later time and again in conjunction with the same specific geo-location.

FIG. 1I illustrates one embodiment of imagery data in a visual record 4-visual-b1 collected by yet another low-flying road-following drone 10b at the later time T2 (when 10b has flown from 10-loc-1 in FIG. 1D to 10-loc-2) and again in conjunction with the same specific geo-location 10-loc-2. Object 1-object-2 and pedestrian 1-ped-2 appear yet again in this visual record. The different visual records 4-visual-a2, 4-visual-c9, 4-visual-b1 of object 1-object-2 may be fused together to generate a very accurate and detailed three-dimensional model and location of object 1-object-2. The model can be later used to interact with object 1-object-2. For example, object 1-object-2 may be a building with a roof that can function as a landing site (e.g., 2-temp, FIG. 1J) for drones, in which case the model generated from 4-visual-a2, 4-visual-c9, 4-visual-b1 can accurately describe the roof and thereby allowing drones to safely locate and land on the roof in accordance with some embodiments.

Figure 1J:
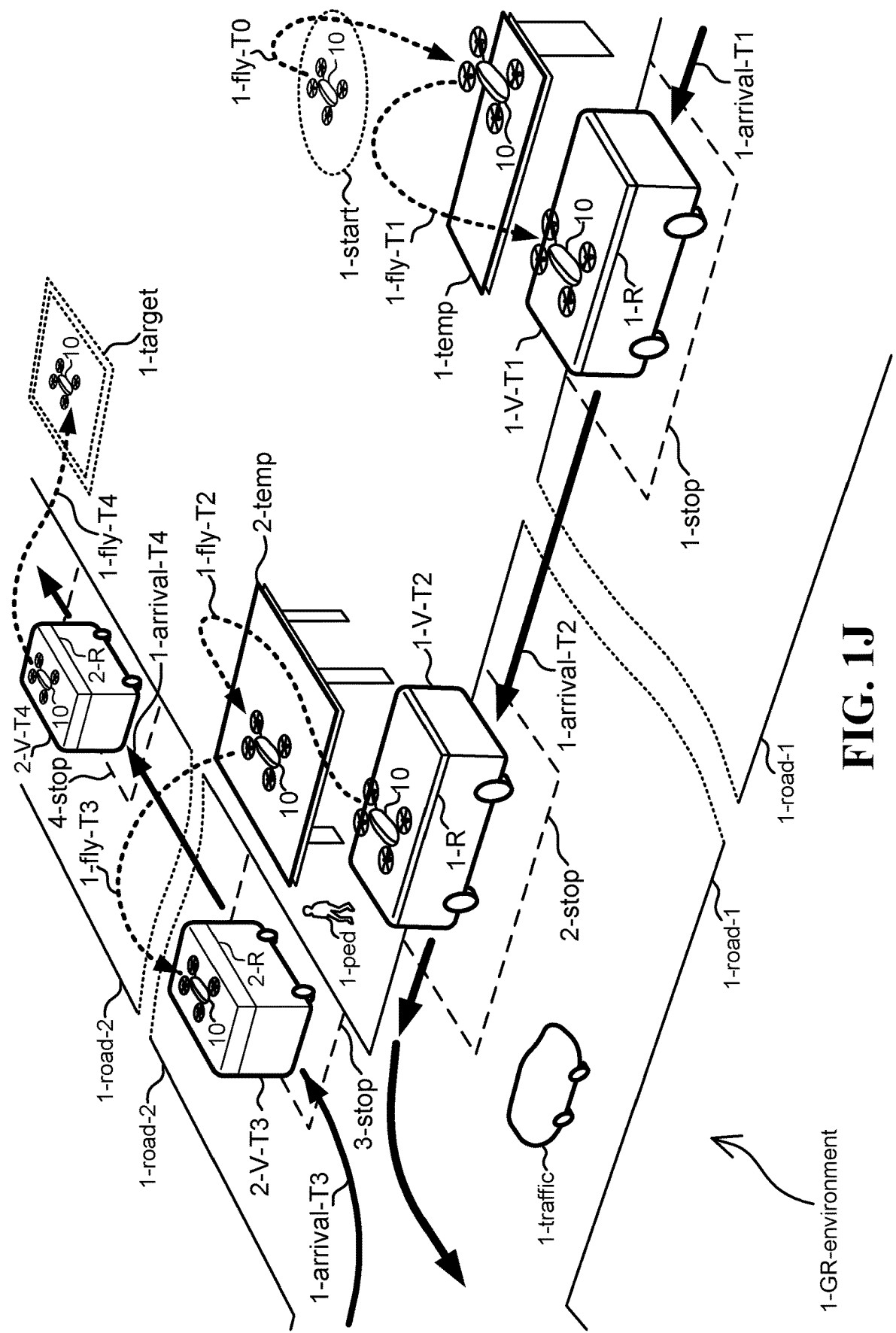
FIG. 1J illustrates one embodiment of a drone operative to utilize multiple vehicles together with temporary landing sites and designated on-road stopping areas to move between different locations.

FIG. 1J illustrates one embodiment of a drone 10 operative to utilize multiple vehicles 1-V, 2-V together with temporary landing sites 1-temp, 2-temp and designated on-road stopping areas 1-stop, 2-stop, 3-stop, 4-stop, to move between different locations and arrive at a certain target destination 1-target. In one embodiment, the drone 10 is required to get from one place 1-start to another 1-target, perhaps as a part of a package delivery mission, in which case the starting point 1-start could be a warehouse storing a package and the target 1-target is the place of delivery, or possibly as a part of a mission to survey surrounding environment 1-GR-environment including a plurality of streets 1-road-1, 1-road-2, in which case the starting point 1-start could be a place at which the drone 10 is currently located and the target 1-target is the place at which the drone 10 is to be located at the end of the survey, e.g., for charging batteries. The target 1-target could also be a place at which the drone 10 is needed for some reason. Now, the drone 10 could simply fly from the starting point 1-start to the target location 1-target, however, the distance could be too great for a non-stop flight, e.g., when 1-start is located in one city and 1-target is located in another city, or when the drone 10 is of a hovering type thus having a relatively short range, or when the mission calls for distance and duration that simply exceed capabilities of the drone 10, such as when the drone is required to survey city streets and to remain in-mission for many hours at a time, or when the drone is carrying a heavy load. In cases that a non-stop flight is not possible or not effective, the done 10, and/or a planning agent (5-P, FIG. 1A) associated therewith, may plan to utilize a plurality of vehicles to complete the mission. In one embodiment, each of the vehicles 1-V, 2-V (which may be a bus or another vehicle such as 12-V, FIG. 11A, or 12, FIG. 4B) is a part of a scheduled service, such as a bus service or a dedicated on-road transport service, in which, for example, vehicle 1-V is servicing a first route that happens to include a first plurality of roads 1-road-1, and vehicle 2-V is servicing a second route that happens to include a second plurality of roads 1-road-2. The done 10 and/or the planning agent 5-P may conclude that a combination of the first and second routes is needed to assist the drone 10 in getting from a current location 1-start to a destination location 1-target, and therefore, a plan is made to utilize both routes and associated vehicles 1-V, 2-V. According to the plan, the drone 10 executes a flight maneuver 1-fly-T0 at time T0, so as to position the drone at a temporary landing site 1-temp located in close proximity to a first designated stopping area 1-stop (e.g., in close proximity to a first bus stop in the first route) at which vehicle 1-V is scheduled to arrive and stop. At time T1, vehicle 1-V arrives and stops 1-arrival-T1 at the first designated stopping area 1-stop, thereby allowing the drone 10 to embark 1-fly-T1 on the vehicle, and catch a ride therewith, till arriving and stopping 1-arrival-T2, at time T2, at a second designated stopping area 2-stop (e.g., at a second bus stop in the first route), at which time the drone executes, according to the plan, another maneuver 1-fly-T2 to disembark the vehicle 1-V, and land on a second landing site 2-temp that acts as a "waiting point" for the drone in conjunction with "changing busses" according to the plan (and not unlike a passengers 1-ped changing transport routes). At time T3, vehicle 2-V arrives and stops 1-arrival-T3 at a third designated stopping area 3-stop (e.g., a bus stop in the second route), thereby allowing the drone 10 to embark 1-fly-T3 on the vehicle, and catch a ride therewith, till arriving and stopping 1-arrival-T4, at time T4, at a another designated stopping area 4-stop (e.g., at another bus stop in the second route), at which time the drone executes, according to the plan, a yet another maneuver 1-fly-T4 to disembark the vehicle 2-V, and reach destination 1-target according to the plan.

One embodiment is a system operative to minimize energy needed by a drone to move between different locations, comprising: a drone of a hovering type 10 (FIG. 1J); and a navigation computer 5-P (FIG. 1A). In one embodiment, the drone 10, using the navigation computer 5-P, is configured to perform multiple tripartite hops involving a plurality of on-road vehicles moving between a plurality of designated on-road stopping areas (e.g., the tripartite hop 1-fly-T2, 1-fly-T3 in FIG. 1J), and in which as a part of each of the tripartite hops, the drone 10 is configured to: ride on a certain one of the on-road vehicles 1-V (FIG. 1J) until arriving 1-arrival-T2 at time T2 (FIG. 1J) to a certain one of the designated on-road stopping areas 2-stop (FIG. 1J); execute, upon said arrival 1-arrival-T2, a flight maneuver 1-fly-T2 operative to reposition the drone 10 from a resting area 1-R on the certain on-road vehicle 1-V to a close-proximity intermediary landing area 2-temp (FIG. 1J) associated with the certain designated on-road stopping area 2-stop; wait (from T2 till T3) on the close-proximity intermediary landing area 2-temp until another one of the on-road vehicles 2-V (at time T3) arrives 1-arrival-T3 (FIG. 1J) at the certain designated on-road stopping area 2-stop (e.g., arrives at the exact same certain designated on-road stopping area 2-stop, or at a close-by associated stopping area 3-stop as depicted in FIG. 1J); execute, upon arrival 1-arrival-T3 of the another on-road vehicle 2-V-T3 at time T3 to the certain designated on-road stopping area 2-stop or 3-stop, another flight maneuver 1-fly-T3 (FIG. 1J) operative to reposition the drone 10 from the close-proximity intermediary landing area 2-temp to another resting area 2-R (FIG. 1J) on the another on-road vehicle 2-V; and ride on the another on-road vehicle 2-V; wherein, as a result of said close proximity, an aggregated period during which the drone rides the on-road vehicles 1-V, 2-V is at least 20 (twenty) times longer than an aggregated period during which the drone performs the flight maneuvers 1-fly-T2, 1-fly-T3 associated with each of the tripartite hops.

In one embodiment, the system further comprises a propulsion system 4-motor, 4-prop (FIG. 1A) onboard the drone 10, in which the propulsion system comprises: at least one motor 4-motor associated respectively with at least one propeller 4-prop; and a battery 4-btr (FIG. 1A) operative to power the propulsion system, in which the battery has a capacity of at least 10 Wh (ten watt-hour); wherein: the mass of the drone is between 150 g (one hundred and fifty grams) and 250 g (two hundred and fifty grams), and therefore the average power needed by the propulsion system during the flight maneuvers is under 100 W (one hundred watts); said multiple tripartite hops comprise at least 5 (five) tripartite hops (such as the tripartite hop 1-fly-T2, 1-fly-T3; said aggregated period of riding the on-road vehicles 1-V, 2-V is longer than 2 (two) hours, therefore, per the first 2 (*two*) hours of riding the on-road vehicles, the drone 10 spends less than 6 (six) minutes performing the flight maneuvers associated with the tripartite hops, and therefore each of the flight maneuvers (e.g., 1-fly-T2) takes, on average, less than 36 (thirty six) seconds to complete; during said less than 6 (six) minutes of performing the flight maneuvers, the energy consumed by the propulsion system is therefore less than 36,000 J (thirty six thousand joules); and therefore, the battery 4-btr, charged with said at least 10 Wh capacity, is configured support the entire first 2 (*two*) hours of said aggregated period of riding, and the associated aggregated period of flight maneuvering, without needing to recharge.

In one embodiment, the battery 4-btr has a capacity of at least 50 Wh (fifty watt-hour); wherein: the mass of the drone 10 is between 2.5 kg (two point five kilograms) and 5 kg (five kilograms), and therefore the average power needed by the propulsion system during the flight maneuvers is under 500 W (five hundred watts); said multiple tripartite hops comprise at least 5 (five) tripartite hops; said aggregated period of riding the on-road vehicles is longer than 2 (two) hours, therefore, per the first 2 (*two*) hours of riding the on-road vehicles, the drone spends less than 6 (six) minutes performing the flight maneuvers associated with the tripartite hops, and therefore each of the flight maneuvers takes, on average, less than 36 (thirty six) seconds to complete; during said less than 6 (six) minutes of performing the flight maneuvers, the energy consumed by the propulsion system is therefore less than 180,000 J (one hundred and eighty thousand joules); and therefore, the battery 4-btr, charged with said at least 50 Wh capacity, is configured support the entire first 2 (*two*) hours of said aggregated period of riding, and the associated aggregated period of flight maneuvering, without needing to recharge.

In one embodiment, the battery 4-btr has a capacity of at least 70 Wh (fifty watt-hour); wherein: the mass of the drone 10 is between 5 kg (five kilograms) and 10 kg (ten kilograms), and therefore the average power needed by the propulsion system during the flight maneuvers is under 700 W (seven hundred watts); said multiple tripartite hops comprise at least 5 (five) tripartite hops; said aggregated period of riding the on-road vehicles is longer than 2 (two) hours, therefore, per the first 2 (*two*) hours of riding the on-road vehicles, the drone spends less than 6 (six) minutes performing the flight maneuvers associated with the tripartite hops, and therefore each of the flight maneuvers takes, on average, less than 36 (thirty six) seconds to complete; during said less than 6 (six) minutes of performing the flight maneuvers, the energy consumed by the propulsion system is therefore less than 252,000 J (two hundred and fifty two thousand joules); and therefore, the battery 4-btr, charged with said at least 70 Wh capacity, is configured support the entire first 2 (*two*) hours of said aggregated period of riding, and the associated aggregated period of flight maneuvering, without needing to recharge.

In one embodiment, the battery 4-btr has a capacity of at least 100 Wh (one hundred watt-hour); wherein: the mass of the drone 10 is between 10 kg (ten kilograms) and 25 kg (twenty five kilograms), and therefore the average power needed by the propulsion system during the flight maneuvers is under 1,000 W (one thousand watts); said multiple tripartite hops comprise at least 5 (five) tripartite hops; said aggregated period of riding the on-road vehicles is longer than 2 (two) hours, therefore, per the first 2 (*two*) hours of riding the on-road vehicles, the drone spends less than 6 (six) minutes performing the flight maneuvers associated with the tripartite hops, and therefore each of the flight maneuvers takes, on average, less than 36 (thirty six) seconds to complete; during said less than 6 (six) minutes of performing the flight maneuvers, the energy consumed by the propulsion system is therefore less than 360,000 J (three hundred and sixty thousand joules); and therefore, the battery 4-btr, charged with said at least 100 Wh capacity, is configured support the entire first 2 (*two*) hours of said aggregated period of riding, and the associated aggregated period of flight maneuvering, without needing to recharge.

In one embodiment, each of the on-road vehicles 1-V, 2-V is associated with at least one of: (i) a bus, (ii) an autonomous vehicle (e.g., 12-V, FIG. 11A), (iii) an on-demand platform operative to arrive at a requested designated location, (iv) a taxi, and (v) a private car.

In one embodiment, the drone 10 is configured, as a part of said another flight maneuver 1-fly-T3, to land on the resting area 2-R only after the certain on-road vehicle 2-V-T3 comes to a complete stop in conjunction with the respective designated on-road stopping area 3-stop; and each of the designated on-road stopping areas 2-stop, 3-stop is associated with at least one of: (i) a specific portion of a road located beside an associated bus station and allocated for busses for picking up and dropping off bus passengers, (ii) a portion of a road located beside a traffic light and over which on-road vehicles stop when the traffic light is red, (iii) a parking space, (iv) any portion of a road over which at least one of the on-road vehicles is expected to stop, and (v) any portion of a road over which at least one of the on-road vehicles is ordered to stop.

In one embodiment, each of the close-proximity intermediary landing areas 2-temp associated with the certain designated on-road stopping area 2-stop, 3-stop is related to at least one of: (i) a bus station located in close proximity to the respective designated on-road stopping area, in which the designated on-road stopping area is a specific portion of road located beside the bus station and allocated for busses for picking up and dropping off bus passengers from the bus station, and in which said close-proximity is less than 50 (fifty) meters, (ii) a roof and/or a balcony and/or a window-related-location of a building located in close proximity to the respective designated on-road stopping area, in which the designated on-road stopping area is a parking space, and in which said close-proximity is less than 200 (two hundred) meters, and (iii) an elevated landing area associated with an outdoor pole and/or a building and/or any outdoor infrastructure elevated at least 2 (two) meters above ground, which is located in close proximity to the respective designated on-road stopping area, in which the designated on-road stopping area is a parking space, and in which said close-proximity is less than 200 (two hundred) meters.

In one embodiment, said riding on the certain one of the on-road vehicles 1-V and said riding on the another one of the on-road vehicles 2-V, together with other ridings conducted by the drone 10 in conjunction with the multiple tripartite hops, are planned in conjunction with the navigation computer 5-P, so as to cause the drone to visit, in a predetermined order, several ones of the close-proximity intermediary landing areas 1-temp, 2-temp, thereby executing a navigation plan.

In one embodiment, the certain designated on-road stopping area 2-stop, 3-stop comprises two separate stopping areas 2-stop and 3-stop, each associated with a different bus stop; said arrival 1-arrival-T2 of the certain one of the on-road vehicles 1-V at the certain designated on-road stopping area is an arrival of the certain one of the on-road vehicles at the certain one 2-stop of the two separate stopping areas associated with a first one of the bus stops; said arrival of the another one of the on-road vehicles 2-V at the certain designated on-road stopping area is an arrival of the another one of the on-road vehicles at the another one 3-stop of the two separate stopping areas associated with the other one of the bus stops; and each of the two separate stopping areas 2-stop and 3-stop, and the close-proximity intermediary landing area 2-temp, are all in a proximity of less than 400 (four hundreds) meters from each other, thereby causing the flight maneuvers 1-fly-T2, 1-fly-T3 to be a short-distance flight maneuvers.

Figure 1K:
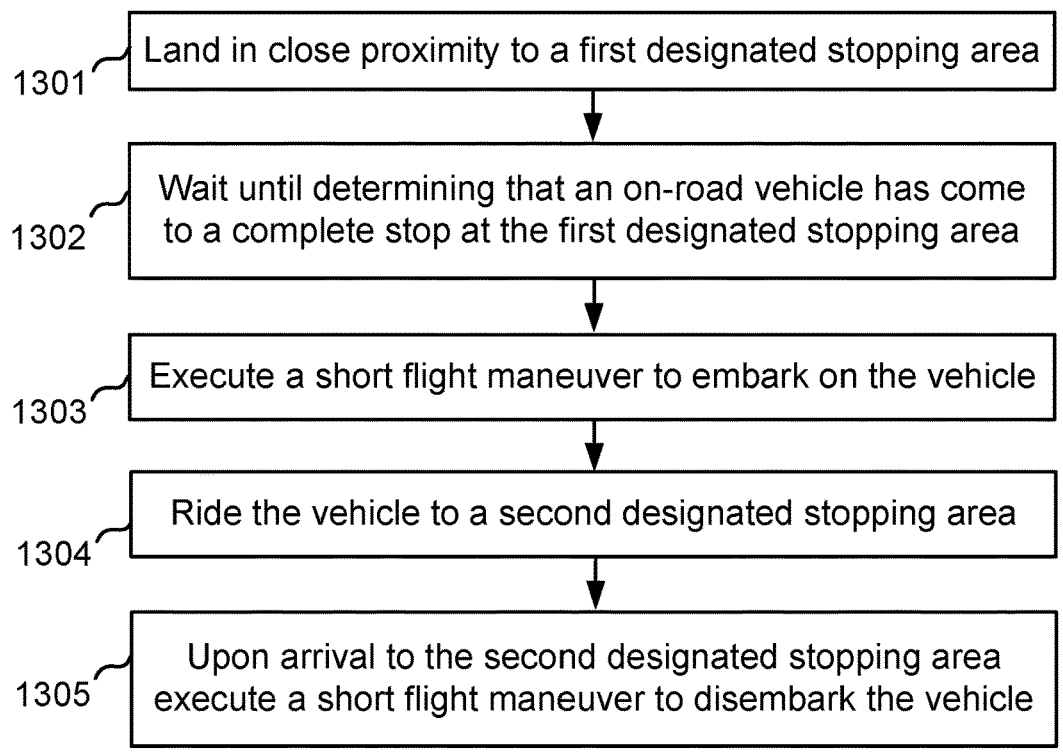
FIG. 1K illustrates one embodiment of a method for minimizing energy needed by a drone to move between different locations.

FIG. 1K illustrates one embodiment of a method for minimizing energy needed by a drone to move between different locations. The method includes: in step 1301, landing 1-fly-T0 (FIG. 1J), by a drone 10 (FIG. 1J), on a first landing area 1-temp (FIG. 1J), in which the first landing area is located in a certain first proximity to a first designated on-road stopping area 1-stop (FIG. 1J). In step 1302, determining, by the drone 10, that a first on-road vehicle 1-V-T1 (FIG. 1J) has now (at time T1) come to a complete stop in conjunction with the first designated on-road stopping area 1-stop. In step 1303, executing, as a result of said determination, by the drone 10, while the first on-road vehicle 1-V-T1 is still in complete stop, a first flight maneuver 1-fly-T1 (FIG. 1J) operative to reposition the drone 10 from the first landing area 1-temp to a first on-vehicle riding area 1-R (FIG. 1J) associated with the first on-road vehicle 1-V-T1. In step 1304, riding, by the drone 10, on the first on-road vehicle 1-V, from the first designated on-road stopping area 1-stop to a second designated on-road stopping area 2-stop (FIG. 1J). In step 1305, executing, upon arrival (at time T2) of the first on-road vehicle 1-V-T2 (FIG. 1J) to the second designated on-road stopping area 2-stop, by the drone 10, a second flight maneuver 1-fly-T2 operative to reposition the drone from the first on-vehicle riding area 1-R to a second landing area 2-temp (FIG. 1J) that is located in a certain second proximity to the second designated on-road stopping area 2-stop. Examples for riding areas 1-R may include a roof of a bus, a cargo space of a truck, or a placement facility using, for example, vertical guides (e.g., 1-guide-a, 1-guide-b, FIG. 11B) or other mechanical means to secure the drone 10 onboard the vehicle.

In one embodiment, the drone 10 is of a hovering type, and comprises a propulsion system 4-prop, 4-motor (FIG. 1A) comprising at least one motor 4-motor associated respectively with at least one propeller 1-prop, in which the propulsion system at least reduces power consumption during said riding compared to a power consumed by the propulsion system during the first and second flight maneuvers 1-fly-T1, 1-fly-T2; the first proximity is under 20 (twenty) meters; the second proximity is under 20 (twenty) meters; and therefore the method further comprises: reducing, as a result of the first and second proximities, energy consumed by the propulsion system during the first and second flight maneuvers 1-fly-T1, 1-fly-T2; and increasing energy efficiency associated with relocation of the drone 10 from the first landing area 1-temp to the second landing area 2-temp, as a combined result of said reduction in energy consumption and said reduction in power consumption. In one embodiment, the propulsion system 4-prop, 4-motor is substantially idle during said riding; the mass of the drone 10 is between 150 g (one hundred and fifty grams) and 250 g (two hundred and fifty grams), and therefore the average power needed by the propulsion system during the first and second flight maneuvers 1-fly-T1, 1-fly-T2 is under 100 (one hundred) watts; and said increased energy efficiency results in less than a total of 2,000 J (two thousand joules) consumed by the propulsion system from starting said execution of the first maneuver till finishing said execution of the second maneuver, and regardless of a distance between the first landing area 1-temp and the second landing area 2-temp, in which said distance is between 1 (one) kilometer and 100 (one hundred) kilometers. In one embodiment, the drone 10 is used for surveillance, and the method further comprises: being on the move, by the drone, while riding on-road vehicles 1-V, 2-V (FIG. 1J) such as the first on-road vehicle 1-V, for a duration of at least 8 (eight) hours in a single day, without charging and/or replacing batteries 4-tr (FIG. 1A), as a result of consuming, during said day, less than 70,000 J (seventy thousand joules), which is sufficient for conducting at least twenty (twenty) flight maneuvers 1-fly-T0, 1-fly-T1, 1-fly-T2, 1-fly-T3, 1-fly-T4 such as the first and second flight maneuvers 1-fly-T1, 1-fly-T2.

In one embodiment, the propulsion system 4-prop, 4-motor is substantially idle during said riding; the mass of the drone 10 is between 2.5 kg (two point five kilograms) and 5 kg (five kilograms), and therefore the average power needed by the propulsion system during the first and second flight maneuvers 1-fly-T1, 1-fly-T2 is under 500 (five hundred) watts; said increased energy efficiency results in less than a total of 10,000 J (ten thousand joules) consumed by the propulsion system from starting said execution of the first maneuver till finishing said execution of the second maneuver, and regardless of a distance between the first landing area 1-temp and the second landing area 2-temp, in which said distance is between 1 (one) kilometer and 100 (one hundred) kilometers.

In one embodiment, the propulsion system 4-prop, 4-motor is substantially idle during said riding; the mass of the drone 10 is between 5 kg (five kilograms) and 10 kg (ten kilograms), and therefore the average power needed by the propulsion system during the first and second flight maneuvers 1-fly-T1, 1-fly-T2 is under 700 (seven hundred) watts; said increased energy efficiency results in less than a total of 14,000 J (fourteen thousand joules) consumed by the propulsion system from starting said execution of the first maneuver till finishing said execution of the second maneuver, and regardless of a distance between the first landing area 1-temp and the second landing area 2-temp, in which said distance is between 1 (one) kilometer and 100 (one hundred) kilometers.

In one embodiment, the propulsion system 4-prop, 4-motor is substantially idle during said riding; the mass of the drone 10 is between 10 kg (ten kilograms) and 25 kg (twenty five kilograms), and therefore the average power needed by the propulsion system during the first and second flight maneuvers 1-fly-T1, 1-fly-T2 is under 1000 (one thousand) watts; said increased energy efficiency results in less than a total of 20,000 J (twenty thousand joules) consumed by the propulsion system from starting said execution of the first maneuver till finishing said execution of the second maneuver, and regardless of a distance between the first landing area 1-temp and the second landing area 2-temp, in which said distance is between 1 (one) kilometer and 100 (one hundred) kilometers. In one embodiment, the drone 10 is used for delivering cargo such as packages and containers, and the method further comprises: being on the move for delivering cargo, by the drone, while riding on-road vehicles 1-V, 2-V such as the first on-road vehicle 1-V, for a duration of at least 4 (four) hours in a single day, without charging and/or replacing batteries 4-btr (FIG. 1A), as a result of consuming, during said day, less than 700,000 J (seven hundred thousand joules), which is sufficient for conducting at least twenty (twenty) flight maneuvers 1-fly-T0, 1-fly-T1, 1-fly-T2, 1-fly-T3, 1-fly-T4 such as the first and second flight maneuvers 1-fly-T1, 1-fly-T2.

In one embodiment, the first on-road vehicle 1-V is a bus; the first on-vehicle riding area 1-R is a landing area located on a roof of the bus; the first landing area 1-temp is located on a roof of a first bus station; the first designated on-road stopping area 1-stop is a first portion of road located beside the first bus station and allocated for busses for picking up and dropping off bus passengers from the first bus station; the second landing area 2-temp is located on a roof of a second bus station; and the second designated on-road stopping area 2-stop is a second portion of road located beside the second bus station and allocated for busses picking up and dropping off bus passengers from the second bus station. In one embodiment, the first on-road vehicle 1-V is an on-demand platform operative to carry drones; the first on-vehicle riding area 1-R is a landing area on the on-demand platform that is directly accessible to the drone 10; and the method further comprising: ordering, by an agent associated with the drone 10, a pickup of the drone from the first designated on-road stopping area 1-stop; in which: the first designated on-road stopping area is a first stopping area designated by the agent as a part of said ordering; and the second designated on-road stopping area 2-stop is a second stopping area designated by the agent as a part of said ordering.

In one embodiment, the method further comprising: prior to said landing 1-fly-T0, planning a riding route by an agent 5-P (FIG. 1A) associated with the drone 10, in which said riding by the drone on the first on-road vehicle 1-V from the first designated on-road stopping area 1-stop to a second designated on-road stopping area 2-stop is associated with a first part of said riding route; and in association with a second part of said riding route, the method further comprises: determining, by the drone 10, that a second on-road vehicle 2-V-T3 at time T3 (FIG. 1J) has now come to a complete stop in conjunction with the second designated on-road stopping area 2-stop (e.g., the exact same second designated on-road stopping area 2-stop, or a close-by associated on-road stopping area 3-stop in FIG. 1J); executing, as a result of said determination, by the drone 10, while the second on-road vehicle 2-V-T3 is still in complete stop, a third flight maneuver 1-fly-T3 operative to reposition the drone from the second landing area 2-temp to a second on-vehicle riding area 2-R (FIG. 1J) associated with the second on-road vehicle 2-V; riding, by the drone 10, on the second on-road vehicle 2-V, from the second designated on-road stopping area (2-stop or 3-stop) to a third designated on-road stopping area 4-stop (FIG. 1J); and executing, upon arrival of the second on-road vehicle 2-V-T4 at time T4 (FIG. 1J) to the third designated on-road stopping area 4-stop, by the drone 10, a fourth flight maneuver 1-fly-T4 (FIG. 1J) operative to reposition the drone from the second on-vehicle riding area 2-R to a third landing area 1-target (FIG. 1J) that is located in a certain third proximity to the third designated on-road stopping area 4-stop.

Figure 1L:
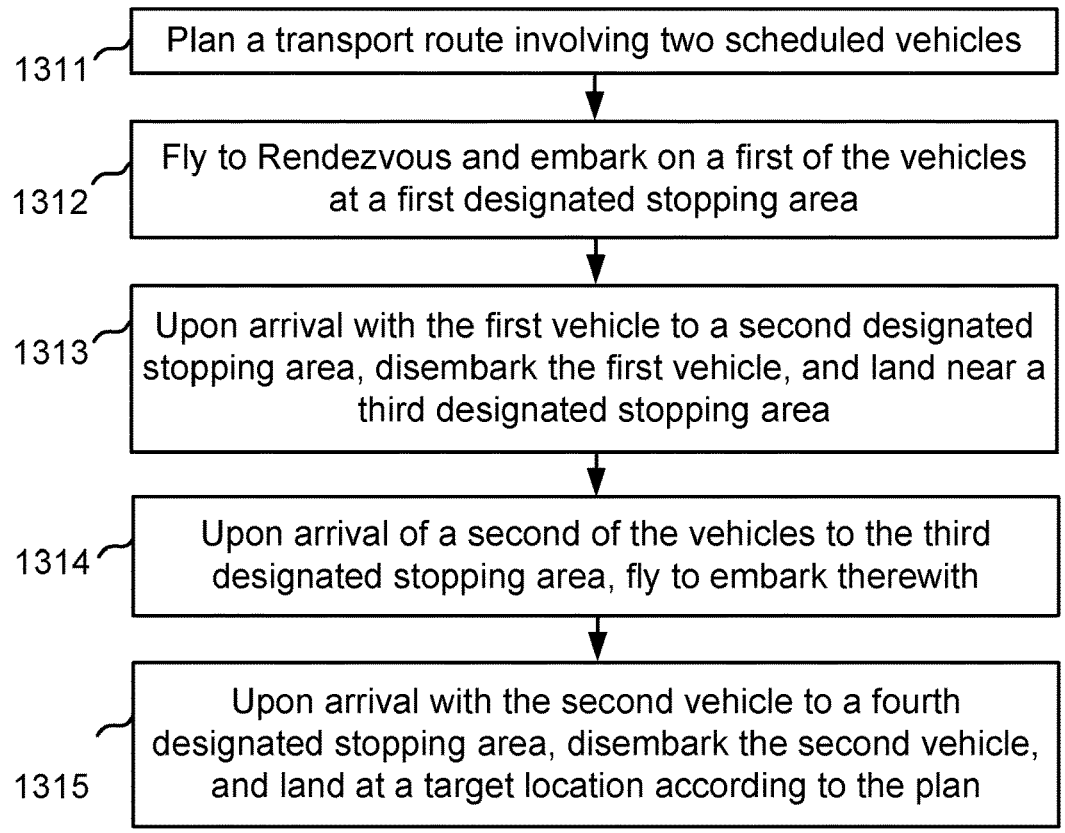
FIG. 1L illustrates one embodiment of another method for minimizing energy needed by a drone to move between different locations.

FIG. 1L illustrates one embodiment of another method for minimizing energy needed by a drone to move between different locations. The method includes: in step 1311, accessing, by a planning agent 5-P (FIG. 1A), a schedule operative to describe future movement of a plurality of on-road vehicles 1-V, 2-V (FIG. 1J) between different designated stopping areas 1-stop, 2-stop, 3-stop, 4-stop (FIG. 1J), and further accessing a description of a target location 1-target (FIG. 1J) at which a drone 10 (FIG. 1J) is scheduled to arrive, in which the drone is currently located in close proximity to a first designated stopping area 1-stop (FIG. 1J); and planning, by the planning agent 5-P, according to said schedule and target location 1-target, a transport plan for the drone 10, in which the transport plan is operative identify at least a first one of the on-road vehicles 1-V scheduled to move from the first of the designated stopping areas 1-stop to a second of the designated stopping areas 2-stop, and a second one of the on-road vehicles 2-V scheduled to move from a third of the designated stopping areas 3-stop to a fourth of the designated stopping areas 4-stop, in which the second and third designated stopping areas 2-stop, 3-stop are located in close proximity to each other, and the fourth designated stopping area 4-stop is located in close proximity to the target location 1-target. Executing the transport plan by the drone 10, in which said execution includes: in step 1312, flying 1-fly-T1 at time T1 (FIG. 1J), by the drone 10, to the first designated stopping area 1-stop, thereby rendezvousing with the first on-road vehicle 1-V-T1 at time T1 and catching a ride therewith until arriving 1-arrival-T2 (FIG. 1J) at time T2 to the second designated stopping area 2-stop. In step 1313, upon arrival 1-arrival-T2 to the second designated stopping area: flying, by the drone 10, from the first on-road vehicle 1-V-T2 at time T2 to a temporary landing area 2-temp (FIG. 1J) located in close proximity to both the second and third designated stopping areas 2-stop, 3-stop, and waiting (from T2 till T3) for the second on-road vehicle 2-V to arrive 1-arrival-T3 (FIG. 1J). In step 1314, upon arrival 1-arrival-T3 of the second on-road vehicle 2-V at time T3 to the third designated stopping area 3-stop: flying 1-fly-T3, by the drone 10, to the third designated stopping area 3-stop, thereby rendezvousing with the second on-road vehicle 2-V and catching a ride therewith until arriving 1-arrival-T4 (FIG. 1J) at time T4 to the fourth designated stopping area 4-stop. In step 1315, upon arrival 1-arrival-T4 of the second on-road vehicle 2-V to the fourth designated stopping area 4-stop: flying 1-fly-T4, by the drone 10, to the target location 1-target.

In one embodiment, said schedule is a bus schedule; the first and second on-road vehicles 1-V, 2-V are a first and second buses; the first designated stopping area 1-stop is a stopping area associated with a first bus stop; the second designated stopping area 2-stop is a stopping area associated with a second bus stop; the third designated stopping area 3-stop is a stopping area associated with a third bus stop; the fourth designated stopping area 4-stop is a stopping area associated with a fourth bus stop; the first bus 1-V is a bus that is scheduled to stop at the first bus stop, and then move to and stop at the second bus stop; the second bus 2-V is a bus that is scheduled to stop at the third bus stop, and then move to and stop at the fourth bus stop; the target location 1-target is a location to which a delivery is to be made by the drone 10; each of the close proximities is a proximity of less than 400 (four hundred) meters, thereby causing each of said flights 1-fly-T1, 1-fly-T2, 1-fly-T3, 1-fly-T4 to be a short-distance flight, in which the aggregated length of all of said flights is under 1 (one) kilometer; and the aggregated length of all said rides is above 2 (two) kilometers, thereby causing the drone 10 to ride most of the way to the target location 1-target, and thereby minimizing energy needed by the drone.

Figure 1M:
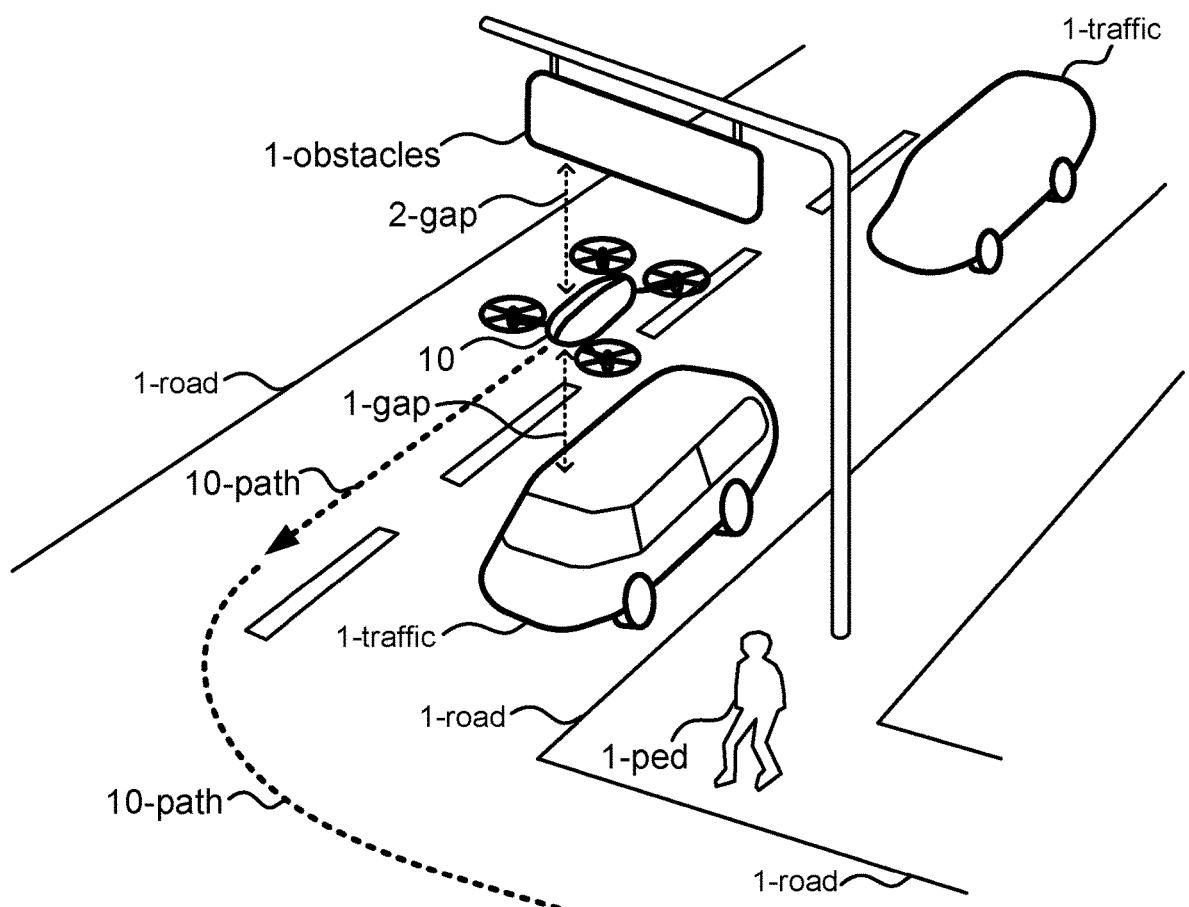
FIG. 1M illustrates one embodiment of a low-flying road-following drone flying directly above road traffic and directly bellow elevated road obstacles.

FIG. 1M illustrates one embodiment of a low-flying road-following drone 10 flying directly above road traffic 1-traffic and directly bellow elevated road obstacles 1-obstacles. The drone 10 moves forward along a path of flight 10-path that follows a road 1-road, in which the path of flight is situated just above road traffic 1-traffic such as cars and trucks, and right below elevated road obstacles 1-obstacles such as overhead signs and hanging traffic lights. By keeping a certain distance 1-gap above road traffic 1-traffic, and a certain distance 2-gap below elevated road obstacles 1-obstacles, the drone 10 can easily avoid collisions with the traffic and obstacles while maintaining a mostly uninterrupted flight along the path of progression 10-path, while consequently able to achieve substantial flight speeds in a safe manner. The path of flight 10-path is situated at a relatively low altitude above road level 1-road, in which such low altitude is both high enough to avoid the traffic 1-traffic underneath and low enough to avoid the elevated obstacles 1-obstacles above. A low altitude flight along a path 10-path that passes right above road traffic also allows the drone 10 to capture clear imagery data of surrounding objects, such as pedestrians 1-ped walking on sidewalks along the road 1-road, and to get as close as two or three meters from the pedestrians while still keeping a safe distance from traffic and obstacles above, and while keeping a relatively high velocities while doing so. Flying low above traffic also reduces the risk of injuries as a result of a drone crash, as the path of flight 10-path passes mainly over cars that protect passengers inside. The path of flight 10-path may follow a direction of car movement below, or may be opposite the direction of car movement below. The path of flight 10-path may pass over moving cars, over parking cars, or over the boundary between two lanes in the road.

Figure 1N:
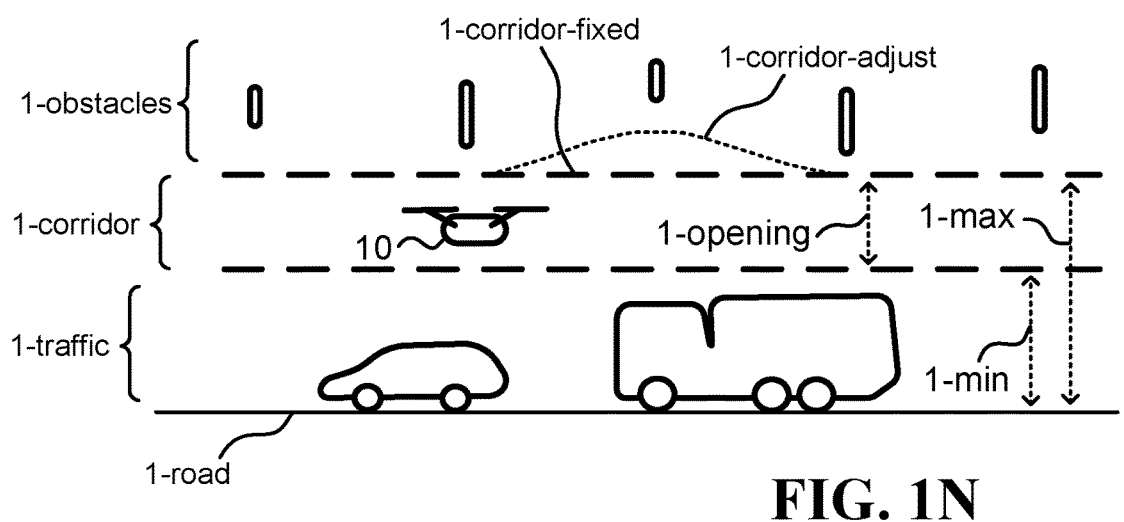
FIG. 1N illustrates one embodiment of the low-flying road-following drone flying via an uninterrupted flight corridor extending directly above road traffic and directly bellow elevated road obstacles.
Figure 10:
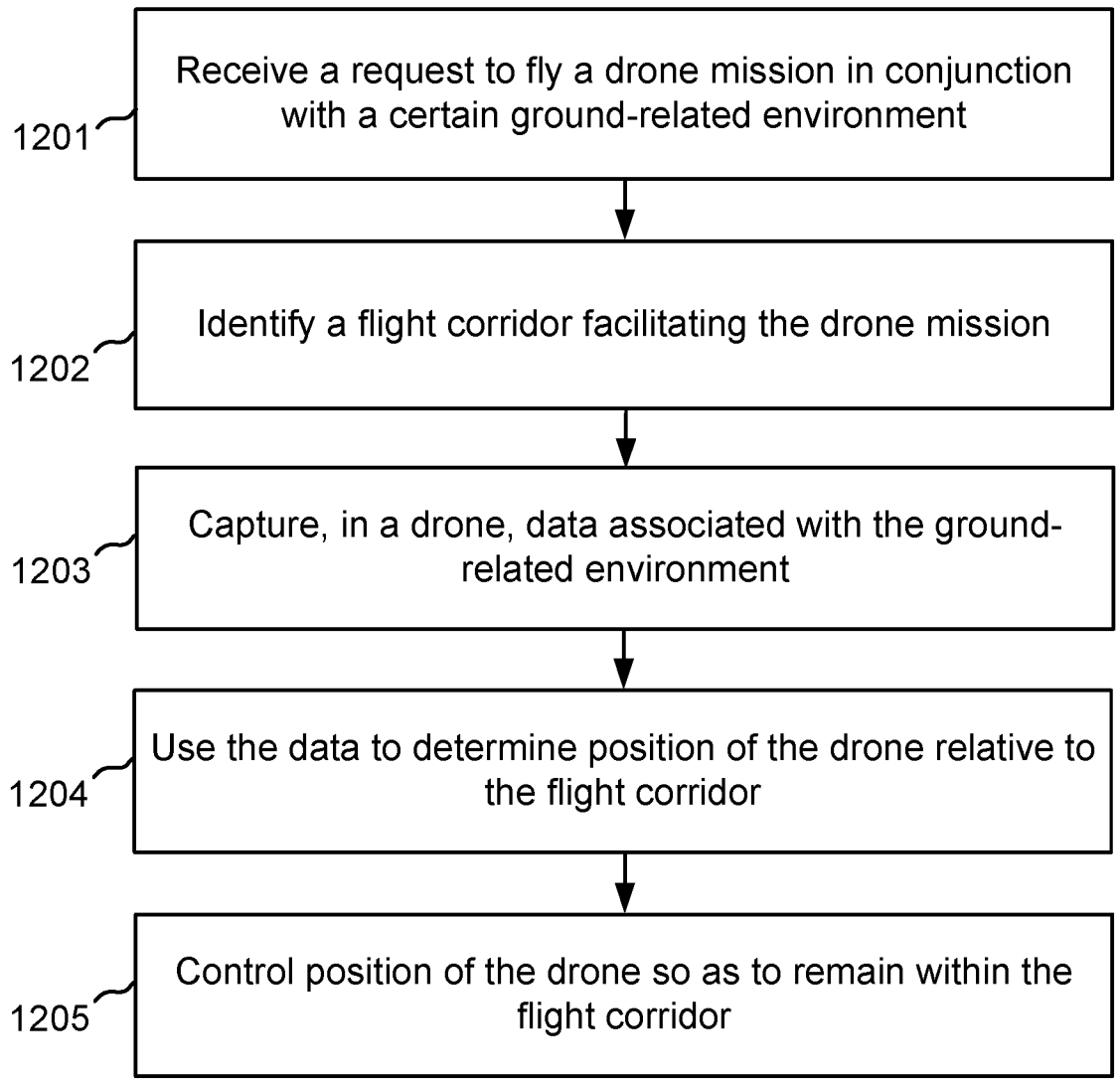
FIG. 10A illustrates one embodiment of a drone carrying a container into a hovering position above a group of vertical guides.
FIG. 10B illustrates one embodiment of the drone fitting the container in the group of vertical guides.
FIG. 10C illustrates one embodiment of the drone descending down the vertical guides with the container while the vertical guides restrict horizontal movement of the container and the drone and therefore keep the drone's propellers away from the vertical guides and from other near-by objects during the descent.
FIG. 10D illustrates one embodiment of the drone further descending down the vertical guides with the container until stacking the container on top of another container already stacked in the group of vertical guides.
FIG. 10E illustrates one embodiment of the drone ascending up the vertical guides while being horizontally restricted by the vertical guides which keep the drone's propellers away from the vertical guides and from other near-by objects during the ascent and while retaining the containers restricted in horizontal movement and therefore tightly stacked.
FIG. 10F illustrates one embodiment of a drone hovering above a group of vertical guides currently stacking two containers.
FIG. 10G illustrates one embodiment of the drone fitting a body thereof in the group of vertical guides.
FIG. 10H illustrates one embodiment of the drone descending down the vertical guides to grab the top container while the vertical guides restrict horizontal movement of the drone and therefore keep the drone's propellers away from the vertical guides and from other near-by objects during the descent.
FIG. 10I illustrates one embodiment of the drone ascending up the vertical guides with the container while the vertical guides restrict horizontal movement of the container and the drone and therefore keep the drone's propellers away from the vertical guides and from other near-by objects during the ascent.
FIG. 10J illustrates one embodiment of the drone carrying the container clear of the vertical guides.
FIG. 10K illustrates one embodiment of a top view of a drone positioned above a container in which both the drone and the container are horizontally restricted by a group of vertical guides and in which propellers of the drone are kept away from the vertical guides and from near-by objects as a result of said horizontal restriction.
FIG. 10L illustrates one embodiment of a top view of a drone's body and a container both aligned by length and angle with a group of vertical guides.
FIG. 10M illustrates one embodiment of a top view of a drone positioned above a container in which both the drone and the container are horizontally restricted by a group of vertical guides and in which propellers of the drone are kept away from the vertical guides and from near-by objects as a result of said horizontal restriction.
FIG. 10N illustrates one embodiment of a top view of a drone's body and a container both aligned by length and angle with a group of vertical guides in which the container is using adapters to achieve said alignment.
FIG. 10O illustrates one embodiment of a top view of a drone's body and a container both aligned by length with a group of vertical guides in which the container and drone are using stripes to achieve said alignment.
FIG. 10P illustrates one embodiment of an array of vertical guides arranged in groups in which the groups form a tightly packed pattern operative to efficiently stack containers in three-dimensions and in which the groups of guides are operative to vertically guide and horizontally restrict movement of a drone in facilitation of stacking containers and so as to protect propellers of the drone from hitting the guides and neighboring containers stacked in adjacent groups.
FIG. 10Q illustrates one embodiment of a top view of the horizontally-restricting array of guides arranged in groups in which the groups form a tightly packed checkered pattern that produces a configuration of spaces through which restricted propellers of the drone can fit without hitting the guides and the containers stacked in the array.
FIG. 10R illustrates one embodiment of a method for stacking containers in conjunction with drones and vertical guides.

FIG. 1N illustrates one embodiment of the low-flying road-following drone 10 flying via an uninterrupted flight corridor 1-corridor extending along the length of roads 1-road, directly above road traffic 1-traffic, and directly bellow elevated road obstacles 1-obstacles. The flight corridor 1-corridor has a certain width 1-opening that allows the drone 10 a safe and mostly uninterrupted flight. The flight corridor 1-corridor may have an upper bound 1-max that is limited by a minimum height allowed for overhead obstacles 1-obstacles, and a lower bound 1-min that is limited by a maximum height allowed for commercial motor vehicles (CMV). The flight corridor 1-corridor may be adjusted 1-corridor-adjust so as to account for actual obstacles detected, or it may be fixed 1-corridor-fixed.

One embodiment is a system operative to facilitate autonomous flight in populated areas by exploiting a flight corridor extending directly above road traffic and directly below elevated road obstacles. The system includes: an autonomous drone 10 (FIG. 1A, FIG. 1B, FIG. 1M) operative to fly, in which the drone comprises a positioning sub-system (e.g., at least one of elements 4-cam-1, 4-cam-2, 4-cam-3, 4-cam-4, 4-cam-5, 4-cam-6, 4-lidar, and 5-GNSS in FIG. 1A) operative to resolve an exact position of the drone 10 during flight; and a navigation sub-system 5-cpu/agent (located onboard or off-board the drone) operative to determine navigation plans for the drone 10.

In one embodiment, the navigation sub-system 5-cpu is configured to determine a navigation plan 10-path (FIG. 1M) for the drone 10, in which the navigation plan comprises a sequence of roads 1-road (FIG. 1M, FIG. 1N) to follow; the drone is configured to follow 10-path (FIG. 1M) the sequence of roads 1-road according to the navigation plan by flying low along and above the roads 1-road in the sequence, in which said flying low comprises utilizing the positioning sub-system to fly just above 1-gap (FIG. 1M) road traffic 1-traffic and just below 2-gap (FIG. 1M) elevated road obstacles 1-obstacles, along a mostly uninterrupted flight corridor 1-corridor (FIG. 1N) that extends throughout the length of the roads 1-road and that exists directly above road traffic 1-traffic and directly below elevated road obstacles 1-obstacles; and the system is configured to exploit said mostly uninterrupted flight corridor 1-corridor to accomplish said flying low in a mostly autonomous manner.

In one embodiment, said mostly uninterrupted flight corridor 1-corridor results on average in less than one flight interruption (such as a bird passing through the corridor) per every 500 (five hundred) meters of flying low, thereby reducing a complexity associating with autonomously flying low, and thereby facilitating said flying low in a mostly autonomous manner. In one embodiment, the drone further comprises at least one imagery sensor (e.g., at least one of elements 4-cam-1, 4-cam-2, 4-cam-3, 4-cam-4, 4-cam-5, 4-cam-6, and 4-lidar in FIG. 1A) operative to capture imagery data during flight; and said imagery sensor/s is used by the drone 10 to avoid autonomously the interruptions that do occur along the mostly uninterrupted flight corridor 1-corridor, thereby further facilitating said flying low in a mostly autonomous manner. In one embodiment, said flying low in a mostly autonomous manner is flying low completely autonomously. In one embodiment, the system is further configured to exploit said flying low to capture clear images of pedestrians 1-ped (FIG. 1M) and other objects located on sidewalks just beside the roads 1-road, in which said clear images are facilitated by the uninterrupted flight corridor 1-corridor located within less than 4 (four) meters from said pedestrians and other objects. In one embodiment, the system is configured to maintaining a flight speed of between 5 (five) meters per second and 40 (forty) meters per second throughout at least 80% (eighty percent) of flight time, as a result of said mostly uninterrupted flight corridor 1-corridor. In one embodiment, said flying low is flying at a height of between 2.5 (two point five) meters and 6 (six) meters above road level 1-road. In one embodiment, said flying low is done throughout at least 80% (eighty percent) of flight time. In one embodiment, said flying low comprises: accomplishing said flying just above road traffic 1-traffic (FIG. 1M, FIG. 1N) by keeping a certain minimal air gap 1-gap (FIG. 1M) between the drone 10 and the road traffic 1-traffic; and accomplishing said flying just below elevated road obstacles 1-obstacles (FIG. 1M, FIG. 1N) by keeping a certain minimal air gap 2-gap (FIG. 1M) between the drone 10 and the elevated road obstacles 1-obstacles. In one embodiment, said certain minimal air gap 1-gap, 2-gap (one or both) is between 2 (two) meters and 20 (twenty) centimeters. In one embodiment, said positioning sub-system comprises at least one imagery sensor 4-cam-1, 4-cam-2, 4-cam-3, 4-cam-4, 4-cam-5, 4-cam-6, 4-lidar (FIG. 1A) operative to capture imagery data during flight; and said utilization of the positioning sub-system to fly just above 1-gap (FIG. 1M) road traffic 1-traffic and just below 2-gap (FIG. 1M) elevated road obstacles 1-obstacles comprises: utilizing the imagery sensor/s to determine exact elevation of the drone above the respective road during flight. In one embodiment, said positioning sub-system comprises a global navigation satellite system (GNSS) receiver 5-GNSS (FIG. 1A), such as a global positioning system (GPS) receiver, operative to determine a precise position of the drone 10; and said utilization of the positioning sub-system to fly just above 1-gap (FIG. 1M) road traffic 1-traffic and just below 2-gap (FIG. 1M) elevated road obstacles 1-obstacles comprises: utilizing the global navigation satellite system to determine exact elevation of the drone above the respective road during flight.

One embodiment is a system operative to navigate and follow roads by flying directly above road traffic and directly below elevated road obstacles. The system includes: a drone 10 (FIG. 1A, FIG. 1B, FIG. 1M) operative to fly 10-path (FIG. 1M), in which the drone comprises: at least one imagery sensor 4-cam-1, 4-cam-2, 4-cam-3, 4-cam-4, 4-cam-5, 4-cam-6, 4-lidar (FIG. 1A) operative to capture imagery data during flight; and a global navigation satellite system (GNSS) receiver 5-GNSS (FIG. 1A), such as a global positioning system (GPS) receiver, operative to determine a precise position of the drone 10. In one embodiment, the system is configured to: utilize, during flight, at least one of: (i) the imagery data and (ii) the precise position of the drone 10, to fly both directly above 1-gap (FIG. 1M) road traffic 1-traffic (FIG. 1M, FIG. 1N) and directly below 2-gap (FIG. 1M) elevated road obstacles 1-obstacles (FIG. 1M, FIG. 1N), while avoiding collisions with both the road traffic 1-traffic below the drone 10 and the elevated road obstacles 1-obstacles above the drone 10, thereby achieving uninterrupted flight 10-path along at least most of the length of at least one road 1-road (FIG. 1M, FIG. 1N).

In one embodiment, the elevated road obstacles 1-obstacles comprise at least one of: (i) bridges and other structures above the road, (ii) traffic lights and other signs hanging above the road, (iii) tunnel ceiling when the road is inside a tunnel, (iv) elevated infrastructure such as cables and light sources, and (v) tree branches. In one embodiment, the road traffic 1-traffic comprises at least one of: (i) roofed on-road vehicles such as cars and trucks, either parking or moving along the road, (ii) unroofed on-road vehicles such as motorcycles and bicycles, either parking or moving along the road (iii) pedestrians crossing the road or walking along the road, and (iv) animals.

In one embodiment, the road 1-road comprises at least one of: (i) a street or a lane inside a city or a village, (ii) a highway interconnecting cities, (iii) an avenue intended for pedestrians, (iv) a parking space or a parking lane, and (v) a sidewalk, in which the sidewalk may provide the drone access to structures nearby the road, such as, for example, access to land on a roof of a bus-station 2-temp (FIG. 1J) in accordance with some embodiments, or access to capture images of the roof from close-by (e.g., from 2 meters or less), thereby facilitating creation of a high accuracy 3D model of the roof for future landing.

In one embodiment, said utilization comprises: using the precise position of the drone 10 to determine exact elevation of the drone above road level 1-road; and keeping the drone 10 higher than a certain minimal elevation 1-min (FIG. 1N) above the road level 1-road, thereby facilitating said flying directly above road traffic 1-traffic while avoiding collisions with the road traffic. In one embodiment, said certain minimal elevation 1-min is between 2.5 (two point five) and 4.5 (four point five) meters above road level 1-road. In one embodiment, said minimal elevation 1-min is determined according to a legal maximum height of a commercial motor vehicle (CMV). In one embodiment, the legal maximum height of the commercial motor vehicle is selected from a group consisting: (i) 4.11 (four point eleven) meters, (ii) 4.27 (four point twenty seven) meters, and (iii) any legal maximum height of a commercial motor vehicle as determined per a specific state or country.

In one embodiment, said utilization comprises: using the precise position of the drone 10 to determine exact elevation of the drone above road level 1-road; and keeping the drone 10 lower than a certain maximum elevation 1-max (FIG. 1N) above the road level 1-road, thereby facilitating said flying directly below elevated road obstacles 1-obstacles while avoiding collisions with the elevated road obstacles. In one embodiment, said certain maximum elevation 1-max is between 5 (five) and 7 (seven) meters above road level 1-road. In one embodiment, said maximal elevation 1-max is determined according to a legal minimum height of elevated road obstacles 1-obstacles. In one embodiment, the legal minimum height of the elevated road obstacles 1-obstacles is selected from a group consisting: (i) 5.18 (five point eighteen) meters that equals 17 (seventeen) feet, which happens to be the legal minimum height of an overhead sign in certain countries, (ii) 4.9 (four point nine) meters, which happens to be the legal minimum height of a bridge above roads in some countries, and (iii) any legal minimum height of an elevated road obstacles 1-obstacles as determined per a specific state or country. In one embodiment, said utilization comprises: using the imagery data to: detect specific road traffic 1-traffic in front of the drone 10 that is about to collide with the drone, and consequently increase elevation of the drone to avoid said collision; and detect specific elevated road obstacles 1-obstacles in front of the drone 10 that is about to collide with the drone, and consequently decrease elevation of the drone to avoid said collision; thereby facilitating said flying directly above road traffic 1-traffic and directly below elevated road obstacles 1-obstacles, while avoiding collisions with both the road traffic below the drone 10 and the elevated road obstacles above the drone 10.

In one embodiment, said flying both directly above 1-gap road traffic 1-traffic and directly below 2-gap elevated road obstacles 1-obstacles in a mostly uninterrupted manner is facilitated by an opening 1-opening (FIG. 1N) that is mandated by law, in which said opening is located just above maximum allowed height of road traffic 1-traffic such as a commercial motor vehicle (CMV) and just below minimal allowed height of elevated road obstacles 1-obstacles such as overhead signs, and in which said opening 1-opening exists throughout at least most of the length of any road 1-road that is legal, thereby creating an uninterrupted flight corridor 1-corridor (FIG. 1N) above roads 1-road, via which the drone 10 can safely fly. In one embodiment, the horizontal width of said uninterrupted flight corridor 1-corridor is equal to the width of the respective road 1-road, and the vertical width of said uninterrupted flight corridor 1-corridor is equal to the vertical width of said opening 1-opening. In one embodiment, said vertical width of the opening 1-opening is between 0.5 (zero point five) meters and 4 (four) meters, depending on venue. In one embodiment, said vertical width of the opening 1-opening and therefore the vertical width of the uninterrupted flight corridor 1-corridor is 63 (sixty three) centimeters, in which the opening 1-opening is: (i) bounded from below by the legal maximum height of a commercial motor vehicle (CMV) 1-traffic that is 4.27 (four point twenty seven) meters above road level 1-road in some states, and (ii) bounded from above by a legal minimum height of elevated road obstacles 1-obstacles that is 4.9 (four point nine) meters above road level 1-road in some states. In one embodiment, said vertical width of the opening 1-opening and therefore the vertical width of the uninterrupted flight corridor 1-corridor is 107 (one hundred and seven) centimeters, in which the opening 1-opening is: (i) bounded from below by the legal maximum height of a commercial motor vehicle (CMV) 1-traffic that is 4.11 (four point eleven) meters above road level 1-road in some states, and (ii) bounded from above by a legal minimum height of elevated road obstacles 1-obstacles that is 5.18 (five point eighteen) meters above road level 1-road in some states.

In one embodiment, the drone 10 utilizes a flight mechanism comprising at least one of: (i) a hovering mechanism, which is the case with helicopters, bi-copters, and quadcopters, and (ii) a fixed wing flight mechanism. In one embodiment, as a result of said uninterrupted flight along at least most of the length of at least one road 1-road, the drone 10 is configured to achieve sustainable flight velocities of between 10 (ten) meters per second and 40 (forty) meters per second, despite flying directly above 1-gap road traffic 1-traffic and directly below 2-gap elevated road obstacles 1-obstacles. In one embodiment, said imagery sensor 4-cam-1, 4-cam-2, 4-cam-3, 4-cam-4, 4-cam-5, 4-cam-6, 4-lidar (FIG. 1A) comprises at least one of: (i) a camera, and (ii) a lidar (light detection and ranging) sensor.

One embodiment is a system operative to survey and track dynamic objects by utilizing a corpus of imagery data collected by a plurality of low-flying road-following drones. The system includes: a plurality of N low-flying road-following drones 10a, 10f (FIG. 1D), 10 (FIG. 1M), in which each of the N low-flying road-following drones (e.g., drone 10 in FIG. 1M) flies low along and above roads 1-road (FIG. 1M) via a respective path of flight 10-path (FIG. 1M) and at a respective velocity that may change over time, and is configured to capture imagery data of areas 20-area-1, 20-area 4 (FIG. 1D) surrounding the respective path of flight 10-path, thereby resulting in a corpus of imagery data 4-visual (FIG. 1E) collectively captured by the plurality of low-flying road-following drones 10a, 10f (FIG. 1D), 10

(FIG. 1M) while flying. In one embodiment, the system is configured to utilize the corpus of imagery data 4-visual to survey and track various dynamic objects 1-ped (FIG. 1D, FIG. 1M) in said areas surrounding the paths of flight, in which the aggregated length of all of the paths flown during any given time interval of dT (delta-T), is proportional to the product dT*V*N, in which V is the average of all said velocities during the given time interval dT. In one embodiment, V is between 10 (ten) meters-per-second and 40 (forty) meters-per-second; and therefore per each 1,000 (one thousand) of said plurality of low-flying road-following drones 10, said aggregated length of all of the paths flown, during a time interval of 60 (sixty) seconds, is between 60*10*1,000=~600,000 (six hundred thousand) meters and 60*40*1,000=~2,400,000 (two point four million) meters of road length, thereby surveying at least a part 1-GEO-AREA (FIG. 1D) of an entire big city every one minute, in which such part is between twice and ten times the size of the city Tel-Aviv.

In one embodiment, said flying low comprises: flying just above road traffic 1-traffic (FIG. 1M) by keeping a certain minimal air gap 1-gap (FIG. 1M) between the drone 10 and the road traffic 1-traffic; and flying just below elevated road obstacles 1-obstacles (FIG. 1M) by keeping a certain minimal air gap 2-gap (FIG. 1M) between the drone 10 and the elevated road obstacles 1-obstacles. In one embodiment, said flying low results in a mostly uninterrupted flight along the roads 1-road, thereby allowing V to be between 10 (ten) meters-per-second and 40 (forty) meters-per-second. In one embodiment, said flying low results in a mostly uninterrupted flight along the roads 1-road, thereby allowing V to be between 5 (five) meters-per-second and 20 (twenty) meters-per-second. In one embodiment, said flying low comprises: flying at a height of between 2.5 (two point five) meters and 6 (six) meters above road level 1-road. In one embodiment, said flying low results in a mostly uninterrupted flight along the roads 1-road, thereby allowing V to be between 10 (ten) meters-per-second and 40 (forty) meters-per-second. In one embodiment, said flying low results in a mostly uninterrupted flight along the roads 1-road, thereby allowing V to be between 5 (five) meters-per-second and 20 (twenty) meters-per-second. In one embodiment, said flying low comprises: flying just above 1-gap (FIG. 1M) road traffic 1-traffic (FIG. 1M) and just below 2-gap (FIG. 1M) elevated road obstacles 1-obstacles (FIG. 1M), along a mostly uninterrupted flight corridor 1-corridor (FIG. 1N) that extends throughout the length of the roads 1-road and that exists directly above road traffic 1-traffic and directly below elevated road obstacles 1-obstacles. In one embodiment, said flying low results in a mostly uninterrupted flight along the roads 1-road, thereby allowing V to be between 10 (ten) meters-per-second and 40 (forty) meters-per-second. In one embodiment, said flying low results in a mostly uninterrupted flight along the roads 1-road, thereby allowing V to be between 5 (five) meters-per-second and 20 (twenty) meters-per-second.

FIG. 1O illustrates one embodiment of a method for facilitating a precision low-altitude flight in an urban environment while avoiding collisions with various ground-related objects. The method includes: in step 1201, receiving a request to fly a drone mission in conjunction with a certain ground-related environment 1-road (FIG. 1N). In step 1202, identifying a flight corridor 1-corridor (FIG. 1N) facilitating the drone mission. In step 1203, capturing, in a drone 10 (FIG. 1N), data associated with the ground-related environment. In step 1204, using the data to determine position of the drone 10 relative to the flight corridor 1-corridor. In step 1205, controlling position of the drone 10 so as to remain within the flight corridor 1-corridor, thereby facilitation completion of the mission.

Figure 1P:
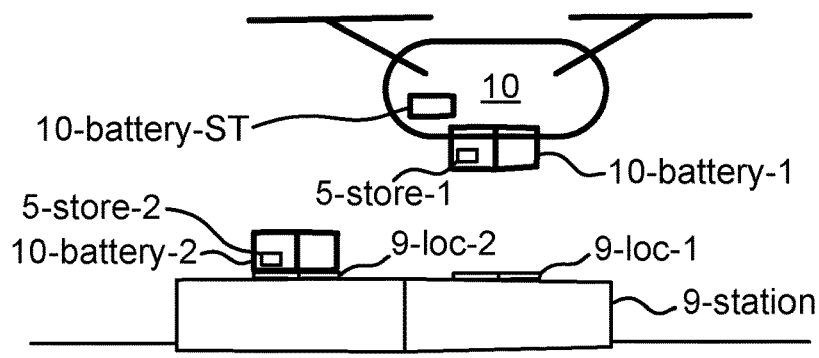
FIG. 1P illustrates one embodiment of a drone approaching a ground-based station.

FIG. 1P illustrates one embodiment of a drone 10 approaching a ground-based station 9-station that may be either static (e.g., located at a certain target location 1-target, FIG. 1J) or located onboard a moving or parking an on-road vehicle. The drone hovers above a certain docking element/location 9-loc-1 in the station, while using energy provided by a first detachable battery 10-battery-1 onboard the drone 10, in which the first detachable battery 10-battery-1 is about to be depleted and therefore needs a replacement. The drone also carries a short-term battery 10-battery-ST, that may be used to power the drone 10 in parallel to the first detachable battery 10-battery-1 or instead of the first detachable battery. The first detachable battery 10-battery-1 may contain other elements such as an embedded data storage element 5-store-1. The station 9-station includes a second detachable battery 10-battery-2, located perhaps in conjunction with a second docking element/location 9-loc-2 in the station, in which the second detachable battery 10-battery-2 is charged and waiting to be picked up by the drone 10. The second detachable battery 10-battery-2 may contain other elements such as a second embedded data storage element 5-store-2.

Figure 1Q:
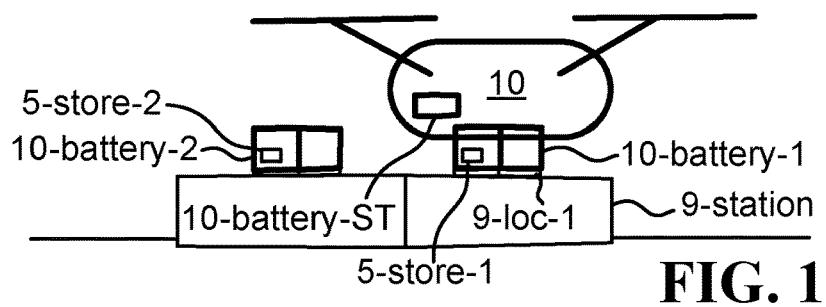
FIG. 1Q illustrates one embodiment of the drone descending toward the ground-based station and offloading an object.

FIG. 1Q illustrates one embodiment of the drone 10 descending toward the ground-based station 9-station and offloading an object such as a battery 10-battery-1 or a data storage element. The drone 10 descends until the first detachable battery 10-battery-1 makes contact and possibly a lock with the docking element/location 9-loc-1. The drone 10 then releases the first detachable battery 10-battery-1, and ascends using energy from the onboard short-term battery 10-battery-ST, while leaving the first detachable battery 10-battery-1 behind to be charged by the station 9-station perhaps via the docking element/location 9-loc-1 now in hold of the first detachable battery 10-battery-1.

Figure 1R:
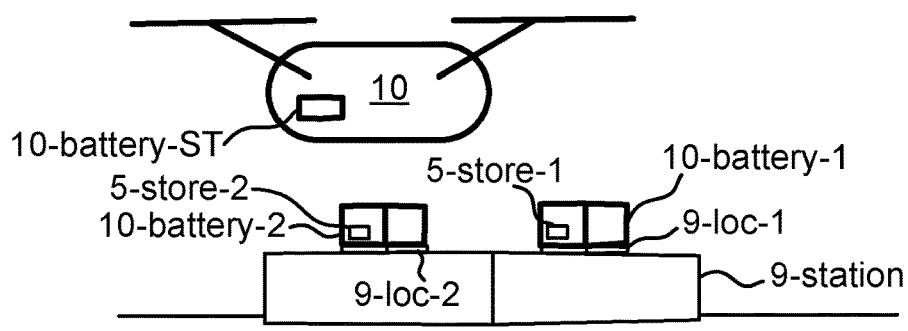
FIG. 1R illustrates one embodiment of the drone moving toward another position above the ground-based station after offloading the object.

FIG. 1R illustrates one embodiment of the drone 10 moving toward a second position 9-loc-2 above the ground-based station 9-station after offloading the object 10-battery-1. The drone is now using energy from the short-term battery 10-battery-ST, as the first detachable battery 10-battery-1 is no longer onboard the drone 10.

Figure 1S:
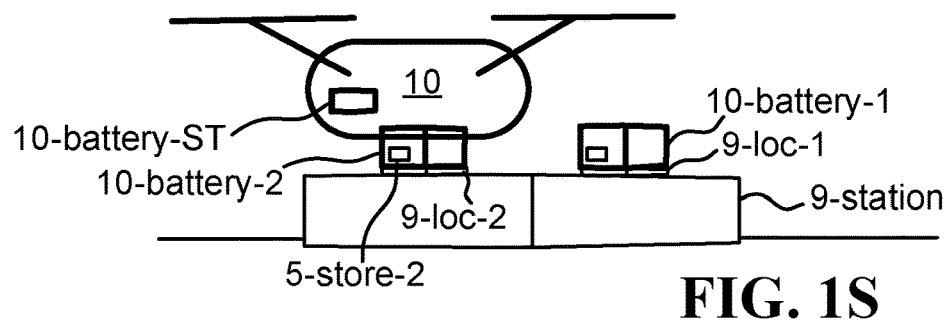
FIG. 1S illustrates one embodiment of the drone descending again toward the ground-based station and picking-up another object.

FIG. 1S illustrates one embodiment of the drone 10 descending again toward the ground-based station 9-station and picking-up another object such as the second detachable battery 10-battery-2. The drone 10 descends until making a contact and possibly a lock with the second detachable 10-battery-2 currently held by/at the second docking element/location 9-loc-2. The station 9-station releases the second detachable 10-battery-2, and the drone 10 then picks-up the second detachable battery 10-battery-2 by ascending together with the second detachable 10-battery-2 now onboard the drone 10.

Figure 1T:
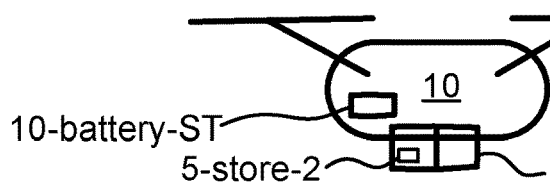
FIG. 1T illustrates one embodiment of the drone flying away from the ground-based station with the other object on-board.

FIG. 1T illustrates one embodiment of the drone 10 flying away from the ground-based station 9-station with the other object such as the second detachable battery 10-battery-2 on-board. The drone is now using energy from the second detachable battery 10-battery-2 now on-board, while the short-term battery 10-battery-ST may be now charged by the second detachable battery 10-battery-2.

One embodiment is a system operative to quickly offload imagery data gathered by a drone. The system includes: a drone 10 (FIG. 1A, FIG. 1P) operative to fly; at least a first imagery sensor 4-cam-1, 4-lidar (FIG. 1A) onboard the drone 10; a first detachable storage element 5-store-1 (FIG. 1P); a second detachable storage element 5-store-2 (FIG. 1P); and a ground-based station 9-station (FIG. 1P). In one embodiment, the drone 10 is configured to: fly along a certain path 10-path-1 (FIG. 1C), while using the imagery sensor/s 4-cam-1, 4-lidar to gather imagery data 4-visual (FIG. 1E) of areas 20-area-1, 20-area-2, 20-area-3 (FIG. 1C) surrounding the certain path 10-path-1; store in the first detachable storage element 5-store-1, during flight, the imagery data gathered 4-visual; and arrive (FIG. 1P) at the ground-based station 9-station (FIG. 1P) to perform an action comprising: (i) delivering (FIG. 1Q) to the ground-based station 9-station the first detachable storage element 5-store-1 containing the imagery data gathered 4-visual, and then (ii) picking up (FIG. 1S) from the ground-based station 9-station the second detachable storage element 5-store-2. In one embodiment, the drone 10, after picking up (FIG. 1S) the second detachable storage element 5-store-2, is further configured to: fly (FIG. 1T) along a new path, while using the imagery sensor/s 4-cam-1, 4-lidar to gather new imagery data of areas surrounding the new path; and store in the second detachable storage element 5-store-2, during flight (FIG. 1T), the new imagery data gathered. In one embodiment, said delivering to the ground-based station 9-station of the first detachable storage element 5-store-1 comprises: hovering (FIG. 1P), by the drone 10, above a first location 9-loc-1 (FIG. 1P) operative to receive the first detachable storage element 5-store-1; descending, by the drone 10, until the first storage element 5-store-1 makes a direct or an indirect contact (FIG. 1Q) with the first location 9-loc-1; and releasing (FIG. 1R) the first detachable storage element 5-store-1 in conjunction with the first location 9-loc-1. In one embodiment, said picking up (FIG. 1S) of the second detachable storage element 5-store-2 comprises: moving by the drone 10 to and hovering above (FIG. 1R) a second location 9-loc-2 at which the second detachable storage element 5-store-2 is located; descending, by the drone 10, until the drone makes a direct or indirect contact (FIG. 1S) with the second detachable storage element 5-store-2; and grabbing the second detachable storage element 5-store-2 from the second location 9-loc-2. In one embodiment, the ground-based station 9-station is configured to communicate said imagery data 4-visual from the first detachable storage element 5-store-1, now located with the ground-based station 9-station, to servers operative to analyze the imagery data 4-visual. In one embodiment the imagery data 4-visual is stored in the first detachable storage element 5-store-1 together with the respective locations at which the imagery data was captured by the drone 10 and together with the respective times at which the imagery data was captured by the drone 10.

One embodiment is a system operative to quickly switch batteries in conjunction with drones. The system includes: a drone 10 (FIG. 1P) operative to fly; a short-term battery 10-battery-ST (FIG. 1P) onboard the drone 10; a first detachable battery 10-battery-1 (FIG. 1P); a second detachable battery 10-battery-2 (FIG. 1P); and a ground-based station 9-station (FIG. 1P). In one embodiment, the drone 10 is configured to: fly along a certain path 10-path-1 (FIG. 1C) using energy provided by the first detachable battery 10-battery-1 currently located on-board the drone 10; arrive (FIG. 1P) at the ground-based station 9-station (FIG. 1P) to perform an action comprising: (i) releasing (FIG. 1Q) to the ground-based station 9-station the first detachable battery 10-battery-1 now about to be depleted, and then (ii) using energy stored in the short-term battery 10-battery-ST to pick up (FIG. 1R, FIG. 1S) the second detachable battery 10-battery-2 which is already charged. In one embodiment, the drone 10, after picking up (FIG. 1S) the second detachable battery 10-battery-2, is further configured to: use the second detachable battery 10-battery-2 to: (i) fly (FIG. 1T) and (ii) charge the short-term battery 10-battery-ST.

In one embodiment, said releasing, to the ground-based station 9-station, of the first detachable battery 10-battery-1 comprises: hovering (FIG. 1P), by the drone 10, above a first location 9-loc-1 (FIG. 1P) operative to receive the first detachable battery; descending, by the drone 10, until the first detachable battery 10-battery-1 makes a direct or an indirect contact (FIG. 1Q) with the first location 9-loc-1; ejecting (FIG. 1R) the first detachable battery 10-battery-1 in conjunction with said first location 9-loc-1; and using energy from the short-term battery 10-battery-ST to remain in a hovering state (FIG. 1R) after said ejection. In one embodiment, said picking up (FIG. 1S) of the second detachable battery 10-battery-2 comprises: moving by the drone 10 to and hovering above (FIG. 1R) a second location 9-loc-2 at which the second detachable battery 10-battery-2 is located, using energy from the short-term battery 10-battery-ST to remain in a hovering state; descending, by the drone 10, using energy from the short-term battery 10-battery-ST, until the drone makes a direct or indirect contact (FIG. 1S) with the second detachable battery 10-battery-2; and grabbing the second detachable battery 10-battery-2 from the second location 9-loc-2. In one embodiment, the first detachable battery 10-battery-1 contains a first storage element 5-store-1 operative to store data gathered by the drone 10 during flight; and the second detachable battery 10-battery-2 contains a second storage element 5-store-2.

Figure 1U:
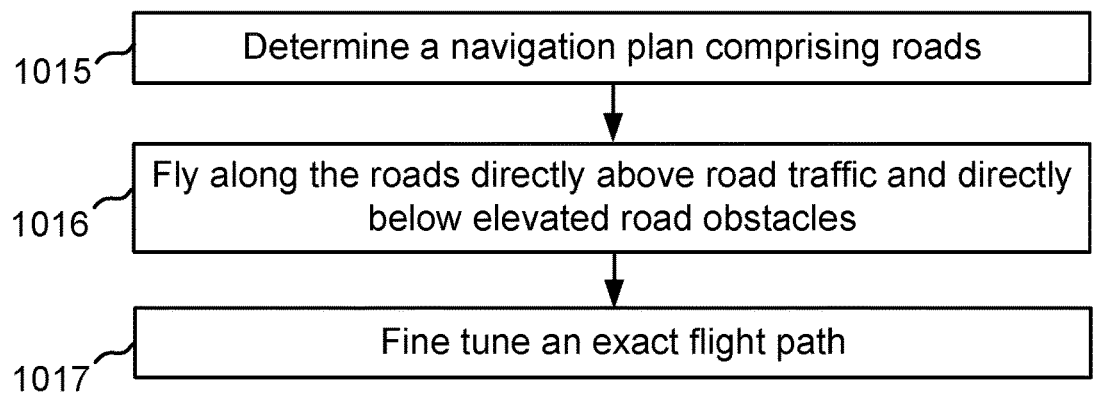
FIG. 1U illustrates one embodiment of a method for navigating and following roads by flying directly above road traffic and directly below elevated road obstacles.

FIG. 1U illustrates one embodiment of a method for navigating and following roads by flying directly above road traffic and directly below elevated road obstacles. The method includes: In step 1015, determining a navigation plan for a drone 10, in which the navigation plan comprises a combination of roads 1-road (FIG. 1M, FIG. 1N) to follow. In step 1016, following 10-path (FIG. 1M) the navigation plan by flying low along and above the roads 1-road, in which said flying low comprises flying just above 1-gap (FIG. 1M) road traffic 1-traffic and just below 2-gap (FIG. 1M) elevated road obstacles 1-obstacles, along a mostly uninterrupted flight corridor 1-corridor (FIG. 1N) that extends throughout the length of the roads 1-road and that exists directly above road traffic 1-traffic and directly below elevated road obstacles 1-obstacles. In step 1017, fine tuning an exact flight path 10-path of the drone 10, as needed from time to time to further avoid collisions with said road traffic 1-traffic and elevated road obstacles 1-obstacles in specific cases. In one embodiment, said fine tuning comprises detecting, by the drone 10, a specific on-road vehicle 1-traffic that extends above an expected maximum height, and bypassing said specific on-road vehicle 1-traffic by performing a certain maneuver, in which the certain maneuver comprises at least one of: (i) maneuvering to the left of the on-road vehicle, (ii) maneuvering to the right of the on-road vehicle, and (iii) maneuvering above the on-road vehicle. In one embodiment, said fine tuning comprises detecting, by the drone 10, a specific elevated road obstacle 1-obstacles that extends below an expected minimum height, and bypassing said specific elevated road obstacle 1-obstacles by performing a certain maneuver, in which the certain maneuver comprises at least one of: (i) maneuvering to the left of the elevated road obstacle, (ii) maneuvering to the right of the elevated road obstacle, and (iii) maneuvering below the elevated road obstacle. In one embodiment, said fine tuning is needed only along less than 5% (five percent) of the length of roads 1-road traversed by the drone, as a result of said mostly uninterrupted flight corridor 1-corridor.

In one embodiment, the method further includes: flying low above road traffic 1-traffic through red lights 1-obstacles without stopping. In one embodiment, the method further includes: flying low above congested road intersections and above road traffic 1-traffic without stopping, thereby ignoring traffic congestion along road intersections. In one embodiment, said flying low above congested road intersections comprises turning from a first road 1-road to a second road without stopping. In one embodiment, the method further includes: maintaining a flight speed of between 10 (ten) meters per second and 40 (forty) meters per second throughout at least 95% (ninety five percent) of flight time, as a result of said mostly uninterrupted flight corridor 1-corridor. In one embodiment, the method further includes: maintaining a flight speed of between 10 (ten) meters per second and 40 (forty) meters per second throughout at least 60% (sixty percent) of flight time, as a result of said mostly uninterrupted flight corridor 1-corridor. In one embodiment, said flying low is done: (i) completely autonomously, (ii) semi-autonomously, (iii) manually, or (iv) as any combination thereof. In one embodiment, said flying low is flying at a height of between 4.27 (four point twenty seven) meters and 4.9 (four point nine) meters above road level 1-road. In one embodiment, said flying low is done during at least 95% (ninety five percent) of flight time. In one embodiment, said flying low is done during at least 60% (sixty percent) of flight time. In one embodiment, said flying low is flying at a height of between 2.5 (two point five) meters and 6 (six) meters above road level 1-road. In one embodiment, said flying low is done during at least 95% (ninety five percent) of flight time. In one embodiment, said flying low is done during at least 60% (sixty percent) of flight time. In one embodiment, said flying low is utilized to capture imagery data of objects 1-ped (FIG. 1M) surrounding the flight path 10-path of the drone 10.

In one embodiment, said flying low is utilized by the drone 10 to make deliveries in accordance with some embodiments (e.g., by drone 10 in FIGS. 1J and 1n conjunction with a delivery location 1-target). In one embodiment, said flying low is utilized by the drone 10 to catch rides in accordance with some embodiments (e.g., by drone 10 in FIGS. 1J and 1n conjunction with vehicles 1-V, 2-V). In one embodiment, said flying low is utilized by the drone 10 to land at a certain street-level location in accordance with some embodiments (e.g., by drone 10 in FIGS. 1J and 1n conjunction with landing site 2-temp). In one embodiment, said flying low is utilized by the drone 10 to function as a flying crane in accordance with some embodiments (e.g., by drone 10b in FIG. 9D and in conjunction with an exchange station 2-exchange and vehicles 10-V).

In one embodiment, said flying low is utilized to minimize damage to pedestrians 1-ped (FIG. 1M) in a case of a malfunction causing the drone 10 to crash, by minimizing potential energy associated with drone elevation. In one embodiment, said drone 10 weights less than 5 (five) kilogram, in order to minimize damage to pedestrians 1-ped (FIG. 1M) in a case of a malfunction causing the drone 10 to crash, by minimizing kinetic and potential energy associated with drone weight. In one embodiment, said drone 10 weights less than 1 (one) kilogram, in order to minimize damage to pedestrians 1-ped (FIG. 1M) in a case of a malfunction causing the drone 10 to crash, by minimizing kinetic and potential energy associated with drone weight. In one embodiment, said drone 10 weights less than 250 (two hundred and fifty) grams, in order to minimize damage to pedestrians 1-ped (FIG. 1M) in a case of a malfunction causing the drone 10 to crash, by minimizing kinetic and potential energy associated with drone weight.

Figure 1V:
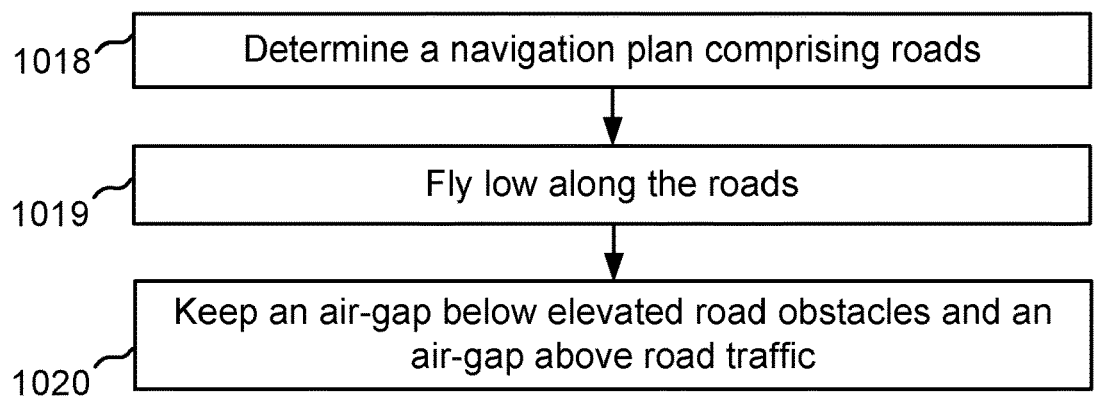
FIG. 1V illustrates one embodiment of another method for navigating and following roads by flying directly above road traffic and directly below elevated road obstacles.

FIG. 1V illustrates one embodiment of another method for navigating and following roads by flying directly above road traffic and directly below elevated road obstacles. The method includes: in step 1018, determining a navigation plan for a drone 10, in which the navigation plan comprises a combination of roads 1-road (FIG. 1M, FIG. 1N) to follow. In step 1019, following 10-path (FIG. 1M) the navigation plan by flying low along and above the roads 1-road, in which said flying low comprises: in step 1020, flying just above road traffic 1-traffic (FIG. 1M, FIG. 1N) by keeping a certain minimal air gap 1-gap (FIG. 1M) between the drone 10 and the road traffic 1-traffic, and flying just below elevated road obstacles 1-obstacles (FIG. 1M, FIG. 1N) by keeping a certain minimal air gap 2-gap (FIG. 1M) between the drone 10 and the elevated road obstacles 1-obstacles. In one embodiment, said minimal air gap 1-gap, 2-gap (one or both) is between 2 (two) meters and 1 (one) meter. In one embodiment, said minimal air gap 1-gap, 2-gap (one or both) is between 1 (one) meter and 0.5 (one half) meter. In one embodiment, said minimal air gap 1-gap, 2-gap (one or both) is between 0.5 (one half) meter and 20 (twenty) centimeters. In one embodiment, said flying low further comprises flying at a height of between 2.5 (two point five) meters and 6 (six) meters above road level 1-road.

Figure 1W:
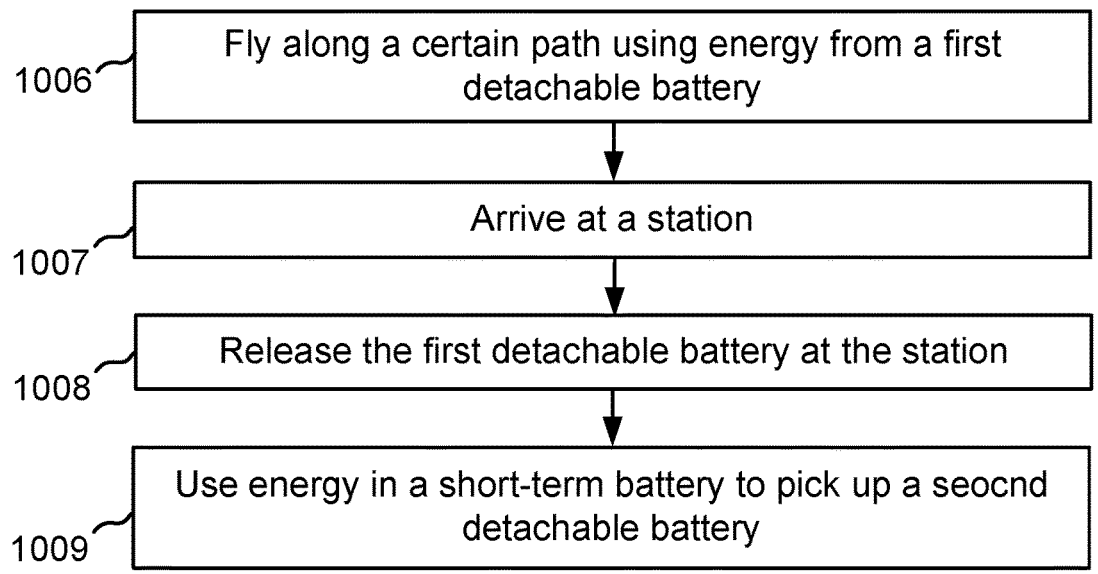
FIG. 1W illustrates one embodiment of a method for quickly switching batteries in conjunction with drones.

FIG. 1W illustrates one embodiment of a method for quickly switching batteries in conjunction with drones. The method includes: in step 1006, flying a drone 10 (FIG. 1P) along a certain path 10-path-1 (FIG. 1C) using energy provided by a first detachable battery 10-battery-1 (FIG. 1P) currently located on-board the drone 10. In step 1007, arriving (FIG. 1P), by the drone 10, at a ground-based station 9-station. In step 1008, releasing (FIG. 1Q), by the drone 10, to the ground-based station 9-station, the first detachable battery 10-battery-1 now about to be depleted. In step 1009, using energy stored in a short-term battery 10-battery-ST onboard the drone 10 to pick up (FIG. 1R, FIG. 1S) the second detachable battery 10-battery-2 which is already charged. In one embodiment, the short-term battery 10-battery-ST onboard the drone 10 has a capacity of less than ½ (half) of the capacity of the detachable battery 10-battery-1. In one embodiment, the short-term battery 10-battery-ST onboard the drone 10 has a capacity of less than ⅕ (one fifth) of the capacity of the detachable battery 10-battery-1. In one embodiment, the short-term battery 10-battery-ST onboard the drone 10 has a capacity of less than ¹⁄₁₀ (one tenth) of the capacity of the detachable battery 10-battery-1, and weights less than ¹⁄₁₀ (one tenth) of the weight of the detachable battery 10-battery-1 accordingly, in which the short-term battery 10-battery-ST is not detachable. In one embodiment, the short-term battery 10-battery-ST onboard the drone 10 has an energy capacity allowing the drone to stay airborne for less than 5 (five) minutes.

Figure 1X:
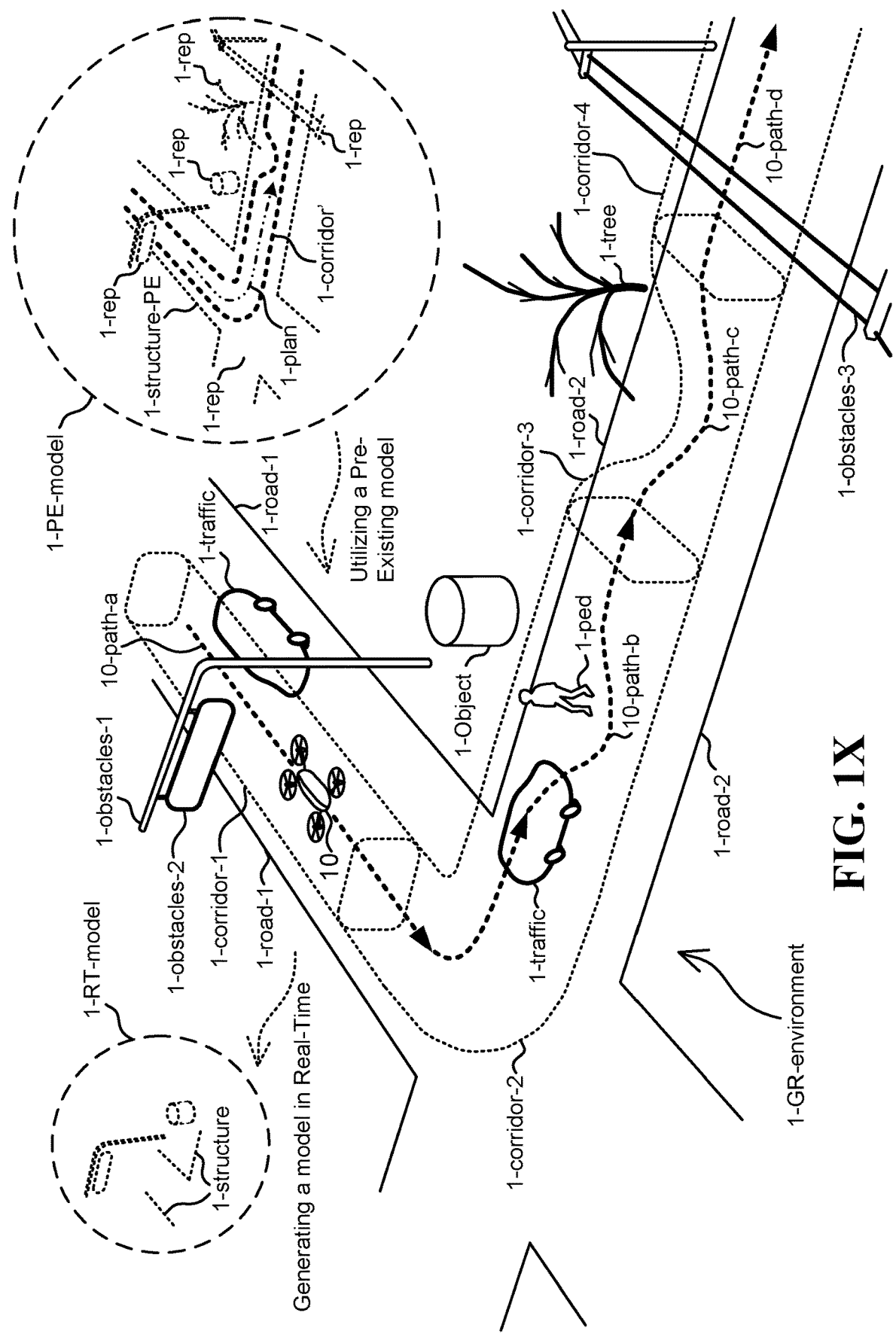
FIG. 1X illustrates one embodiment of a system operative to plan and execute safe navigation of low-flying road-following drones using various virtual three-dimensional models of a ground-related environment through which the drones are moving.

FIG. 1X illustrates one embodiment of a system operative to plan and execute safe navigation of low-flying road-following drones using various virtual three-dimensional models of a ground-related environment through which the drones are moving. In one embodiment, a drone 10 is required to navigate in conjunction with a ground-related environment 1-GR-environment, in which such navigation may include flying in close proximity to various static ground-related objects associated with the ground-related environment, such as roads 1-road-1, 1-road-2, structures 1-Object such as buildings, and objects that are suspended above road such as poles 1-obstacle-1, road signs 1-obstacle-2, tree brunches 1-tree, and cables 1-obstacles-3.

When navigating the ground-related environment 1-GR-environment, the drone 10 may find itself flying in close proximity to various dynamic ground-related objects such as pedestrians 1-ped and moving on-road vehicles 1-traffic, and therefore special care needs to be taken in order to avoid endangering such dynamic objects, while also navigating safely under/over/around the various static object constituting the ground-related environment. There are many possible scenarios requiring navigation through ground-related environments while flying in close proximity to various ground related objects, such as taking-off from a certain location on or above ground (e.g., 2-temp in FIG. 1J), landing, interacting with a battery charging/replacing station, surveying the ground-related environment from a very low altitude, responding to urban distress calls by approaching scenes on-ground, carrying and delivering packages to/from various location (e.g., 1-cntr in FIG. 9F), and interacting with dynamic on-ground objects such as pedestrians and on-road vehicles (e.g., 10-V in FIG. 9D). flying in close proximity to various ground-related objects may include passing within as close as one meter, or even closer, to some of the objects, for example, flying as close as one meter under cables 1-obstacles-3 that are suspended above the road, or flying just above traffic 1-traffic at a height of several meters above ground and typically at a height of in between two and five meters. In some scenarios, such as in 3D mapping of a ground related environment, the drone, acting as a probe, is intentionally flying in close proximity to ground-related objects in order to facilitate construction of a detailed 3D model 1-PE-model of the environment. For example, using a light-detection-and-ranging (lidar) sensor, the drone has to come to within ten to fifty meters from objects in order to achieve high definition mapping, and using optical camera-based techniques, such as visual-simultaneous-localization-and-mapping (VSLAM) and stereographic imaging, the drone has to come to within five to twenty meters from various ground-related objects. In some 3D modeling scenarios, the drone has to approach objects to within one or two meters in order to determine exact 3D structure and positioning of the objects, thereby reaching a centimeter-level model accuracy.

In one embodiment, some of the road-related objects, such as cables 1-obstacles-3, are difficult to detect, and therefore the system has to rely on different environmental clues in order to avoid colliding with such road-related objects during flight. For example, when a cable, or other difficult-to-detect objects such as tree branches 1-tree and poles 1-obstacles-1, are situated above a road 1-road, then, obviously, they have to be suspended beyond a certain height above the road, in order to allow safe passage of on-road traffic 1-traffic below; now, the system may exploit that fact, and plot a flight trajectory 10-path that is situated low enough above road to avoid colliding with a suspended object, but also high enough above road in order to avoid traffic below. For example, if the drone 10 if forced to fly no lower than four meters above road level, and no higher than five meters above road level, then there is a good chance that the drone can avoid collisions even if it fails to detect road-related suspended objects and actual traffic, as the drone flies at a certain height envelop above road that is supposed to be clear of any objects. In one embodiment related to the above example, the system may detect the road 1-road, either prior to flight or in real-time during flight, and then make sure that the drone flies at a certain height envelop above the road detected, thereby preventing collisions, in which it is noted that road contour/surface/border is much easier to detect and predict than smaller narrow objects such as cables. In other words, since the system can easily predict/model/detect a road, it can then use the road as a hint regarding where it would be safe to fly, relative to the road, in order to avoid road-related objects. In some cases, the system can create a 3D model 1-PE-model of the ground-related environment, then identify roads in the model, then define a virtual flight corridor 1-corridor' above the roads identified in the model, and then cause the drone 10 to navigate inside the virtual flight corridor 1-corridor', thereby forcing the actual flight path 10-path to remain inside a flight corridor 1-corridor that keeps the drone away from road-related objects above and traffic below. As another example of exploiting clues, the system may detect, in real-time, a large on-road vehicle, such as a bus, and force the drone 10 to fly just above and just behind the bus, therefore decreasing probability of colliding with other objects. The system can also detect on-road traffic in general, and use the traffic itself as a positioning reference, and then fly just above the traffic detected, therefore, again, avoiding other undetected or difficult-to-detect objects. The system can use the drone to create a real-time 3D map 1-RT-model of the environment, and use such real-time map to either detect the road and place the drone at a certain height above road, or compare/correlate structures 1-structure appearing in the real-time model with structures 1-structure-PE appearing in a pre-existing model 1-PE-model, thereby determining position of the drone relative to the pre-defined virtual flight corridor 1-corridor' and make course corrections accordingly, or the system can utilize the real-time map 1-RT-model to facilitate both techniques at the same time, thereby staying above road traffic and below suspended road-related objects.

In one embodiment, the system constructs, iteratively, a detailed 3D model 1-PE-model of the ground-related environment 1-GR-environment (FIG. 1X). The system may begin with a 3D model lacking sufficient details that would have allowed safe low altitude flight, and therefore the system tries to gather more information before beginning low altitude flight. For example, if no information is available in conjunction with the ground-related environment 1-GR-environment, then the system may instruct a drone 10 (FIG. 1X), or a plurality of drones 10 (FIG. 1D), to execute preliminary expeditionary flight at a relatively high altitude above the ground-related environment 1-GR-environment, e.g., at an altitude of fifty meters above ground, where, according to some indication, no structural ground-related objects are expected to be found, and the drones then execute said high altitude expeditionary flight and thereby capturing imagery data associated with major large structures, such as buildings 1-object (FIG. 1D, FIG. 1X) and roads 1-road (FIG. 1X). Thus, at this point, the 3D model may be updated with 3D representations of the major structures, but it is still lacking fine details such as cables, trees branches, and poles, and therefore the system uses the 3D representations of the major structures in order to perform a medium altitude follow-up expeditionary flight. For example, the system may decide to perform the medium altitude follow-up expeditionary flight by flying the drones at an altitude of twenty meters above the roads detected, and in-between the buildings detected and appearing in the 3D model, where it is still not expected for smaller structures, such as trees and cables, to be found, and gather, during said medium altitude follow-up expeditionary flight, additional imagery data that may now be incorporated into the evolving 3D model as 3D representations of the smaller structures. At this point, the system may decide to increase the accuracy and details level of the 3D model, by defining flight corridors 1-corridors', in the 3D model, that are located in close proximity to the already 3D-modeled various known structures, and then perform low-altitude flight 10-path (FIG. 1X), via the safe corridors 1-corridor, and at a height of several meters above ground, thereby gathering fine details of the structures, from close by, and updating again the 3D model, which may now be considers a detailed 3D model 1-PE-model of the ground-related environment. The system may further analyze the detailed 3D model 1-PE-model, and identify micro-paths in-between some of the structures allowing even closer approach into some of the structures, for example, a micro-path may be detected in the 3D model between a tree 1-tree and a building 1-Object, thereby allowing a drone 10 to approach the building and land on a porch or a roof thereof. It is noted that in the above described iterative approach, each iteration is using the current 3D model of the ground-related environment to define new safe flight corridors above/below/around structures appearing in the model, in which said safe flight corridors are then used to fly closer to structures and gather additional imagery data, thus increasing the detail level of the 3D model, which in turn is used to define, again, additional safe flight corridors. Eventually, after many iterations, that may take even months or years, the detail level of the 3D model 1-PE-model may include sub-centimeter details, and have a sub-centimeter accuracy, in which the ground-related environment 1-GR-environment may be an entire city and include dense urban regions.

In one embodiment, the system constructs, iteratively, a detailed 3D model 1-PE-model of the ground-related environment 1-GR-environment (FIG. 1X). The system may begin with a 3D model lacking sufficient details that would have allowed safe low altitude flight, and therefore the system tries to gather more information before beginning low altitude flight. For example, if no information is available in conjunction with the ground-related environment 1-GR-environment, then the system may use cameras and/or lidar sensors onboard on-road vehicles 1-traffic traversing associated roads 1-road (FIG. 1X) to capture imagery data of the ground-related environment from the ground, thereby having sufficient initial imagery data to 3D model structures, such as trees 1-tree and poles 1-obstacles-1, situated up to twenty meters above road level 1-road, or perhaps situated just up to ten meters above road level, depending on sensors and actual environment, thereby updating the 3D model 1-PE-model to a level that allows preliminary low altitude flight 10-path (FIG. 1X) above and along the roads 1-road. The system may then execute said low altitude flight 10-path, thereby gathering additional imagery data that may be used to both: (i) 3D model the layers above ten or twenty meters, up to perhaps thirty or forty metes, and (ii) identify micro-paths in-between some of the structures allowing a close approach into some of the structures, for example, a micro-path may be detected in the 3D model between a tree 1-tree and a building 1-Object, thereby allowing a drone 10 to approach the building and land on a porch or a roof thereof.

In one embodiment, the system constructs, iteratively, a detailed 3D model 1-PE-model of the ground-related environment 1-GR-environment (FIG. 1X). The system may begin with a 3D model having only general details that allow initial low-altitude flight above road 1-road and in-between buildings, but lacks fine details that allow 3D modeling of fine structures such as landing sites, tree branches, and surface structure of buildings. The system therefore identifies the general 3D structures in the 3D model, and defines safe virtual micro-corridors, in the 3D model, that are estimated to allow closer approach to the structures, and then executes low altitude flight, via the virtual micro-corridors defined, to get drones 10 closer to the structures, capture imagery data from close by, and use the new imagery data to enhance accuracy of and add details to the 3D model, thereby producing said detailed 3D model 1-PE-model of the ground-related environment. For example, a micro-corridor may lead from a location above road 1-road to a location that is one meter from one of the buildings, thereby allowing to 3D model a landing site located in one of the porches of the building. As another example, a micro-corridor may lead form a location above road 1-road to a location that is behind a tree 1-tree and above a sidewalk, thereby allowing to accurately 3D model the tree, and later on allow low altitude flight over the sidewalk.

In one embodiment, the system described above in conjunction with FIG. 1X, includes various physical system elements such as flying drones 10 (FIG. 1A, FIG. 1D), sensors such as cameras 4-cam and lidar 4-lidar (FIG. 1A) onboard the drones and capable of capturing the imagery data described, a computing platform that may reside onboard the drones 5-cpu (FIG. 1A), externally to the drones 5-P (FIG. 1A), or both, and capable of receiving, via a physical communication interface 5-comm, 5-comm', the imagery data, or a derivative thereof, and construct the 3D model 1-PE-model of the ground-related environment 1-GR-environment, in which the 3D model, or parts of it, may be stored in a physical storage space 5-store', 5-store externally to the drones, onboard the drones, or both.

One embodiment is a system operative to facilitate low-altitude flight over roads while avoiding collisions with various road-related objects, comprising: a computing platform (such as 5-cpu or 5-P in FIG. 1A) operative to define a plurality of interconnected flight corridors 1-corridor-1, 1-corridor-2, 1-corridor-3, 1-corridor-4 (FIG. 1X) that extend along and above a plurality of interconnected roads 1-road-1, 1-road-2 (FIG. 1X), in which the flight corridors are defined so as to pass below static objects 1-obstacles-1, 1-obstacles-2, 1-obstacles-3 (FIG. 1X) suspended above the roads, but so as to also pass above at least some of the expected traffic 1-traffic (FIG. 1M, FIG. 1N, FIG. 1X)—it is noted that the corridors 1-corridor-1, 1-corridor-2, 1-corridor-3, 1-corridor-4 may be considered as a single continuous corridor 1-corridor as appears in FIG. 1N; a low-flying road-following drone 10 (FIG. 1A, FIG. 1M, FIG. 1N, FIG. 1X); and a positioning/localization sub-system (e.g., at least one of elements 4-cam-1, 4-cam-2, 4-cam-3, 4-cam-4, 4-cam-5, 4-cam-6, 4-lidar, and 5-GNSS in FIG. 1A) located onboard the low-flying road-following drone 10.

In one embodiment, the system is configured to define a flight path 10-path-a, 10-path-b, 10-path-c, 10-path-d (FIG. 1X), which is contained within the plurality of interconnected flight corridors 1-corridor-1, 1-corridor-2, 1-corridor-3, 1-corridor-4; and the drone 10 is configured to: use the positioning sub-system onboard to determine current spatial deviation from the flight path 10-path-a, 10-path-b, 10-path-c, 10-path-d, and align, accordingly, three-dimensional movement of the drone 10 with the flight path, thereby assuring a safe low-altitude flight just above at least some of the expected traffic 1-traffic, while passing safely below at least some of the suspended static objects 1-obstacles-1, 1-obstacles-2, 1-obstacles-3 along the flight path.

In one embodiment, each of the static objects 1-obstacles-1, 1-obstacles-2, 1-obstacles-3 suspended above the roads 1-road-1, 1-road-2 comprises at least one of: a traffic light, a road sign, a horizontal pole supporting weight of a static object above the road, a cable crossing above the road, and a bridge above the road; each of the suspended static objects 1-obstacles-1, 1-obstacles-2, 1-obstacles-3 has a legal minimum height of between 4.9 (four point nine) and 5.18 (five point eighteen) meters above the road 1-road-1, 1-road-2; said expected traffic 1-traffic comprises commercial motor vehicle (CMV) traffic, in which a CMV has a legal maximum height of between 4.11 (four point eleven) and 4.27 (four point twenty seven) meters; and therefore: at least some of said safe low-altitude flight just above expected traffic 1-traffic is a low-altitude flight that is not lower than 4.11 (four point eleven) meters above the road 1-road-1, 1-road-2; and at least some of said safe passages below at least some of the suspended static objects 1-obstacles-1, 1-obstacles-2, 1-obstacles-3 is a flight at an altitude of between 4.27 (four point twenty seven) meters and 4.9 (four point nine) meters above the road 1-road-1, 1-road-2.

In one embodiment, the computing platform 5-P (FIG. 1A) is located off the drone 10, and the flight corridors 1-corridor-1, 1-corridor-2, 1-corridor-3, 1-corridor-4 are pre-defined before said flight of the drone 10. In one embodiment, initially, the system has no prior knowledge of actual three-dimensional location of the suspended static objects 1-obstacles-1, 1-obstacles-2, 1-obstacles-3, and therefore the computing platform 5-P is configured to first achieve said definition of the flight corridors 1-corridor-1, 1-corridor-2, 1-corridor-3, 1-corridor-4 using a fixed height envelop 1-opening, 1-corridor-fixed (FIG. 1N), in which the fixed height envelop is located just above the expected traffic 1-traffic and just below a minimum height expected from the static objects 1-obstacles-1, 1-obstacles-2, 1-obstacles-3 hanging above the road 1-road-1, 1-road-2. In one embodiment, the system further comprises a plurality of other low-flying road-following drones 10a, 10b, 10c, 10d, 10e, 10f (FIG. 1D) configured to fly just above and along the roads 1-road-1, 1-road-2 and further configured to generate three-dimensional data associated with the environment surrounding the drones during the flight, in which the three-dimensional data is generated using at least one of: (i) a light-detection-and-ranging (lidar) sensor 4-lidar (FIG. 1A), and (ii) visual-simultaneous-localization-and-mapping (VSLAM) technique using imagery data captured by cameras (e.g., at least one of 4-cam-1, 4-cam-2, 4-cam-3, 4-cam-4, 4-cam-5, 4-cam-6 in FIG. 1A) onboard the drones 10a, 10b, 10c, 10d, 10e, 10f; and the system is further configured to use the three-dimensional data generated in order to map exact locations of the static objects 1-obstacles-1, 1-obstacles-2, 1-obstacles-3 suspended above the roads 1-road-1, 1-road-2, and use said exact locations to adjust the flight corridors 1-corridor (e.g., the adjustment 1-corridor-adjust in FIG. 1N) so as to account for the actual heights of the suspended static objects 1-obstacles, in which said adjustment comprises at least one of: (i) expanding relevant parts of the flight corridors upwards 1-corridor-adjust (FIG. 1N), so as to still pass safely below at least some of the suspended static objects 1-obstacles along the flight path 10-path-a, 10-path-b, 10-path-c, 10-path-d, but so as to now pass higher and closer to the actual suspended static objects as permitted by said mapping, and (ii) shrinking relevant parts of the flight corridors 1-corridor downwards, so as to pass even safer below at least some of the suspended static objects 1-obstacles along the flight path 10-path-a, 10-path-b, 10-path-c, 10-path-d as required by said mapping.

In one embodiment, the system further comprises a plurality of other low-flying road-following drones 10a, 10b, 10c, 10d, 10e, 10f (FIG. 1D) configured to fly just above and along the roads 1-road-1, 1-road-2 and further configured to generate three-dimensional data associated with the environment surrounding the drones during the flight, in which the three-dimensional data is generated using at least one of: (i) a light-detection-and-ranging (lidar) sensor 4-lidar (FIG. 1A), and (ii) visual-simultaneous-localization-and-mapping (VSLAM) technique using imagery data captured by cameras (e.g., at least one of 4-cam-1, 4-cam-2, 4-cam-3, 4-cam-4, 4-cam-5, 4-cam-6 in FIG. 1A) onboard the drones 10a, 10b, 10c, 10d, 10e, 10f; and the system is further configured to use the three-dimensional data generated in order to map exact locations of quasi-static objects suspended above the roads 1-road-1, 1-road-2, such as tree leaves and branches 1-tree (FIG. 1X) intruding into and above the road, and use said exact locations to adjust the flight corridors 1-corridor-1, 1-corridor-2, 1-corridor-3, 1-corridor-4 so as to account for the quasi-static objects, in which said adjustment comprises at least shrinking relevant parts of the flight corridors sideways, away from at least some of the suspended quasi-static objects that intrude from one side of the road according to the mapping, so as to avoid colliding with the suspended quasi-static objects during said flight (e.g., the corridor portion 1-corridor-3 in FIG. 1X is narrower than the other corridor portions, in order to avoid an intruding branch of tree 1-tree).

In one embodiment, the system further comprises a plurality of other low-flying road-following drones 10a, 10b, 10c, 10d, 10e, 10f (FIG. 1D) configured to fly just above and along the roads 1-road-1, 1-road-2 and further configured to generate three-dimensional data associated with the environment surrounding the drones during the flight, in which the three-dimensional data is generated using at least one of: (i) a light-detection-and-ranging (lidar) sensor 4-lidar (FIG. 1A), and (ii) visual-simultaneous-localization-and-mapping (VSLAM) technique using imagery data captured by cameras (e.g., at least one of 4-cam-1, 4-cam-2, 4-cam-3, 4-cam-4, 4-cam-5, 4-cam-6 in FIG. 1A) onboard the drones 10a, 10b, 10c, 10d, 10e, 10f; and the system is further configured to use the three-dimensional data generated in order to map exact locations of both the static objects 1-obstacles-1, 1-obstacles-2, 1-obstacles-3 and quasi-static objects 1-tree suspended above the roads 1-road such as tree leaves and branches intruding into and above the road, and use said exact locations to adjust the flight corridors 1-corridor-1, 1-corridor-2, 1-corridor-3, 1-corridor-4 so as to account for the static and quasi-static objects, in which said adjustment comprises at least defining, in the flight corridors 1-corridor-1, 1-corridor-2, 1-corridor-3, 1-corridor-4, locations (e.g., the location of path 10-path-c) that are the farthest away from both suspended objects and expected traffic 1-traffic, thus suggesting an optimal path of flight 10-path-c that is statistically the safest to fly within the flight corridors.

In one embodiment, the plurality of interconnected flight corridors 1-corridor-1, 1-corridor-2, 1-corridor-3, 1-corridor-4 that extend along and above the plurality of interconnected roads 1-road-1, 1-road-2, are 3D modeled 1-corridor' (FIG. 1X), in a pre-existing 3D model 1-PE-model of an associated ground-related environment 1-GR-environment, and said definition of the flight path 10-path is done in conjunction with the pre-existing 3D model, in which the pre-existing 3D model is generated from imagery data captured by at least one of: (i) an imaging platform located on-road, such as an on-road vehicle, (ii) an imaging platform located two to five meters above road, such as another drone previously flying along and above the roads, and (iii) an imaging platform located above an altitude of ten meters above any road, such as high-flying drone or a satellite; and the system is further configured to: gather, during said low-altitude flight of the drone above the roads 1-road-1, 1-road-2, imagery data of objects 1-object, 1-obstacles, 1-tree surrounding the roads; use said imagery data of objects surrounding the road to improve the pre-existing 3D model 1-PE-model of the ground-related environment 1-GR-environment; and use the improved pre-existing 3D model to identify micro-flight-corridors connected to the plurality of interconnected flight corridors 1-corridor-1, 1-corridor-2, 1-corridor-3, 1-corridor-4, that are associated with additional clear space facilitating safe flight, in which at least one of the micro-flight-corridors is associated with at least one of: (i) a clear safe-flight space connecting at least a location above the road with a location above a sidewalk of the road, thereby facilitation future flight that starts above the road and continues above the sidewalk, (ii) a clear safe-flight space connecting at least a location above the road with a location associated with a building located alongside the road, thereby facilitation future flight that starts above the road and continues away from the road and in conjunction with said building, and (iii) a clear safe-flight space connecting at least a location that is two to five meters above the road with a location that is at least ten meters above any road, thereby facilitation future flight that starts as a low-altitude flight above the road and continues away from the road and in conjunction with higher altitude flight.

In one embodiment, the system further comprises additional low-flying road-following drones 10a, 10b, 10c, 10d, 10e, 10f (FIG. 1D) that together with said low-flying road-following drone 10 constitute a plurality of N low-flying road-following drones, in which each of the N low-flying road-following drones is configured to fly low along and above the roads 1-road-1, 1-road-2 via an associated respective flight path (e.g., drone 10 flies according to path 10-path-a, 10-path-b, 10-path-c, 10-path-d, and the other drones fly according to perhaps different paths) that is contained within the flight corridors 1-corridor and at a respective velocity that may change over time, and is further configured to capture imagery data of areas 20-area-1, 20-area-2, 20-area-3, 20-area-4 (FIG. 1D) surrounding the respective flight path, thereby resulting in a corpus of imagery data 4-visual (FIG. 1E) collectively captured by the plurality of N low-flying road-following drones while flying; the system is further configured to utilize the corpus of imagery data 4-visual to survey various objects 1-ped-2, 1-ped-1, 1-object-5 (FIG. 1D) in said areas 20-area-1, 20-area-2, 20-area-3, 20-area-4 surrounding the flight paths, in which the aggregated length of all of the paths flown during any given time interval of dT (delta-T), is proportional to the product dT*V*N, in which V is the average of all said velocities during the given time interval dT, and V is between 5 (five) meters-per-second and 20 (twenty) meters-per-second; and therefore per each 100 (one hundred) of said plurality of N low-flying road-following drones, said aggregated length of all of the paths flown, during a time interval of 60 (sixty) seconds, is between 60*5*100=~30,000 (thirty thousand) meters and 60*20*100=~120,000 (hundred and twenty thousand) meters of road length, thereby surveying from low-altitude at least a part of an entire city every one minute, at the same time as: (i) assuring a safe low-altitude flight just above expected traffic 1-traffic, while (ii) passing safely below at least some of the suspended static objects 1-obstacles-1, 1-obstacles-2, 1-obstacles-3 along the flight paths.

In one embodiment, the system further comprises an optical sub-system (e.g., at least one of 4-cam-1, 4-cam-2, 4-cam-3, 4-cam-4, 4-cam-5, 4-cam-6, 4-lidar in FIG. 1A) located onboard the drone 10, in which the optical sub-system is configured to capture data associated with the environment surrounding the drone 10, and in which the optical sub-system comprises at least one of a camera 4-cam and a light-detection-and-ranging (lidar) sensor 4-lidar; and said usage of the positioning sub-system onboard to determine said current spatial deviation from the flight path 10-path-a, 10-path-b, 10-path-c, 10-path-d is based on terrain-following-navigation that comprises: generating, using the positioning sub-system onboard the drone, and in conjunction with the data captured, a real-time three-dimensional (3D) model 1-RT-model (FIG. 1X) of said environment surrounding the drone 10; correlating the real-time 3D model 1-RT-model with a pre-existing model 1-PE-model (FIG. 1X) of said environment, thereby determining a current 3D location of the drone 10, in which said pre-existing model 1-PE-model is managed by the computing platform; and using said current 3D location to accomplish said determination of the current spatial deviation from the flight path 10-path-a, 10-path-b, 10-path-c, 10-path-d; in which said generation of the real-time 3D model 1-RT-model comprises at least one of: (i) utilizing a visual-simultaneous-localization-and-mapping (VSLAM) technique in conjunction with the data captured by the camera 4-cam, and (ii) integrating the data associated with the lidar 4-lidar. In one embodiment, the positioning sub-system comprises a global navigation satellite system (GNSS) receiver 5-GNSS (FIG. 1A), such as a global positioning system (GPS) receiver, operative to determine a three-dimensional position of the drone 10.

In one embodiment, the system further comprises an optical sub-system (e.g., at least one of 4-cam-1, 4-cam-2, 4-cam-3, 4-cam-4, 4-cam-5, 4-cam-6, 4-lidar in FIG. 1A) located onboard the drone 10, in which the optical sub-system is configured to capture data associated with the environment surrounding the drone 10, and in which the optical sub-system comprises at least one of a camera 4-cam and a light-detection-and-ranging (lidar) sensor 4-lidar; and the drone 10 is further configured to: detect and classify, using the data captured, dynamic on-road objects (e.g., a pedestrian 1-ped in FIG. 1X) just below and around the drone 10 while flying; and adapt the flight path 10-path-a, 10-path-b, 10-path-c, 10-path-d, but still within the boundaries of the flight corridors 1-corridor-1, 1-corridor-2, 1-corridor-3, 1-corridor-4, so as to minimize risk posed by the drone 10 to the dynamic on-road objects detected; in which the dynamic on-road objects comprise at least one of: (i) a pedestrian 1-ped (FIG. 1X), in which said adaptation comprises flying around the pedestrian (as illustrated by 10-path-b in FIG. 1X), thereby avoiding flying over the pedestrian 1-ped, (ii) motor vehicles 1-traffic, in which the said adaptation comprises flying around the motor vehicles, thereby avoiding flying over the motor vehicles, (iii) motor vehicles 1-traffic, in which the said adaptation comprises adapting a velocity of the drone 10 in conjunction with a velocity of at least one of the motor vehicles detected, thereby harmonizing movement of the drone with traffic below, and (iv) unroofed on-road vehicles such as motorcycles and bicycles, in which said adaptation comprises flying around the unroofed on-road vehicles, thereby avoiding flying over the unroofed on-road vehicles, and instead flying over empty road or over motor vehicles having a roof.

In one embodiment, the system further comprises an optical sub-system (e.g., at least one of 4-cam-1, 4-cam-2, 4-cam-3, 4-cam-4, 4-cam-5, 4-cam-6, 4-lidar in FIG. 1A) onboard the drone 10, in which the optical sub-system is configured to capture data associated with the environment surrounding the drone 10, and in which the optical sub-system comprises at least one of a camera 4-cam and a light-detection-and-ranging (lidar) sensor 4-lidar; the computing platform 5-cpu is onboard the drone 10, and is configured to: (i) analyze the data thereby detecting a structure 1-structure (FIG. 1X) associated with the road 1-road (e.g., a structure such as the road itself, or such as an edge of the road or a bordering sidewalk) in-front of the drone 10, and (ii) define a portion of the flight corridor (e.g., the portion 1-corridor-2 in FIG. 1X) so as to locate the portion at certain predetermined height envelop 1-opening (FIG. 1N) above the structure detected, in which said height envelop is located just above the expected traffic 1-traffic and just below a minimal height expected from the static objects 1-obstacles-1, 1-obstacles-2, 1-obstacles-3 hanging above the road 1-road, thereby accomplishing at least a part 1-corridor-2 of said defining of the plurality of interconnected flight corridors 1-corridor-1, 1-corridor-2, 1-corridor-3, 1-corridor-4; and the computing platform is further configured to generate a portion of the flight path 1-path-b (FIG. 1X) in-front of the drone 10 and in real-time, thereby accomplishing at least a part of said definition of the flight path 10-path-a, 10-path-b, 10-path-c, 10-path-d; in which said analysis is associated with at least one of: (i) visual-simultaneous-localization-and-mapping (VSLAM) using the data from the camera 4-cam, and (ii) integrating data from the lidar sensor 4-lidar.

In one embodiment, the system further comprises, as a part of the positioning sub-system, an optical sub-system (e.g., at least one of 4-cam-1, 4-cam-2, 4-cam-3, 4-cam-4, 4-cam-5, 4-cam-6 in FIG. 1A) onboard the drone 10, in which the optical sub-system is configured to capture data associated with the environment surrounding the drone 10, and in which the optical sub-system comprises at least one camera 4-cam; the system is further configured to use the data to calculate at least one of: (i) an estimate, using at least one machine-learning-based technique, of a height of the drone 10 above a structure 1-structure (FIG. 1X) of the road 1-road that appears in the data captured, and (ii) a location of the drone relative to the borders of the road 1-road; and use said calculation to determine said spatial deviation from the flight path 10-path-a, 10-path-b, 10-path-c, 10-path-d.

Figure 1Y:
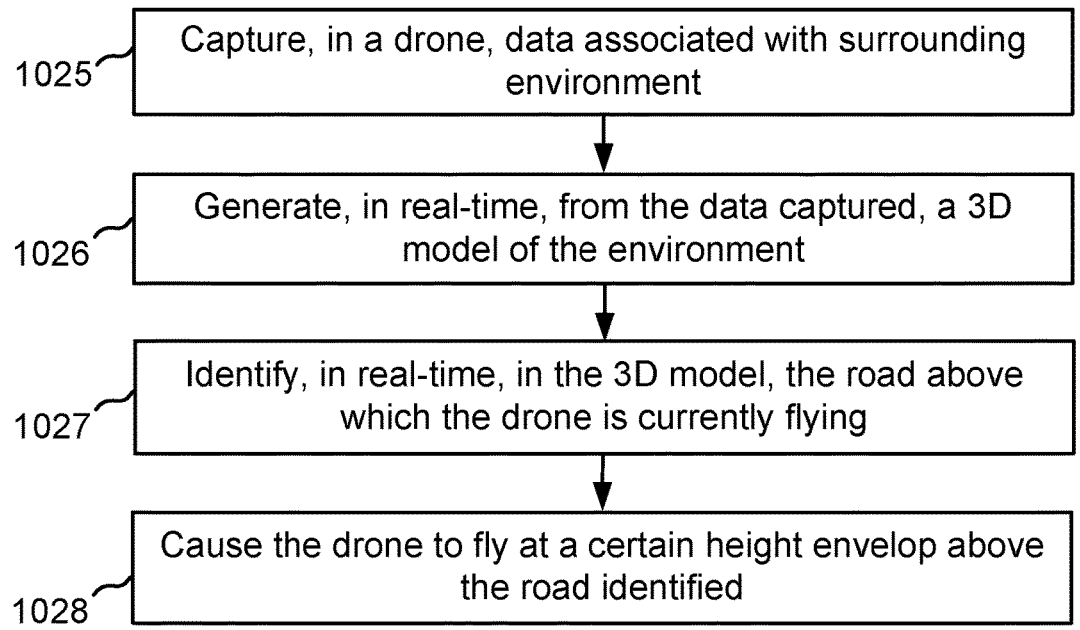
FIG. 1Y illustrates one embodiment of a method for facilitating low-altitude flight over roads while avoiding collisions with various road-related objects.

FIG. 1Y illustrates one embodiment of a method for facilitating low-altitude flight over roads while avoiding collisions with various road-related objects. The method includes: In step 1025, capturing, in a drone 10 (FIG. 1N, FIG. 1X) flying above and along a road 1-road (FIG. 1N, FIG. 1X), data associated with environment 1-road, 1-Object (FIG. 1N, FIG. 1X) surrounding the drone, in which said data capturing is done using at least one of: (i) a camera 4-cam (FIG. 1A) and (ii) a light-detection-and-ranging (lidar) sensor 4-lidar (FIG. 1A) onboard the drone. In step 1026, generating, in the drone 10, in real-time, and in conjunction with the data captured, a three-dimensional (3D) model 1-RT-model (FIG. 1X) of said environment surrounding the drone, and determining a 3D position of the drone in said 3D model. In step 1027, identifying in real-time, by the drone 10, in the 3D model generated 1-RT-model, at least portions of a 3D structure 1-structure (FIG. 1X) defining the road 1-road above which the drone 10 is currently flying. In step 1028, controlling said flight by the drone 10, so as to cause the 3D position of the drone to remain at a certain height envelop 1-opening (FIG. 1N) above the identified 3D structure 1-structure defining the road 1-road, in which said height envelop 1-opening defines a range of heights that exists just above at least some of the expected traffic 1-traffic (FIG. 1N, FIG. 1X) and just below at least some static objects 1-obstacles (FIG. 1N, FIG. 1X) expected to be suspended above the road 1-road, thereby causing the drone 10 to fly within a flight corridor 1-corridor (FIG. 1N, FIG. 1X) extending just above the at least some of the expected traffic 1-traffic and just below the at least some static objects 1-obstacles expected to be suspended above the road 1-road.

In one embodiment, each of the static objects 1-obstacles expected to be suspended above the road 1-road comprises at least one of: a traffic light, a road sign 1-obstacles-2 (FIG. 1X), a horizontal pole 1-obstacles-1 (FIG. 1X) supporting weight of a static object above the road, a cable 1-obstacles-3 (FIG. 1X) crossing above the road 1-road, and a bridge above the road 1-road; each of the suspended static objects 1-obstacles is expected to be located at or higher than 4.9 (four point nine) meters above the road 1-road; said expected traffic 1-traffic comprises commercial motor vehicle (CMV) traffic, in which a CMV has a legal maximum height of between 4.11 (four point eleven) and 4.27 (four point twenty seven) meters; and therefore: for at least some portions of said flight: (i) said height envelop 1-opening comprises at least the range of heights between 4.27 (four point twenty seven) meters and 4.9 (four point nine) meters above the road 1-road, but (ii) the heights below 4.11 (four point eleven) meters above the road 1-road, and the heights over 5.18 (five point eighteen) meters above the road 1-road, are excluded from the height envelop 1-opening. In one embodiment, both said generation of the 3D model 1-RT-model and said determining position of the drone 10 are achieved by utilizing a visual-simultaneous-localization-and-mapping (VSLAM) technique in conjunction with the data captured by the camera 4-cam.

Figure 1Z:
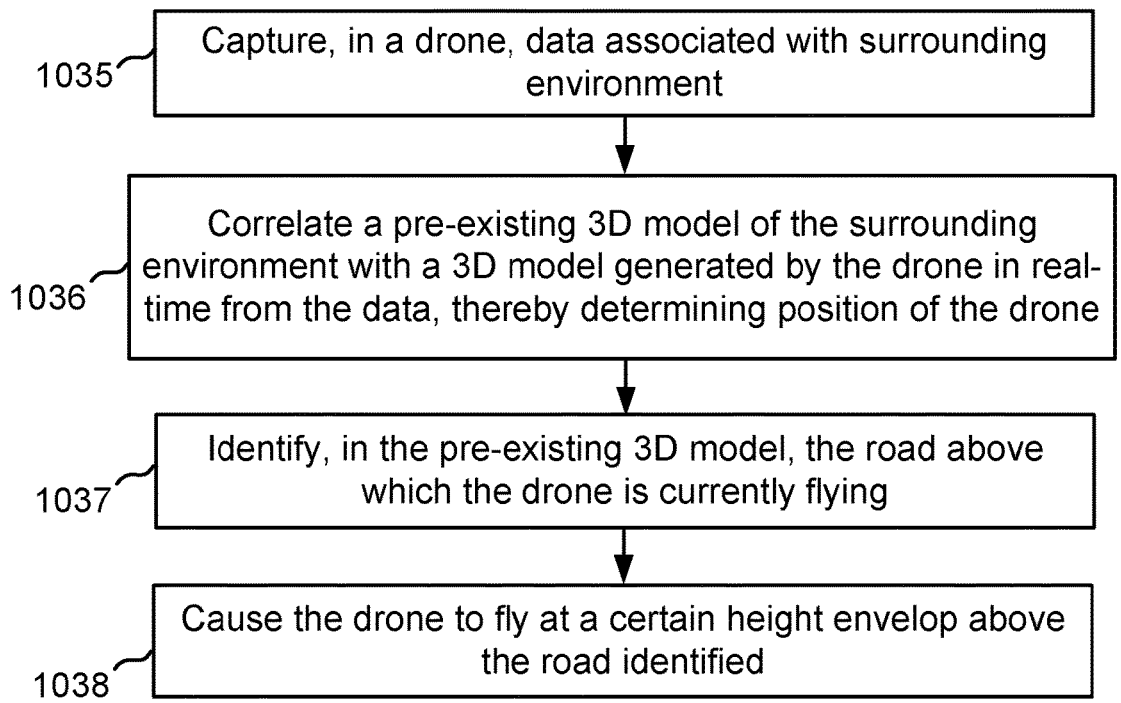
FIG. 1Z illustrates one embodiment of another method for facilitating low-altitude flight over roads while avoiding collisions with various road-related objects.

FIG. 1Z illustrates one embodiment of another method for facilitating low-altitude flight over roads while avoiding collisions with various road-related objects. The method includes: In step 1035, capturing, in a drone 10 (FIG. 1N, FIG. 1X) flying above and along a road 1-road (FIG. 1N, FIG. 1X), data associated with environment 1-road, 1-Object (FIG. 1N, FIG. 1X) surrounding the drone, in which said data capturing is done using at least one of: (i) a camera 4-cam (FIG. 1A) and (ii) a light-detection-and-ranging (lidar) sensor 4-lidar (FIG. 1A) onboard the drone. In step 1036, generating, in the drone 10, and in conjunction with the data captured, a real-time three-dimensional (3D) model 1-RT-model (FIG. 1X) of said environment surrounding the drone, and correlating, in real-time, the real-time 3D model 1-RT-model with a pre-existing 3D model 1-PE-model (FIG. 1X) of said environment, thereby determining a current 3D position of the drone 10 in the pre-existing 3D model 1-PE-model of said environment (e.g., determining a current 3D coordinates of the drone in conjunction with the pre-existing 3D model, in which the coordinates are expressed relative to a coordinate system used in the pre-existing 3D model). In step 1037, identifying, in the pre-existing 3D model 1-PE-model, at least portions of a 3D structure 1-structure-PE (FIG. 1X) defining the road 1-road. In step 1038, controlling said flight by the drone 10, so as to cause the 3D position of the drone, in the pre-existing 3D model 1-PE-model, to remain at a certain height envelop 1-opening (FIG. 1N) above the identified 3D structure 1-structure-PE defining the road 1-road, in which said height envelop defines a range of heights that exists just above at least some of the expected traffic 1-traffic (FIG. 1N, FIG. 1X) and just below at least some static objects 1-obstacles (FIG. 1N, FIG. 1X) expected to be suspended above the road 1-road, thereby causing the drone to fly within a flight corridor 1-corridor (FIG. 1N, FIG. 1X) extending just above at least some of the expected traffic 1-traffic and just below the at least some static objects 1-obstacles expected to be suspended above the road 1-road.

In one embodiment, each of the static objects 1-obstacles expected to be suspended above the road 1-road comprises at least one of: a traffic light, a road sign 1-obstacles-2 (FIG. 1X), a horizontal pole 1-obstacles-1 (FIG. 1X) supporting weight of a static object above the road, a cable 1-obstacles-3 (FIG. 1X) crossing above the road 1-road, and a bridge above the road 1-road; each of the suspended static objects 1-obstacles is expected to be located at or higher than 4.9 (four point nine) meters above the road 1-road; said expected traffic 1-traffic comprises commercial motor vehicle (CMV) traffic, in which a CMV has a legal maximum height of between 4.11 (four point eleven) and 4.27 (four point twenty seven) meters; and therefore: for at least some portions of said flight: said height envelop comprises at least the range of heights between 4.27 (four point twenty seven) meters and 4.9 (four point nine) meters above the road 1-road, but the heights below 4.11 (four point eleven) meters above the road 1-road are excluded from the height envelop. In one embodiment, the method further comprises: generating said pre-existing 3D model 1-PE-model of the environment by a computing platform 5-P (FIG. 1A) located off the drone 10 and using data gathered by a plurality of drones 10*a*, 10*b*, 10*c*, 10*d*, 10*e*, 10*f* (FIG. 1D) that have previously flown over the road 1-road; and updating over time, by the computing platform, the flight corridor 1-corridor (FIG. 1N, FIG. 1X), so as to account for 3D positions of actual suspended static object 1-obstacles detected by the drones over time; wherein said identifying, in the pre-existing 3D model 1-PE-model, of the at least portions of the 3D structure 1-structure-PE defining the road 1-road, is done by the computing platform.

In one embodiment, said road 1-road is a combination of connected roads 1-road-1, 1-road-2 (FIG. 1X); and said flight corridor 1-corridor is a combination of connected flight corridors 1-corridor-1, 1-corridor-2, 1-corridor-3, 1-corridor-4 (FIG. 1X) extending respectively along and above the combination of connected roads 1-road-1, 1-road-2; and the method further comprises: determining, by a computing platform (e.g., 5-cpu or 5-P in FIG. 1A), a navigation plan for the drone 10, in which the navigation plan is associated with the combination of connected roads 1-road-1, 1-road-2 to follow; and executing the navigation plan in the drone 10, by carrying out said flight along the combination of connected flight corridors 1-corridor-1, 1-corridor-2, 1-corridor-3, 1-corridor-4 that extend throughout the length of the combination of connected roads 1-road-1, 1-road-2 and that exist directly above expected traffic 1-traffic and directly below static objects 1-obstacles expected to be suspended above the combination of connected roads 1-road-1, 1-road-2.

One embodiment is a method for facilitating a precision low-altitude flight in an urban environment while avoiding collisions with various ground-related objects. The method includes: in step 1201 (FIG. 1O), receiving a request to fly a drone 10 (FIG. 1X) in conjunction with a certain mission associated with a specific ground-related environment 1-GR-environment (FIG. 1X), in which said mission requires the drone to fly in a proximity of less than 10 (ten) meters from at least one of a plurality of ground-related objects in said ground-related environment (e.g., in proximity to 1-Object, FIG. 1X), and in which the at least one ground-related object 1-Object comprises at least one of: (i) a surface on the ground such as a road 1-road or a sidewalk, (ii) a structure touching the ground, directly or indirectly, such as a building or a pole 1-obstacle-1, (iii) an obstacle suspended above ground such as a tree 1-tree or a cable 1-obstacle-3, and (iv) ground itself. In step 1202 (FIG. 1O) analyzing said request, and as a part of planning the mission: identifying, in a pre-existing virtual three-dimensional (3D) model 1-PE-model (FIG. 1X) of the ground-related environment 1-GR-environment, a virtual 3D flight corridor 1-corridor' (FIG. 1X) representing a 3D flight corridor 1-corridor (FIG. 1X) through which the drone 10 has to fly in order to complete the mission, in which, according to said pre-existing virtual 3D model, said virtual flight corridor 1-corridor' is: (i) clear of the plurality of ground-related objects 1-road, 1-obstacles, 1-Object, 1-tree (FIG. 1X) as represented in the pre-existing virtual 3D model, and (ii) operative to cause the drone to fly in said proximity of less than 10 (ten) meters from the at least one ground-related object 1-Object. In step 1203 (FIG. 1O), capturing, in the drone 10, while flying said mission, data associated with a portion of the ground-related environment 1-GR-environment currently surrounding the drone 10, in which said data capturing is done using at least one of: (i) a camera 4-cam (FIG. 1A) and (ii) a light-detection-and-ranging (lidar) sensor 4-lidar (FIG. 1A) onboard the drone 10. In step 1204 (FIG. 1O) generating, in the drone 10, and in conjunction with the data captured, a real-time three-dimensional (3D) model 1-RT-model (FIG. 1X) of said portion of the ground-related environment 1-GR-environment currently surrounding the drone 10, and correlating, in real-time, the real-time 3D model 1-RT-model with the pre-existing 3D model 1-PE-model, thereby determining a current 3D position of the drone 10 in the pre-existing 3D model 1-PE-model of said ground-related environment 1-GR-environment (e.g., determining a current 3D coordinates of the drone in conjunction with the pre-existing 3D model, in which the coordinates are expressed relative to a coordinate system used in the pre-existing 3D model). In step 1205 (FIG. 1O), controlling said flight by the drone 10, so as to cause the current 3D position of the drone, in the pre-existing 3D model 1-PE-model, to remain within the virtual three-dimensional flight corridor 1-corridor' appearing in said pre-existing 3D model 1-PE-model, thereby causing the drone to fly a path 10-path-a, 10-path-b, 10-path-c, 10-path-d that is both safe and facilitating completion of the mission.

In one embodiment, said mission comprises at least one of: (i) a mission of landing in a spot within said ground-related environment 1-GR-environment, in which said one of a plurality of ground-related objects is a landing-related object such as a surface, (ii) a mission of ascending from a spot within said ground-related environment 1-GR-environment, in which said one of a plurality of ground-related objects is a launching-related object such as a surface, (iii) a mission of charging batteries within said ground-related environment 1-GR-environment, in which said one of a plurality of ground-related objects is a charging-related object such as a charging surface, (iv) a mission of low-flying road-following in conjunction with roads 1-road within said ground-related environment 1-GR-environment, in which said one of a plurality of ground-related objects is a road, and (v) a mission of flying in conjunction with said ground-related environment 1-GR-environment (FIG. 1X) and in close proximity to associated ground-related objects 1-road, 1-obstacles, 1-Object, 1-tree, while generating three-dimensional (3D) data representing the ground-related environment, in which the 3D data is generated using at least one of: a light-detection-and-ranging (lidar) sensor 4-lidar (FIG. 1A), and visual-simultaneous-localization-and-mapping (VSLAM) technique using imagery data captured by cameras (e.g., at least one of 4-cam-1, 4-cam-2, 4-cam-3, 4-cam-4, 4-cam-5, 4-cam-6 in FIG. 1A) onboard the drone 10, in which said data is used to generate at least part of said 3D model 1-PE-model.

In one embodiment, said (i) generating, in the drone 10, and in conjunction with the data captured, a real-time three-dimensional (3D) model 1-RT-model (FIG. 1X) of said portion of the ground-related environment 1-GR-environment currently surrounding the drone 10, and said (ii) correlating, in real-time, the real-time 3D model 1-RT-model with the pre-existing 3D model 1-PE-model, thereby determining a current 3D position of the drone 10 in the pre-existing 3D model 1-PE-model of said ground-related environment, together, constitute a 3D terrain-based-positioning. In one embodiment, said correlating, in real-time, the real-time 3D model 1-RT-model with the pre-existing 3D model 1-PE-model, thereby determining a current 3D position of the drone 10 in the pre-existing 3D model 1-PE-model of said ground-related environment, comprises: aligning together, in three-dimensions, 3D features found in both the real-time 3D model and in the pre-existing 3D model, thereby achieving said correlation between the two models, and thereby translating a 3D location of the drone from the real-time 3D model into the pre-existing 3D model, thereby achieving said determination of the current 3D position of the drone 10 in the pre-existing 3D model 1-PE-model of said ground-related environment. In one embodiment, said 3D features found in both the real-time 3D model 1-RT-model and in the pre-existing 3D model 1-PE-model are associated with two 3D point-clouds found respectively in the real-time 3D model and in the pre-existing 3D, in which both of said two 3D point-clouds represent said ground-related environment; and said correlation and alignment is associated with a calculation of a displacement error between the two 3D point-clouds. In one embodiment, said 3D features found in both the real-time 3D model 1-RT-model and in the pre-existing 3D model 1-PE-model are associated with two 3D virtual structures found respectively in the real-time 3D model and in the pre-existing 3D, in which both of said two 3D virtual structures represent said ground-related environment; and said correlation and alignment is associated with a calculation of a displacement error between the two 3D virtual structures.

One embodiment is a system operative to facilitate a precision low-altitude flight in an urban environment while avoiding collisions with various ground-related objects, comprising: a plurality of drones 10a, 10b, 10c, 10d, 10e, 10f (FIG. 1D) configured to fly in conjunction with a ground-related environment 1-GR-environment (FIG. 1X) and in close proximity to associated ground-related objects 1-road, 1-obstacles, 1-Object, 1-tree (FIG. 1X), while generating three-dimensional (3D) data representing the ground-related environment, in which the 3D data is generated using at least one of: (i) a light-detection-and-ranging (lidar) sensor 4-lidar (FIG. 1A), and (ii) visual-simultaneous-localization-and-mapping (VSLAM) technique using imagery data captured by cameras (e.g., at least one of 4-cam-1, 4-cam-2, 4-cam-3, 4-cam-4, 4-cam-5, 4-cam-6 in FIG. 1A) onboard the drones 10a, 10b, 10c, 10d, 10e, 10f; and a computing platform 5-P (FIG. 1A) operative to: (i) integrate the data captured by the drones 10, and consequently generate (e.g., using a processor 5-cpu') and store (e.g., in a storage system 5-store' such as flash memory, disk memory, or random-access-memory), using the data, a virtual 3D model 1-PE-model (FIG. 1X) of the ground-related environment 1-GR-environment, and (ii) identify, in the virtual 3D model generated and stored, cavities 1-corridor' (FIG. 1X) that are, according to the virtual 3D model, clear of representations 1-rep (FIG. 1X) of the ground-related objects 1-road, 1-obstacles, 1-Object, 1-tree appearing in the virtual 3D model 1-PE-model.

In one embodiment, the computing platform 5-P is configured to: receive a request (e.g., via a physical communication interface 5-comm', but the request can also be generated in the computing platform itself) to fly a mission associated with the ground-related environment 1-GR-environment; analyze the request, and consequently produce, using the virtual 3D model 1-PE-model and the related cavities identified 1-corridor', a navigation plan 1-plan (FIG. 1X) operative to facilitate both a safe flight in conjunction with the cavities identified and execution of the mission.

In one embodiment, said close proximity is a proximity of less than 20 (twenty) meters from said associated ground-related objects 1-road, 1-obstacles, 1-Object, 1-tree; and consequently to said close proximity, the virtual 3D model 1-PE-model contains details of the ground-related objects 1-road, 1-obstacles, 1-Object, 1-tree that are less than 10 (ten) centimeters wide, such as cables and tree brunches, thereby facilitating accurate identification of said cavities 1-corridor' and said safe flight in conjunction with the ground-related environment 1-GR-environment.

In one embodiment, the system comprises a particular drone 10 (FIG. 1X), which is either one of the plurality of drones or a different drone that did not participate is said data generation; said particular drone 10 is configured to obtain, from the computing platform 5-P, at least a part of the virtual 3D model 1-PE-model, and perform 3D terrain-based-positioning using the part obtained as a reference model, thereby determining a displacement of the particular drone 10 relative to the navigation plan 1-plan; and said particular drone 10 is further configured to correct said displacement by performing a corrective maneuver, thereby flying within a flight corridor 1-corridor (FIG. 1X) that corresponds to at least parts of the cavities 1-corridor' identified in the virtual 3D model 1-PE-model; in which said 3D terrain-based-positioning is accurate to within 10 (ten) centimeters as a result of said close proximity that results in a model accuracy of better than 10 (ten) centimeters for said virtual 3D model 1-PE-model.

One embodiment is a system operative to facilitate low-altitude road-following flight, comprising: a low-flying road-following drone 10 (FIG. 1A, FIG. 1X) comprising at least one of a camera 4-cam and a light-detection-and-ranging (lidar) sensor 4-lidar; and a navigation computer (e.g., 5-cpu or 5-P in FIG. 1A). In one embodiment, the system is configured to: determine, using the navigation computer, a navigation plan 1-plan (FIG. 1X) for the drone 10, in which the navigation plan is associated with a combination of connected roads 1-road-1, 1-road-2 (FIG. 1X) to fly over; cause the drone 10 to follow the navigation plan 1-plan, by flying 1-path (FIG. 1X) the drone at a height of between 2 (two) meters and 5 (five) meters above and along at least most of said combination of connected roads 1-road-1, 1-road-2; detect, using at least one of the camera 4-cam and the lidar 4-lidar onboard the drone 10, during said flight, on-road vehicles 1-traffic (FIG. 1M, FIG. 1N, FIG. 1X) that are currently in visual vicinity of the drone, and estimate a height of each of said on-road vehicles; and adjust movement of the drone 10, according so said estimated heights, so as to avoid passing over at least a certain one of the on-road vehicles estimated to have a height of above a specific threshold value. In one embodiment, said specific threshold value is between 2 (two) meters and 5 (five) meters. In one embodiment, said adjustment of movement comprises at least one of: (i) moving to the left or to the right, thereby avoiding flying over the certain on-road vehicle, and instead passing alongside the on-road vehicle at a height of between 2 (two) meters and 5 (five) meters above road, (ii) reducing forward velocity, thereby avoiding flying over the certain on-road vehicle, and instead flying behind the on-road vehicle at a height of between 2 (two) meters and 5 (five) meters above road, and (iii) increasing forward velocity, thereby avoiding flying over the certain on-road vehicle, and instead flying in-front of the on-road vehicle at a height of between 2 (two) meters and 5 (five) meters above road. In one embodiment, said height estimation of the on-road vehicles is done in conjunction with at least one of: (i) generation of a real-time 3D model 1-RT-model (FIG. 1X) of an area surrounding the drone 10 by utilizing a visual-simultaneous-localization-and-mapping (VSLAM) technique in conjunction with data captured by the camera 1-cam, and extracting height information of the on-road vehicles appearing in the model, (ii) generation of a real-time 3D model 1-RT-model of an area surrounding the drone 10 by integrating data gathered by the lidar 4-lidar sensor, and extracting height information of the on-road vehicles appearing in the model, and (iii) utilizing machine-learning models to extract height information from appearances of the on-road vehicles as captured by the camera 1-cam.

Figure 2A:
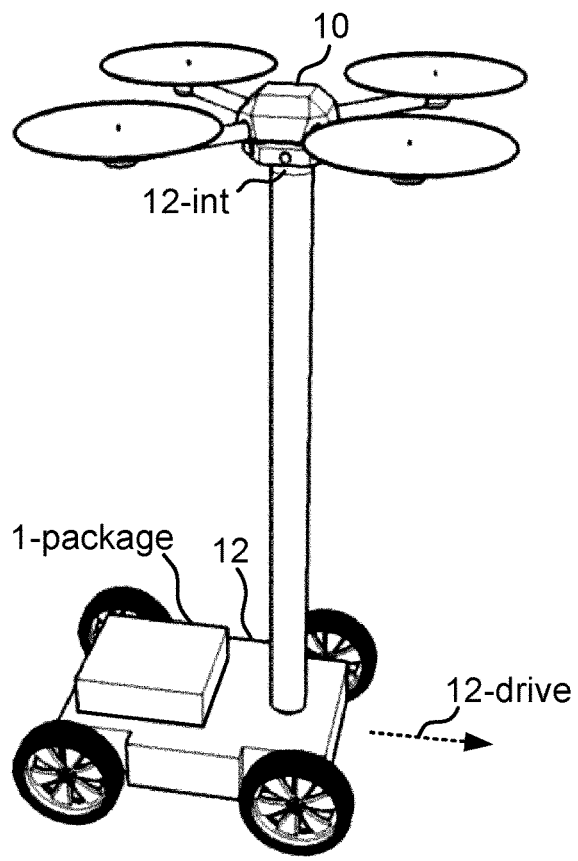
FIG. 2A illustrates one embodiment of a drone integrated with a package-carrying on-road vehicle that is directly controlled by the drone.

FIG. 2A illustrates one embodiment of a drone 10 physically integrated with a package-carrying on-road vehicle 12 that is directly controlled by the drone. The drone 10 is integrated with the on-road vehicle 12 via a docking point 12-int onboard the on-road vehicle. The drone 10 uses a sensor suite and processing capabilities onboard the drone to: (i) sense and analyze environment surrounding the on-road vehicle 12, and accordingly (ii) issue actuation commands directly to servo mechanisms onboard the on-road vehicle 12, thereby adapting the on-road vehicle for self driving 12-drive, in which the on-road vehicle 12, by itself, does not necessarily posses self driving capabilities. In one embodiment, the on-road vehicle 12 does not possess any self driving capabilities by itself, and therefore gains autonomous capabilities only via said physical integration with the drone 10 and by accepting direct actuation commands from the autonomy-capable drone 10. In one embodiment, the on-road vehicle 12 carries a package 1-package to be delivered, and the autonomy-capable drone 10, which is integrated with the on-road vehicle, self-drives the on-road vehicle 12 to a certain destination facilitating said delivery.

Figure 2B:
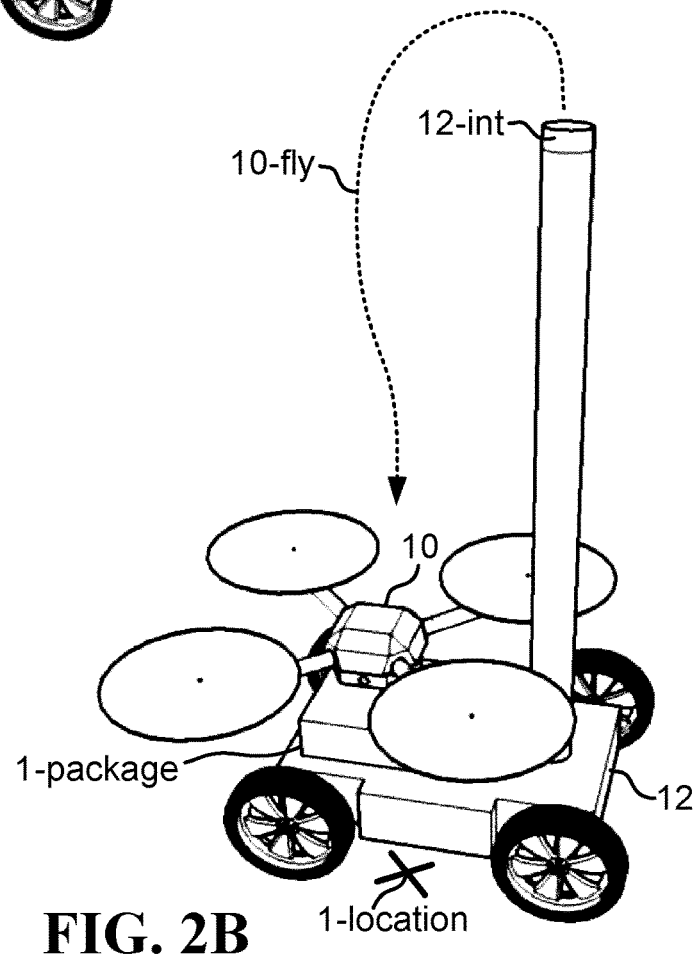
FIG. 2B illustrates one embodiment of the drone de-integrating with the on-road vehicle and flying toward a package carried by the on-road vehicle.

FIG. 2B illustrates one embodiment of the drone 10 de-integrating with the on-road vehicle 12 and flying toward the package 1-package carried by that on-road vehicle. Upon arrival of the drone 10 with the vehicle 12 to the certain destination 1-location facilitating said delivery, the drone 10 de-integrates with the on-road vehicle 12 by un-docking with the docking point 12-int, and flies autonomously 1-fly toward the package 1-package on-board the vehicle 12, using the same sensor suite and processing capabilities used before by the drone 10 to self drive the vehicle 12. The autonomous flight 1-fly toward the package 1-package may be a very short flight of a few meters/few seconds that is necessary to traverse the short distance between the docking point 12-int and a resting place of the package 1-package on the vehicle 12. Upon reaching the package 1-package, the drone 10 may then pick-up the package.

Figure 2C:
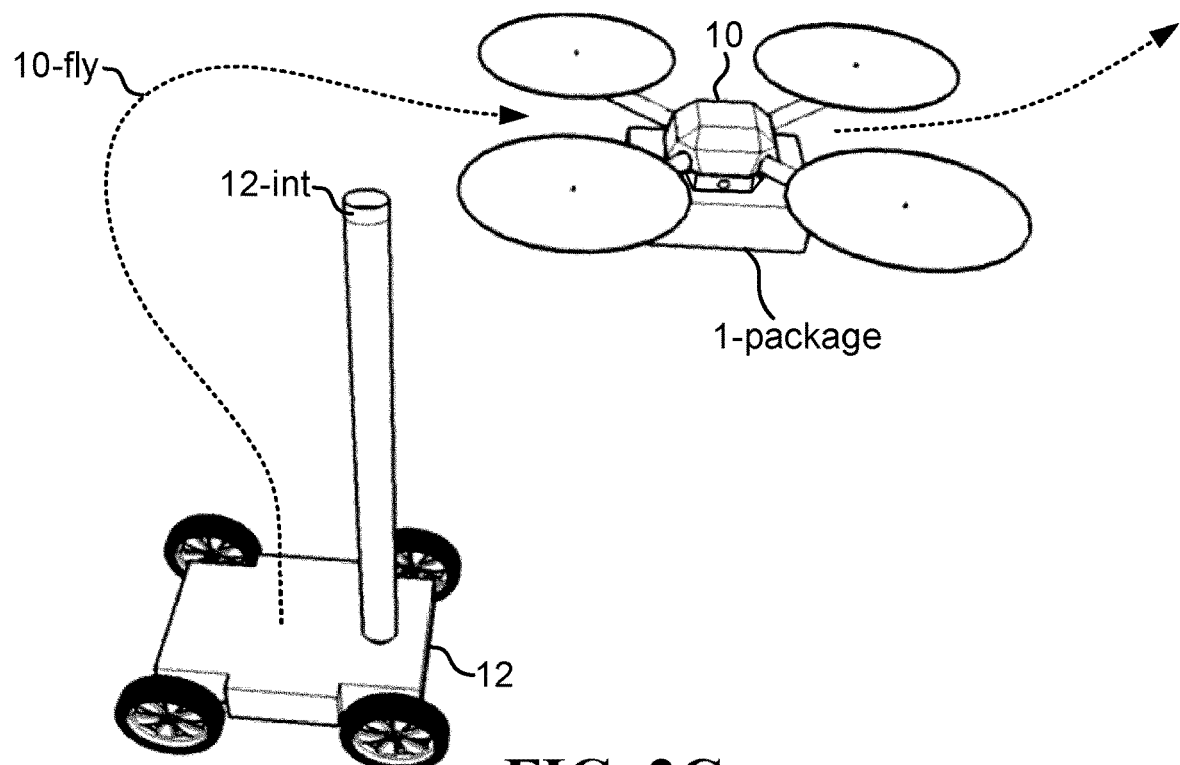
FIG. 2C illustrates one embodiment of the drone picking up the package from the on-road vehicle and flying away with that package.

FIG. 2C illustrates one embodiment of the drone 10 picking up the package 1-package from the on-road vehicle 12 and flying away 10-fly with that package to a final destination at which the package may be delivered by the drone 10. In one embodiment, the vehicle 12 remains static (e.g., remains parked) during the departure of the drone 10 with the package 1-package, as the on-road vehicle 12 losses autonomy when the drone 10 flies away with the sensor suite and processing capabilities necessary for autonomy, in which the sensor suite and processing capabilities are now utilized by the drone 10 to self fly 10-fly toward the final destination of delivery.

Figure 2D:
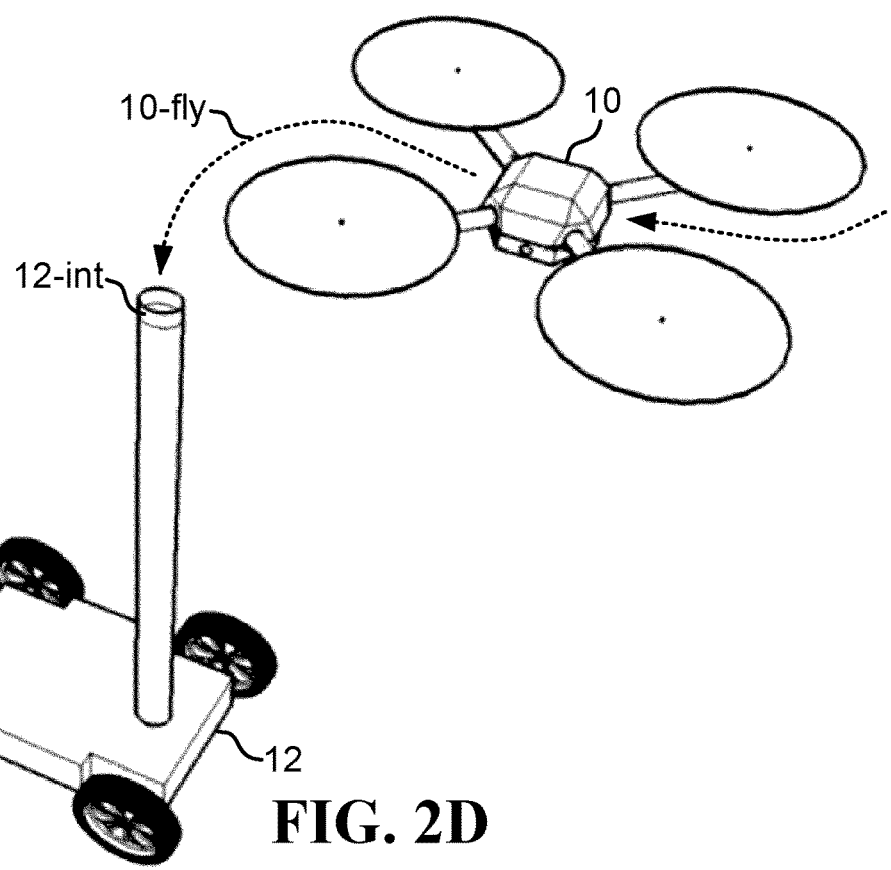
FIG. 2D illustrates one embodiment of the drone flying back for integration with the on-road vehicle after delivering the package.

FIG. 2D illustrates one embodiment of the drone 10 flying back 10-fly for integration with the on-road vehicle 12 after delivering the package. Upon returning and re-integrating/docking 12-int of the drone 10 with the vehicle 12, the drone 10 may then directly control the vehicle 12 again, perhaps for the purpose of self-driving the vehicle 12 into a warehouse at which the vehicle is to be loaded with a new package for delivery.

Figure 2E:
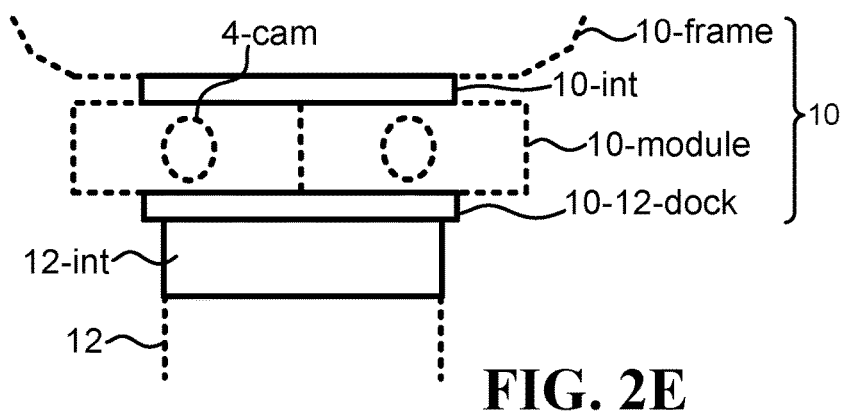
FIG. 2E illustrates one embodiment of the drone physically integrated with the on-road vehicle via a physical interface.

FIG. 2E illustrates one embodiment of the drone 10 physically integrated with the on-road vehicle 12 via a physical interface/docking point 12-int. The drone itself may include: (i) a frame 10-frame, (ii) an autonomy module 10-module integrated with the frame via an integration point 10-int, in which the autonomy module 10-module may include the sensor suite (e.g., cameras 4-cam) and processing capabilities needed to facilitate autonomous functions, and (iii) a docking element 10-12-dock operative to lock into the docking point 12-int onboard the vehicle 12.

Figure 2F:
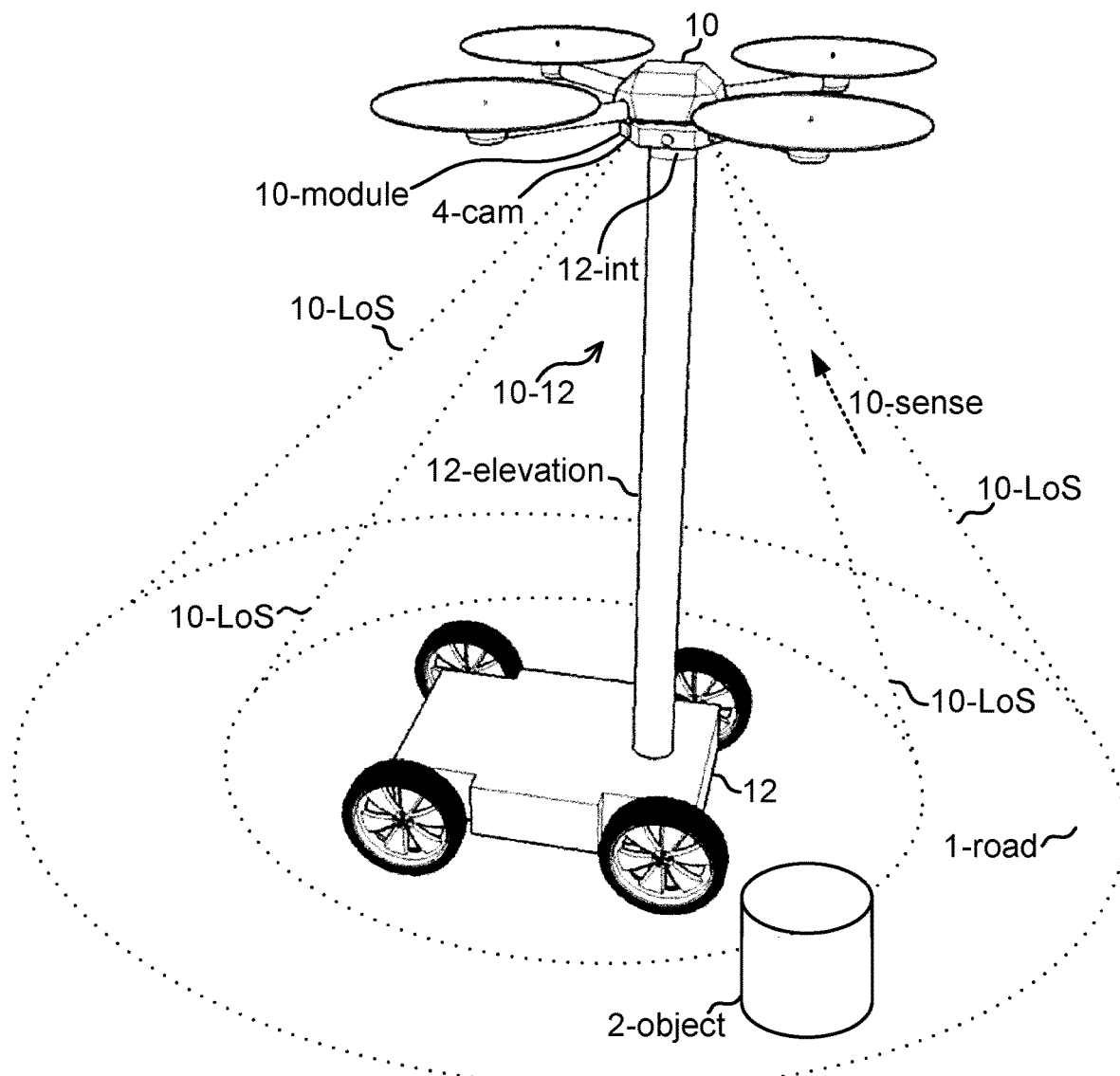
FIG. 2F illustrates one embodiment of the drone physically integrated with the on-road vehicle and directly controlling the on-road vehicle thereby facilitation autonomous driving.

FIG. 2F illustrates one embodiment of the drone 10 physically integrated with the on-road vehicle 12 and directly controlling the on-road vehicle thereby facilitation autonomous driving. The drone 10, which is integrated with the vehicle 12 via a docking point 12-int, uses a sensor suite onboard the drone (e.g., a set of cameras 4-cam) to sense 10-sense environment surrounding the vehicle 12 (e.g., sensing an object 2-object on the road 1-road near the vehicle), and utilizes a processing capability onboard the drone to analyze the sensory input and to issue actuation commands to the vehicle 12 accordingly, thereby adapting the on-road vehicle to self driving. In one embodiment, the docking point 12-int is elevated 12-elevation above the on-road vehicle 12, thereby providing the sensor suite 4-cam onboard the drone 10 with uninterrupted view of the surrounding environment, and thereby facilitating a line-of-sight 10-LoS between the sensor suite and the surrounding environment all around the vehicle 12. In one embodiment, the sensor suite 4-cam and processing capabilities are both located inside an autonomy module 10-module carried by the drone 10. In one embodiment the combination of the drone 10 and the on-road vehicle 12 produces a single integrated hybrid autonomous vehicle 10-12.

Figure 2G:
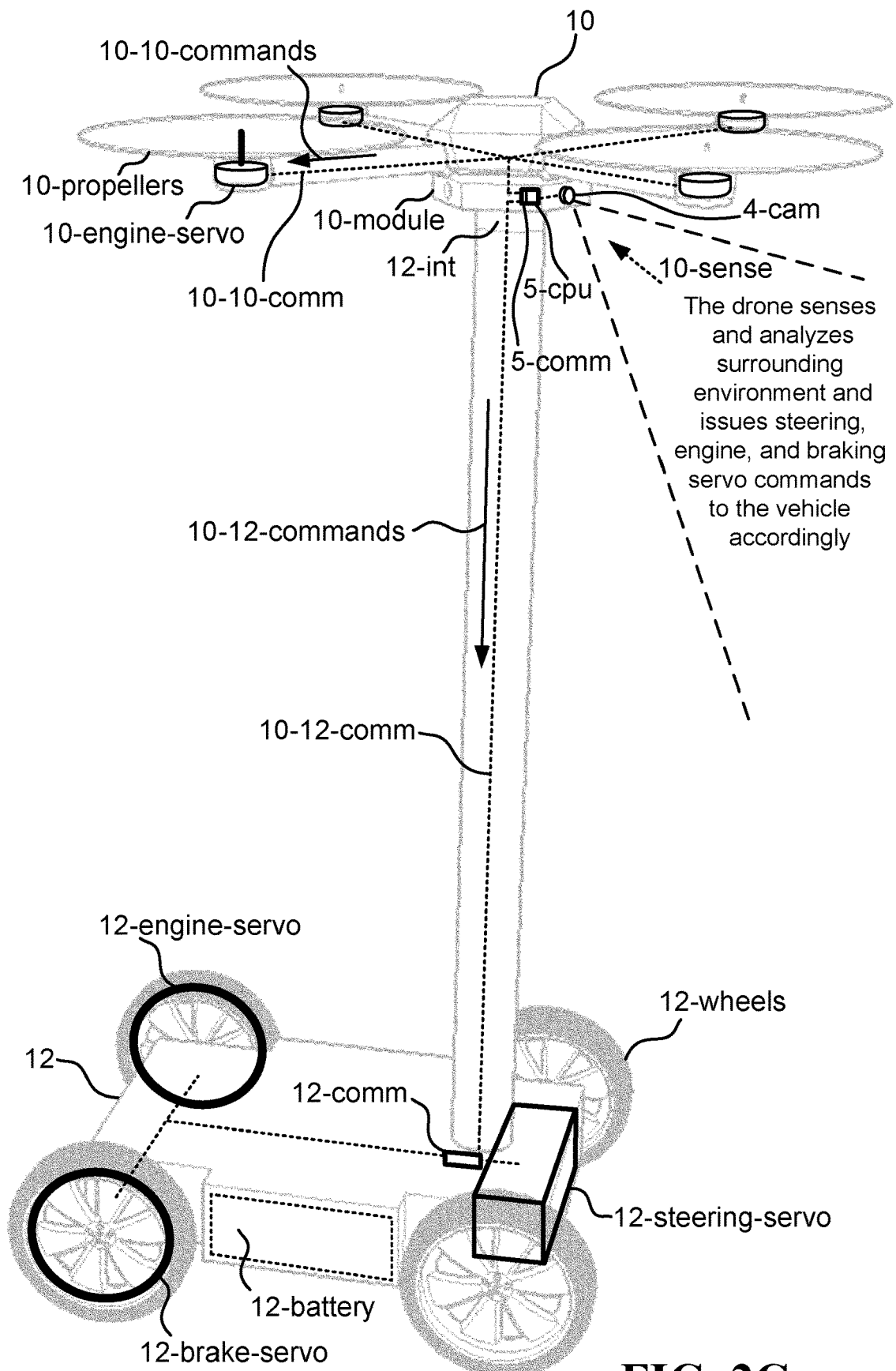
FIG. 2G illustrates one embodiment of the drone physically integrated with the on-road vehicle and directly controlling servo mechanisms onboard the on-road vehicle as a reaction to sensing and analyzing surrounding environment.

FIG. 2G illustrates one embodiment of the drone 10 physically integrated with the on-road vehicle 12 and directly controlling servo mechanisms onboard the on-road vehicle as a reaction to sensing and analyzing surrounding environment. The drone 10 is integrated with the on-road vehicle 12 via a docking point 12-int onboard the on-road vehicle. The drone 10 uses an onboard sensor suite (e.g., a set of cameras 4-cam) together with an onboard compute element/processor 5-cpu capable of executing self driving and self flying algorithms to: (i) sense and analyze environment surrounding the on-road vehicle 12, and accordingly (ii) issue actuation commands 10-12-commands directly to servo mechanisms onboard the on-road vehicle 12, thereby adapting the on-road vehicle for self driving. The actuation commands 10-12-commands from the drone 10 may include: (i) actuation commands to a steering servo mechanism onboard the vehicle 12-steering-servo, thereby allowing the drone to directly steer at least one wheel 12-wheels of the on-road vehicle 12, (ii) actuation commands to an engine servo mechanism onboard the vehicle 12-engine-servo, thereby allowing the drone to directly control power transfer from a power source onboard the vehicle 12-battery to at least one wheel 12-wheels of the vehicle and thereby directly accelerating, decelerating or maintaining current speed of the on-road vehicle 12, (iii) actuation commands to a braking servo mechanism onboard the vehicle 12-brake-servo, thereby allowing the drone to directly decelerate or completely stop the vehicle 12, and (iv) other actuation commands associated with activating/deactivating signaling lights, illumination, and other functions usually associated with on-road vehicles certified as commercial motor vehicles (CMV). The actuation commands 10-12-commands are communicated from the drone 10 to the on-road vehicle 12 using a communication link 10-12-comm that may be either wired or wireless, in which said communication link 10-12-comm is facilitated by a communication interface 5-comm on the drone side and a communication interface 12-comm on the vehicle side. In one embodiment, when the drone 10 issues actuation commands 10-12-commands to the on-road vehicle 12, the drone does not send in parallel actuation commands to an engine servo mechanism onboard the drone 10-engine-servo, as the drone is now docked 12-int with the vehicle 12 and therefore there is no need to operate the drone's engines and propellers 10-propellers. In one embodiment, during flight 10-fly (e.g., as shown in FIG. 2C and FIG. 2D), a separate communication link 10-10-comm onboard the drone 10 is used by the drone to directly control 10-10-commands the engine servo mechanism 10-engine-servo onboard the drone, and in that case: (i) the communication link 10-12-comm to the on-road vehicle is disabled, (ii) the on-road vehicle remains static, and (iii) the sensor suite 4-cam and compute element 5-cpu onboard the drone 10 are used solely for autonomous flight 10-fly.

FIG. 3A illustrates one embodiment of a drone frame 10-frame configured to integrate with an autonomy module 10-module. The autonomy module 10-module includes: (i) a sensor suite (e.g., a set of cameras 4-cam) together with an onboard compute element/processor 5-cpu (FIG. 2G) capable of executing self driving and self flying algorithms, and (ii) an interface 10-int operative to lock the autonomy module 10-module onto the drone frame 10-frame.

FIG. 3B illustrates one embodiment of the drone frame 10-frame integrated with the autonomy module 10-module thereby producing a drone 10 having autonomous flight capabilities when de-integrated with an on-road vehicle (e.g., as shown in FIG. 2C and FIG. 2D) and autonomous driving capabilities when integrated with an on-road vehicle (e.g., as shown in FIG. 2F).

FIG. 4A illustrates one embodiment of an on-road vehicle 12 with a docking interface 12-int carrying a cargo 12-cargo and currently not integrated with an autonomy module. In this state, the on-road vehicle 12 may be incapable of autonomous driving, and is perhaps awaiting, in a warehouse with the cargo 12-cargo onboard, for upcoming integration with the autonomy module.

FIG. 4B illustrates one embodiment of the on-road vehicle 12 carrying the cargo 12-cargo and currently integrated 12-int with an autonomy module 10-module, thereby rendering the on-road vehicle 12 autonomous and ready for self driving and self delivering the cargo 12-cargo. The autonomy module 10-module may be docked 12-int onto the vehicle 12 manually, or a drone 10 (FIG. 3B) comprising the autonomy module 10-module may descend onto the docking interface 12-int, release the autonomy module 10-module, and fly away (frame only 10-frame) while leaving the 10-module docked with the vehicle 12.

FIG. 4C illustrates one embodiment of an on-road vehicle 12 carrying a passenger 12-passenger and currently integrated 12-int with an autonomy module 10-module, thus rendering the on-road vehicle 12 capable of autonomously transporting the passenger 12-passenger and autonomously reaching the passenger for being transported.

Figure 5A:
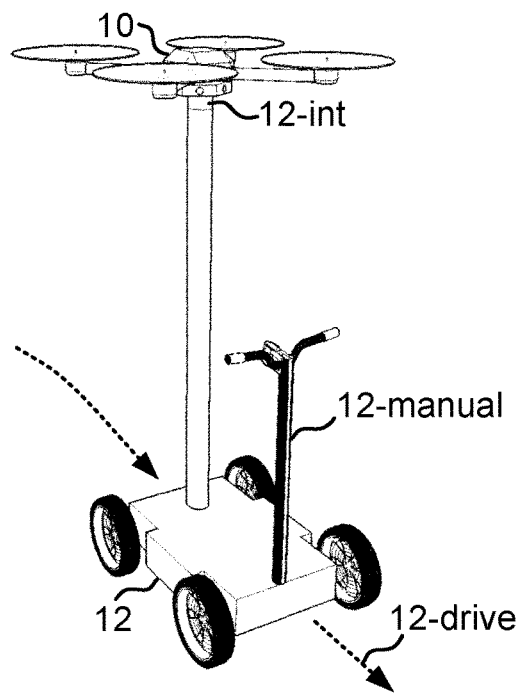
FIG. 5A illustrates one embodiment of a drone integrated with a manually controllable on-road vehicle that is currently on the move and being directly controlled by the drone.

FIG. 5A illustrates one embodiment of a drone 10 integrated with a manually controllable on-road vehicle 12 that is currently on the move 12-drive and being directly controlled by the drone 10. The on-road vehicle 12 may be heading 12-driving toward a driver that awaits the on-road vehicle. The manually controllable on-road vehicle 12 includes a steering wheel or handlebars 12-manual enabling a human driver to manually control the vehicle 12. In this current state, the manually controllable on-road vehicle 12 is being directly controlled by the drone 10, thereby facilitating autonomous driving 12-drive.

Figure 5B:
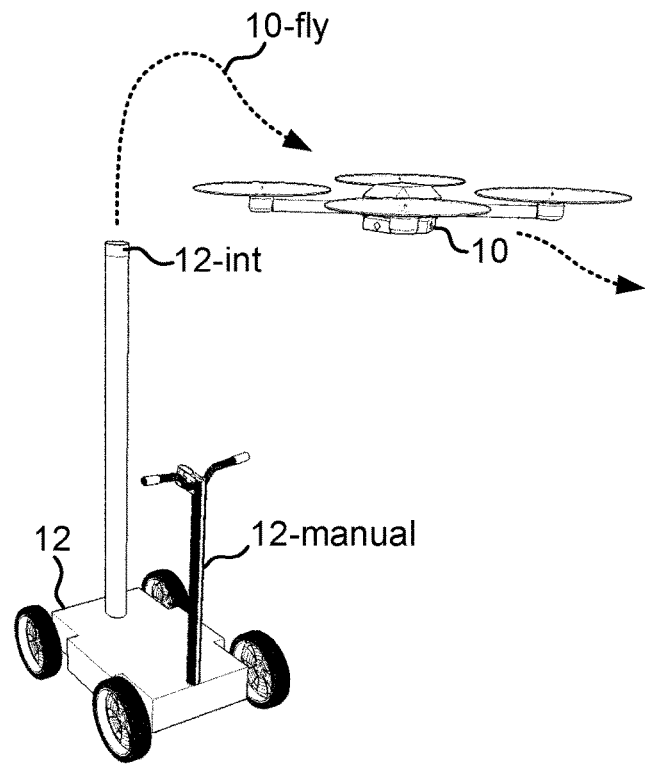
FIG. 5B illustrates one embodiment of the drone de-integrating with the manually controllable on-road vehicle and flying away.

FIG. 5B illustrates one embodiment of the drone 10 de-integrating with the manually controllable on-road vehicle 12 and flying away 10-fly, after bringing the vehicle 12 into close proximity to a human driver.

Figure 5C:
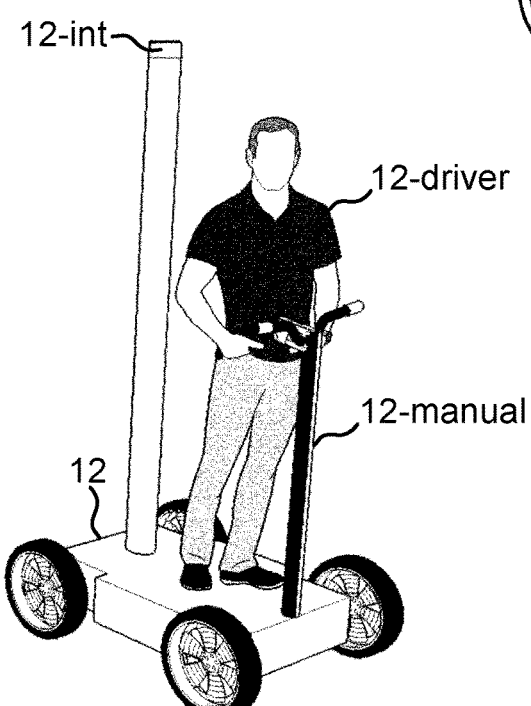
FIG. 5C illustrates one embodiment of the on-road vehicle that is currently manually controlled by a driver.

FIG. 5C illustrates one embodiment of the on-road vehicle 12 that is currently manually controlled by the driver 12-driver. In this current state, the vehicle 12 is de-integrated with the drone 10 and is therefore incapable of self driving, however self driving is not needed now, as the driver assumes manual control 12-manual over the vehicle 12.

One embodiment is a system operative to exploit autonomous capabilities of a drone for adapting an on-road vehicle to autonomous driving, comprising: a drone 10 (FIG. 1A, FIG. 3B) having autonomous capabilities such as autonomous flight, in which the drone comprises: (i) an autonomy module 10-module (FIG. 3B) operative to facilitate said autonomous capabilities, and (ii) a first plurality of engines coupled respectively with a first plurality of engine servo mechanisms 10-engine-servo (FIG. 2G) together operative to power a plurality of propellers 10-propellers (FIG. 2G) respectively; and an on-road vehicle 12 (FIG. 2D, FIG. 2G) on wheels 12-wheels (FIG. 2G), comprising: (i) a physical interface 12-int operative to facilitate physical integration of the drone 10 with said on-road vehicle 12, and (ii) a second plurality of engines coupled with a second plurality of servo mechanisms 12-engine-servo, 12-steering-servo (FIG. 2G) together operative to power and steer at least some of the wheels 12-wheels.

In one embodiment, the system is configured to: use the autonomy module 10-module onboard the drone 10 to: sense environment (e.g., sense 1-object, 1-ped in FIG. 1B, FIG. 1M) surrounding the drone 10, analyze the environment 1-ped, 1-object, and issue accordingly real-time actuation commands 10-10-commands to the first plurality of engine servo mechanisms 10-engine-servo onboard the drone 10, thereby controlling directly a thrust produced by each of the propellers 10-propellers, and thereby causing the drone to fly autonomously 10-fly (FIG. 2D) en route to the on-road vehicle 12; upon arrival to the on-road vehicle 12: dock 10-12-dock (FIG. 2E) the drone 10 with the on-road vehicle 12 via the physical interface 12-int, thereby physically integrating the drone 10 with the on-road vehicle 12 to produce one integrated vehicle 10-12 (FIG. 2F); establish a communication channel 10-12-comm (FIG. 2G) between the drone 10 and the on-road vehicle 12; and use again the autonomy module 10-module onboard the drone 10 to: sense 10-sense (FIG. 2F) environment 2-object (FIG. 2F) surrounding the on-road vehicle 12 now integrated with the drone 10, analyze the environment 2-object, and issue accordingly real-time actuation commands 10-12-commands (FIG. 2G), via the communication channel 10-12-comm, to the second plurality of engine servo mechanisms 12-engine-servo, 12-steering-servo (FIG. 2G) onboard the on-road vehicle 12, thereby powering and steering directly at least some of the wheels 12-wheels, and thereby achieving said adaptation of the on-road vehicle to autonomous driving.

In one embodiment, the autonomy module 10-module comprises: (i) a sensor suite (e.g., at least one of 4-cam, 4-lidar, FIG. 1A), and (ii) a compute element 5-cpu (FIG. 1A) together facilitating said autonomous capabilities; said sensing 10-sense and analyzing of the environment surrounding the on-road vehicle 12 is done continuously, using the sensor suite and the compute element 5-cpu, during at least some phases of said autonomous driving, at a rate of between 10 (ten) times per second and 1,000 (one thousand) times per second, thereby facilitating said autonomous driving in conjunction with roads 1-road (FIG. 1M, FIG. 1N) and alongside car and pedestrian traffic 1-traffic, 1-ped (FIG. 1M); and said issuing accordingly of the real-time actuation commands 10-12-commands (FIG. 2G), via the communication channel 10-12-comm, to the second plurality of engine servo mechanisms 12-engine-servo, 12-steering-servo (FIG. 2G) onboard the on-road vehicle 12, during at least some phases of said autonomous driving, is done using the compute element 5-cpu at a rate of between 10 (ten) times per second and 1,000 (one thousand) times per second, thereby further facilitating said autonomous driving in conjunction with said roads 1-road and alongside the car and pedestrian traffic 1-traffic, 1-ped. In one embodiment, the delay (latency) between said sensing 10-sense and said issuing accordingly of the real-time actuation commands 10-12-commands is between 1 (one) millisecond and 100 (one hundred) milliseconds, thereby facilitating said real-time actuation.

In one embodiment, during said sensing 10-sense and analyzing of the environment surrounding the on-road vehicle 12, and during said issuing accordingly of the real-time actuation commands 10-12-commands (FIG. 2G), via the communication channel 10-12-comm, to the second plurality of engine servo mechanisms 12-engine-servo, 12-steering-servo (FIG. 2G) onboard the on-road vehicle 12, the autonomy module 10-module stops said issuing of the real-time actuation commands 10-10-commands to the first plurality of engine servo mechanisms 10-engine-servo onboard the drone 10, thereby powering down the first plurality of engines coupled respectively with a first plurality of engine servo mechanisms 10-engine-servo onboard the drone.

In one embodiment, said analysis of the environment 1-ped, 1-object is done completely autonomously by processing resources and autonomous flight algorithms onboard the autonomy module 10-module. In another related embodiment, said analysis of the environment 1-ped, 1-object is done only semi-autonomously, in which such semi-autonomous operation may include relaying by the autonomy module 10-module, via a wireless network such as LTE or 5G, to a remote operator, the environment sensed (e.g., relaying imagery data of 1-object, 1-ped in FIG. 1B, FIG. 1M), and in which the remote operator relays back, via the wireless network, manual control commands to the autonomy module 10-module that uses the manual commands to issue accordingly real-time actuation commands 10-10-commands to the first plurality of engine servo mechanisms 10-engine-servo onboard the drone 10, thereby controlling directly a thrust produced by each of the propellers 10-propellers, and thereby causing the drone to fly semi autonomously 10-fly (FIG. 2D).

In one embodiment, said analysis of the environment 2-object is done completely autonomously by processing resources and autonomous driving algorithms onboard the autonomy module 10-module. In another related embodiment, said analysis of the environment 2-object is done only semi-autonomously, in which such semi-autonomous operation may include relaying, by the autonomy module 10-module, via a wireless network such as LTE or 5G, to a remote operator, the environment sensed (e.g., relaying imagery data of 2-object), and in which the remote operator relays back, via the wireless network, manual control commands to the autonomy module 10-module that uses the manual commands to issue accordingly real-time actuation commands 10-12-commands (FIG. 2G), via the communication channel 10-12-comm, to the second plurality of engine servo mechanisms 12-engine-servo, 12-steering-servo (FIG. 2G) onboard the on-road vehicle 12, thereby powering and steering directly at least some of the wheels 12-wheels, and thereby achieving said adaptation of the on-road vehicle to semi-autonomous driving.

One embodiment is a system operative to exploit autonomous capabilities of a drone for adapting an on-road vehicle to self driving, comprising: a drone 10 (FIG. 1A, FIG. 3B) having autonomous capabilities such as autonomous flight, in which the drone comprises at least: (i) a sensor suite (e.g., at least one of 4-cam, 4-lidar, and 5-GNSS, FIG. 1A), and (ii) a compute element 5-cpu (FIG. 1A) together facilitating said autonomous capabilities; and an on-road vehicle 12 (FIG. 2D) comprising a physical interface 12-int operative to facilitate physical integration of the drone 10 with said on-road vehicle 12. In one embodiment, the system is configured to: use the sensor suite 4-cam, 4-lidar, 5-GNSS and the compute element 5-cpu onboard the drone 10 to fly the drone autonomously 10-fly (FIG. 2D) en route to the on-road vehicle 12; upon arrival to the on-road vehicle: dock 10-12-dock (FIG. 2E) the drone 10 with the on-road vehicle 12 via the physical interface 12-int, thereby physically integrating the drone 10 with the on-road vehicle 12 to produce one integrated vehicle 10-12 (FIG. 2F); establish a communication channel 10-12-comm (FIG. 2G) between the drone 10 and the on-road vehicle 12; and use again the sensor suite 4-cam, 4-lidar, 5-GNSS and the compute element 5-cpu still onboard the drone 10, but this time for autonomously driving the on-road vehicle 12, in which the drone 10 senses 10-sense (FIG. 2G) and analyzes (using 5-cpu) an environment surrounding the vehicle 12 and consequently issues driving commands 10-12-commands (FIG. 2G), via the communication channel 10-12-comm, to the on-road vehicle 12 now integrated with the drone 10, thereby achieving said adaptation.

In one embodiment, the on-road vehicle 12 further comprises: at least two wheels 12-wheels (FIG. 2G); a steering servo mechanism 12-steering-servo (FIG. 2G) operative to steer the on-road vehicle 12 using at least some of the wheels 12-wheels; an engine servo mechanism and an engine (together 12-engine-servo, FIG. 2G) operative to power at least some of the wheels 12-wheels; and a braking servo mechanism and a brake (together 12-brake-servo, FIG. 2G) operative to slow-down the on-road vehicle 12; in which said issuing of driving commands comprises: sending steering commands 10-12-commands to the steering servo mechanism 12-steering-servo, thereby controlling directly, by the drone 10, an angle of turning associated with at least some of the wheels 12-wheels; sending braking commands 10-12-commands to the braking servo mechanism 12-brake-servo, thereby causing the on-road vehicle 12 to slow down; and sending power level commands 10-12-commands to the engine servo mechanism 12-engine-servo, thereby controlling directly, by the drone 10, a velocity of the on-road vehicle 12.

In one embodiment, the sensor suite comprises: a global navigation satellite system (GNSS) receiver 5-GNSS, such as a global positioning system (GPS) receiver, and at least one of: (i) imagery sensor/s such as cameras 4-cam or infrared sensors, (ii) radar sensors such as millimeter-wave sensors, (iii) acoustical sensors such as ultrasound sensors, and (iv) lidar sensors 4-lidar; and said physically integration of the drone 10 with the on-road vehicle 12 is done so as to not interfere with the operation of the sensor suite onboard the drone, and thereby allowing a line-of-sight 10-LOS (FIG. 2F) between at least some of the sensors 4-cam, 4-lidar in the sensor suite and outside environment 2-object (FIG. 2F) surrounding the on-road vehicle 12 that is now integrated with the drone 10, thereby facilitating said autonomous driving. In one embodiment, the system is further configured to switch between autonomous flight mode and autonomous driving mode in conjunction with said adaptation, in which during said driving mode the drone 10 is not flying. In one embodiment, said establishing of the communication channel 10-12-comm between the drone 10 and the on-road vehicle 12 is done in conjunction with one or more of the following timing possibilities: (i) prior to said integration, (ii) during said integration, and (iii) after said integration. In one embodiment, said communication channel 10-12-comm between the drone 10 and the on-road vehicle 12 is facilitated by at least one of: (i) a wired electrical connection associated with the physical interface 12-int, and (ii) a wireless connection, either direct or indirect, between the drone and the on-road vehicle.

One embodiment is a system operative to exploit autonomous capabilities of drones for adapting on-road vehicles to self driving, comprising: a plurality of on-road vehicles 12 (FIG. 5B), 12 (FIG. 2D); and a plurality of drones 10 (FIG. 2D), 10 (FIG. 5B), in which each of the drones 10 has autonomous capabilities such as autonomous flight facilitated by a sensor suite (e.g., at least one of 4-cam, 4-lidar, and 5-GNSS, FIG. 1A) and a compute element 5-cpu (FIG. 1A) onboard the drone, and in which each of the drones 10 is configured to physically interface with each of the on-road vehicles 12. In one embodiment, each of the drones 10 has at least two drone-states: (i) a first drone-state, in which the drone 10 flies autonomously, and (ii) a second drone-state, in which the drone 10 is physically interfaced with one of the on-road vehicles 12 and is operative to issue on-road driving commands to that on-road vehicle; each of the on-road vehicles 12 has at least two vehicle-states: (i) a first vehicle-state, in which the vehicle 12 is not physically interfaced with one of the drones 10, and is therefore unable to drive autonomously, and (ii) a second vehicle-state, in which the on-road vehicle 12 is physically interfaced with one of the drones 10 and is operative to receive and execute on-road driving commands from that drone, and is therefore able to drive autonomously; and the system is configured to resolve, at any given time and based on a changing situation, which of the drones 10 is to be physically interfaced with which of the on-road vehicles 12, thereby causing each of the drones 10 and each of the on-road vehicles 12 to be in a specific one of the respective states currently facilitating the changing situation.

In one embodiment, each of at least some of the on-road vehicles 12 (FIG. 5B) comprises a manual control element 12-manual (FIG. 5B) such as a steering wheel or handlebars, in which the manual control element enables a human driver 12-driver (FIG. 5C) to manually drive the on-road vehicle 12; and in conjunction with said resolving and said changing condition, the system is configured to: identify a human driver 12-driver requesting to use an on-road vehicle 12; identify one of the on-road vehicle 12 having a manual control element 12-manual, in which the on-road vehicle identified 12 (FIG. 5A) is currently not co-located with the human driver 12-driver; command one of the drones 10 (FIG. 5A) to: (i) physically interface with the on-road vehicle identified 12 (FIG. 5A), and (ii) issue on-road driving commands to that on-road vehicle 12 (FIG. 5A), thereby autonomously positioning 12-drive (FIG. 5A) the on-road vehicle 12 (FIG. 5B) in proximity to the human driver 12-drive; and command the drone 10 (FIG. 5B) to disengage the on-road vehicle 12 and fly away 10-fly (FIG. 5B), thereby allowing the human driver 12-driver (FIG. 5C) to take manual control over the on-road vehicle 12 (FIG. 5C).

In one embodiment, each of at least some of the on-road vehicles 12 (FIG. 2A) is operative to facilitate delivery of packages 1-package (FIG. 2A); and in conjunction with said resolving and said changing condition, the system is configured to command one of the drones 10 (FIG. 2A) to: (i) physically interface with one of the on-road vehicle 12 (FIG. 2A) that is currently carrying or is about to carry a package 1-package (FIG. 2A) for delivery, and (ii) issue on-road driving commands to that on-road vehicle 12 (FIG. 2A), thereby autonomously positioning 12-drive (FIG. 2A) the on-road vehicle 12 with the package 1-package at a specific location 1-location (FIG. 2B) from which the package is to be delivered. In one embodiment, upon arrival at said specific location 1-location (FIG. 2B), the system is configured to command said one of the drones 10 (FIG. 2B) to: (i) disengage the on-road vehicle 12 (FIG. 2B), (ii) fly 10-fly (FIG. 2B) and pick up the package 1-package (FIG. 2B) from the on-road vehicle 12 (FIG. 2B), and (iii) autonomously fly 10-fly (FIG. 2C) the package 1-package (FIG. 2C) to a secondary location associated with (e.g., nearby) the specific location 1-location, in which the secondary location is not accessible to the on-road vehicle 12. The drone 10 can then deliver the package 1-package at the secondary location, and fly back 10-fly (FIG. 2D) to the on-road vehicle 12 (FIG. 2D).

In one embodiment, each of at least some of the on-road vehicles 12 is operative to facilitate capturing of imagery data in conjunction with conducting surveillance; and in conjunction with said resolving and said changing condition, the system is configured to command one of the drones 10 to: (i) physically interface (FIG. 2F) with one of the on-road vehicle 12 that is to facilitate surveillance activity, and (ii) issue on-road driving commands to that on-road vehicle 12, thereby autonomously traversing streets 1-road, and thereby allowing the drone 10 (FIG. 2F) to capture, using the sensor suite 4-cam onboard the drone, the imagery data needed for said surveillance while being integrated with the on-road vehicle 12 (FIG. 2F). In one embodiment, at a certain point, or several points, along the course of driving and conducting said surveillance, the system is configured to command said one of the drones 10 to: (i) disengage the on-road vehicle 12, (ii) and continue said surveillance activities (FIG. 1C, in which said one of the drones 10 is represented by drone 10a), using the sensor suite 4-cam onboard the drone 10, while flying autonomously 10-path-1 (FIG. 1C), and while the on-road vehicle 12 remains static and awaits the drone 10.

In one embodiment, each of at least some of the on-road vehicles 12 is an electric vehicle having an onboard battery 12-battery (FIG. 2G); and in conjunction with said resolving and said changing condition, the system is configured to command one of the drones 10 to: (i) physically interface (FIG. 2F) with one of the on-road vehicle 12 that needs to recharge or replace the respective onboard battery 12-battery, and (ii) issue on-road driving commands to that on-road vehicle 12, thereby autonomously driving the on-road vehicle to a location at which the respective onboard battery 12-battery can be recharged or replaced. In one embodiment, each of the drones 10 (FIG. 1P) is configured to charge batteries 10-battery-1 (FIG. 1P) onboard the drone while being physically interfaced with one of the on-road vehicles 12 (FIG. 2F) and using energy 12-battery (FIG. 2G) from that on-road vehicle 12. In one embodiment, each of the drones 10 (FIG. 1P) is configured to exchange batteries 10-battery-1, 10-battery-2 with one of the on-road vehicles 12 (represented by 9-station in FIG. 1P), thereby picking up a newly charged battery 10-battery-2 from that on-road vehicle 9-station (FIG. 1S, FIG. 1T).

Figure 6:
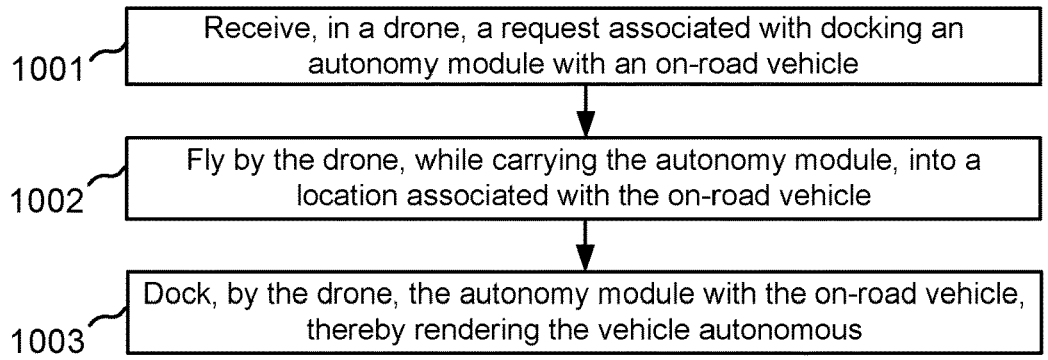
FIG. 6 illustrates one embodiment of a method for interfacing between an on-road vehicle and a module operative to render the on road vehicle capable of self-driving.

FIG. 6 illustrates one embodiment of a method for interfacing between an on-road vehicle and a module operative to render the on road vehicle capable of self-driving. The method includes: In step 1001, receiving, in a drone 10 (FIG. 3B), a request associated with interfacing between an on-road vehicle 12 (FIG. 4A) and a module 10-module (FIG. 3B) operative to render the on road vehicle capable of self-driving, in which the module 10-module comprises a sensor suite (e.g., at least one of 4-cam, 4-lidar, and 5-GNSS FIG. 1A) and a compute element 5-cpu (FIG. 1A) operative to facilitate autonomous capabilities. In step 1002, flying 10-fly (FIG. 2D), by the drone 10, while carrying the module 10-module, to a location at which the on-road vehicle 12 (FIG. 2D, FIG. 4A) is currently located or is expected to be located. In step 1003, upon arrival at said location, attaching (FIG. 2F) the module 1-module, by the drone 10, into a physical interface 12-int onboard the on-road vehicle 12, thereby rendering the on-road vehicle 12 capable of self driving. In one embodiment, the module 10-module is an integral part of the drone 10, in which said flying, by the drone 10, is an autonomous flight facilitated by the module. In one embodiment, the module 10-module is a detachable module (FIG. 3A); and upon said attachment (FIG. 2F) of the module 10-module to the on-road vehicle 12, the drone 10 is operative to fly away while leaving the module 10-module attached to the on-road vehicle 12 (FIG. 4B, FIG. 4C).

One embodiment is an on-road vehicle having a physical interface operative to dock a detachable self-driving module, comprising: a detachable self-driving module 10-module (FIG. 3A), in which the detachable self-driving module comprises: (i) a sensor suite (e.g., at least one of 4-cam, 4-lidar, and 5-GNSS, FIG. 1A) and a compute element 5-cpu (FIG. 2G) together operative to facilitate autonomous capabilities, and (ii) a first communication interface 5-comm (FIG. 2G); a main body structure on wheels 12 (FIG. 2D), in which the main body structure comprises: (i) a servo mechanism 12-steering-servo (FIG. 2G) operative to steer the main body structure 12 using at least some of the wheels 12-wheels (FIG. 2G), and (ii) a second communication interface 12-comm (FIG. 2G); and a physical interface 12-int (FIG. 2D) embedded in the main body structure 12 and operative to dock 10-12-dock (FIG. 2E) the detachable self-driving module 10-module, in which the physical interface 12-int is elevated 12-elevation (FIG. 2F) above the main body structure 12 so as to allow the docked detachable self-driving module 10-module (FIG. 2F) to detect 10-sense (FIG. 2F) road features and objects 2-object (FIG. 2F) on the road 1-road (FIG. 2F) from as close as 1 (*one*) meter from the main body structure 12 without the main body structure visually obscuring the road features and objects (i.e., a line-of-sight 10-LoS is facilitated toward road objects that are as close as one meter from the main body structure). In one embodiment, the on-road vehicle is configured to: dock 10-12-dock (FIG. 2E) the detachable self-driving module 10-module with the physical interface 12-int; maintain a communicative connection 10-12-comm between the detachable self-driving module 10-module now docked and the servo mechanism 12-steering-servo, in which said communicative connection is facilitated by said first 5-comm and second 12-comm communication interfaces; and use said communicative connection 10-12-comm to relay self driving commands 10-12-commands from the detachable self-driving module 10-module to the servo mechanism 12-steering-servo, thereby self driving the on-road vehicle.

In one embodiment, said docking of the detachable self-driving module 10-module with the physical interface 12-int comprises: flying 10-fly (FIG. 2D), by a drone 10 (FIG. 2D), while carrying the detachable self-driving module 10-module, to a location at which the main body structure on wheels 12 is currently located or is expected to be located; and upon arrival at said location, performing said docking 10-12-dock of the detachable self-driving module 10-module, by the drone 10, with the physical interface 12-int onboard the main body structure 12 (FIG. 2F). In one embodiment, said detachable self-driving module 10-module is a drone 10 (FIG. 3B), and said docking 10-12-dock of the detachable self-driving module 10-module with the physical interface 12-int comprises docking the drone with 10 the physical interface 12-int, in which such docking comprises: self flying 10-fly (FIG. 2D), by the drone 10 (FIG. 2D), using the sensor suite 4-cam and compute element 5-cpu in the drone 10, to a location at which the main body structure on wheels 12 is currently located or is expected to be located; and upon arrival at said location, autonomously landing (10-fly, FIG. 2D) the drone 10 on the physical interface 12-int onboard the main body structure 12 and fastening the drone 10-12-dock to the physical interface 12-int.

In one embodiment, the on-road vehicle further comprises a manual control element 12-manual (FIG. 5A) such as a steering wheel or handlebars, in which the manual control element enables a human driver 12-driver (FIG. 5C) to manually steer the on-road vehicle by manually controlling the servo mechanism 12-steering-servo when the detachable self-driving module 10-module is detached from the main body structure 12 (FIG. 5C). In one embodiment, the main body structure 12 comprises a pole 12-elevation (FIG. 2F), and the physical interface 12-int is embedded at a high end of the pole, thereby facilitating said elevation and said detection of road features and objects 2-object on the road 1-road from as close as 1 (*one*) meter from the main body structure 12 without the main body structure visually obscuring the road features and objects. In one embodiment, the main body structure 12 is characterized by being at least one of: (i) an electric hoverboard and (ii) an electric skateboard. In one embodiment, the main body structure 12 is characterized by weighting less than 250 (two hundred and fifty) kilograms, and by having a height of no more than 50 (fifty) centimeters excluding the pole 12-elevation, in which the physical interface 12-int is elevated at least 2 (two) meters above ground 1-road using the pole 12-elevation, thereby further facilitating said elevation and said detection of road features and objects 2-object on the road 1-road from as close as 1 (one) meter from the main body structure 12 without the main body structure visually obscuring the road features and objects. In one embodiment, the main body structure 12 is further characterized by having a wheel base of less than 1.5 (one point five) meter, thereby further facilitating said detection of road features and objects 2-object on the road 1-road from as close as 1 (*one*) meter from the main body structure 12 without the main body structure visually obscuring the road features and objects. In one embodiment, the main body structure 12 is operative to accommodate at least one of: (i) a standing passenger 12-passenger (FIG. 4C), and (ii) a package 12-cargo (FIG. 4B) to be delivered, in which the physical interface 12-int is elevated at least 20 (twenty) centimeters above the standing passenger 12-passenger having a height of no more than 2 (two) meters, thereby further facilitating said detection of road features and objects 2-object on the road 1-road from as close as 1 (*one*) meter from the main body structure 12 without the main body structure visually obscuring the road features and objects.

In one embodiment, the detachable self-driving module 10-module weights no more than 5 (five) kilograms, thereby facilitating at least one of: (i) lifting of the detachable self-driving module using a drone 10, and (ii) the detachable self-driving module 10-module being a drone 10. In one embodiment, the detachable self-driving module 10-module has a volume of no more than 5 (five) liters, thereby facilitating at least one of: (i) lifting of the detachable self-driving module 10-module using a drone 10, and (ii) the detachable self-driving module being a drone 10. In one embodiment, the detachable self-driving module 10-module has a length of no more than 1 (one) meter, thereby facilitating at least one of: (i) lifting of the detachable self-driving module 10-module using a drone 10, and (ii) the detachable self-driving module being a drone 10. In one embodiment, the main body structure 12 is characterized by being at least one of: (i) an electric hoverboard, (ii) an electric skateboard, (iii) an electric tricycle, (iv) an electric bicycle, (v) an electric quadricycle, (vi) a two, three, or four wheeled electric motorcycle, and (vii) an electric car.

Figure 7A:
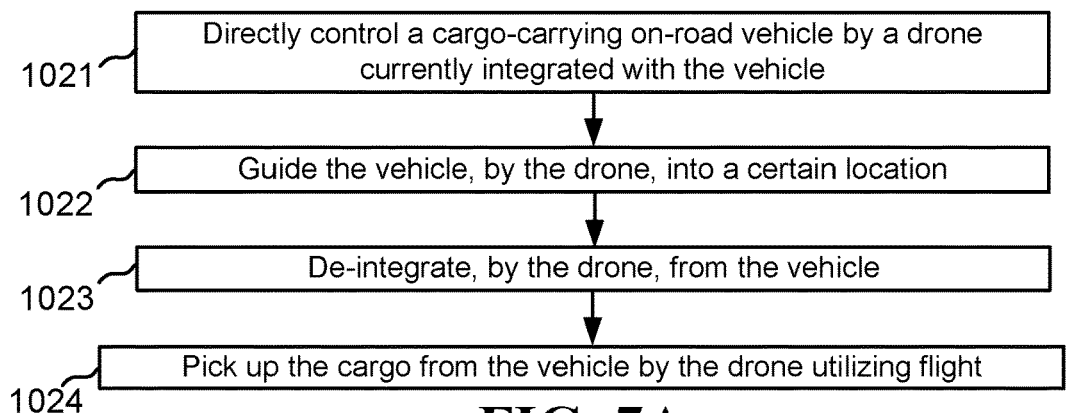
FIG. 7A illustrates one embodiment of a method for delivering a cargo.

FIG. 7A illustrates one embodiment of a method for delivering a cargo. The method includes: In step 1021, directly controlling, by a drone 10, an on-road vehicle 12 currently carrying a cargo 1-package, in which the drone is currently physically integrated with the on-road vehicle via an interface 12-int in the on-road vehicle (FIG. 2A). In step 1022, arriving autonomously 12-drive, of the on-road vehicle 12 together with the cargo 1-package, under said direct control, to a certain location 1-location (FIG. 2B) by utilizing energy stored in the on-road vehicle 12. In step 1023, de-integrating the drone 10 from the on-road vehicle 12 upon said arrival, in which said de-integration comprises the drone flying away 10-fly (FIG. 2B) from the interface 12-int toward a resting place of the cargo 1-package onboard the on-road vehicle 12. In step 1024, picking up the cargo 1-package by the drone 10 (FIG. 2B), and flying 10-fly (FIG. 2C) the cargo 1-package by the drone 10 away from the on-road vehicle 12 thereby facilitating delivery of the cargo.

In one embodiment, the method further comprises: flying back 10-fly (FIG. 2D), by the drone 10, toward the on-road vehicle 12 that has remained static while the drone was away flying the cargo and returning; re-integrating the drone 10 with the on-road vehicle 12 (FIG. 2F); directly controlling, by a drone 10, the on-road vehicle 12 currently without a cargo; and arriving autonomously, of the on-road vehicle 12, under said direct control, to another location facilitating reloading of a new cargo onboard the on-road vehicle 12. In one embodiment, said reloading is performed by the drone 10. In one embodiment, the drone 10 comprises a sensory suite (e.g., at least one of 4-cam, 4-lidar, and 5-GNSS, FIG. 1A) and a compute element 5-cpu (FIG. 2G) together rendering the drone capable of autonomous operations; said direct control and arrival is facilitated by said capability of the drone 10 during a time that the drone if physically integrated with the on-road vehicle 12; and said flying is facilitated by said capability of the drone 10 during a time that the drone is de-integrated with the on-road vehicle 12.

Figure 7B:
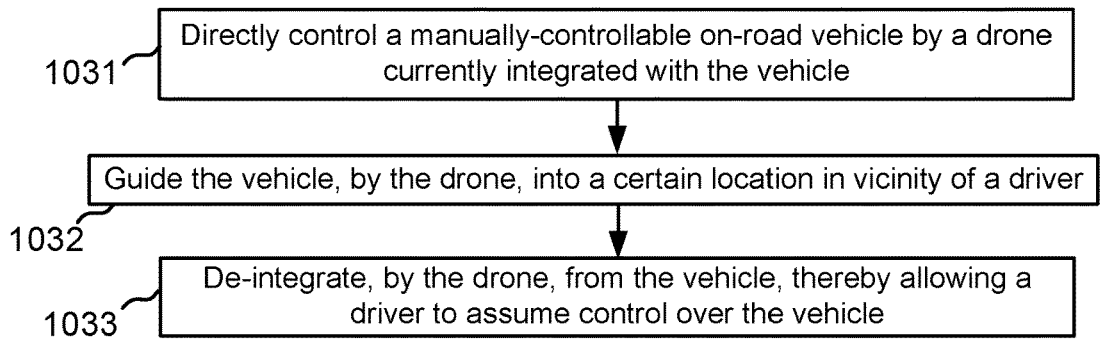
FIG. 7B illustrates one embodiment of a method for handing over an on-road vehicle to an awaiting driver.

FIG. 7B illustrates one embodiment of a method for handing over an on-road vehicle to an awaiting driver. The method includes: In step 1031, directly controlling, by a drone 10, an on-road vehicle 12 having a manual control interface 12-manual (FIG. 5A), in which the drone is currently physically integrated with the on-road vehicle via an interface 12-int in the on-road vehicle. In step 1032, arriving autonomously 12-arrive (FIG. 5A), of the on-road vehicle 12, under said direct control and by utilizing energy stored in the on-road vehicle, to a certain location in a vicinity of an awaiting or soon-to-be-present driver. In step 1033, de-integrating the drone 10 from the on-road vehicle 12 upon said arrival, in which said de-integration comprises the drone flying away 10-fly (FIG. 5B) from the interface 12-int, thereby allowing the driver 12-driver (FIG. 5C) to enter the on-road vehicle 12 and assume manual control of the on-road vehicle via the manual control interface 12-manual. In one embodiment, the drone 10 comprises a sensory suite (e.g., at least one of 4-cam, 4-lidar, and 5-GNSS, FIG. 1A) and a compute element 5-cpu (FIG. 2G) together rendering the drone capable of autonomous operations; said direct control and arrival is facilitated by said capability of the drone 10 during a time that the drone if physically integrated with the on-road vehicle 12; and said flying is facilitated by said capability of the drone 10 during a time that the drone is de-integrated with the on-road vehicle 12.

Figure 7C:
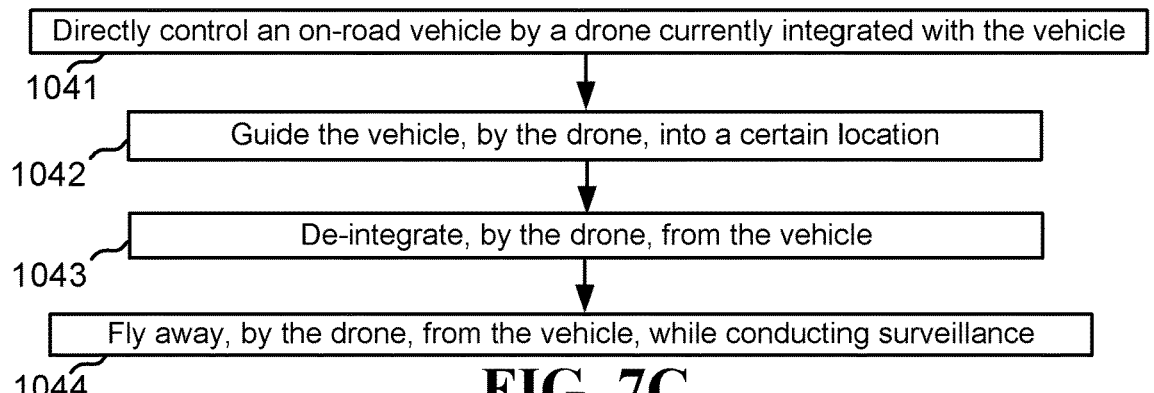
FIG. 7C illustrates one embodiment of a method for surveying areas.

FIG. 7C illustrates one embodiment of a method for surveying areas. The method includes: In step 1041, directly controlling, by a drone 10, an on-road vehicle 12, in which the drone is currently physically integrated 10-12 (FIG. 2F) with the on-road vehicle via an interface 12-int in the on-road vehicle. In step 1042, arriving autonomously, of the on-road vehicle 12, under said direct control and by utilizing energy stored in the on-road vehicle, to a certain location. In step 1043, de-integrating the drone 10 from the on-road vehicle 12 upon said arrival, in which said de-integration comprises the drone flying away from the interface 12-int. In step 1044, continuing flying, by the drone 10, along a path 10-path-1 (FIG. 1C) operative to allow the drone to conduct surveillance. In one embodiment, the drone 10 comprises a sensory suite (e.g., at least one of 4-cam, 4-lidar, and 5-GNSS, FIG. 1A) and a compute element 5-cpu (FIG. 2G) together rendering the drone capable of autonomous operations; said direct control and arrival is facilitated by said capability of the drone 10 during a time that the drone if physically integrated with the on-road vehicle 12; and said flying and continuing flying is facilitated by said capability of the drone 10 during a time that the drone is de-integrated with the on-road vehicle 12. In one embodiment, said conducting of surveillance is facilitated by the same sensory suite (e.g., at least one of 4-cam, 4-lidar, and 5-GNSS, FIG. 1A) and a compute element 5-cpu (FIG. 2G).

Figure 7D:
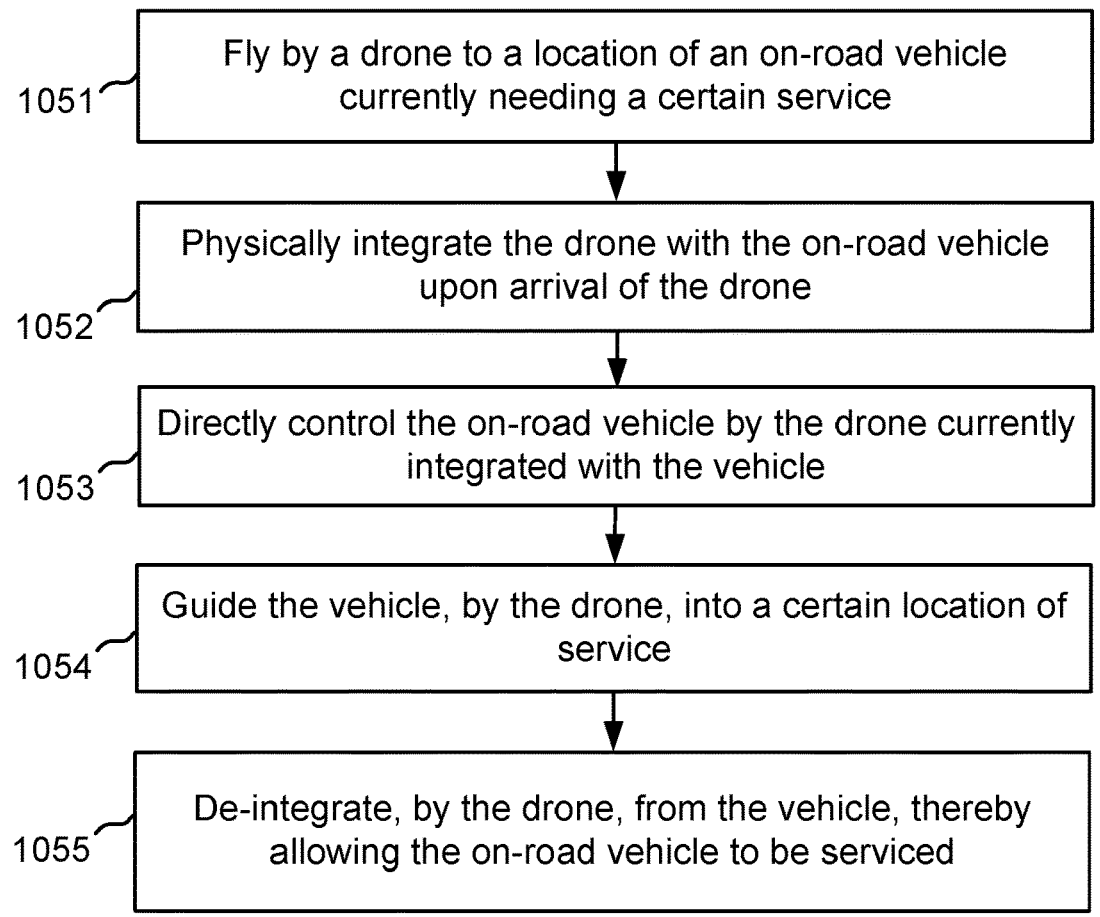
FIG. 7D illustrates one embodiment of a method for bringing in an on-road vehicle for charging and/or changing batteries.

FIG. 7D illustrates one embodiment of a method for bringing in an on-road vehicle for charging and/or changing batteries, the method includes: In step 1051, flying autonomously, by a drone 10, to a location at which an on-road vehicle 12 is located or is about to be located, in which the on-road vehicle comprises a battery 12-battery (FIG. 2G) that is due for charging or replacement with a fresh battery. In step 1052, physically integrating 10-12 the drone 10 with the on-road vehicle 12 via an interface 12-int in the on-road vehicle upon arrival to said location (FIG. 2F). In step 1053, directly controlling, by a drone 10, the on-road vehicle 12 now integrated with the drone. In step 1054, arriving autonomously, of the on-road vehicle 12, under said direct control and by utilizing energy still remaining in the battery 12-battery onboard the on-road vehicle, to a certain location of service. In step 1055, de-integrating the drone 10 from the on-road vehicle 12 upon said arrival, in which said de-integration comprises the drone flying away from the interface 12-int, thereby allowing the on-road vehicle to be services by charging or replacing the battery. In one embodiment, the drone 10 comprises a sensory suite (e.g., at least one of 4-cam, 4-lidar, and 5-GNSS, FIG. 1A) and a compute element 5-cpu (FIG. 2G) together rendering the drone capable of autonomous operations; said direct control and arrival is facilitated by said capability of the drone 10 during a time that the drone is physically integrated with the on-road vehicle 12; and said flying is facilitated by said capability of the drone 10 during a time that the drone is de-integrated with the on-road vehicle 12.

Figures 8A, 8B:
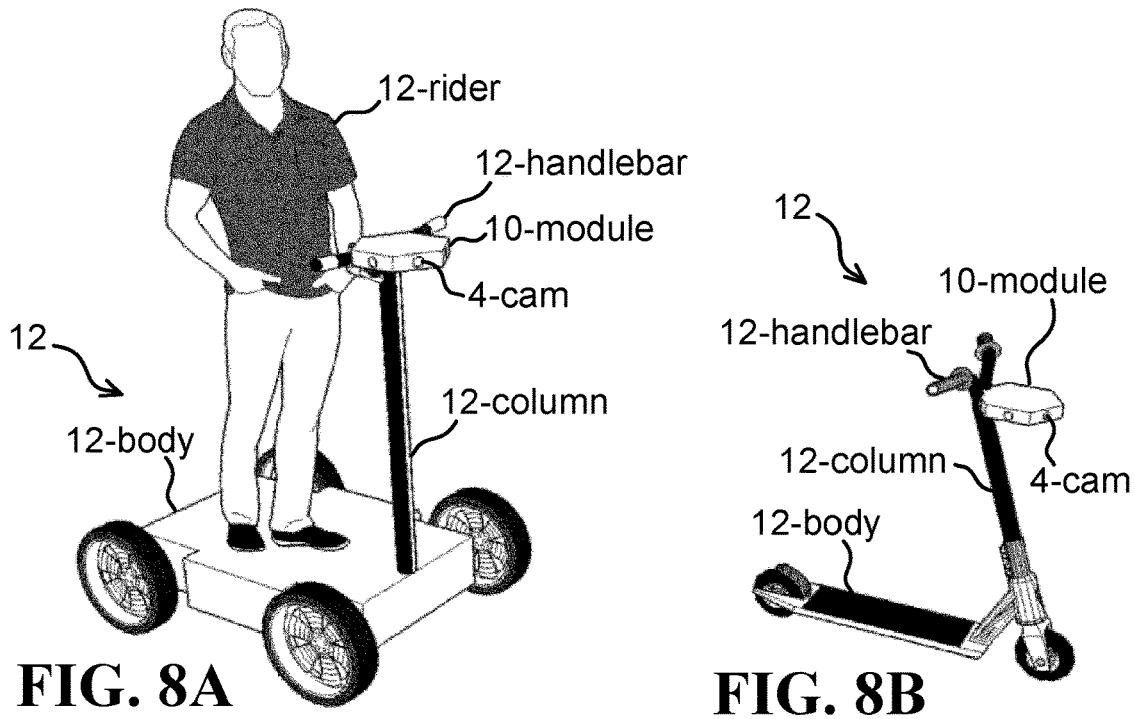
FIG. 8A illustrates one embodiment of a scooter including an autonomy module.
FIG. 8B illustrates another embodiment of a scooter including an autonomy module.

FIG. 8A illustrates one embodiment of a scooter 12 including an autonomy module 10-module operative to render the scooter capable of autonomously or non-autonomously surveying geographical areas.

FIG. 8B illustrates another embodiment of a scooter 12 including an autonomy module 10-module operative to render the scooter capable of surveying geographical areas.

One embodiment is a system operative to utilize a plurality of scooters to survey a certain geographical area, comprising: a plurality of scooters 12 (FIG. 8A, FIG. 8B), in which each of the scooters 12 comprises: (i) a main body structure 12-body on wheels, and (ii) a handlebar 12-handlebar elevated above the main body structure 12-body in conjunction with a steering column 12-column, in which the handlebar and the steering column are operative to facilitate manual steering of the scooter by a rider 12-rider; a plurality of storage elements 5-store (FIG. 1E) onboard the plurality of scooters 12 respectively; and a plurality of autonomy modules 10-module (FIG. 8A, FIG. 8B) mounted respectively on the plurality of scooters 12, in which each of the autonomy modules 10-module is attached, directly or indirectly, to one or both of the respective handlebar 12-handlebar and steering column 12-column of the respective scooter 12, and is therefore also elevated above the main body structure 12-body, and in which each of the autonomy modules 10-module comprises a sensor suite (e.g., a set of cameras 4-cam and/or a lidar 4-lidar) operative to sense environment 20-area (FIG. 1C) surrounding the respective scooter 12, in which said sensing is facilitated by said elevation of the respective autonomy module 10-module. In one embodiment, the system is configured to: match between a plurality of riders 12-rider and at least some of the plurality of scooters 12, thereby increasing utilization of the scooters during a certain period of time, and thereby traversing, together by the plurality of scooters 12, at least a first aggregated length of roads 1-road (FIG. 1M) during that certain period of time; and per each of the autonomy modules 10-module that is mounted on one of the scooters 12 currently driven by one of the riders 12-rider during said certain period of time: use the respective sensor suite 4-cam to collect imagery data 4-visual (FIG. 1E, FIG. 1G, FIG. 1H, FIG. 1I) of the environment surrounding the respective scooter 12 now traversing a respective portion of said length of roads, and send the imagery data 4-visual for recording in the respective storage elements 5-store, thereby capturing, during said at least certain period of time, imagery data 4-visual associated with the at least first aggregated length of roads and thereby surveying a certain geographical area 1-GEO-AREA (FIG. 1D). In one embodiment, per each 100 (one hundred) of the scooters 12 currently matched with riders 12-rider and currently on the move, the first aggregated length of roads 1-road traversed during the certain period of time is equal to at least the product V*dT*100, in which V is the average speed of the scooters 12 while being driven by the riders, and dT (delta T) is the certain period of time, and therefore the respective imagery data 4-visual captured during the certain period of time is associated with a section of roads 1-road having a length of at least the product V*dT*100. In one embodiment, the certain period of time (dT) is 60 (sixty) seconds; the average speed of the scooters (V) while being driven by the riders is at least 3 (three) meters-per-second; and therefore the first aggregated length of roads traversed during the certain period of time is equal to at least 3*60*100=18,000 (eighteen thousand) meters, and consequently the respective imagery data 4-visual captured during the certain period of time is associated with sections of roads 1-road having an aggregated length of at least 18,000 (eighteen thousand) meters. In one embodiment, per each of said 100 (one hundred) of the scooters 12 currently matched with riders 12-rider and currently on the move, there are no more than 100 (one hundred) of the scooters 12 that are currently parked and waiting for riders, and therefore a minimum of only 100+100=200 (two hundred) of the scooters are needed to survey at least 18,000 (eighteen thousand) meters of roads in 60 (sixty) seconds, in which said minimum is facilitated by said increasing utilization during a certain part of a day. In one embodiment, per each of said 100 (one hundred) of the scooters 12 currently matched with riders 12-rider and currently on the move, there are no more than 200 (two hundred) of the scooters 12 that are currently parked and waiting for riders, and therefore a minimum of only 100+200=300 (three hundred) of the scooters are needed to survey at least 18,000 (eighteen thousand) meters of roads in 60 (sixty) seconds, in which said minimum is facilitated by said increasing utilization during a certain part of a day. In one embodiment, per each of said 100 (one hundred) of the scooters 12 currently matched with riders 12-rider and currently on the move, there are no more than 300 (three hundred) of the scooters 12 that are currently parked and waiting for riders, and therefore a minimum of only 100+300=400 (four hundred) of the scooters are needed to survey at least 18,000 (eighteen thousand) meters of roads in 60 (sixty) seconds, in which said minimum is facilitated by said increasing utilization during a certain part of a day. In one embodiment, per each of said 100 (one hundred) of the scooters 12 currently matched with riders 12-rider and currently on the move, there are no more than 400 (four hundred) of the scooters 12 that are currently parked and waiting for riders, and therefore a minimum of only 100+400=500 (five hundred) of the scooters are needed to survey at least 18,000 (eighteen thousand) meters of roads in 60 (sixty) seconds, in which said minimum is facilitated by said increasing utilization during a certain part of a day.

In one embodiment, the autonomy module 10-module further comprises a compute element 5-cpu (FIG. 2G) operative to analyze sensory input from the sensor suite 4-cam and issue accordingly direct actuation commands 10-12-commands (FIG. 2G) to the respective main body structure 12-body, thereby rendering the respective scooter 12 autonomous; and the autonomy module 10-module autonomously drives the scooter 12 to a location of a rider 12-rider, thereby facilitating said matching. In one embodiment, said matching between the plurality of riders 12-riders and at least some of the plurality of scooters 12 is done in conjunction with a scooter rental service, thereby facilitating said increased utilization. In one embodiment, each of the scooters 12 further comprises a global navigation satellite system (GNSS) receiver 5-GNSS (FIG. 1A) operative to determine a geo-location 10-loc (FIG. 1D) of the respective scooter 12; and the imagery data captured 4-visual comprises visual records 4-visual-a1, 4-visual-a2, 4-visual-a3, 4-visual-b1, 4-visual-c9, 4-visual-d2, 4-visual-e2, 4-visual-f1 (FIG. 1E) that are linked with geo-locations 10-loc (FIG. 1E) determined by the respective scooter 12 at the time of making the respective capture and recording, in which the geo-locations are then used to access the visual records 4-visual according to specific geo-locations inquired. In one embodiment, at least some of the visual records 4-visual are offloaded, wirelessly or otherwise, from the scooter 12 to a central location for processing. In one embodiment, the visual records 4-visual are offloaded wirelessly using a communication interface 5-comm (FIG. 2G) onboard the scooter 12. In one embodiment, the visual records 4-visual are offloaded physically by removing and/or replacing the storage elements 5-store (FIG. 1P). In one embodiment, the GNSS receiver 5-GNSS and the storage element 5-store are located in the autonomy module 10-module. In one embodiment, the autonomy module 10-module is a detachable module operative to be docked, directly or indirectly, in conjunction with one or both of the respective handlebar 12-handlebar and steering column 12-column of the respective scooter 12.

Figure 9A:
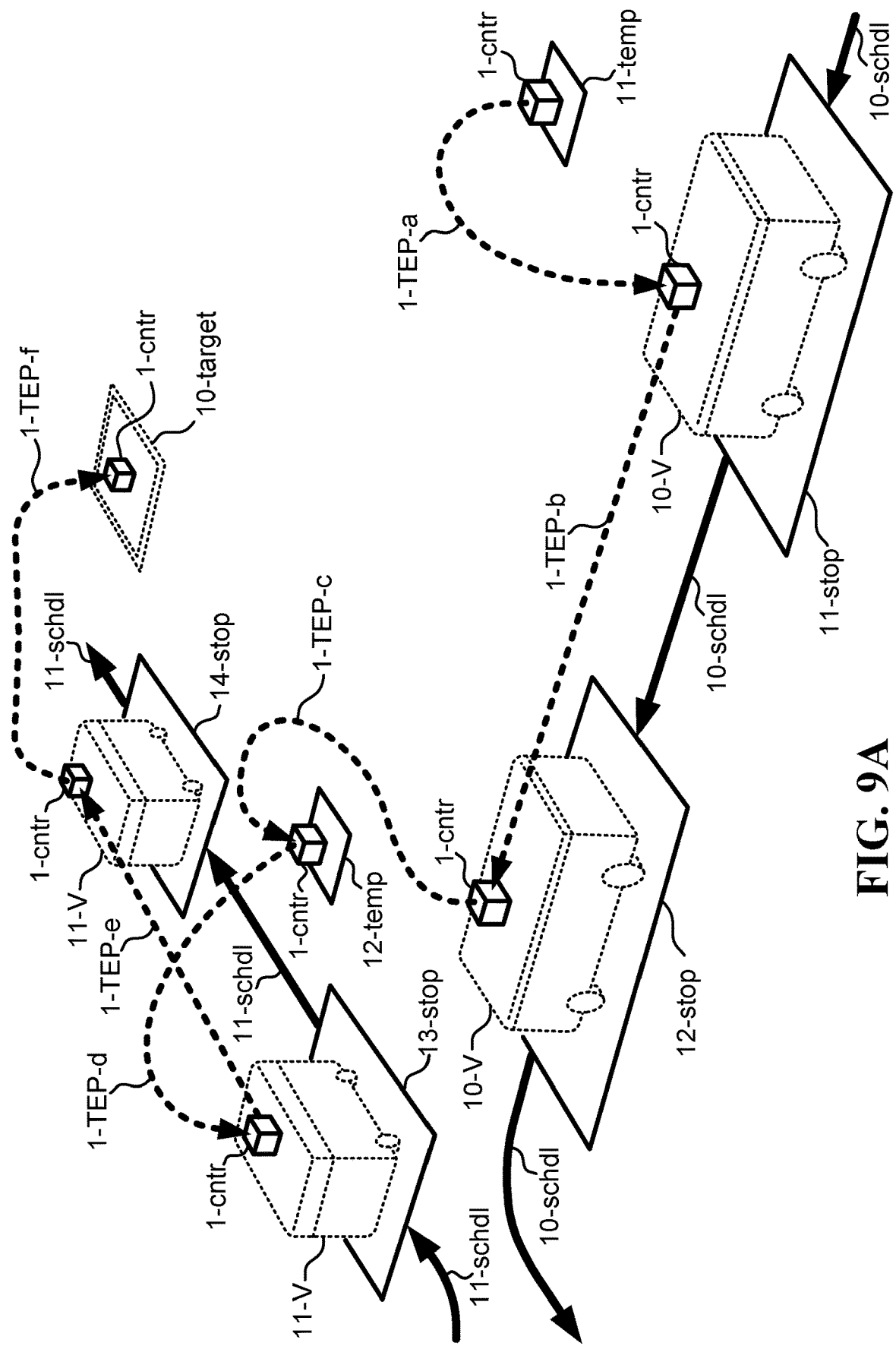
FIG. 9A illustrates one embodiment of a container being transported according to a transport and exchange plan and by utilizing an exchange network operative to transport cargo between different locations.
Figure 9B:
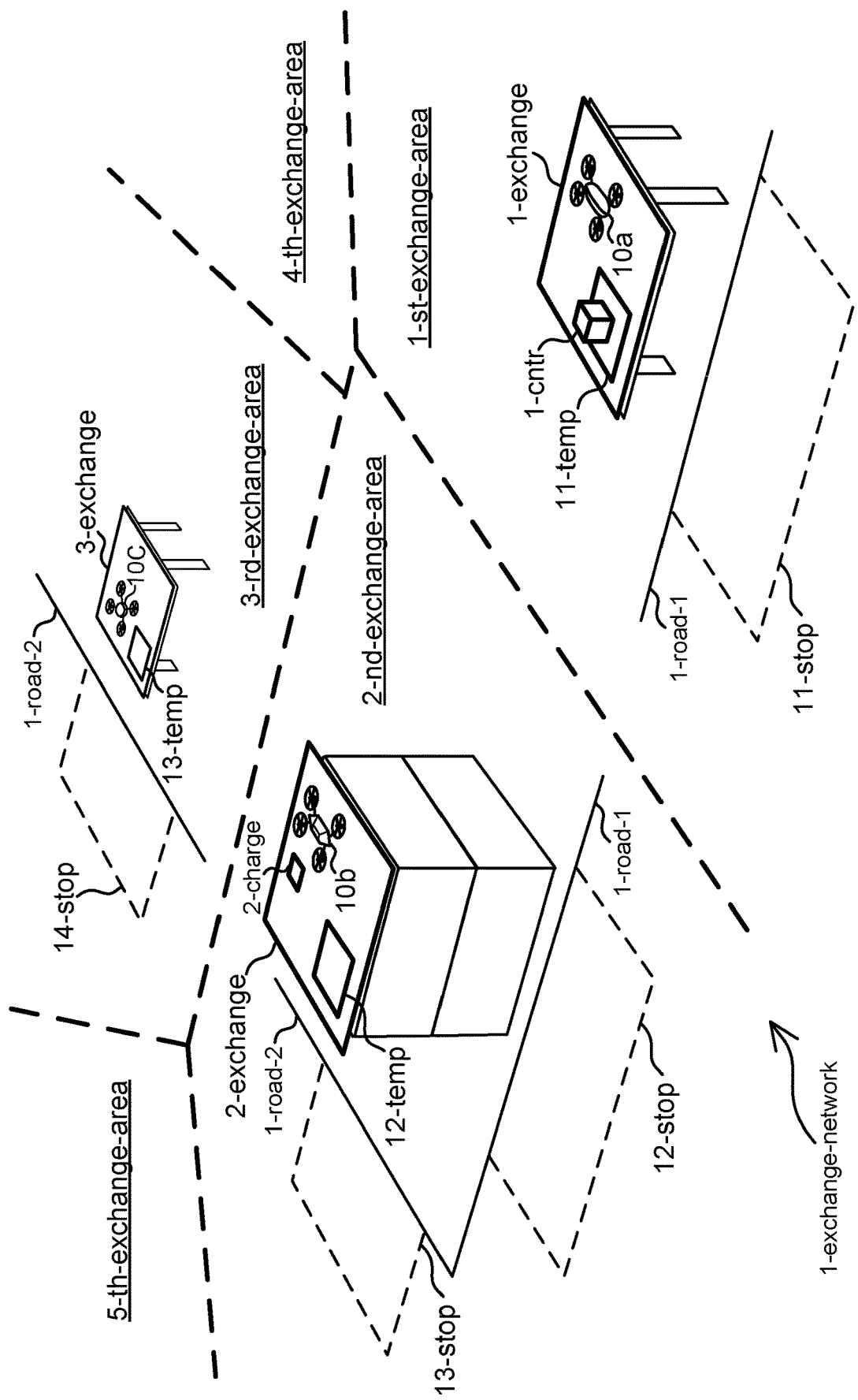
FIG. 9B illustrates one embodiment of an exchange network operative to transport cargo between different locations and comprising a plurality of exchange stations.

FIG. 9A illustrates one embodiment of a container 1-cntr being transported according to a transport and exchange plan 1-TEP and by utilizing an exchange network 1-exchange-network (FIG. 9B) operative to transport cargo between different locations. In one embodiment, a planning agent associated with the exchange network 1-exchange-network, such as 5-P (FIG. 1A), receives or generates a request to transport a container 1-cntr from a first temporary storage location 11-temp to a certain destination location 10-target that may be a temporary storage location by itself, or a delivery location for the container 1-cntr. The planning agent 5-P then puts together a transport and exchange plan 1-TEP designed to utilize a plurality of vehicles 10-V, 11-V as a part of a transport chain operative to facilitate delivery of the container 1-cntr from the first temporary storage location 11-temp to the destination location 10-target. In one embodiment, each of the vehicles 10-V, 11-V is a part of a scheduled service, such as a bus service or a dedicated on-road transport service, in which, for example, vehicle 10-V is servicing, according to a certain schedule 10-schdl, a first route that includes a first plurality of roads 1-road-1 (FIG. 9B), and vehicle 11-V is servicing, according to another schedule 11-schdl, a second route that includes a second plurality of roads 1-road-2 (FIG. 9B). The planning agent 5-P may conclude that a combination of the first and second routes is required for getting the container 1-cntr from the first temporary storage location 11-temp to the destination location 10-target, and therefore, both routes and associated vehicles 10-V, 11-V are included in the plan 1-TEP. The planning agent 5-P may then identify, as part of the plan 1-TEP, exchange areas 1-st-exchange-area, 2-nd-exchange-area, 3-rd-exchange-area, (FIG. 9B) covering the first route and the second route. The first exchange area 1-st-exchange-area is identified so as to cover both the first temporary storage location 11-temp of the container 1-cntr and a first designated stopping area 11-stop (e.g., a first bus stop) associated with the first route. The second exchange area 2-nd-exchange-area is identified so as to cover both a second designated stopping area 12-stop (e.g., a second bus stop) associated with the first route, and a designated stopping area 13-stop (e.g., a bus stop) associated with the second route. The third exchange area 3-rd-exchange-area is identified so as to cover a designated stopping area 14-stop (e.g., a bus stop) that is both associated with the second route and that is located in close proximity to the destination location 10-target. The plan 1-TEP is now complete, and supports the following transport and exchange scenario: in step one of the plan 1-TEP-a, a first drone 10a (FIG. 9B) associated with the first exchange area 1-st-exchange-area is to carry the container 1-cntr from the temporary storage 11-temp, located in the first exchange area, into placement onboard vehicle 10-V that is scheduled 10-schdl to arrive and stop at the first designated stopping area 11-stop of the first route, which is also located in the first exchange area. In step two of the plan 1-TEP-b, the vehicle 10-V is to transport the container 1-cntr, along the first route, to the second designated stopping area 12-stop of the first route, that is located in the second exchange area 2-nd-exchange-area, thereby crossing with the container 1-cntr between the first and second exchange areas. In step three of the plan 1-TEP-c, upon arrival of the container 1-cntr, onboard vehicle 10-V and according to the schedule 10-schdl, to the second designated stopping area 12-stop, a second drone 10b (FIG. 9B) associated with the second exchange area 2-nd-exchange-area is to offload the container 1-cntr from the vehicle 10-V into temporary storage 12-temp located in the second exchange area. In step four of the plan 1-TEP-d, the second drone 10b, or another drone associated with the second exchange area 2-nd-exchange-area, is to carry the container 1-cntr from temporary storage 12-temp, located in the second exchange area, into placement onboard vehicle 11-V that is scheduled 11-schdl to arrive and stop at the first designated stopping area 13-stop of the second route, which is also located in the second exchange area. In step five of the plan 1-TEP-e, the vehicle 11-V is to transport the container 1-cntr, along the second route, to the second designated stopping area 14-stop of the second route, that is located in the third exchange area 3-rd-exchange-area, thereby crossing with the container 1-cntr between the second and third exchange areas. In step six of the plan 1-TEP-f, upon arrival of the container 1-cntr, onboard vehicle 11-V and according to the schedule 11-schdl, to the second designated stopping area 14-stop of the second route, a third drone 10c (FIG. 9B) associated with the third exchange area 3-rd-exchange-area is to offload the container 1-cntr from the vehicle 11-V and deliver the container 1-cntr to the destination location 10-target, thus concluding the delivery mission according to the transport and exchange plan 1-TEP, and utilizing at least three different drones 10a, 10b, 10c and two different vehicles 10-V, 11-V.

FIG. 9B illustrates one embodiment of an exchange network 1-exchange-network operative to transport cargo, such as container 1-cntr, between different locations and comprising a plurality of exchange stations 1-exchange, 2-exchange, 3-exchange. In one embodiment, each of the exchange stations includes at least one associated flying drone operative to service an exchange area under supervision of the exchange station, in which the exchange area includes at least one designated stopping area associated with the exchange station. In one embodiment, the first exchange area 1-st-exchange-area, including designated stopping area 11-stop, is serviced by exchange station 1-exchange, which includes a dedicated drone 10*a* and a temporary storage area 11-temp. The second exchange area 2-nd-exchange-area, including designated stopping areas 12-stop, 13-stop, is serviced by exchange station 2-exchange, which includes a dedicated drone 10*b* and a temporary storage area 12-temp, in which a charging station 2-charge is operative to charge the drone 10*b*. The third exchange area 3-rd-exchange-area, including designated stopping area 14-stop, is serviced by exchange station 3-exchange, which includes a dedicated drone 10*c* and a temporary storage area 13-temp. Other exchange areas are also shown 4-th-exchange-area, 5-th-exchange-area. Each of the exchange areas, using the respective drone (or several associated drones), functions as a "regional crane" for loading and unloading cargo in conjunction with vehicles arriving and stopping at designated stopping areas in the exchange area. Each of the drones 10*a*, 10*b*, 10*c* functions as a "flying crane" while serving the respective exchange area in accordance with some embodiments. It is noted that a temporary storage area, such as 12-temp, may be co-located in a single structure together with other facilities of the respective exchange station, or it may be located at another location in the exchange area, and in that case the respective exchange station is a distributed one.

Figure 9C:
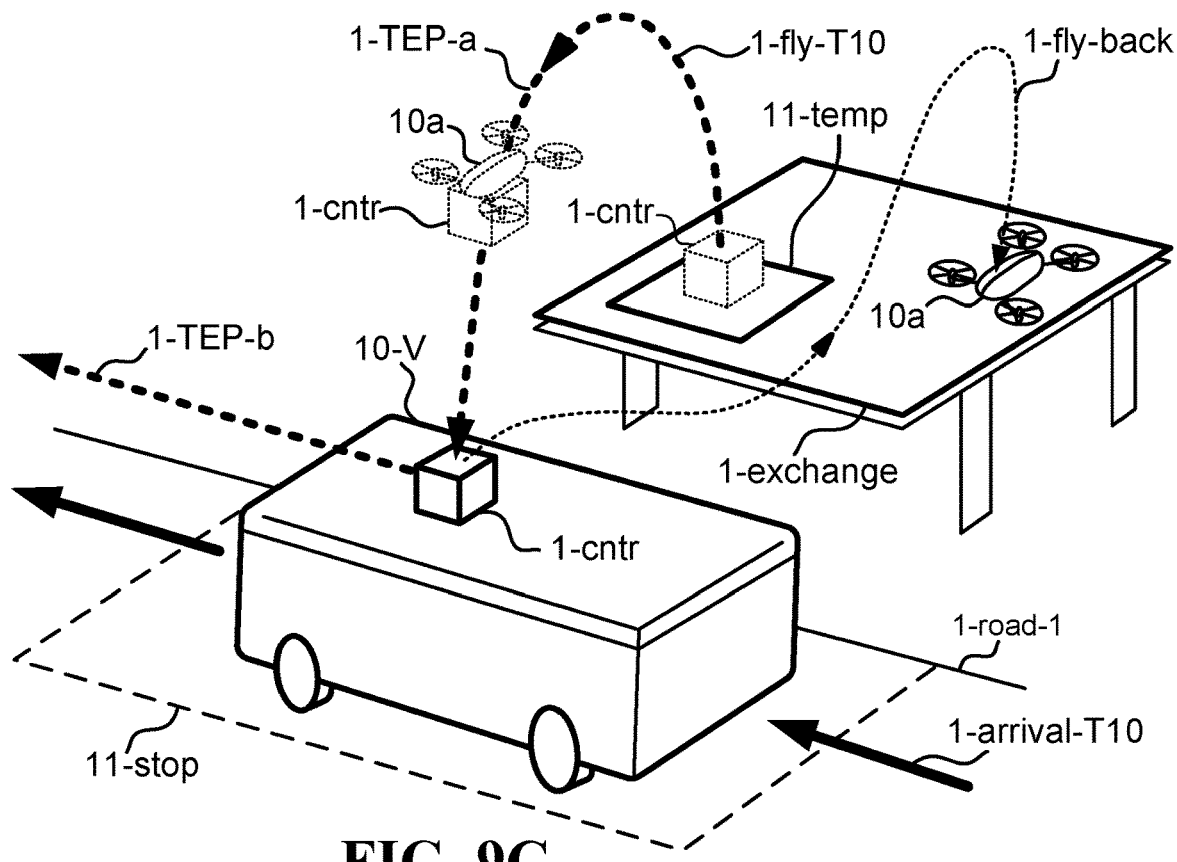
FIG. 9C illustrates one embodiment of a first exchange station comprising a drone operative to pick up a container from a temporary storage space and load the container into a certain on-road vehicle that has come to a complete stop at a designated stopping area of the first exchange station.

FIG. 9C illustrates one embodiment of a first exchange station 1-exchange comprising a drone 10*a* operative to pick up a container 1-cntr from a temporary storage space and load the container into a certain on-road vehicle 10-V that has come to a complete stop at a designated stopping area of the first exchange station. In one embodiment, vehicle V-10 arrives 1-arrival-T10 at a designated stopping area 11-stop of a first exchange station 1-exchange, and is to be loaded with a container 1-cntr according to a transport and exchange plan 1-TEP-a. A drone 10*a* associated with the first exchange station 1-exchange executes the first step in the transport and exchange plan 1-TEP-a by picking up the container 1-cntr from temporary storage 11-temp and flying 1-fly-T10 with the container toward the vehicle 10-V in order to place the container 1-cntr onboard the vehicle 10-V when the vehicle comes to a complete stop at the designated stopping area 11-stop. The vehicle 10-V then leaves the designated stopping area 11-stop with the container 1-cntr onboard, while the drone 10*a* returns 1-fly-back to the first exchange station 1-exchange to be ready to perform other tasks associated with the first exchange station. It is noted that the temporary storage space 11-temp is illustrated as being located with the drone 10*a* in conjunction with a single structure 1-exchange, however, the drone may take off and land in conjunction with a different structure or location associated with the first exchange station, and the temporary storage space 11-temp may be located in still a different structure or location associated with the first exchange station.

Figure 9D:
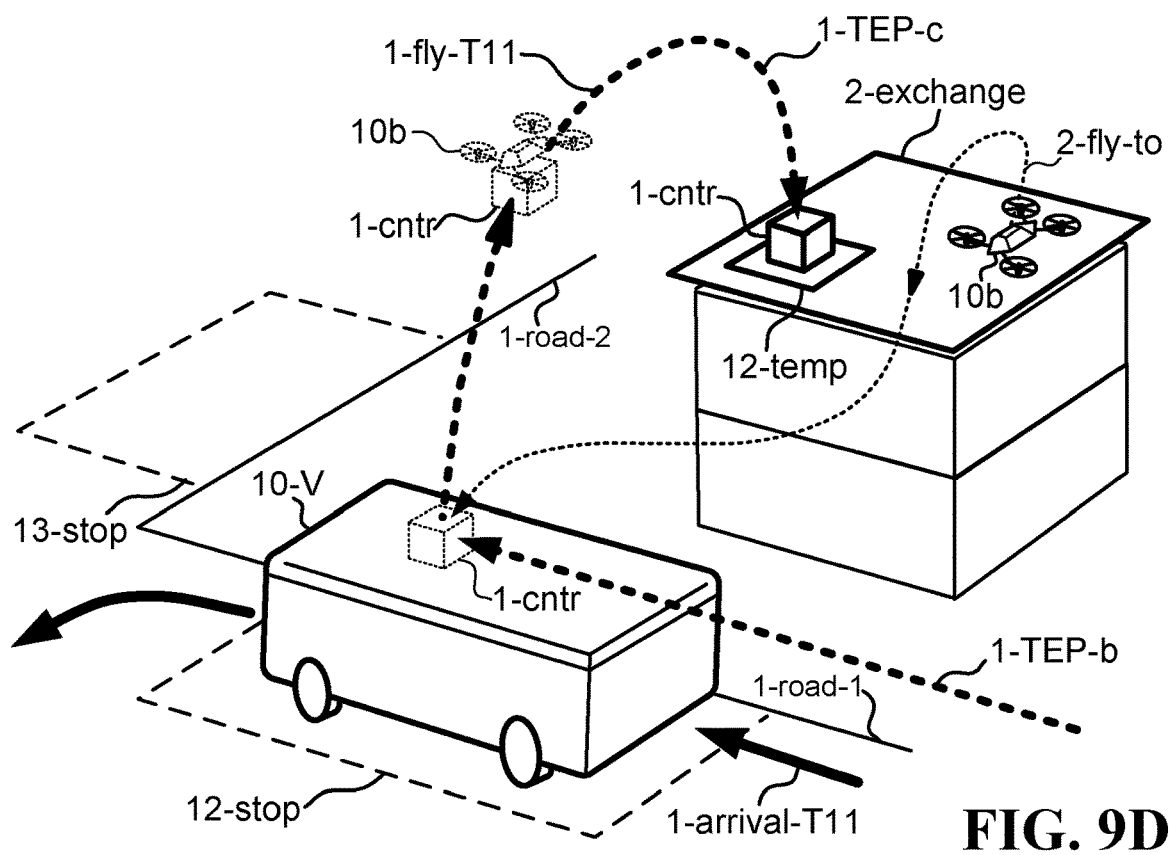
FIG. 9D illustrates one embodiment of a second exchange station comprising a second drone operative to pick up the container from the certain on-road vehicle that has come to a complete stop at a designated stopping area of the second exchange station and place the container into temporary storage at the second exchange station.

FIG. 9D illustrates one embodiment of a second exchange station 2-exchange comprising a second drone 10*b* operative to pick up the container 1-cntr from the certain on-road vehicle 10-V that has come to a complete stop at a designated stopping area of the second exchange station and place the container into temporary storage at the second exchange station. In one embodiment, vehicle 10-V, after being previously loaded with container 1-cntr, now arrives 1-arrival-T11 at a designated stopping area 12-stop of a second exchange station 2-exchange with the container 1-cntr onboard and according to the transport and exchange plan 1-TEP-b. A drone 10*b* associated with the second exchange station 2-exchange executes the next step in the transport and exchange plan 1-TEP-c by flying 2-fly-to toward the vehicle 10-V, picking up the container 1-cntr from the vehicle 10-V when the vehicle comes to a complete stop at the designated stopping area 12-stop, and flying 1-fly-T11 back to the second exchange station 2-exchange with the container 1-cntr in order to placed the container in temporary storage 12-temp. The vehicle 10-V leaves the designated stopping area 12-stop and continues on its way. It is noted that a transport procedure has been accomplished by completing the three consecutive steps 1-TEP-a (FIG. 9C), 1-TEP-b (FIG. 9C, FIG. 9D), 1-TEP-c (FIG. 9D), in which during the transport procedure, which involves the three parties 1-exchange, 10-V, 2-exchange, the container 1-cntr has been successfully exchanged between the exchange stations 1-exchange and 2-exchange.

Figure 9E:
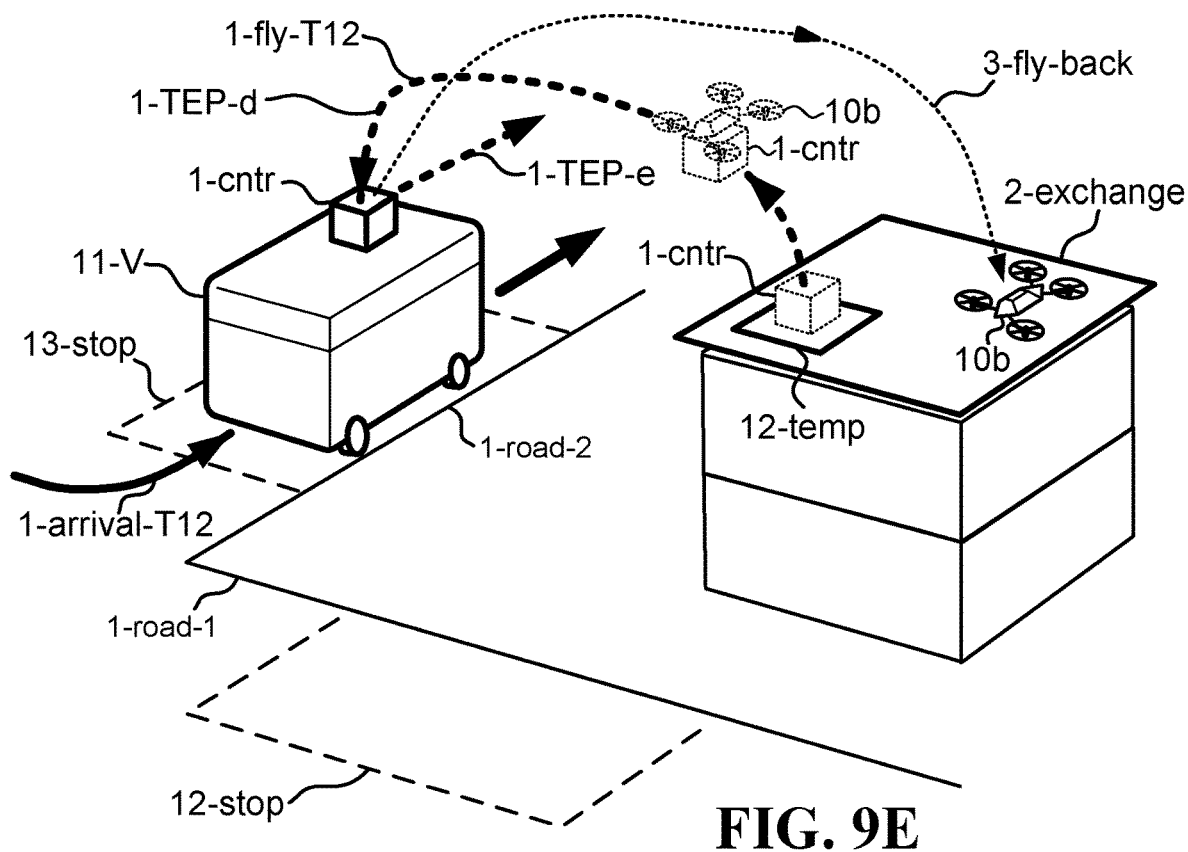
FIG. 9E illustrates one embodiment in which the drone of the second exchange station is further operative to pick up the container from the temporary storage space of the second exchange station and load the container into a second on-road vehicle that has come to a complete stop at a designated stopping area of the second exchange station.

FIG. 9E illustrates one embodiment in which the drone 10*b* of the second exchange station 2-exchange is further operative to pick up the container 1-cntr from the temporary storage space of the second exchange station and load the container into a second on-road 11-V vehicle that has come to a complete stop at a designated stopping area of the second exchange station. In one embodiment, a second vehicle V-11 arrives 1-arrival-T12 at a designated stopping area 13-stop of the second exchange station 2-exchange, and is to be loaded with the container 1-cntr according to the next step of the transport and exchange plan 1-TEP-d. The drone 10*b* associated with the second exchange station 2-exchange (or another drone associated therewith) executes said next step of the transport and exchange plan 1-TEP-d by picking up the container 1-cntr from temporary storage 12-temp and flying 1-fly-T12 with the container toward the vehicle 11-V in order to place the container 1-cntr onboard the vehicle 11-V when the vehicle comes to a complete stop at the designated stopping area 13-stop. The vehicle 11-V then leaves the designated stopping area 13-stop with the container 1-cntr onboard, while the drone 10*b* returns 3-fly-back to the second exchange station 2-exchange to be ready to perform other tasks associated with the second exchange station. It is noted that a tripartite exchange procedure has been accomplished by completing the two consecutive steps 1-TEP-c (FIG. 9D), 1-TEP-d (FIG. 9E), in which during the tripartite exchange procedure, which involves the three parties 10-V, 2-exchange, 11-V, the container 1-cntr has been successfully exchanged between vehicle 10-V and vehicle 11-V.

Figure 9F:
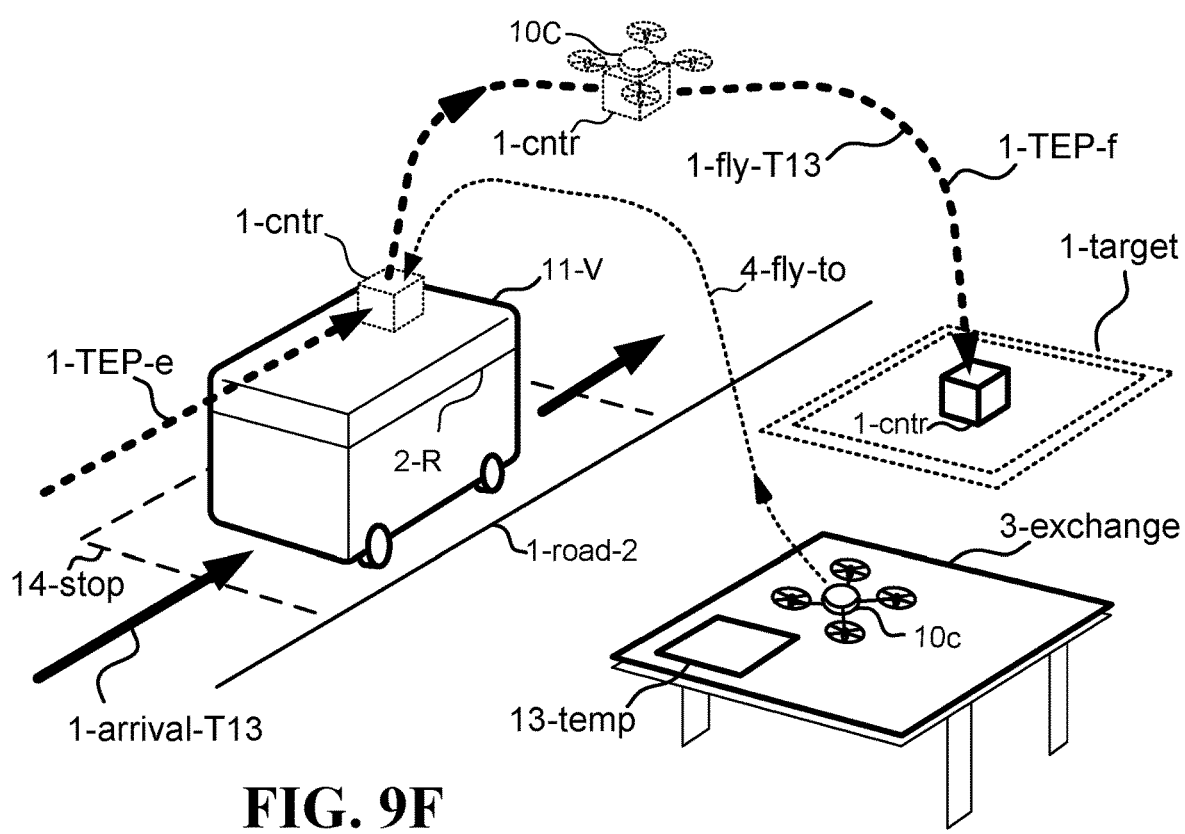
FIG. 9F illustrates one embodiment of a third exchange station comprising a third drone operative to pick up the container from the second on-road vehicle that has come to a complete stop at a designated stopping area of the third exchange station and deliver the container to a target location.

FIG. 9F illustrates one embodiment of a third exchange station 3-exchange comprising a third drone 10*c* operative to pick up the container 1-cntr from the second on-road vehicle 11-V that has come to a complete stop at a designated stopping area of the third exchange station and deliver the container to a target location. In one embodiment, vehicle 11-V, after being previously loaded with container 1-cntr, now arrives 1-arrival-T13 at a designated stopping area 14-stop of a third exchange station 3-exchange with the container 1-cntr onboard and according to the transport and exchange plan 1-TEP-e. A drone 10*c* associated with the third exchange station 3-exchange executes the final step in the transport and exchange plan 1-TEP-f by flying 4-fly-to toward the vehicle 11-V, picking up the container 1-cntr from the vehicle 11-V when the vehicle comes to a complete stop at the designated stopping area 14-stop, and delivering 1-fly-T13 the container 1-cntr to the target location 1-target. The vehicle 11-V leaves the designated stopping area 14-stop and continues on its way.

One embodiment is a system constituting an exchange network operative to transport cargo between different locations, comprising: an exchange network 1-exchange-network (FIG. 9B) comprising a plurality of exchange stations 1-exchange, 2-exchange, 3-exchange (FIG. 9B) situated respectively at a plurality of different locations 1-st-exchange-area, 2-nd-exchange-area, 3-rd-exchange-area, in which each of the exchange stations comprises: (i) at least one respective drone (e.g., drone 10a associated with exchange station 1-exchange, 10b associated with 2-exchange, and 10c associated with 3-exchange) and (ii) a respective temporary storage space (e.g., temporary storage space 11-temp associated with 1-exchange, 12-temp associated with 2-exchange, and 13-temp associated with 3-exchange), and in which each of the exchange stations is associated with, and is located in a certain proximity to, at least one respective designated on-road stopping area (e.g., on-road stopping area 11-stop associated with 1-exchange, 12-stop and 13-stop associated with 2-exchange, and 14-stop associated with 3-exchange).

In one embodiment, each of the exchange stations (e.g., 2-exchange in FIG. 9D) is configured to initiate and conclude an exchange procedure in conjunction with each of a plurality of containers (e.g., container 1-cntr in FIG. 9D) that: (i) arrives (e.g., 1-arrival-T11 at time T11) onboard an on-road vehicle 10-V at one of the respective designated on-road stopping areas 12-stop (FIG. 9D), and (ii) is to be temporarily stored at the respective storage space 12-temp; in which as part of said initiation of the exchange procedure, one of the respective drones (e.g., 10b in FIG. 9D) is configured to: fly 2-fly-to (FIG. 9D) from the exchange station 2-exchange toward the on-road vehicle 10-V; pick up the container 1-cntr from the on-road vehicle 10-V that has just arrived and stopped 1-arrival-T11; fly 1-fly-T11 at time T11 (FIG. 9D) to the respective temporary storage space 12-temp while carrying the container 1-cntr; and release the container 1-cntr for temporary storage at the respective temporary storage space 12-temp; and in which as part of said conclusion of the exchange procedure, one of the respective drones 10b (FIG. 9E) is configured to convey 1-fly-T12 at time T12 (FIG. 9E) the container 1-cntr from the respective temporary storage space 12-temp to another on-road vehicle 11-V (FIG. 9E) that has just arrived 1-arrival-T12 (FIG. 9E) at one of the respective designated on-road stopping areas 13-stop and is to transport the container 1-cntr to another location 14-stop (FIG. 9F).

In one embodiment, per each of at least some of the exchange procedures executed in conjunction with one of the exchange stations (e.g., 2-exchange in FIG. 9D), the another location 14-stop (FIG. 9F), to which the respective another on-road vehicle 11-V transports the respective container 1-cntr, is the designated stopping area 14-stop of another one of the exchange stations 3-exchange (FIG. 9F), thereby transporting the container between the designated stopping areas 13-stop, 14-stop of two exchange stations 2-exchange, 3-exchange.

In one embodiment, the another one of the exchange stations 3-exchange is configured to use the associated one of the drones 10c (FIG. 9F) to pick up 1-fly-T13 at time T13 (FIG. 9F) the container 1-cntr from the another on-road vehicle 11-V arriving 1-arrival-T13 (FIG. 9F) at the respective designated stopping area 14-stop, and to release the container for temporary storage at the respective temporary storage space 13-temp (FIG. 9F) of the another one of the exchange stations 3-exchange.

In one embodiment, the system further comprises a propagation computer 5-P (FIG. 1A); and the exchange network 1-exchange-network is configured to execute a plurality of said exchange procedures in conjunction with at least some of the plurality of exchange stations 1-exchange, 2-exchange, 3-exchange and in conjunction with a plurality of on-road vehicles, so as to propagate each of at least some of said containers (such as container 1-cntr) between at least two of the exchange stations, in which as a part of said propagation, the propagation computer is configured to: per each of the containers (e.g., 1-cntr) to be propagated, plan a propagation path 1-TEP-a, 1-TEP-b, 1-TEP-c, 1-TEP-d, 1-TEP-e (FIG. 9A), in which the propagation path comprises an identification of a plurality of at least two of the exchange stations 1-exchange, 2-exchange, 3-exchange to participate in the propagation, and an identification of a plurality of at least two on-road vehicles 10-V, 11-V each to be used for transporting the container 1-cntr between the designated stopping areas of two of the exchange stations identified (e.g., 10-V is identified as being operative to transport the container 1-cntr between the designated stopping area 11-stop of exchange station 1-exchange and the designated stopping area 12-stop of exchange station 2-exchange). In one embodiment, as a result of said certain proximity, each of the containers (e.g., 1-cntr), during the respective propagation, spends at least 20 (twenty) times longer being transported by on-road vehicles 10-V, 11-V than being carried by drones 10a, 10b, 10c.

In one embodiment, each of at least some of the exchange stations (e.g., 1-exchange) is associated with at least one of: (i) a bus station, in which the at least one respective designated on-road stopping area (e.g., 11-stop) is a portion of road 1-road-1 (FIG. 9B) located beside the bus station and allocated for busses for picking up and dropping off bus passengers, in which the associated drones 10a and temporary storage space 11-temp are located in conjunction with a roof of the bus station, in which at least some of the on-road vehicles are busses 10-V, and in which said certain proximity is less than 20 (twenty) meters, (ii) a roof and/or a balcony of a building, in which the at least one respective designated on-road stopping area is an on-road parking space, in which the associated drones and temporary storage space are located in conjunction with the roof and/or the balcony of the building, and in which said certain proximity is less than 200 (two hundred) meters, and (iii) an elevated landing area associated with an outdoor pole and/or a building and/or any outdoor infrastructure elevated at least 2 (two) meters above ground, in which the associated drones and temporary storage space are located in conjunction with the elevated landing area, and in which said certain proximity is less than 200 (two hundred) meters. In one embodiment, at least most of the drones (e.g., 10b) are associated with a specific one of the exchange stations (e.g., 10b is associated specifically with exchange station 2-exchange), and therefore do not fly between the different exchange stations (e.g., 10b services only the exchange station 2-exchange, and not the exchange stations 1-exchange and 3-exchange).

In one embodiment, per each of at least some of the exchange stations (e.g., 2-exchange), at least one of the associated drones 10b is configured to act as a flying crane operative to facilitate the respective exchange procedures (e.g., the exchange procedure involving 1-cntr and the flights 2-fly-to and 1-fly-T11 in FIG. 9D and 1-fly-T12 in FIG. 9E), in which the flying crane 10b stays within a radius of at most 200 (two hundred) meters from the exchange station 2-exchange, and is thereby operative to facilitate a sequence of exchange procedures in conjunction with a sequence of containers arriving at a respective one of the designated stopping areas 12-stop and 13-stop, in which the flying crane 10b spends no more than 2 (two) minutes in the air per each of the exchange procedures (e.g., 10b spends no more than two minutes in the air during flights 2-fly-to, 1-fly-T11, and 1-fly-T12). In one embodiment, at least another one of the associated drones is configured to act as a delivery drone operative to deliver packages to clients located beyond 200 (two hundred) meters from the exchange station. In one embodiment, the system further comprises: a propulsion system onboard the flying crane 10b, in which the flying crane is a drone of a hovering type, and in which the propulsion system comprises at least one motor 4-motor (FIG. 1A) associated respectively with at least one propeller 4-prop (FIG. 1A); wherein: the mass of the flying crane 10b is between 10 kg (ten kilograms) and 25 kg (twenty five kilograms), therefore the average power needed by the propulsion system during said flight in conjunction with the exchange procedures is under 1,000 W (one thousand watts); and therefore, per each of the exchange procedures, the energy consumed by the propulsion system, for supporting the flying crane in the air, is under 120,000 J (one hundred and twenty thousand joules). In one embodiment, the system further comprises: a charging station 2-charge (FIG. 9B), associated with the exchange station 2-exchange, and configured to charge a battery 4-btr (FIG. 1A) of the flying crane 10b when the flying crane is at rest in conjunction with the exchange station, in which said charging is executed at a rate of above ⅕ (one fifth) of said average power needed by the propulsion system during said flight; and therefore, on average, the flying crane 10b is configured to make do with less than 10 (ten) minutes of charging the battery per each of said exchange procedures (e.g., per the exchange procedure involving flights 2-fly-to, 1-fly-T11, and 1-fly-T12), thereby allowing the flying crane to sustain a continuous series of exchange procedures. In one embodiment, each of at least some of the containers 1-cntr has a mass of between 1 (one) kilogram and 5 (five) kilograms, and is associated with at least one of: (i) package delivery, (ii) food delivery, (iii) mail delivery, (iv) infrastructure components delivery. In one embodiment, said certain proximity is a visual proximity, thereby allowing one of the associated drones (e.g., 10b) to rest at the respective exchange station 2-exchange while visually observing the associated designated stopping area 12-stop and 13-stop for arriving on-road vehicles (e.g., V-10 and V-11).

In one embodiment, one of the designated on-road stopping areas (e.g., 12-stop) of the exchange station 2-exchange is associated with a first bus stop, and another of the designated on-road stopping areas (e.g., 13-stop) of the exchange station 2-exchange is associated with a second bus stop; said arrival 1-arrival-T11 of the container 1-cntr onboard the on-road vehicle 10-V at one of the respective designated on-road stopping areas is an arrival of the container onboard the on-road vehicle 10-V at the first respective designated on-road stopping area 12-stop associated with the first bus stop; said picking up 1-fly-T11 of the container 1-cntr is done in conjunction with the first respective designated on-road stopping area 12-stop associated with the first bus stop; and said arrival 1-arrival-T12 of the another on-road vehicle 11-V at one of the respective designated on-road stopping areas is an arrival of the another on-road vehicle at the second respective designated on-road stopping area 13-stop associated with the second bus stop; in which the first designated on-road stopping area 12-stop associated with the first bus stop, the second designated on-road stopping area 13-stop associated with the second bus stop, and the respective temporary storage space 12-temp of the exchange station 2-exchange, are all located within 400 (four hundred) meters from each other, thereby facilitating said certain close proximity.

Figure 9G:
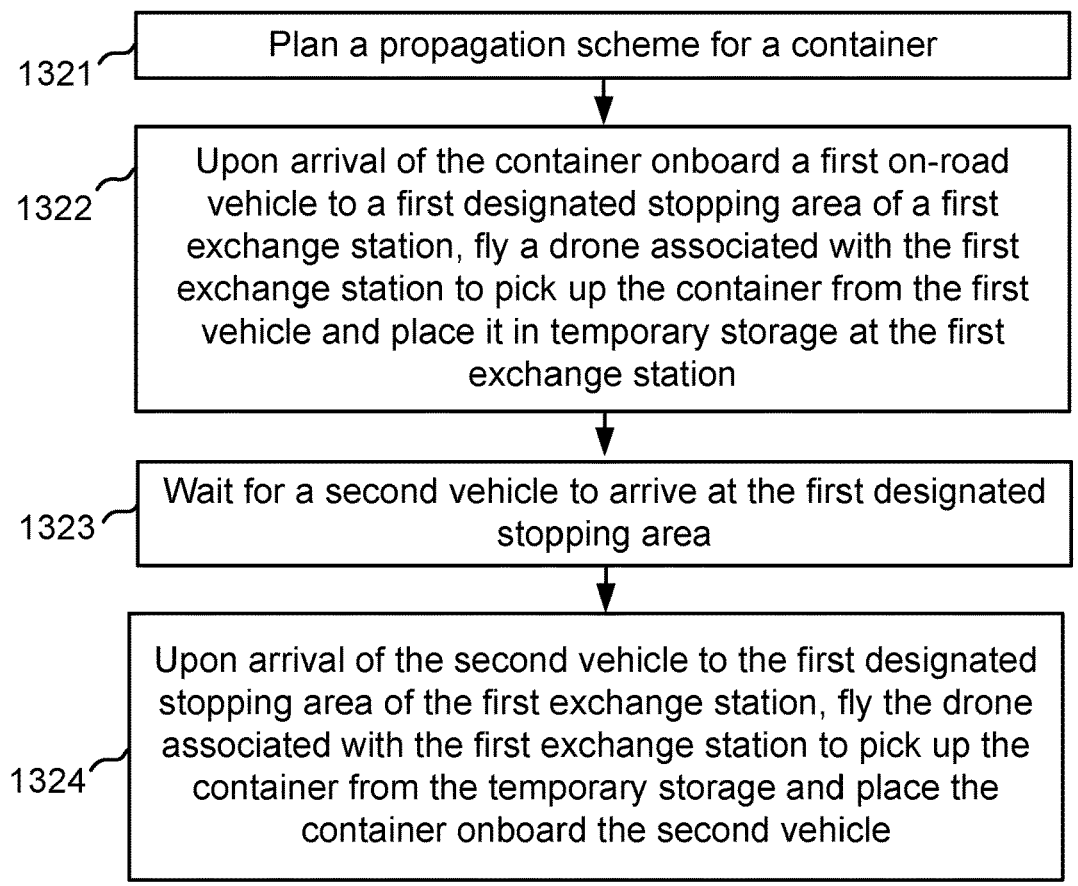
FIG. 9G illustrates one embodiment of a method for using an exchange network to transport cargo between different locations.

FIG. 9G illustrates one embodiment of a method for using an exchange network to transport cargo between different locations. The method includes: in step 1321, planning, by an exchange network 1-exchange-network (FIG. 9B), a propagation scheme 1-TEP (FIG. 9A) for a container 1-cntr, in which the propagation scheme is operative to identify, out of a plurality of exchange stations 1-exchange, 2-exchange, 3-exchange (FIG. 9B), at least a first and a second exchange stations 2-exchange, 3-exchange to participate in propagating the container. Executing, by at least one drone 10b (FIG. 9D) associated with the first exchange station 2-exchange, upon an indication that the container 1-cntr is arriving 1-arrival-T11 (FIG. 9D) onboard a first on-road vehicle 10-V (FIG. 9D) to a first designated stopping area 12-stop, 13-stop (FIG. 9D) associated with the first exchange station 2-exchange, a first tripartite exchange procedure comprising: in step 1322, flying 2-fly-to (FIG. 9D) from the first exchange station 2-exchange toward the first on-road vehicle 10-V; picking up the container 1-cntr at time T11 from the first on-road vehicle 10-V that has just arrived 1-arrival-T11 and stopped at the first designated stopping area 12-stop, 13-stop; flying back 1-fly-T11 (FIG. 9D) to the first exchange station 2-exchange while carrying the container 1-cntr; and releasing the container 1-cntr for temporary storage 12-temp (FIG. 9D) at the first exchange station 2-exchange. In step 1323: as continuation of the first tripartite exchange procedure, waiting for an indication that a second on-road vehicle 11-V (FIG. 9E), which is scheduled to travel between the first designated stopping area 12-stop, 13-stop to a second designated stopping area 14-stop associated with the second exchange station 3-exchange, is arriving 1-arrival-T12 (FIG. 9E) to the first designated stopping area 12-stop, 13-stop. In step 1324, flying from the first exchange station 1-fly-T12 at time T12 (FIG. 9E), with the container 1-cntr, toward the second on-road vehicle 11-V; and releasing the container 1-cntr to the second on-road vehicle 11-V that has just arrived 1-arrival-T12 and stopped at the first designated stopping area 12-stop, 13-stop, thereby completing the first tripartite exchange procedure, and facilitating arrival 1-arrival-T13 at time T13 (FIG. 9F) of the container 1-cntr to the second designated stopping area 14-stop (FIG. 9F) onboard the second on-road vehicle 11-V.

In one embodiment, the method further comprises: executing, by at least one different drone 10c (FIG. 9F) associated with the second exchange station 3-exchange, upon an indication that the container is arriving 1-arrival-T13 (FIG. 9F) onboard a second on-road vehicle 11-V to the second designated stopping area associated with the second exchange station, a second tripartite exchange procedure comprising: flying 4-fly-to (FIG. 9F) from the second exchange station 3-exchange toward the second on-road vehicle 11-V; picking up the container 1-cntr from the second on-road vehicle 11-V that has just arrived and stopped 1-arrival-T13 at the second designated stopping area 14-stop; flying back to the second exchange station 3-exchange while carrying the container 1-cntr; releasing the container 1-cntr for temporary storage 13-temp at the second exchange station 3-exchange; waiting for an indication that a third on-road vehicle (not shown), which is scheduled to travel between the second designated stopping area 14-stop to a destination location (not shown), is arriving to the second designated stopping area 14-stop; flying from the second exchange station 3-exchange, with the container 1-cntr, toward the third on-road vehicle; and releasing the container 1-cntr to the third on-road vehicle that has just arrived and stopped at the second designated stopping area 14-stop, thereby completing the second tripartite exchange procedure, and facilitating arrival of the container to the destination location onboard the third on-road vehicle.

In one embodiment, the method further comprises: planning, by the exchange network 1-exchange-network, a plurality of additional propagation schemes for a plurality of additional containers, in which each of the additional propagation schemes is operative to identify, out of the plurality of exchange stations, at least a respective combination of exchange stations to participate in propagating the respective container, thereby resulting is a plurality of different combinations of exchange stations; and executing, by the exchange network 1-exchange-network, per each of the additional propagation schemes, at least one tripartite exchange procedure in conjunction with the respective combination of exchange stations identified, thereby facilitation the plurality of propagation schemes.

In one embodiment, the first on-road vehicle 10-V is a first bus; the second on-road vehicle 11-V is a second bus; the first designated stopping area 12-stop, 13-stop is a first portion of a road allocated for busses for picking up and dropping off bus passengers, in which said stopping of the first bus 10-V in conjunction with the first designated stopping area 12-stop, 13-stop is associated with the first bus stopping for picking up and/or dropping off bus passengers; the indication that the container 1-cntr is arriving 1-arrival-T11 onboard the first bus 10-V to the first designated stopping area 12-stop, 13-stop is based, at least in part, on a known bus-schedule associated with the first bus; and the indication that the second bus 11-V is arriving 1-arrival-T12 to the first designated stopping area 12-stop, 13-stop is based, at least in part, on a known bus-schedule associated with the second bus. In one embodiment, the first exchange station 2-exchange is located in close proximity to the first designated stopping area 12-stop, 13-stop, in which said close proximity is close enough to allow the drone 10b to successfully complete both: (i) said flight 2-fly-to (FIG. 9D) from the first exchange 2-exchange station toward the first bus 10-V, and (ii) said picking up of the container 1-cntr from the first bus 10-V, upon an indication that the first bus has arrived 1-arrival-T11, and before the first bus 10-V leaves the first designated stopping area 12-stop, 13-stop. In one embodiment, an average flight speed of the drone is below 10 (ten) meters per second; an average time for a bus to wait in a bus station is less than 20 (twenty) seconds; and therefore, said close proximity is less than 200 (two hundred) meters.

In one embodiment, the indication that the container 1-cntr is arriving 1-arrival-T11 (FIG. 9D) onboard the first on-road vehicle 10-V to the first designated stopping area 12-stop, 13-stop is based, at least in part, on a visual detection by optical sensors 4-cam (FIG. 1A) onboard one of the drones 10b (FIG. 9D) associated with the first exchange station 2-exchange and currently resting at the first exchange station; the indication that the second on-road vehicle 11-V is arriving 1-arrival-T12 (FIG. 9E) to the first designated stopping area 12-stop, 13-stop is also based, at least in part, on a visual detection by optical sensors 4-cam onboard at least one of the drones 10b associated with the first exchange station 2-exchange and currently resting at the first exchange station; and the first exchange station 2-exchange is located in visual proximity to said first designated stopping area 12-stop, 13-stop, thereby facilitating said indications.

In one embodiment, at least one of the exchange stations 2-exchange is associated with at least two drones (10b and another drone not shown), and the method further comprises: assuring, by the exchange network 1-exchange-network, that at any given time in which said one of the exchange stations 2-exchange is active, at least one (e.g., 10b), out of the at least two drones, is currently in visual proximity to the associated designated stopping area 12-stop, 13-stop, thereby guaranteeing immediate availability of the drone for initiating a tripartite exchange procedure upon arrival of a respective on-road vehicle. In one embodiment, the other associated drones (not shown) that are not currently in visual proximity to the associated designated stopping area 12-stop, 13-stop, are available to the exchange station 2-exchange for delivering packages to clients that are beyond visual proximity to the associated designated stopping area.

In one embodiment, the first designated stopping area 12-stop, 13-stop comprises two separate stopping areas (e.g., one is 12-stop and the other is 13-stop), in which one of the separate stopping areas 12-stop is associated with a first bus station associated with the first exchange station 2-exchange, and the other separate stopping area 13-stop is associated with a second bus station associated with the same first exchange station 2-exchange; and the second designated stopping area 14-stop is associated with a third bus station associated with the second exchange station 3-exchange; in which: said picking up of the container 1-cntr is done in conjunction with said one of the separate stopping areas 12-stop associated with the first bus station; said arrival 1-arrival-T12 of the second on-road vehicle 11-V to the first designated stopping area is an arrival of the second on-road vehicle to said other separate stopping area 13-stop associated with the second bus station; and the first and second bus stations are located in close proximity of less than 400 (four hundred meters) from each other, thereby said flights 2-fly-to (FIG. 9D), 1-fly-T11 (FIG. 9D), 1-fly-T12 (FIG. 9E) are short-distance flights, however the third bus station is located at least 1 (one) kilometer from both the first and second bus stations, thereby necessitating said usage of the second on-road vehicle 11-V to transport the container 1-cntr from the second bus station associated with the first exchange station 2-exchange to the third bus station associated with the second exchange station 3-exchange.

Figure 9H:
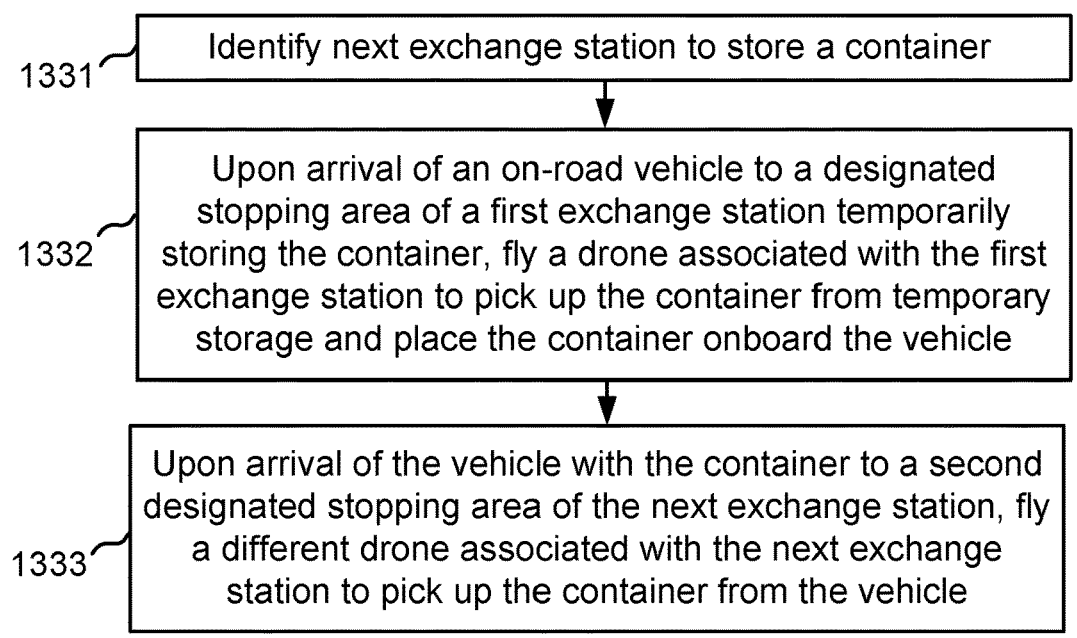
FIG. 9H illustrates one embodiment of another method for using an exchange network to transport cargo between different locations.

FIG. 9H illustrates one embodiment of another method for using an exchange network to transport cargo between different locations. The method includes: in step 1331, determining, by an exchange network 1-exchange-network (FIG. 9B), per each of a plurality of containers temporarily stored in a plurality of exchange stations (e.g., per container 1-cntr temporarily stored 11-temp in exchange station 1-exchange, FIG. 9C), which of the exchange stations (e.g., exchange station 2-exchange, FIG. 9D) is the next exchange station to temporarily store the container 1-cntr. Per each of the containers 1-cntr for which a determination was made, execute a transport procedure comprising: in step 1332, identifying, by the exchange network 1-exchange-network, one of a plurality of on-road vehicles 10-V (FIG. 9C) that is operative to transport the container 1-cntr from the exchange station 1-exchange currently storing 11-temp the container to the next exchange station determined 2-exchange; and upon a detection that the on-road vehicle identified 10-V is arriving 1-arrival-T10 at time T10 (FIG. 9C) at a designated stopping area 11-stop (FIG. 9C) associated with the exchange station 1-exchange currently storing the container 1-cntr: flying 1-fly-T10 (FIG. 9C), by a drone 10a (FIG. 9C) associated with the exchange station currently storing the container 1-exchange, with the container 1-cntr, toward the on-road vehicle 10-V arriving 1-arrival-T10, and releasing, by the drone 10a, the container 1-cntr to the on-road vehicle 10-V that has just arrived and stopped 1-arrival-T10 at the designated stopping area 11-stop. In step 1333, as a continuation of the transport procedure, upon a detection that the on-road vehicle 10-V now carrying the container 1-cntr is arriving 1-arrival-T11 at time T11 (FIG. 9D) at a designated stopping area 12-stop associated with the next exchange station 2-exchange (FIG. 9D) to currently store the container 1-cntr: flying 2-fly-to (FIG. 9D), by another drone 10*b* (FIG. 9D) associated with the next exchange station 2-exchange, toward the on-road vehicle 10-V arriving 1-arrival-T11 with the package 1-cntr, picking-up, by the another drone 10*b*, the container 1-cntr from the on-road vehicle 10-V that has just arrived and stopped 1-arrival-T11 at the designated stopping area 12-stop, flying back 1-fly-T11 (FIG. 9D), by the another drone 10*b*, to the next exchange station 2-exchange while carrying the container 1-cntr, and releasing, by the other drone 10*b*, the container 1-cntr for temporary storage 12-temp (FIG. 9D) at said next exchange station 2-exchange.

In one embodiment, each of the exchange stations 1-exchange, 2-exchange constitutes at least one of: (i) a storage facility accessible to drones, (ii) a roof and/or a porch of a building, (iii) a warehouse, in which the warehouse constitutes a starting point for delivering at least some of the containers, (iv) a structure elevated at least two meters above ground, (v) a bus station located in-city, (vi) a pole with a landing and temporary storage surface on-top, (vii) a parking truck, (viii) a container and/or another structure parked alongside a road 1-road-1 (FIG. 9C, FIG. 9D) and/or in conjunction with a bus station, in which the respective stopping area 11-stop, 12-stop is a parking space and/or a stopping area for busses alongside the same road, (ix) any structure and/or container accessible to drones, and (x) a storage node in a distributed warehouse comprising a plurality of storage nodes; each of the on-road vehicles (e.g., 10-V) constitutes at least one of: (i) a bus, (ii) an on-demand platform, (iii) an autonomous vehicle, (iv) a scooter, and (v) a taxi; and each of at least some of the packages 1-cntr are transported, in conjunction with more than one of the transport procedures, between more than two of the exchange stations 1-exchange, 2-exchange.

Figure 9I:
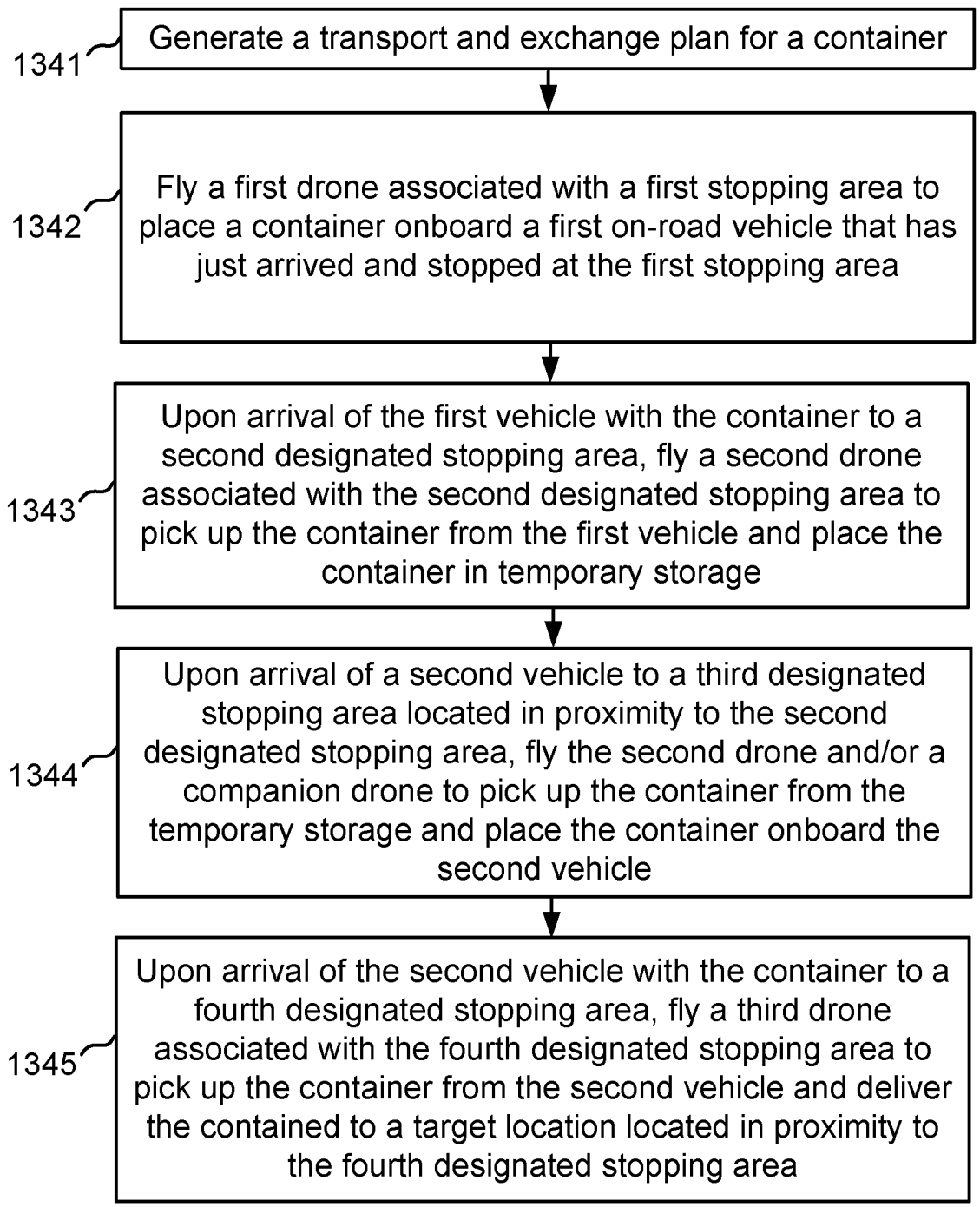
FIG. 9I illustrates one embodiment of yet another method for using an exchange network to transport cargo between different locations.

FIG. 9I illustrates one embodiment of yet another method for using an exchange network to transport cargo between different locations. The method includes: in step 1341, accessing, by a planning agent 5-P (FIG. 1A) of an exchange network 1-exchange-network (FIG. 9B), a schedule 10-schdl, 11-schdl (FIG. 9A) operative to describe future movement of a plurality of on-road vehicles 10-V, 11-V (FIG. 9A) between different designated stopping areas 11-stop, 12-stop, 13-stop, 14-stop (FIG. 9A, FIG. 9B), and further accessing a description of a target location 10-target (FIG. 9A) at which a container 1-cntr (FIG. 9A, FIG. 9B) is scheduled to be delivered; and planning, by the planning agent 5-P, according to said schedule 10-schdl, 11-schdl and target location 10-target, a transport and exchange plan 1-TEP (FIG. 9A) for the container 1-cntr, in which the transport and exchange plan 1-TEP is operative to identify at least a first one of the on-road vehicles 10-V scheduled 10-schdl to move from the first of the designated stopping areas 11-stop to a second of the designated stopping areas 12-stop, and a second one of the on-road vehicles 11-V scheduled 11-schdl to move from a third of the designated stopping areas 13-stop to a fourth of the designated stopping areas 14-stop, in which the second 12-stop and third 13-stop designated stopping areas are located in close proximity to each other, and the fourth designated stopping area 14-stop is located in close proximity to the target location 10-target. Facilitating the transport and exchange plan 1-TEP by at least three different drones 10*a*, 10*b*, 10*c* (FIG. 9B), in which said facilitation comprises the following steps: in step 1342, flying 1-fly-T10 at time T10 (FIG. 9C), according to the transport and exchange plan 1-TEP-a, by a first of the drones 10*a* (FIG. 9C) associated with the first designated stopping area 11-stop (FIG. 9C) and currently carrying the container 1-cntr, toward the first designated stopping area 11-stop, thereby rendezvousing (at time T10) with the first on-road vehicle 10-V that has just arrived 1-arrival-T10 (FIG. 9C) and leaving the container therewith (FIG. 9C), consequently causing the container 1-cntr to arrive 1-arrival-T11 at time T11 (FIG. 9D), according to the transport and exchange plan 1-TEP-b, at the second designated stopping area 12-stop together with the first on-road vehicle 10-V. In step 1343, upon said arrival 1-arrival-T11: picking up and flying 1-fly-T11 the container (FIG. 9D), according to the transport and exchange plan 1-TEP-c, by a second of the drones 10*b* (FIG. 9D) associated with the second 12-stop and third 13-stop designated stopping areas, from the first on-road vehicle 10-V to a temporary landing and storage area 12-temp (FIG. 9D) located in close proximity to both the second and third designated stopping areas 12-stop, 13-stop, and waiting for the second on-road vehicle 11-V (FIG. 9E) to arrive 1-arrival-T12 (FIG. 9E). In step 1344, upon arrival 1-arrival-T12 of the second on-road vehicle 11-V to the third designated stopping area 13-stop at time T12: flying with the container 1-fly-T12 (FIG. 9E), according to the transport and exchange plan 1-TEP-d, by the second drone 10*b* and/or by a companion drone, from the temporary landing and storage area 12-temp toward the third designated stopping area 13-stop, thereby rendezvousing (at time T12) with the second on-road vehicle 11-V and leaving the container 1-cntr therewith, consequently causing the container 1-cntr to arrive 1-arrival-T13 at time 13 (FIG. 9F), according to the transport and exchange plan 1-TEP-e, at the fourth designated stopping area 14-stop together with the second on-road vehicle 11-V. In step 1345, upon arrival 1-arrival-T13 of the second on-road vehicle 11-V with the container 1-cntr to the fourth designated stopping area 14-stop: picking up and flying 1-fly-T13 (FIG. 9F) the container 1-cntr, according to the transport and exchange plan 1-TEP-f, by a third of the drones 10*c* (FIG. 9F) associated with the fourth designated stopping area 14-stop, from the second on-road vehicle 11-V to the target location 1-target.

In one embodiment, said schedule 10-schdl, 11-schdl is a bus schedule; the first and second on-road vehicles 10-V, 11-V are a first and second buses; the first designated stopping area 11-stop is a stopping area associated with a first bus stop; the second designated stopping area 12-stop is a stopping area associated with a second bus stop; the third designated stopping area 13-stop is a stopping area associated with a third bus stop; the fourth designated stopping 14-stop area is a stopping area associated with a fourth bus stop; the first bus 10-V is a bus that is scheduled to stop at the first bus stop, and then move to and stop at the second bus stop; the second bus 11-V is a bus that is scheduled to stop at the third bus stop, and then move to and stop at the fourth bus stop; each of the close proximities is a proximity of less than 400 (four hundred) meters, thereby causing each of said flights 1-fly-T10, 1-fly-T11, 1-fly-T12, 1-fly-T13 to be a short-distance flight, in which the aggregated length through which the container 1-cntr is carried in the air by the at least three drones 10*a*, 10*b*, 10*c* is under 1 (one) kilometer; and the aggregated length through which the container is transported by the two on-road vehicles 10-V, 11-V is above 2 (two) kilometers, thereby causing the container 1-cntr to be transported most of the way by the two on-road vehicles, and thereby minimizing energy needed by the drones 10a, 10b, 10c.

FIG. 10A illustrates one embodiment of a drone 10 carrying a container 1-cntr-2 into a hovering position above a group of vertical guides 1-guide-a, 1-guide-b, in which the container 1-cntr-2 is to be stacked in the group of vertical guides. Another container 1-cntr-1 is shown as already being stacked in the group of vertical guides 1-guide-a, 1-guide-b.

FIG. 10B illustrates one embodiment of the drone 10 fitting the container 1-cntr-2 in the group of vertical guides 1-guide-a, 1-guide-b.

FIG. 10C illustrates one embodiment of the drone 10 descending down the vertical guides 1-guide-a, 1-guide-b with the container 1-cntr-2 while the vertical guides restrict horizontal movement of the container and the drone and therefore keep the drone's propellers away from the vertical guides and from other near-by objects during the descent.

FIG. 10D illustrates one embodiment of the drone 10 further descending down the vertical guides 1-guide-a, 1-guide-b with the container 1-cntr-2 until stacking the container on top of another container 1-cntr-1 already stacked in the group of vertical guides.

FIG. 10E illustrates one embodiment of the drone 10 ascending up the vertical guides 1-guide-a, 1-guide-b while being horizontally restricted by the vertical guides which keep the drone's propellers away from the vertical guides and from other near-by objects during the ascent and while retaining the containers 1-cntr-1, 1-cntr-2 restricted in horizontal movement and therefore tightly stacked.

Figure 10F:
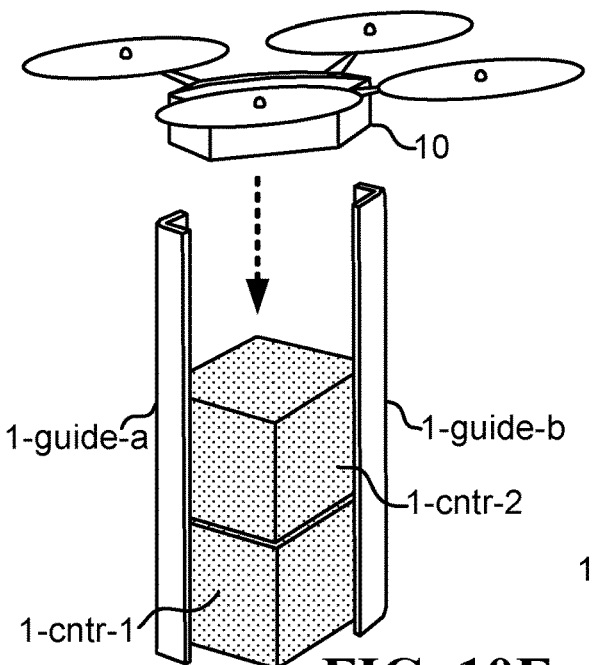

FIG. 10F illustrates one embodiment of a drone 10 hovering above a group of vertical guides 1-guide-a, 1-guide-b currently stacking two containers 1-cntr-1, 1-cntr-2.

Figure 10G:
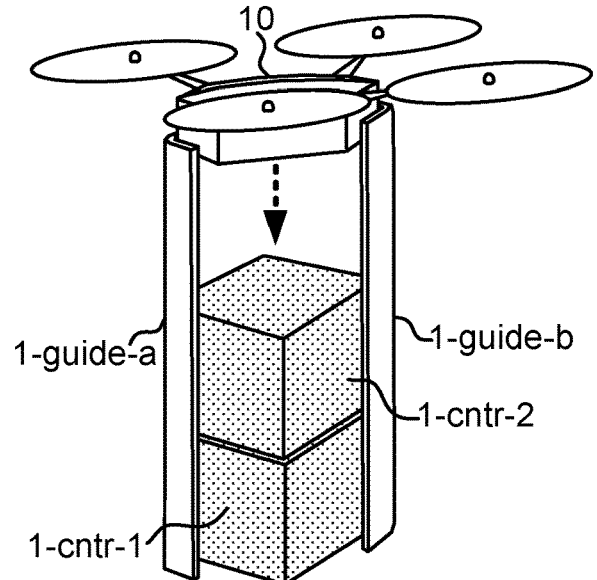

FIG. 10G illustrates one embodiment of the drone 10 fitting a body thereof in the group of vertical guides 1-guide-a, 1-guide-b.

Figure 10H:
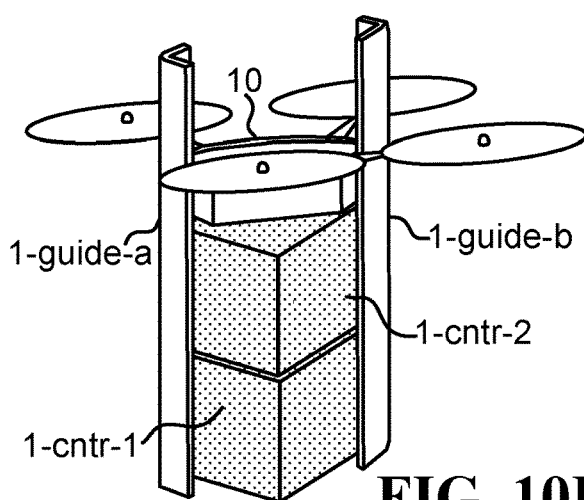

FIG. 10H illustrates one embodiment of the drone 10 descending down the vertical guides 1-guide-a, 1-guide-b to grab the top container 1-cntr-2 while the vertical guides restrict horizontal movement of the drone and therefore keep the drone's propellers away from the vertical guides and from other near-by objects during the descent.

Figure 10I:
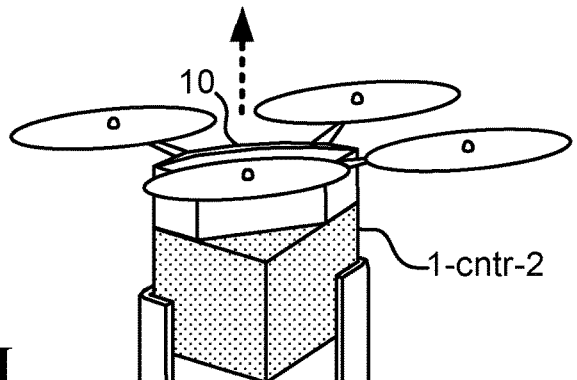

FIG. 10I illustrates one embodiment of the drone 10 ascending up the vertical guides 1-guide-a, 1-guide-b with the container 1-cntr-2 while the vertical guides restrict horizontal movement of the container and the drone and therefore keep the drone's propellers away from the vertical guides and from other near-by objects during the ascent.

Figure 10J:
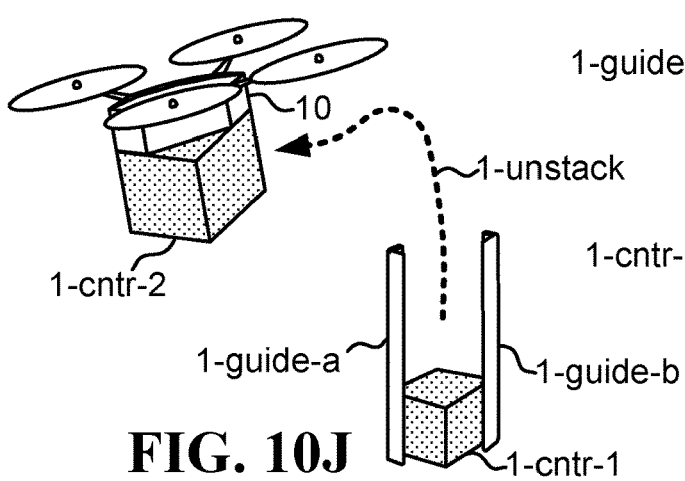

FIG. 10J illustrates one embodiment of the drone 10 carrying the container 1-cntr-2 clear of the vertical guides 1-guide-a, 1-guide-b.

Figure 10K:
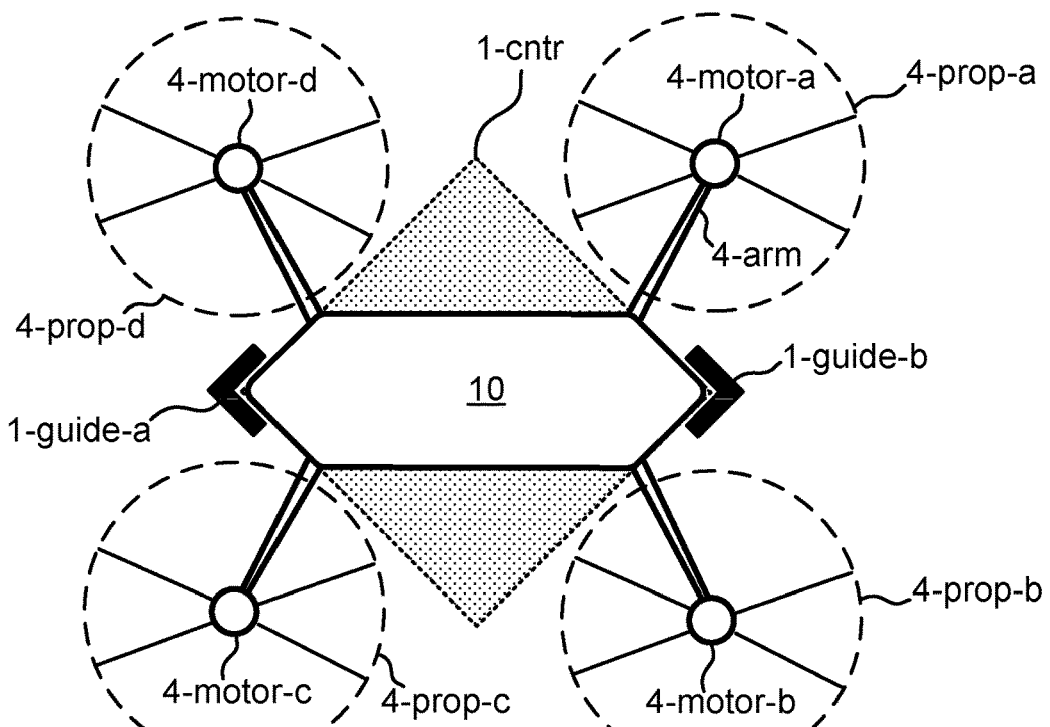

FIG. 10K illustrates one embodiment of a top view of a drone 10 positioned above a container 1-cntr in which both the drone and the container are horizontally restricted by a group of vertical guides 1-guide-a, 1-guide-b and in which propellers of the drone 4-prop-a, 4-prop-b, 4-prop-c, 4-prop-d are kept away from the vertical guides 1-guide-a, 1-guide-b and from near-by objects as a result of said horizontal restriction. The propellers of the drone 4-prop-a, 4-prop-b, 4-prop-c, 4-prop-d are powered by motors 4-motor-a, 4-motor-b, 4-motor-c, 4-motor-d, each connected to the drone's body via an arm 4-arm that is operative to extend the respective propeller away from the vertical guides 1-guide-a, 1-guide-b.

Figure 10L:
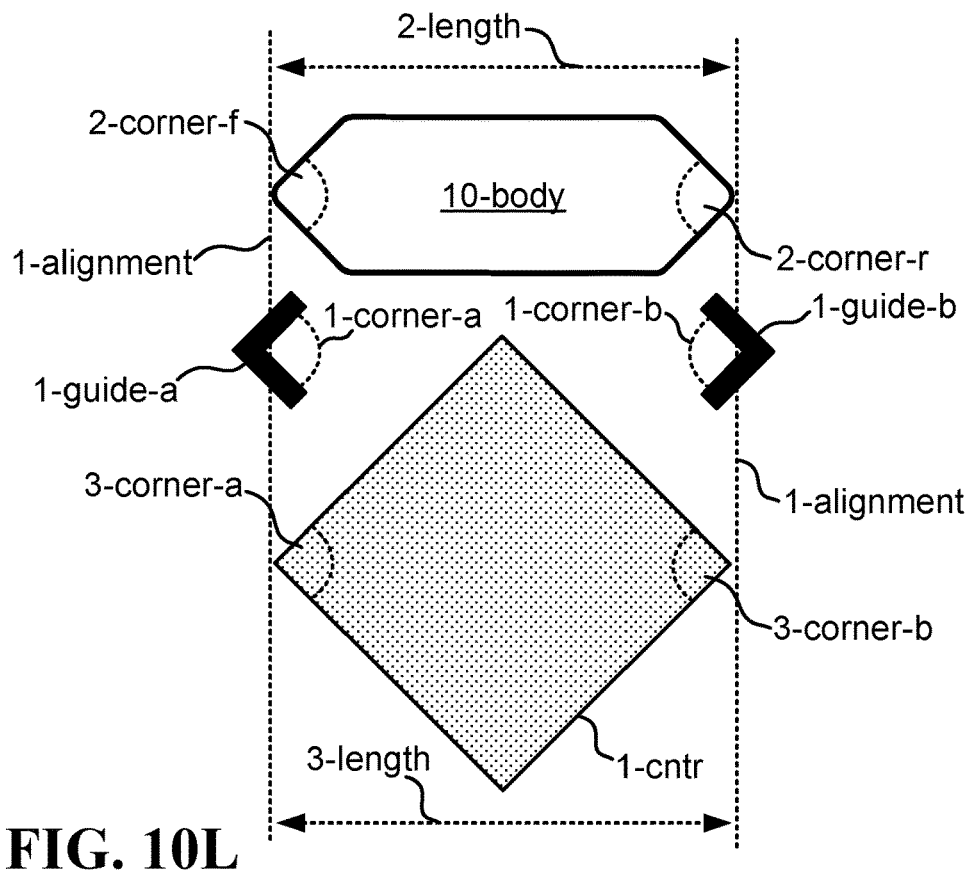

FIG. 10L illustrates one embodiment of a top view of a drone's body 10-body and a container 1-cntr both aligned 1-alignment by length 2-length, 3-length and angle 2-corner-f, 2-corner-r, 3-corner-a, 3-corner-b with a group of angled 1-corner-a, 1-corner-b vertical guides 1-guide-a, 1-guide-b.

FIG. 10M illustrates one embodiment of a top view of a drone 10 positioned above a container 1-cntr in which both the drone and the container are horizontally restricted by a group of vertical guides 1-guide-a-1, 1-guide-b-1, 1-guide-a-2, 1-guide-b-2 and in which propellers of the drone 4-prop-a, 4-prop-b, 4-prop-c, 4-prop-d are kept away from the vertical guides and from near-by objects as a result of said horizontal restriction. The propellers of the drone 4-prop-a, 4-prop-b, 4-prop-c, 4-prop-d are powered by motors 4-motor-a, 4-motor-b, 4-motor-c, 4-motor-d, each connected to the drone's body via an arm 4-arm that is operative to extend the respective propeller away from the vertical guides 1-guide-a-1, 1-guide-b-1, 1-guide-a-2, 1-guide-b-2.

FIG. 10N illustrates one embodiment of a top view of a drone's body 10-body and a container 1-cntr-small both aligned 1-alignment by length and angle with a group of vertical guides 1-guide-a, 1-guide-b, in which the container 1-cntr-small is using adapters 1-adapt-a, 1-adapt-b to achieve said alignment.

FIG. 10O illustrates one embodiment of a top view of a drone's body 10-body and a container 1-cntr both aligned 1-alignment by length with a group of vertical guides 1-guide-a, 1-guide-b, in which the container and drone are using stripes 2-stripe-a, 2-stripe-b, 3-stripe, 4-stripe to achieve said alignment.

Figure 10P:
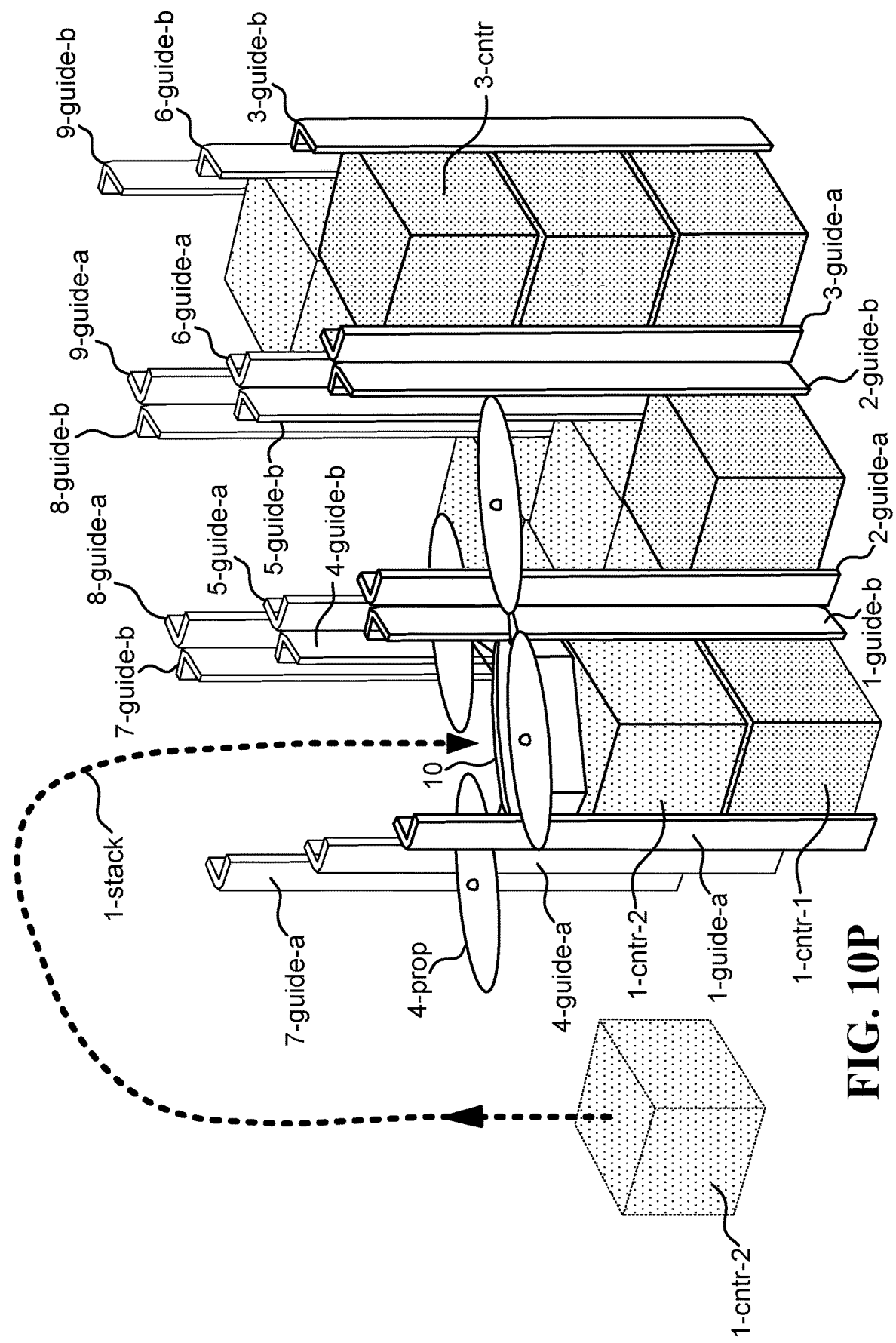

FIG. 10P illustrates one embodiment of an array of vertical guides arranged in groups 1-guide, 2-guide, 3-guide, 4-guide, 5-guide, 6-guide, 7-guide, 8-guide, 9-guide (nine groups are shown, with two guides in each of the groups), in which the groups form a tightly packed pattern operative to efficiently stack containers 1-cntr-1, 1-cntr-2, 3-cntr in three-dimensions and in which the groups of guides are operative to vertically guide and horizontally restrict movement of a drone 10 in facilitation of stacking containers and so as to protect propellers of the drone 4-prop from hitting the guides and neighboring containers stacked in adjacent groups.

Figure 10Q:
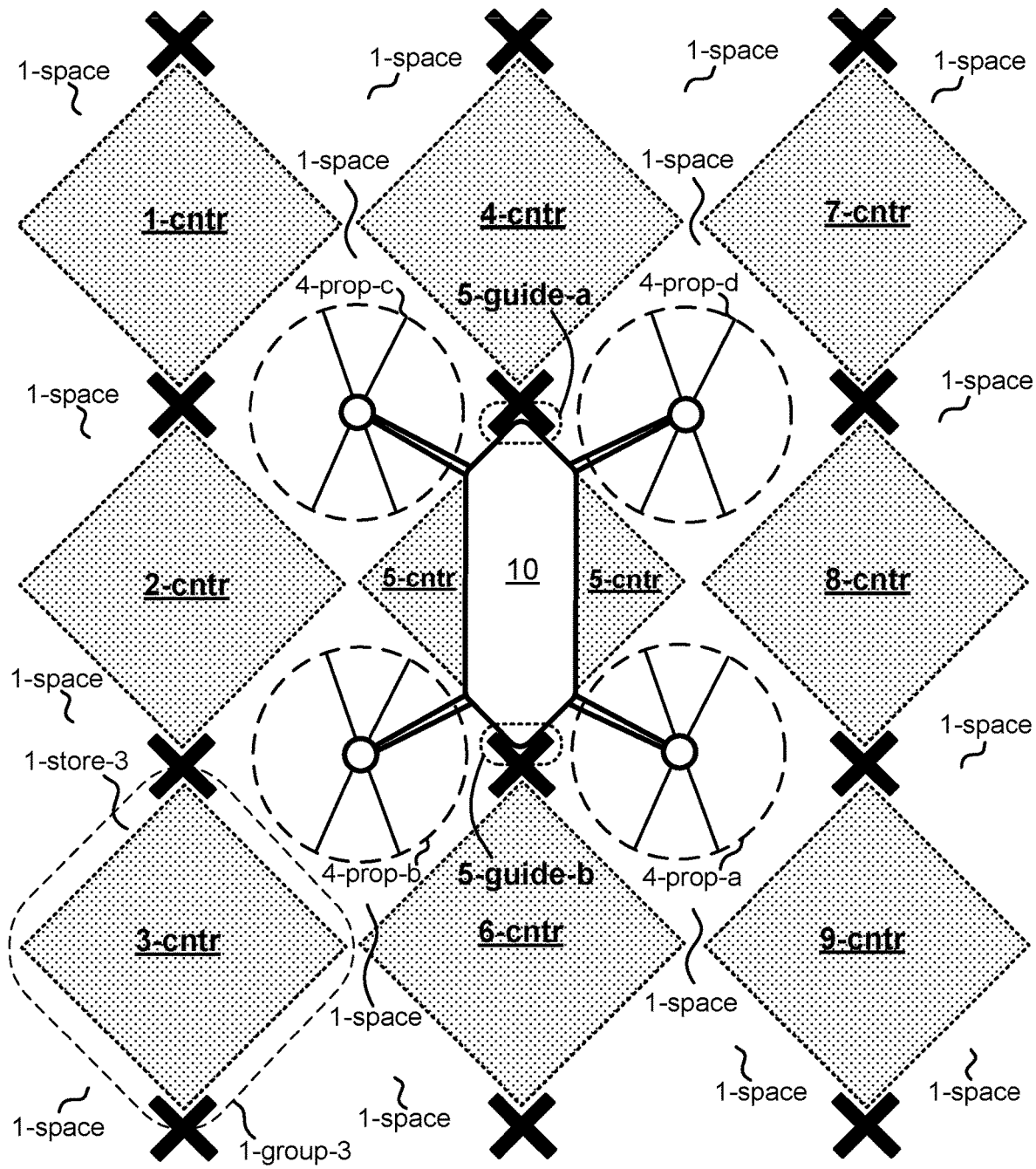

FIG. 10Q illustrates one embodiment of a top view of the horizontally-restricting array of guides arranged in groups (e.g., 5-guide-a, 5-guide-b is one of nine groups shown), in which the groups form a tightly packed checkered pattern that produces a configuration of spaces 1-space through which restricted propellers 4-prop-a, 4-prop-b, 4-prop-c, 4-prop-d of the drone 10 can fit without hitting the guides and the containers 1-cntr, 2-cntr, 3-cntr, 4-cntr, 6-cntr, 7-cntr, 8-cntr, 9-cntr stacked in the array.

One embodiment is a system operative to stack containers in conjunction with drones, comprising: a drone 10 (FIG. 10A, FIG. 10K) operative to fly using a propulsion system comprising at least two propellers 4-prop-a, 4-prop-b (FIG. 10K); at least two vertical guides 1-guide-a, 1-guide-b (FIG. 10A, FIG. 10K) arranged in parallel to each other, in which the vertical guides are precisely positioned so as to: (i) physically restrict horizontal movement of the drone 10 that fit between the vertical guides, but (ii) allow the drone 10 to move vertically up and down the vertical guides while being restricted between and physically guided by the vertical guides.

In one embodiment, per each of a plurality of containers 1-cntr-1, 1-cntr-2 (FIG. 10A) to be stacked between the vertical guides 1-guide-a, 1-guide-b, the drone 10 is configured to: grab and carry the container 1-cntr-2 above the vertical guides 1-guide-a, 1-guide-b (FIG. 10A); fit the container 1-cntr-2 (and/or fit a lower part of the drone engulfing the container, e.g., fit grabs 1-grab, 2-grab, FIG. 11H) between the vertical guides 1-guide-a, 1-guide-b (FIG. 10B); and descend down the vertical guides 1-guide-a, 1-guide-b together with the container 1-cntr-2 (FIG. 10C), while at least one of the drone 10 and the container 1-cntr-2 is being physically restricted between and guided by the vertical guides, until the container 1-cntr-2 reaches (FIG. 10D) either a bottom or another of the containers 1-cntr-1 already stacked, thereby stacking, in a controlled manner, at least two of the containers 1-cntr-1, 1-cntr-2 between the vertical guides 1-guide-a, 1-guide-b; in which during said descent (FIG. 10C, FIG. 10D), each of the spinning propellers 4-prop-a, 4-prop-b is kept away from the vertical guides 1-guide-a, 1-guide-b as a result of said restriction between and guidance by the vertical guides.

In one embodiment, after stacking one of the containers 1-cntr-2 (FIG. 10D), the drone 10 is further configured to: release the container 1-cntr-2; and ascend (FIG. 10E) up the vertical guides 1-guide-a, 1-guide-b while being restricted between and guided by the vertical guides, until rising above the vertical guides; in which during said ascent, each of the spinning propellers 4-prop-a, 4-prop-b is kept away from the vertical guides 1-guide-a, 1-guide-b as a result of the drone 10 being restricted between and guided by the vertical guides.

In one embodiment, per each of the containers 1-cntr-2 that is now stacked 1-cntr-1, 1-cntr-2 at the top of the stack between the vertical guides 1-guide-a, 1-guide-b, the drone 10 is configured to: fly above the vertical guides 1-guide-a, 1-guide-b (FIG. 10F); descend (FIG. 10G) down the vertical guides 1-guide-a, 1-guide-b, while being restricted between and guided by the vertical guides, until reaching the container 1-cntr-2 (FIG. 10H) at the top of the stack, in which during said descent, each of the spinning propellers 4-prop-a, 4-prop-b is kept away from the vertical guides as a result of the drone 10 being restricted between and guided by the vertical guides; grab the container 1-cntr-2 at the top of the stack; and ascend up the vertical guides 1-guide-a, 1-guide-b together with the container 1-cntr-2 (FIG. 10I), while at least one of the drone 10 and the container 1-cntr-2 is being restricted between and guided by the vertical guides, until the drone 10 and the container 1-cntr-2 rise above the vertical guides (FIG. 10J), thereby retrieving the container 1-cntr-2 in a controlled manner, in which during said ascent, each of the spinning propellers 4-prop-a, 4-prop-b is kept away from the vertical guides 1-guide-a, 1-guide-b as a result of said restriction between and guidance by the vertical guides.

In one embodiment, the container 1-cntr (FIG. 10K) is a box-shaped container 1-cntr (FIG. 10L); and the at least two vertical guides 1-guide-a, 1-guide-b (FIG. 10K) comprise two rails 1-guide-a, 1-guide-b (FIG. 10L), each having a corner profile 1-corner-a, 1-corner-b (FIG. 10L) matching corners 3-corner-a, 3-corner-b (FIG. 10L) of the box-shaped container 1-cntr, so as to achieve said restriction of the container by engulfing two opposite corners 3-corner-a, 3-corner-b of the box-shaped container 1-cntr. In one embodiment, the drone 10 further comprises a body 10-body (FIG. 10L) having a front corner 2-corner-f and a rear corner 2-corner-r (FIG. 10L); and said restriction and guidance of the drone 10 is achieved by one of the rails 1-guide-a engulfing the front corner 2-corner-f and the other rail 1-guide-b engulfing the rear corner 2-corner-r. In one embodiment, the at least two propellers are four propellers 4-prop-a, 4-prop-b, 4-prop-c, 4-prop-d (FIG. 10K) associated respectively with four motors 4-motor-a, 4-motor-b, 4-motor-c, 4-motor-d (FIG. 10K), in which each of the motors is suspended away from the body 10-body using a respective arm a-arm (FIG. 10K), so as to further facilitate said keeping of the spinning propellers 4-prop-a, 4-prop-b, 4-prop-c, 4-prop-d away from the vertical guides 1-guide-a, 1-guide-b when the drone 10 is restricted by the vertical guides, and so that each of the vertical guides is located between two of the spinning propellers when the drone is restricted by the vertical guides (e.g., vertical guide 1-guide-a is located between propellers 4-prop-c and 4-prop-d, and vertical guide 1-guide-b is located between propellers 4-prop-a and 4-prop-b, as shown in FIG. 10K). In one embodiment, the box-shaped container 1-cntr has a base dimensions of between 30×30 cm (thirty centimeters by thirty centimeters) and 60×60 cm (sixty centimeters by sixty centimeters); the distance between any of the spinning propellers (e.g., 4-prop-a) and the closest vertical guide (e.g., 1-guide-b) is between 5 cm (five centimeters) and 20 cm (twenty centimeters) during the descent; thereby necessitating said restriction and guidance in order to prevent winds and/or flight control mistakes from causing the propellers 4-prop-a, 4-prop-b, 4-prop-c, 4-prop-d to hit the vertical guides 1-guide-a, 1-guide-b during the descent.

In one embodiment, the container is a box-shaped container 1-cntr (FIG. 10M); and the at least two vertical guides 1-guide-a, 1-guide-b comprise four rails 1-guide-a-1, 1-guide-a-2, 1-guide-b-1, 1-guide-b-2 (FIG. 10M), each having a straight profile matching the sides of the box-shaped container 1-cntr, so as to achieve said restriction of the container by engulfing four sides of the box-shaped container. In one embodiment, the container 1-cntr is a container 1-cntr-small (FIG. 10N) that is too small to be restricted by the vertical guides 1-guide-a, 1-guide-b, and therefore the container 1-cntr-small is used in conjunction with adaptors 1-adapt-a, 1-adapt-b (FIG. 10N) operative to extend dimensions of the container and further operative to be restricted by the vertical guides 1-guide-a, 1-guide-b. In one embodiment, the vertical guides 1-guide-a, 1-guide-b are at least two vertical guides 1-guide-a, 1-guide-b having a U-shaped profile (FIG. 10O); the drone 10 has at least two vertical stripes 2-stripe-a, 2-stripe-b (FIG. 10O) that fit into the vertical guides U-shaped profile, thereby achieving said guidance and restriction of the drone; and the container 1-cntr is a container comprising at least two stripes 3-stripe, 4-stripe (FIG. 10O) that fit into the vertical guides U-shaped profile, thereby achieving said restriction of the container. In one embodiment, each of the containers 1-cntr-1, 1-cntr-2 that is now stacked between the vertical guides 1-guide-a, 1-guide-b is also restricted in horizontal movement by the vertical guides, thereby preventing the containers from breaking stacking formation due to a force exerted by at least one of: (i) wind, (ii) acceleration as result of being stacked on a moving platform, and (iii) a person accidently and/or intentionally pushing and/or pulling one or some of the stacked containers.

One embodiment is a system operative to stack containers in conjunction with drones, comprising: at least one drone 10 (FIG. 10P, FIG. 10Q) operative to fly using a propulsion system comprising at least two propellers 4-prop-a, 4-prop-b, 4-prop-c, 4-prop-d (FIG. 10Q); and an array of vertical guides 1-guide, 2-guide, 3-guide, 4-guide, 5-guide, 6-guide, 7-guide, 8-guide, 9-guide (FIG. 10P) arranged in groups (e.g., the first group includes the guides 1-guide-a, 1-guide-b, and the ninth group includes the guides 9-guide-a, 9-guide-b, FIG. 10P) and in parallel to each other, in which the vertical guides of each of the groups (e.g., the vertical guides 1-guide-a, 1-guide-b of the first group) are operative to vertically guide and horizontally restrict the drone 10 in a physical manner, either directly or indirectly or both, while descending and ascending for stacking and retrieving a container (e.g., the container 1-cntr-2, FIG. 10P) in conjunction with the group (e.g., the first group 1-guide-a, 1-guide-b), in which the array is geometrically arranged in a repetitive pattern (FIG. 10Q) that interleaves storage area of the groups (e.g., storage area 1-store-3 of the third group 1-group-3, FIG. 10Q) and spaces 1-space (FIG. 10Q) needed to accommodate placement of the propellers 4-prop-a, 4-prop-b, 4-prop-c, 4-prop-d while guiding and restricting the drone 10;

In one embodiment, during said ascending and descending, each of the spinning propellers 4-prop-a, 4-prop-b, 4-prop-c, 4-prop-d is kept away from the vertical guides 1-guide as a result of said restriction and guidance; each of the containers (e.g., 1-cntr-1 and 1-cntr-2) stacked in one of the groups (e.g., in the first group 1-guide-a, 1-guide-b, FIG. 10P) is horizontally restricted by the respective vertical guides (e.g., guides guide-a, 1-guide-b) of the respective group, thereby preventing undesired horizontal shifts of the stacks (e.g., the stack of 1-cntr-2 on top of 1-cntr-1); and said stacking, said vertical guidance and horizontal restriction, and said geometrically arrangement in the repetitive pattern, together, results in robust three-dimensional high-density storage of the containers 1-cntr-1, 1-cntr-2, 3-cntr (FIG. 10P).

In one embodiment, the container 1-cntr is a box-shaped container 1-cntr (FIG. 10L); the vertical guides in each of the groups comprise two vertical guides (e.g., the vertical guides 1-guide-a, 1-guide-b in the first group), each having a corner profile 1-corner-a, 1-corner-b (FIG. 10L) matching corners 3-corner-a, 3-corner-b (FIG. 10L) of the box-shaped container 1-cntr, so as to achieve said horizontal restriction of the container by engulfing two opposite corners 3-corner-a, 3-corner-b of the box-shaped container 1-cntr; the drone 10 further comprises a body 10-body (FIG. 10L) having a front corner 2-corner-f and a rear corner 2-corner-r (FIG. 10L); said horizontal restriction and vertical guidance of the drone 10 is achieved by one of the vertical guides with corner profile 1-corner-a engulfing the front corner 2-corner-f and the other vertical guide with corner profile 1-corner-b engulfing the rear corner 2-corner-r; and the at least two propellers are four propellers 4-prop-a, 4-prop-b, 4-prop-c, 4-prop-d associated respectively with four motors 4-motor-a, 4-motor-b, 4-motor-c, 4-motor-d (FIG. 10K), in which each of the motors is suspended away from the body using a respective arm 4-arm (FIG. 10K), so as to further facilitate said keeping of the spinning propellers away from the vertical guides 1-guide when the drone 10 is restricted by the vertical guides, and so that each of the vertical guides is located between two of the spinning propellers when the drone is restricted by the vertical guides (e.g., vertical guide 1-guide-a is located between propellers 4-prop-c and 4-prop-d, and vertical guide 1-guide-b is located between propellers 4-prop-a and 4-prop-b, as shown in FIG. 10K).

In one embodiment, the repetitive pattern is a checkered pattern (FIG. 10Q), in which the containers from adjacent groups 1-cntr, 2-cntr, 3-cntr, 4-cntr, 5-cntr, 6-cntr, 7-cntr, 8-cntr, 9-cntr (FIG. 10Q) are stored corner-to-corner, in addition to being stacked on top of other containers of the same group; said spaces 1-space needed to accommodate placement of the propellers 4-prop-a, 4-prop-b, 4-prop-c, 4-prop-d are formed between the groups and are also of a rectangular shape; and during said ascending and descending, each of the spinning propellers 4-prop-a, 4-prop-b, 4-prop-c, 4-prop-d is kept away from containers stacked in adjacent groups as a result of said restriction and guidance (e.g., when the drone 10 ascends and descends for container 5-cntr: spinning propeller 4-prop-c is kept away from containers 1-cntr, 2-cntr, and 4-cntr, spinning propeller 4-prop-d is kept away from containers 7-cntr, 8-cntr, and 4-cntr, spinning propeller 4-prop-a is kept away from containers 8-cntr, 9-cntr, and 6-cntr, and spinning propeller 4-prop-b is kept away from containers 6-cntr, 3-cntr, and 2-cntr, FIG. 10Q).

In one embodiment, said three-dimensional high-density storage of the containers 1-cntr, 2-cntr, 3-cntr, 4-cntr, 5-cntr, 6-cntr, 7-cntr, 8-cntr, 9-cntr is bounded by 50% (fifty percent) volume occupancy of containers as a result of the checkered pattern, in which the practical volume occupancy of containers is between 25% (twenty five percent) and 47% (forty seven percent), depending in part on the number of groups and thickness of the vertical guides 1-guide. In one embodiment, as a result of said checkered pattern and the corner profile 1-corner of the vertical guides 1-guide, the vertical guides of adjacent groups are situated back-to-back, thereby forming vertical poles having a X-shaped cross-section (FIG. 10Q).

In one embodiment, the front corner 2-corner-f and rear corner 2-corner-r of the drone 10 substantially align from above respectively with opposite two corners 3-corner-a, 3-corner-b of each of the box-shaped containers 1-cntr (FIG. 10L), in which said substantial alignment comprises at least one of: (i) an exact alignment, in which a diagonal length of the container 3-length (FIG. 10L), from one corner 3-corner-a to the opposite corner 3-corner-b, is equal to a length 2-length (FIG. 10L) of the body 10-body of the drone 10 from the front corner 2-corner-f to the rear corner 2-corner-r, and (ii) a partial alignment, in which a diagonal length of the container 3-length, from one corner 3-corner-a to the opposite corner 3-corner-b, is shorter by 1 to 5 (one to five) millimeters than a length 2-length of the body 10-body of the drone 10 from the front corner 2-corner-f to the rear corner 2-corner-r, thereby allowing for a tight horizontal restriction of the body of the drone by the corner profiled 1-corner vertical guides 1-guide required for said vertical guidance associated with vertical sliding, but for a less tighter horizontal restriction of the containers 1-cntr that is however sufficiently tight for preventing said undesired horizontal shifts of the containers stacked. In one embodiment, said engulfing of the front and rear corners 2-corner-f, 2-corner-r is a tight engulfment that permits a horizontal drone movement of between 0.5 to 2 (zero point five to two) millimeters, thereby allowing a smooth vertical sliding of the drone 10 relative to the vertical guides 1-guide in conjunction with said descending and ascending.

Figure 10R:
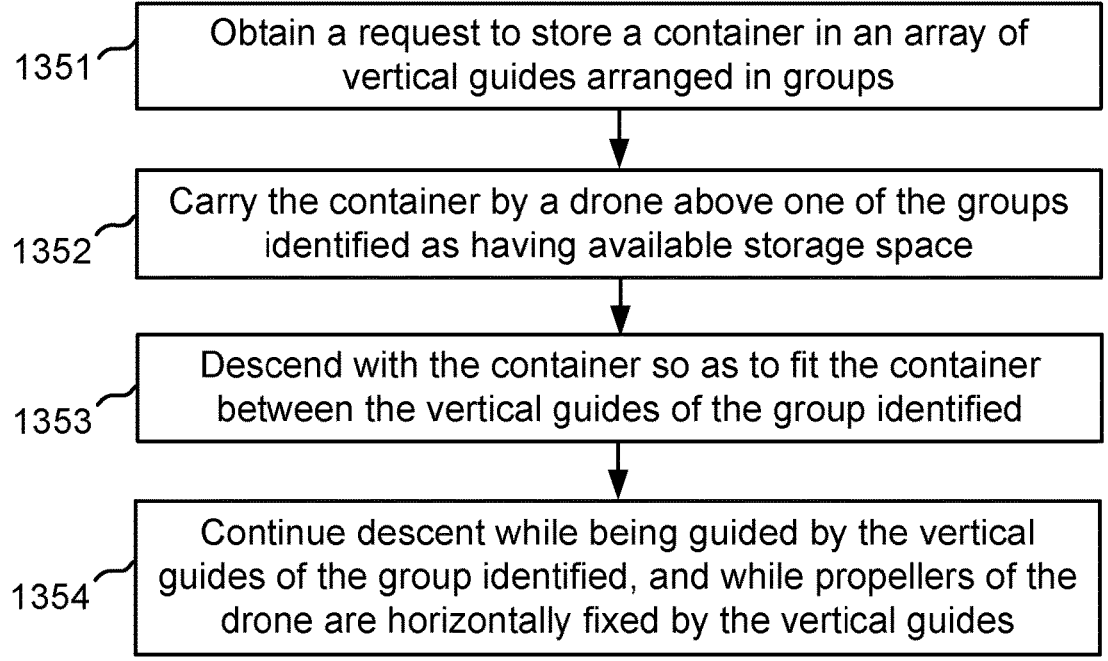

FIG. 10R illustrates one embodiment of a method for stacking containers in conjunction with drones and vertical guides. The method includes: in step 1351, obtaining, by a drone 10 (FIG. 10P), a request to store a specific container 1-cntr-2 (FIG. 10P) in conjunction with an array of vertical guides 1-guide, 2-guide, 3-guide, 4-guide, 5-guide, 6-guide, 7-guide, 8-guide, 8-guide (FIG. 10P) arranged in adjacent groups (e.g., the first group includes the guides 1-guide-a, 1-guide-b, and is adjacent to the second group 2-guide-a, 2-guide-b and to the fourth group 4-guide-a, 4-guide-b, FIG. 10P). In step 1352, carrying the specific container 1-cntr-2, by the drone 10 (FIG. 10A), to a hovering position exactly above one of the groups (e.g., the first group 1-guide-a, 1-guide-b, FIG. 10A, FIG. 10P) identified as having available storage space for the container 1-cntr-2. In step 1353, descending, by the drone 10 with the specific container 1-cntr-2, toward the group identified 1-guide-a, 1-guide-b, so as to fit the container (FIG. 10B, or fit a lower part of the drone engulfing the container) between the vertical guides of the group identified, thereby fixing an horizontal position of the container 1-cntr-2 (or the lower part of the drone engulfing the container). In step 1354, continuing said descent, by the drone 10 with the specific container 1-cntr-2, until the entire container (or the lower part of the drone engulfing the container) is engulfed by the vertical guides 1-guide-a, 1-guide-b of the group identified (FIG. 10C), and further descending until placing the drone's body between the vertical guides of the group identified, thereby fixing horizontal position of propellers 4-prop-a, 4-prop-b, 4-prop-c, 4-prop-d (FIG. 10K, FIG. 10Q) of the drone 10 in respect to the vertical guides of the group 1-guide-a, 1-guide-b, and thereby preventing propellers of the drone 4-prop from hitting the vertical guides 1-guide and from hitting other containers already stored in adjacent groups (e.g., containers stored in the second and fourth groups) while the drone 10 and the specific container 1-cntr-2 continue descending guided by the vertical guides until placing and releasing the container either at a bottom or on another container 1-cntr-1 already stacked (FIG. 10D). In one embodiment, the method further comprises: after said placement and release (FIG. 10D) of the specific container 1-cntr-2, ascending, by the drone 10 (FIG. 10E), while the drone's body still remains between the vertical guides 1-guide-a, 1-guide-b of the group identified, thereby still fixing horizontal position of the drone's propellers 4-prop-a, 4-prop-b, 4-prop-c, 4-prop-d in respect to the vertical guides of the group, and thereby still preventing the propellers from hitting the vertical guides 1-guide and from hitting other containers already stored in adjacent groups while the drone continue ascending guided by the vertical guides until returning to a hovering position above the group and clear of the vertical guides 1-guide.

In one embodiment, the method further comprises: obtaining, by the drone 10, or by another drone, a request to retrieve the specific container 1-cntr-2 from the array (FIG. 10P); moving, by said drone 10, to a hovering position (FIG. 10F) exactly above the group 1-guide-a, 1-guide-b that is identified as currently stacking the specific container 1-cntr-2; descending, by said drone 10, toward the group identified 1-guide-a, 1-guide-b, so as to fit the drone's body between the vertical guides of the group identified (FIG. 10G), thereby fixing horizontal position of the drone's propellers 4-prop-a, 4-prop-b, 4-prop-c, 4-prop-d in respect to the vertical guides of the group, and thereby preventing the propellers from hitting the vertical guides 1-guide and from hitting other containers already stored in adjacent groups while the drone continues descending guided by the vertical guides until reaching and grabbing the specific container 1-cntr-2 (FIG. 10H); and ascending, by the drone 10 with the specific container 1-cntr-2, while the drone's body and the container still remain between the vertical guides of the group 1-guide-a, 1-guide-b, thereby still fixing horizontal position of the drone's propellers 4-prop-a, 4-prop-b, 4-prop-c, 4-prop-d in respect to the vertical guides of the group, and thereby still preventing the propellers from hitting the vertical guides and from hitting other containers already stored in adjacent groups while the drone and the container continue ascending (FIG. 10I) guided by the vertical guides until extracting the container 1-cntr-2 (FIG. 10J) into a hovering position above the group and clear of the vertical guides 1-guide.

In one embodiment, said identification of the group 1-guide-a, 1-guide-b as a group having available storage space for the specific container 1-cntr-2 is achieved by the drone 10, or by another drone or both, using an onboard camera 4-cam (FIG. 1A) for executing a visual survey of the array (FIG. 10P), thereby detecting the available storage space in conjunction with the group identified 1-guide-a, 1-guide-b, in which said group identified is recorded in a record either in the drone or elsewhere or both; and said identification of the group 1-guide-a, 1-guide-b as a group currently stacking the specific container is achieved by the drone 10, or by another drone or both, using the record and consequently visually identifying the group recorded.

In one embodiment, the method further comprises: obtaining, by the drone 10, or by another drone, a request to retrieve the specific container 1-cntr-2 from the array (FIG. 10P); determining that another container 5-cntr was stacked above the specific container 1-cntr-2 in the same group 1-guide-a, 1-guide-b, and therefore said other container 5-cntr needs to be moved so as to allow drone access to the specific container 1-cntr-2 to retrieve; moving, by said drone, to a hovering position exactly above the group 1-guide-a, 1-guide-b that is identified as currently stacking the other container 5-cntr above the specific container 1-cntr-2; descending, by said drone 10, toward the group identified, so as to fit the drone's body between the vertical guides of the group identified, thereby fixing horizontal position of the drone's propellers in respect to the vertical guides of the group, and thereby preventing the propellers from hitting the vertical guides and from hitting other containers already stored in adjacent groups while the drone continues descending guided by the vertical guides until reaching and grabbing the other container 5-cntr; ascending, by the drone 10 with the other container 5-cntr, while the drone's body and the other container still remain between the vertical guides of the group 1-guide-a, 1-guide-b, thereby still fixing horizontal position of the drone's propellers in respect to the vertical guides of the group, and thereby still preventing the propellers from hitting the vertical guides and from hitting other containers already stored in adjacent groups while the drone 10 and the other container 5-cntr continue ascending guided by the vertical guides until extracting the other container 5-cntr into a hovering position above the group and clear of the vertical guides, and thus clearing access to the specific container 1-cntr-2; stacking the other container 5-cntr, by the drone 10, in another of the groups (e.g., in the fifth group 5-guide-a, 5-guide-b, FIG. 10P, FIG. 10Q); moving again, by said drone 10, to a hovering position exactly above the group stacking the specific container 1-cntr-2; descending, by said drone 10, toward the group 1-guide-a, 1-guide-b, so as to fit the drone's body between the vertical guides of the group identified (FIG. 10G), thereby fixing horizontal position of the drone's propellers 4-prop-a, 4-prop-b, 4-prop-c, 4-prop-d in respect to the vertical guides of the group, and thereby preventing the propellers from hitting the vertical guides 1-guide and from hitting other containers already stored in adjacent groups while the drone continue descending guided by the vertical guides until reaching and grabbing the specific container 1-cntr-2 (FIG. 10H); and ascending, by the drone 10 with the specific container 1-cntr-2, while the drone's body and the container still remain between the vertical guides of the group 1-guide-a, 1-guide-b, thereby still fixing horizontal position of the drone's propellers 4-prop-a, 4-prop-b, 4-prop-c, 4-prop-d in respect to the vertical guides of the group, and thereby still preventing the propellers from hitting the vertical guides and from hitting other containers already stored in adjacent groups while the drone and the container continue ascending (FIG. 10I) guided by the vertical guides until extracting the container 1-cntr-2 (FIG. 10J) into a hovering position above the group and clear of the vertical guides 1-guide.

Figure 11A:
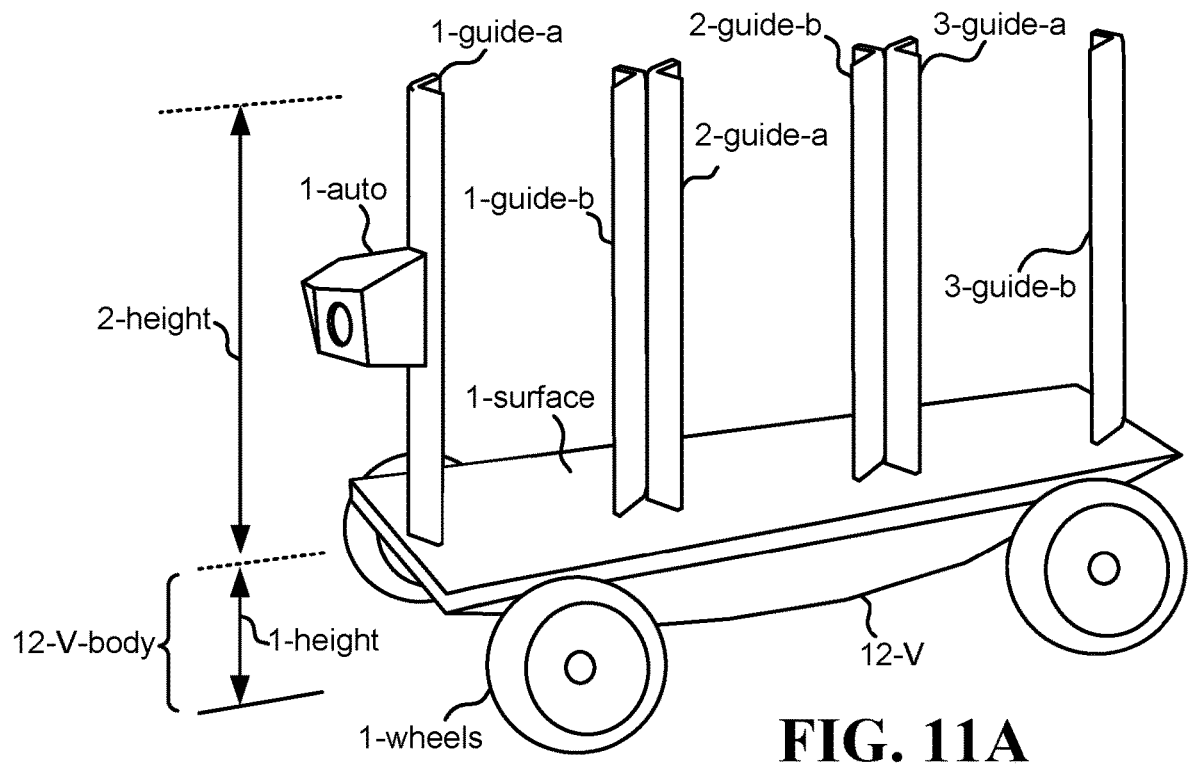
FIG. 11A illustrates one embodiment of an on-road vehicle employing groups of vertical guides operative to stack and restrict containers during transport and further operative to vertically guide and horizontally restrict drones operative to stack the containers in the groups.

FIG. 11A illustrates one embodiment of an on-road vehicle 12-V employing groups of vertical guides 1-guide, 2-guide, 3-guide (three groups are shown, in which each group includes two guides) operative to stack and restrict containers during transport and further operative to vertically guides and horizontally restrict drones operative to stack the containers in the groups. In one embodiment, the vehicle 12-V comprises a body section 12-V-body on wheels 1-wheels and a surface 1-surface. In one embodiment the vehicle includes an autonomy module 1-auto operative to render the vehicle autonomous and/or semi-autonomous. In one embodiment, the vertical guides 1-guide, 2-guide, 3-guide are taller 2-height than the body section 12-V-body, 1-height, thereby maximizing a number of containers that can be stacked. The vehicle 12-V may be associated with scheduled services and routes in accordance with some embodiments, or it may be associated with on-demand delivery in accordance with other embodiments.

Figure 11B:
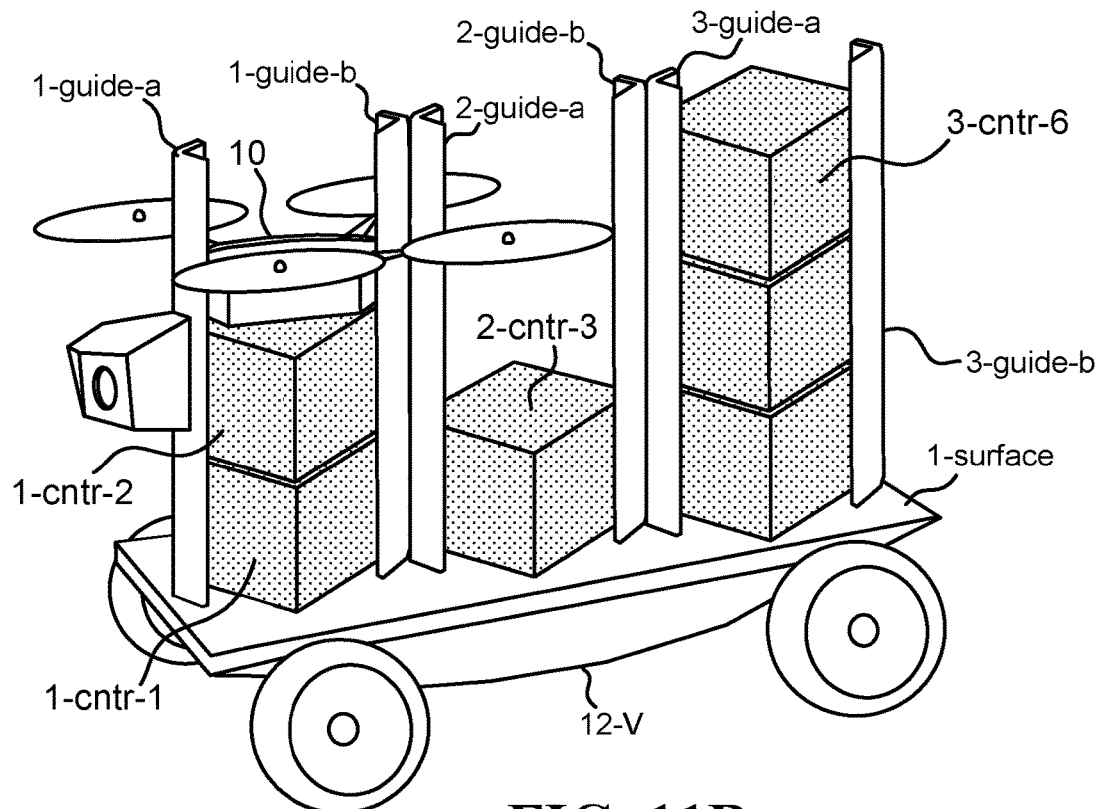
FIG. 11B illustrates one embodiment of the on-road vehicle employing groups of vertical guides currently retaining in restriction a plurality of stacked containers and a drone that is presently confined to one of the groups.

FIG. 11B illustrates one embodiment of the on-road vehicle 12-V employing groups of vertical guides 1-guide, 2-guide, 3-guide currently retaining in restriction a plurality of stacked containers 1-cntr-1, 1-cntr-2, 2-cntr-3, 3-cntr-6 and a drone 10 that is presently confined to one of the groups 1-guide. The drone 10 may be associated with the on-road vehicle 12-V, or it may be associated with other elements such as exchange stations in accordance with some embodiments.

Figure 11C:
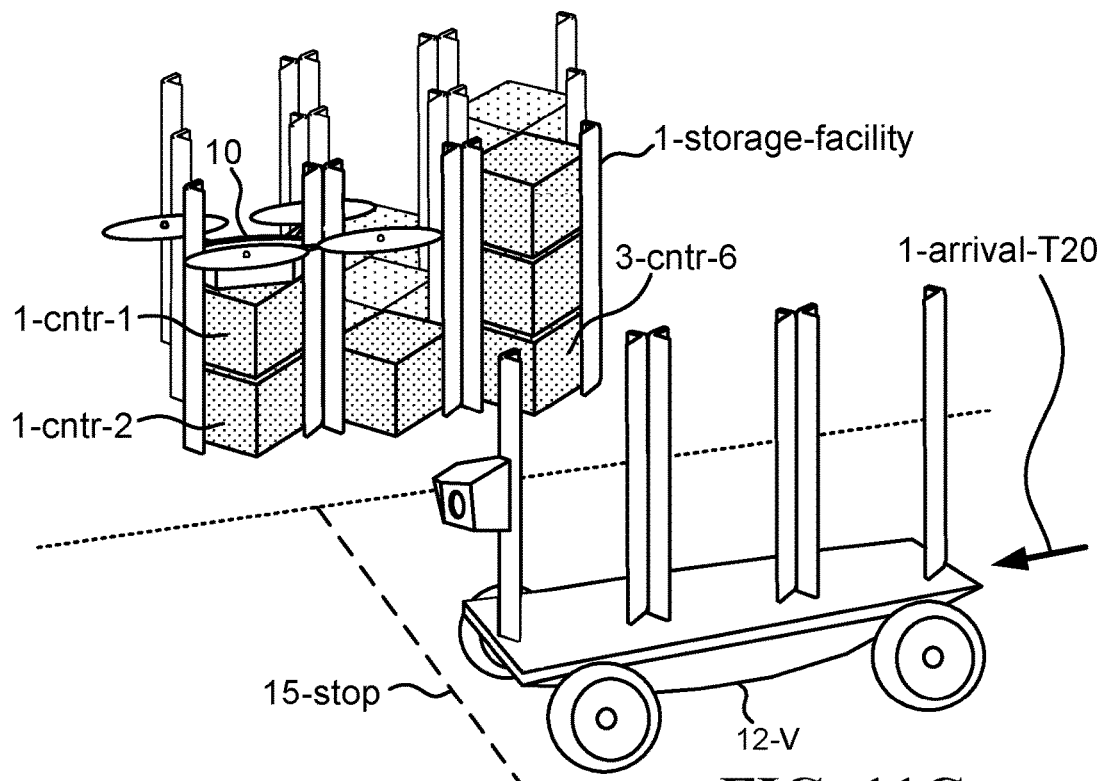
FIG. 11C illustrates one embodiment of the on-road vehicle employing groups of vertical guides currently coming to a stop at a designated stopping area of a storage facility comprising a drone.

FIG. 11C illustrates one embodiment of the on-road vehicle 12-V employing groups of vertical guides 1-guide, 2-guide, 3-guide currently arriving 1-arrival-T20 and coming to a stop at a designated stopping area 15-stop of a storage facility 1-storage-facility. The storage facility 1-storage-facility may act as an exchange station in accordance with some embodiment, and may be associated with a drone 10 that services the storage facility. Containers 1-cntr-1, 1-cntr-2, 3-cntr-6 are shown currently stored in the storage facility 1-storage-facility.

Figure 11D:
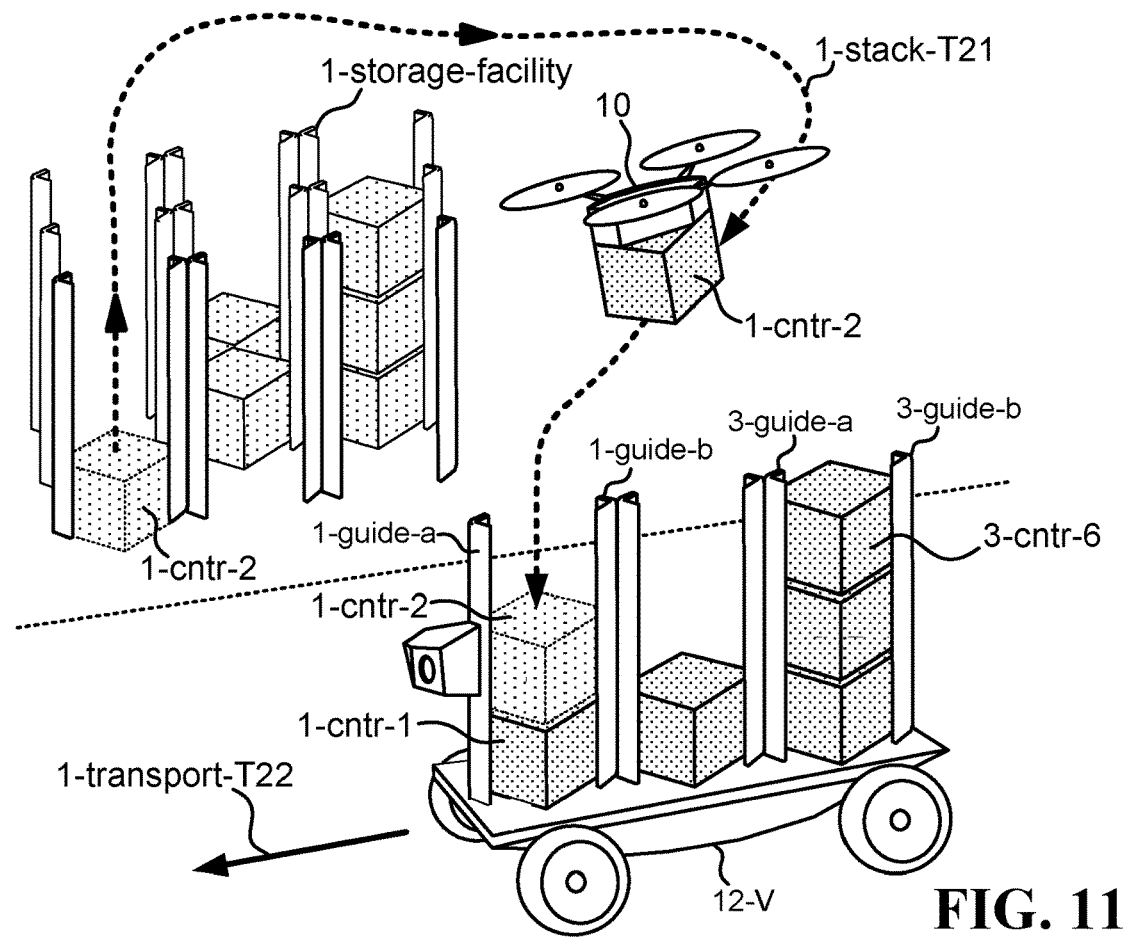
FIG. 11D illustrates one embodiment of the drone picking up containers from the storage facility and stacking each of the containers inside one of the groups of vertical guides onboard the on-road vehicle.

FIG. 11D illustrates one embodiment of the drone 10 picking up containers from the storage facility 1-storage-facility and stacking each of the containers inside one of the groups of vertical guides 1-guide, 2-guide, 3-guide onboard the on-road vehicle 12-V. For example, drone 10 is shown picking up one of the containers 1-cntr-2 from the storage facility 1-storage-facility and stacking 1-stack-T21 the container 1-cntr-2 in the first group 1-guide-a, 1-guide-b onboard the vehicle 12-V. The drone 10 may execute, for example, six of such picking-up-and-stacking maneuvers, thereby eventually transferring six of the containers from the storage facility 1-storage-facility into storage onboard the vehicle 12-V. The vehicle 12-V may then leave 1-transport-T22 the designated stopping area 15-stop with all six containers 1-cntr-1, 1-cntr-2, 3-cntr-6 stacked onboard. The drone 10 may stay with the storage facility 1-storage-facility for further service, or it may leave with the vehicle V-12.

Figure 11E:
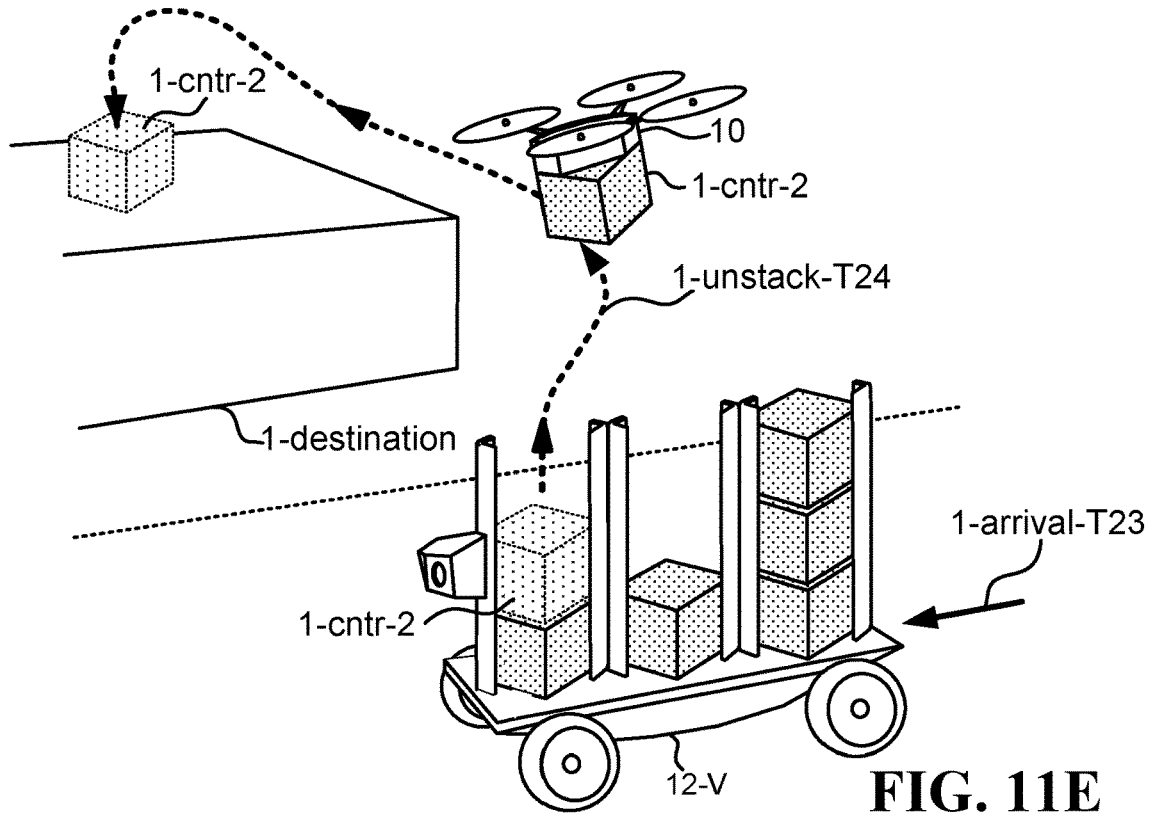
FIG. 11E illustrates one embodiment of a drone picking up containers from the vertical guides onboard the on-road vehicle and delivering the containers to a certain destination.

FIG. 11E illustrates one embodiment of a drone 10 picking up containers from the vertical guides 1-guide, 2-guide, 3-guide onboard the on-road vehicle 12-V that has just arrived 1-arrival-T23 at a delivery location 1-destination, and delivering the containers. For example, drone 10 is shown unstacking 1-unstack-T24 one of the containers 1-cntr-2 from the first group 1-guide-a, 1-guide-b onboard the vehicle 12-V and delivering the container 1-cntr-2 at the delivering location 1-destination. The drone 10 may execute, for example, six of such unstack-and-deliver maneuvers, thereby eventually transferring all six of the containers 1-cntr-1, 1-cntr-2, 3-cntr-6 from storage onboard the vehicle 12-V into the destination location. The drone 10 may be associated with the delivery location 1-destination, or it may have come with the vehicle V-12 together with the containers.

FIG. 11F illustrates one embodiment the on-road vehicle 12-V departing 1-departure-T25 the delivery location 1-destination after delivery of the containers 1-cntr-1, 1-cntr-2, 3-cntr-6.

One embodiment is a system operative to temporary stack and transport containers in conjunction with flying drones and on-road vehicles, comprising: an on-road vehicle 12-V (FIG. 11A) comprising an array of vertical guides 1-guide, 2-guide, 3-guide (FIG. 11A) arranged in groups (e.g., 1-guide-a, 1-guide-b is the first group, 2-guide-a, 2-guide-b is the second group, 3-guide-a, 3-guide-b is the third group, FIG. 11A), in which each of the groups comprises at least two vertical guides (e.g., the first group includes the vertical guides 1-guide-a, 1-guide-b) operative to stack containers therewith; and a facility for temporary storage 1-storage-facility (FIG. 11C) comprising: (i) a storage space currently stacking a plurality of containers 1-cntr-1, 1-cntr-2, 3-cntr-6 (FIG. 11C) to be transported to a target location, (ii) an associated at least a first drone 10 (FIG. 11C) operative to carry only one of the containers at a time, and (iii) a designated stopping area 15-stop (FIG. 11C).

In one embodiment, the system is configured to: cause the on-road vehicle 12-V to arrive 1-arrival-T20 (FIG. 11C) at and come to a complete stop in conjunction with the designated stopping area 15-stop; execute an aerial exchange procedure (FIG. 11D) while the on-road vehicle 12-V is in complete stop, in which as part of said aerial exchange procedure, the at least first drone 10 is configured to transport each of the containers, one by one (e.g., the container 1-cntr-2, FIG. 11D), from the storage space of the facility 1-storage-facility into stacking 1-stack-T21 (FIG. 11D) in the on-road vehicle 12-V and in conjunction with one of the groups of vertical guides designated to that container (e.g., in the first group 1-guide-a, 1-guide-b), in which as part of said stacking of each of the containers, the respective group of vertical guides (e.g., 1-guide-a, 1-guide-b) is configured to vertically guide and horizontally restrict the drone 10, in a physical manner, when descending with the container 1-cntr-2, and then again when ascending out of the respective group 1-guide-a, 1-guide-b; and use the on-road vehicle 12-V to transport 1-transport-T22 (FIG. 11D) the containers 1-cntr-1, 1-cntr-2, 3-cntr-6 to the target location 1-destination (FIG. 11E), in which during said transport, the containers are horizontally restricted by the vertical guides of the groups 1-guide, 2-guide, 3-guide, thereby preventing shifting of the containers relative to the on-road vehicle 12-V.

In one embodiment, the system further comprises at least a second drone 10 (FIG. 11E) associated with the target location 1-destination (FIG. 11E); wherein: the at least first drone 10 (FIG. 11C) is configured to remain associated with the facility 1-storage-facility, thereby staying behind when the on-road vehicle 12-V transports 1-transport-T22 the containers 1-cntr-1, 1-cntr-2, 3-cntr-6 to the target location 1-destination; and upon arrival 1-arrival-T23 (FIG. 11E) of the on-road vehicle 12-V with the containers stacked therewith 1-cntr-1, 1-cntr-2, 3-cntr-6 to the target location 1-destination and coming to a complete stop, the at least second drone 10 (FIG. 11E) is configured to execute an aerial unload procedure, in which as part of said aerial unload procedure, the at least second drone is configured to unstack 1-unstack-T24 (FIG. 11E), one by one, each of the containers (e.g., the container 1-cntr-2) from the groups of vertical guides (e.g., from the first group 1-guide-a, 1-guide-b) onboard the on-road vehicle 12-V into placement in conjunction with the target location 1-destination, in which as part of said unstacking of each of the containers, the respective group of vertical guides (e.g., 1-guide-a, 1-guide-b) is configured to vertically guide and horizontally restrict the second drone 10 (FIG. 11E) when descending to grab the container 1-cntr-2, and then again when ascending out of the respective group with the container 1-cntr-2.

In one embodiment, the on-road vehicle 12-V is configured to carry the at least first drone 10, together with the containers 1-cntr-1, 1-cntr-2, 3-cntr-6 (e.g., as shown in FIG. 11B), to the target location 1-destination; and upon arrival 1-arrival-T23 (FIG. 11E) of the on-road vehicle 12-V with the containers stacked therewith 1-cntr-1, 1-cntr-2, 3-cntr-6 and the first drone 10 to the target location 1-destination and coming to a complete stop, the first drone 10 is configured to execute an aerial unload procedure, in which as part of said aerial unload procedure, the first drone 10 is configured to unstack 1-unstack-T24 (FIG. 11E), one by one, each of the containers (e.g., the container 1-cntr-2) from the groups of vertical guides (e.g., from the first group 1-guide-a, 1-guide-b) onboard the on-road vehicle 12-V into placement in conjunction with the target location 1-destination, in which as part of said unstacking of each of the containers, the respective group of vertical guides (e.g., 1-guide-a, 1-guide-b) is configured to vertically guide and horizontally restrict the first drone 10 when descending to grab the container 1-cntr-2, and then again when ascending out of the respective group with the container 1-cntr-2.

In one embodiment, each of the groups is adjacent to at least one of the other groups (e.g., the first group 1-guide is adjacent to the second group 2-guide, which is adjacent to the third group 3-group, FIG. 11A), thereby causing containers stacked in adjacent groups to be in close proximity to each other; the first drone 10 comprises propellers 4-prop-a, 4-prop-b, 4-prop-c, 4-prop-d (FIG. 10K) operative to spin thereby creating lift; and during said ascending and descending, each of the spinning propellers 4-prop-a, 4-prop-b, 4-prop-c, 4-prop-d is kept away from the vertical guides and from containers stacked in adjacent groups as a result of said restriction and guidance (e.g., when the drone 10 descends to stack container 2-cntr-3 in the second group, the restriction by guides of the second group 2-guide-a, 2-guide-b prevent the propellers from hitting container 3-cntr-6 already stacked in the third group, and from hitting guides of the first and third groups 1-guide-b, 3-guide-a, as well as from hitting guides 2-guide-a, 2-guide-b themselves, FIG. 11B).

In one embodiment, each of the containers 1-cntr-1, 1-cntr-2, 3-cntr-6 is a box-shaped container 1-cntr (FIG. 10L); the vertical guides in each of the groups 1-guide, 2-guide, 3-guide (FIG. 11B) comprise two vertical guides (e.g., the vertical guides 1-guide-a, 1-guide-b in the first group), each having a corner profile 1-corner-a, 1-corner-b (FIG. 10L) matching corners 3-corner-a, 3-corner-b (FIG. 10L) of the box-shaped containers, so as to achieve said horizontal restriction of the containers by engulfing two opposite corners of each of the box-shaped containers (e.g., vertical guide 1-guide-a engulfs one corner 3-corner-a, and vertical guide 1-guide-b engulfs the opposite corner 3-corner-b); the first drone 10 further comprises a body 10-body (FIG. 10L) having a front corner 2-corner-f and a rear corner 2-corner-r; said horizontal restriction and vertical guidance of the drone 10 is achieved by one of the vertical guides with corner profile 1-guide-a engulfing the front corner 2-corner-f and the other vertical guides with corner profile 1-guide-b engulfing the rear corner 2-corner-r; and the propellers are four propellers 4-prop-a, 4-prop-b, 4-prop-c, 4-prop-d associated respectively with four motors 4-motor-a, 4-motor-b, 4-motor-c, 4-motor-d (FIG. 10K), in which each of the motors is suspended away from the body 10-body using a respective arm 4-arm (FIG. 10K), so as to further facilitate said keeping of the spinning propellers away from the vertical guides 1-guide, 2-guide, 3-guide when the drone 10 is restricted by the vertical guides, and so that each of the vertical guides is located between two of the spinning propellers when the drone 10 is restricted by the vertical guides (e.g., vertical guide 1-guide-a is located between the two spinning propellers 4-prop-c, 4-prop-d, and vertical guide 1-guide-b is located between the two spinning propellers 4-prop-a, 4-prop-b, FIG. 10K).

In one embodiment, the groups 1-guide, 2-guide, 3-guide are arranged in a repetitive pattern (e.g., one after the other in a sequence as shown in FIG. 11B, side by side, or in a checkered pattern as shown in FIG. 10Q), in which the containers from adjacent groups are stored corner-to-corner, in addition to being stacked on top of other containers of the same group (e.g., one of the corners of container 1-cntr-2 engulfed by guide 1-guide-b is adjacent to one of the corners of container 2-cntr-3 engulfed by guide 2-guide-a, in addition of container 1-cntr-2 being stacked on top of container 1-cntr-1, FIG. 11B); and said close proximity is a proximity in which containers from adjacent groups that are stacked corner-to-corner are positioned less than 20 (twenty) centimeters from each other (e.g., container 2-cntr-3 is less than 20 centimeters away from container 1-cntr-1, FIG. 11B).

In one embodiment, the front corner 2-corner-f (FIG. 10L) and rear corner 2-corner-r of the drone 10 substantially align from above respectively with opposite two corners 3-corner-a, 3-corner-b (FIG. 10L) of each of the box-shaped containers 1-cntr-1, 1-cntr-2, 3-cntr-6, in which said substantial alignment comprises at least one of: (i) an exact alignment, in which a diagonal length of the container 3-length (FIG. 10L), from one corner 3-corner-a to the opposite corner 3-corner-b, is equal to a length 2-length (FIG. 10L) of the body of the drone 10-body from the front corner 2-corner-f to the rear corner 2-corner-r (FIG. 10L), and (ii) a partial alignment, in which a diagonal length of the container 3-length, from one corner 3-corner-a to the opposite corner 3-corner-b, is a shorter by 1 to 5 (one to five) millimeters than a length 2-length of the body of the drone 10-body from the front corner 2-corner-f to the rear corner 2-corner-r, thereby allowing for a tight horizontal restriction of the body of the drone 10-body by the corner profiled vertical guides 1-guide-a, 1-guide-b required for said vertical guidance associated with vertical sliding, but for a more relaxed horizontal restriction of the containers 1-cntr-1, 1-cntr-2, 3-cntr-6 (FIG. 11B) that is however sufficiently tight for preventing said shifting of the containers. In one embodiment, said engulfing of the front and rear corners 2-corner-f, 2-corner-r is a tight engulfment that permits a horizontal drone movement of between 0.5 to 2 (zero point five to two) millimeters, thereby allowing a smooth vertical sliding of the drone 10 relative to the vertical guides (e.g., 1-guide-a, 1-guide-b) in conjunction with said descending and ascending.

In one embodiment, the on-road vehicle 12-V comprises a wheeled 1-wheels body section 12-V-body (FIG. 11A) comprising a top surface 1-surface constituting a bottom for the vertical guides of the groups 1-guide, 2-guide, 3-guide, in which a lower-most container in each of the groups (e.g., 1-cntr-1 and 2-cntr-3, FIG. 11B) rests directly or indirectly on said surface 1-surface; the top surface 1-surface is elevated by the wheeled body 12-V-body to a first level 1-height (FIG. 11A) above road; the vertical guides of the groups 1-guide, 2-guide, 3-guide extend to a certain height 2-height (FIG. 11A) above the first level 1-height, in which said certain height above the first level allows for stacking, per each of the groups, of at least 3 (three) containers (e.g., as shown in conjunction with the guides 3-guide-a, 3-guide-b, FIG. 11B), a first one at the bottom 1-surface, a second one on top of the first one, and a third one 3-cntr-6 (FIG. 11B) on top of the second one.

In one embodiment, the first level 1-height is below 0.5 (zero point five) meters, and the certain height 2-height is above one meter, thereby causing the vertical guides 1-guide, 2-guide, 3-guide to constitute a majority of a total height of the on-road vehicle 12-V, thereby increasing storage efficiency while lowering center of gravity.

In one embodiment, each of the containers 1-cntr-1, 1-cntr-2, 3-cntr-6 is a box-shaped container; each of the groups 1-guide, 2-guide, 3-guide is adjacent to at least one of the other groups, thereby causing containers stacked in adjacent groups to be in close proximity of 20 (twenty) centimeters or less to each other (e.g., container 1-cntr-1 stacked in the first group is in close proximity to the container 2-cntr-3 stacked in the adjacent second group); and the groups are arranged in a repetitive pattern comprising at least three groups in a row 1-guide, 2-guide, 3-guide, in which the containers from adjacent groups are stored corner-to-corner (FIG. 11B), thereby tightly stacking at least 9 (nine) of the containers (FIG. 11B illustrates five containers, but the three groups of vertical guides 1-cntr-1, 1-cntr-2, 3-cntr-6 have enough space for nine containers, and more than nine containers can be stacked depending in part on actual individual container dimensions. It is noted that more than three groups are possible by increasing the number of groups in the row, or adding rows in a checkered formation).

In one embodiment, said storage space of the facility 1-storage-facility (FIG. 11C) comprises an array of vertical guides 1-guide, 2-guide, 3-guide, 4-guide, 5-guide, 6-guide, 7-guide, 8-guide, 9-guide (FIG. 10P) arranged in groups and used for initially stacking the containers 1-cntr-1, 1-cntr-2, 3-cntr-6, in which the vertical guides of each of the groups (e.g., the vertical guides 9-guide-a, 9-guide-b of the ninth group) are operative to vertically guide and horizontally restrict the drone 10, either directly or indirectly or both, while descending and ascending for retrieving one of the containers in conjunction with the group, in which the array is geometrically arranged in a repetitive pattern (e.g., checkered pattern, FIG. 10Q) that interleaves storage area of the groups and spaces 1-space (FIG. 10Q) needed to accommodate placement of propellers 4-prop-a, 4-prop-b, 4-prop-c, 4-prop-d (FIG. 10K) of the drone 10 while guiding and restricting the drone; during said descending and ascending, each of the spinning propellers 4-prop-a, 4-prop-b, 4-prop-c, 4-prop-d is kept away from the vertical guides as a result of said restriction and guidance; and each of the containers 1-cntr-1, 1-cntr-2, 3-cntr-6 initially stacked in one of the groups is horizontally restricted by the respective vertical guides of the respective group, thereby preventing undesired horizontal shifts of the stacks; in which as part of said transport of each of the containers 1-cntr-1, 1-cntr-2, 3-cntr-6, one by one, from the storage space of the facility 1-storage-facility into stacking in the on-road vehicle 12-V, the drone 10 is further configured to retrieve the respective container from the group currently storing the container.

FIG. 11G illustrates one embodiment of a method for temporary stacking and transporting containers in conjunction with flying drones and on-road vehicles. The method comprises: in step 1361, obtaining, by a drone 10 (FIG. 11C), a request to transfer a plurality of containers 1-cntr-1, 1-cntr-2, 3-cntr-6 (FIG. 11C) for temporary storage in an array of vertical guides 1-guide, 2-guide, 3-guide (FIG. 11A) arranged in adjacent groups (e.g., the first group 1-guide-a, 1-guide-b is adjacent to the second group 2-guide-a, 2-guide-b, which is adjacent to the third group 3-guide-a, 3-guide-b, FIG. 11A) onboard an on-road vehicle V-12 (FIG. 11A). Performing, by the drone 10, as a response to said request, a plurality of transfer procedures, in which each of the transfer procedures is operative to transfer a specific one of the containers 1-cntr-1, 1-cntr-2, 3-cntr-6 to the on-road vehicle 12-V until transferring all of the containers, and in which each of the transfer procedures (e.g., the transfer procedure 1-stack-T21, FIG. 11D) comprises the following steps: In step 1362, carrying the specific container (e.g., container 1-cntr-2, FIG. 11D), by the drone 10, to a hovering position exactly above one of the groups identified as having available storage space for the container (e.g., the first group 1-guide-a, 1-guide-b, FIG. 11D, FIG. 10A). In step 1363, descending, by the drone 10 with the specific container 1-cntr-2, toward the group identified 1-guide-a, 1-guide-b, so as to fit the container (FIG. 10B) between the vertical guides of the group identified 1-guide-a, 1-guide-b, thereby fixing an horizontal position of the container 1-cntr-2. In step 1364, continuing said descent, by the drone 10 with the specific container 1-cntr-2, until the entire container is engulfed (FIG. 10C) by the vertical guides of the group identified 1-guide-a, 1-guide-b, and further descending until placing the drone's body 10-body between the vertical guides of the group identified, thereby fixing horizontal position of the drone's propellers 4-prop-a, 4-prop-b, 4-prop-c, 4-prop-d (FIG. 10K) in respect to the vertical guides of the group 1-guide-a, 1-guide-b, and thereby preventing the propellers from hitting the vertical guides and from hitting other containers already stored in adjacent groups while the drone and the specific container continue descending guided by the vertical guides until placing and releasing the container (FIG. 10D) either at a bottom or on another container 1-cntr-1 (FIG. 10D, FIG. 11D) already stacked; and after said placement and release of the specific container 1-cntr-2, ascending (FIG. 10E), by the drone 10, while the drone's body still remains between the vertical guides of the group identified 1-guide-a, 1-guide-b, thereby still fixing horizontal position of the drone's propellers 4-prop-a, 4-prop-b, 4-prop-c, 4-prop-d in respect to the vertical guides of the group, and thereby still preventing the propellers from hitting the vertical guides and from hitting other containers already stored in adjacent groups while the drone 10 continues ascending guided by the vertical guides until returning to a hovering position above the group 1-guide and clear of the vertical guides 1-guide-a, 1-guide-b. In one embodiment, the method further comprises: using the on-road vehicle 12-V to transport 1-transport-T22 (FIG. 11D) the containers 1-cntr-1, 1-cntr-2, 3-cntr-6 to a target location 1-destination (FIG. 11E), in which during said transport, the containers are horizontally restricted by the vertical guides of the groups 1-guide, 2-guide, 3-guide, thereby preventing shifting of the containers relative to the on-road vehicle. In one embodiment, the drone 10 is capable of carrying a payload of at most 10 (ten) kilograms; the total mass of the plurality of containers 1-cntr-1, 1-cntr-2, 3-cntr-6 is between 50 (fifty) and 200 (two hundred) kilograms, in which each of the containers has a mass of less than 10 (ten) kilograms, said plurality consists of at least 5 (five) containers (three are listed 1-cntr-1, 1-cntr-2, 3-cntr-6 as a partial list), and there are more containers than groups of vertical guides 1-guide, 2-guide, 3-guide, therefore at least one of the groups of vertical guides stacks at least two containers, one on top of the other (e.g., the group 1-guide-a, 1-guide-b stacks the container 1-cntr-2 on top of container 1-cntr-1, FIG. 11D), thereby allowing the on-road vehicle 12-V to have a road footprint of less than 3 (three) square meters and a mass of less than 700 (seven hundred) kilograms. In one embodiment, the groups are arranged as at least three groups in a row 1-guide, 2-guide, 3-guide, in which the containers from adjacent groups (e.g., 1-cntr-1 and 2-cntr-3, FIG. 11B) are stored in proximity of 20 (twenty) centimeters or less from each other, thereby tightly stacking at least 9 (nine) of the containers; and both the drone 10 and the on-road vehicle 12-V are at least partially autonomous (e.g., using an autonomy module 1-auto, FIG. 11A, and a computer 5-cpu, FIG. 1A), thereby requiring no physical human intervention in conjunction with said plurality of transfer procedures (e.g., 1-stack-T21) and transportation 1-transport-T22, in which the vertical guides 1-guide, 2-guide, 3-guide are operative to further facilitate said lack of physical human intervention as a result of allowing the drone 10 safe accesses to containers 1-cntr-1, 1-cntr-2, 3-cntr-6 that are densely stacked both on top of each other and adjacent to each other.

In one embodiment, upon arrival 1-arrival-T23 (FIG. 11E) of the on-road vehicle 12-V with the containers 1-cntr-1, 1-cntr-2, 3-cntr-6 to the target location 1-destination, obtaining, by the drone 10, or by another drone associated with the target location, or both, a request to retrieve the containers from the array 1-guide, 2-guide, 3-guide; performing, by the drone 10 or the another drone or both, as a response to said request, a plurality of transfer procedures, in which each of the transfer procedures (e.g., 1-unstack-T24, FIG. 11E) is operative to transfer a specific one of the containers (e.g., the container 1-cntr-2, FIG. 11E) from the on-road vehicle 12-V to the target location 1-destination, until transferring all of the containers 1-cntr-1, 1-cntr-2, 3-cntr-6, and in which each of the transfer procedures (e.g., 1-unstack-T24, FIG. 11E) comprises: moving, by said drone 10, to a hovering position exactly above the group (e.g., the first group) that is identified as currently stacking the specific container (e.g., container 1-cntr-2, FIG. 11E, FIG. 10F); descending, by said drone 10, toward the group identified 1-guide-a, 1-guide-b (FIG. 10F), so as to fit (FIG. 10G) the drone's body 10-body between the vertical guides of the group identified 1-guide-a, 1-guide-b, thereby fixing horizontal position of the drone's propellers 4-prop-a, 4-prop-b, 4-prop-c, 4-prop-d (FIG. 10K) in respect to the vertical guides of the group 1-guide-a, 1-guide-b, and thereby preventing the propellers from hitting the vertical guides and from hitting other containers already stored in adjacent groups while the drone 10 continues descending guided by the vertical guides 1-guide-a, 1-guide-b until reaching and grabbing the specific container 1-cntr-2 (FIG. 10H); and ascending, by the drone 10 with the specific container 1-cntr-2 (FIG. 10I), while the drone's body 10-body and the container still remain between the vertical guides of the group 1-guide-a, 1-guide-b, thereby still fixing horizontal position of the drone's propellers 4-prop-a, 4-prop-b, 4-prop-c, 4-prop-d in respect to the vertical guides of the group 1-guide-a, 1-guide-b, and thereby still preventing the propellers from hitting the vertical guides and from hitting other containers already stored in adjacent groups while the drone 10 and the container 1-cntr-2 continue ascending guided by the vertical guides until extracting the container 1-cntr-2 into a hovering position above the group 1-guide and clear of the vertical guides 1-guide-a, 1-guide-b (FIG. 10J). In one embodiment, said transferring of the containers into the on-road vehicle 12-V is done in a certain stacking order per each of the groups of vertical guides (e.g., for the first group, container 1-cntr-1 is stacked first, and container 1-cntr-2 is stacked second 1-stack-T21, FIG. 11D), and in which said transferring of the containers from the on-road vehicle 12-V is done in a reverse unstacking order per each of the groups of vertical guides (e.g., for the first group, container 1-cntr-2 is unstacked first 1-unstack-T24, and container 1-cntr-1 is unstacked second, FIG. 11E), so as to result in a last-in-first-out (LIFO) stacking-unstacking approach per each of the groups of vertical guides (e.g., per the first group, container 1-cntr-2 is last to get in 1-stack-T21, and first to get out 1-unstack-T24); and both the drone/s 10 and the on-road vehicle 12-V are at least partially autonomous (e.g., using an autonomy module 1-auto, FIG. 11A, and a computer 5-cpu, FIG. 1A), thereby requiring no physical human intervention in conjunction with said plurality of transfer procedures (e.g., 1-stack-T21) and transportation 1-transport-T22, in which the vertical guides 1-guide, 2-guide, 3-guide are operative to further facilitate said lack of physical human intervention as a result of allowing the drone 10 safe accesses to containers 1-cntr-1, 1-cntr-2, 3-cntr-6 that are densely stacked both on top of each other and adjacent to each other.

In one embodiment, the method further comprises: prior to said transferring of the containers 1-cntr-1, 1-cntr-2, 3-cntr-6 to the on-road vehicle 12-V, parking (e.g., 1-arrival-T20, FIG. 11C) the on-road vehicle in close proximity of less than 100 (one hundred) meters to the containers (e.g., at 15-stop, FIG. 11C), and prior to transferring of the containers from the on-road vehicle, parking the on-road vehicle (e.g., 1-arrival-T23, FIG. 11E) in close proximity of less than 100 (one hundred) meters to a final resting place of the containers in the target location 1-destination; and the plurality of containers 1-cntr-1, 1-cntr-2, 3-cntr-6 includes N containers, thereby executing said plurality of transfer procedures with less than 4*N (four times N) flight maneuvers of the drones 10, as each transfer procedure requires two flight maneuvers, and each of the containers is associated with two transfer procedures, one for stacking and one for unstacking at the target location (e.g., per container 1-cntr-4: 1-stack-T21 is the first flight maneuver, a return of the drone 10 to pick up the next container for stacking is the second flight maneuver, 1-unstack-T24 is the third flight maneuver, and a return of the drone 10 to pick up the next container for unstacking is the fourth flight maneuver); wherein the duration of each of the flight maneuvers (e.g., 1-stack-T21) is less that 20 (twenty) seconds, thereby requiring a total of less than 80*N (eighty times N) flight seconds in total, in which at most 20*N (twenty times N) flight seconds in total are flight seconds during which the drone/s 10 move vertically while being restricted by the vertical guides, thereby expediting delivery of the containers 1-cntr-1, 1-cntr-2, 3-cntr-6. In one embodiment, moving parts are used in conjunction with flying the drone/s 10, grabbing/releasing the containers 1-cntr-1, 1-cntr-2, 3-cntr-6 by the drone/s, and making the on-road vehicle 12-V move on-road; however, as a direct result of the vertical guides 1-guide, 2-guide, 3-guide and usage of the drones 10, no dedicated moving parts are required to stack (e.g., 1-stack-T21), unstack (e.g., 1-unstack-T24), and physically secure the containers 1-cntr-1, 1-cntr-2, 3-cntr-6 during transport 1-transport-T22, thereby greatly simplifying design and reducing cost, while maximizing safety and reliability.

FIG. 11H illustrates one embodiment of a drone 10 grabbing a container 1-cntr from below using grabbing arms 1-grab, 1-grab-2, in which said grabbing from below is compatible with all embodiments associated with vertical guides. Other grabbing methods are possible as well.

FIG. 11I illustrates one embodiment of a drone 10 grabbing a container 1-cntr from above using a grabbing element 5-grab, in which said grabbing from above is compatible with all embodiments associated with vertical guides. Grabbing may be mechanical, magnetic, or otherwise.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A system constituting an exchange network operative to transport cargo between different locations, comprising:
    an exchange network comprising a plurality of exchange stations situated respectively at a plurality of different locations, in which each of the exchange stations comprises: (i) at least one respective drone and (ii) a respective temporary storage space, and in which each of the exchange stations is associated with, and is located in a certain proximity to, at least one respective stopping area of at least one respective bus station;
    wherein each of the exchange stations is configured to initiate and conclude an exchange procedure in conjunction with each of a plurality of containers that: (i) arrives onboard a respective bus at one of the respective stopping areas of one of the respective bus stations, and (ii) is to be temporarily stored at the respective storage space;
    in which as part of said initiation of the exchange procedure, one of the respective drones is configured to:
    fly from the exchange station toward the respective bus;
    pick up the container from the respective bus that has just arrived and stopped;
    fly to the respective temporary storage space while carrying the container; and
    release the container for temporary storage at the respective temporary storage space;
    and in which:
    as part of said conclusion of the exchange procedure, one of the respective drones is configured to convey the container from the respective temporary storage space to another bus that has just arrived at one of the respective stopping areas and that is configured to transport the container to another location; and
    the respective bus stations are located in close proximity of less than 400 meters (four hundred meters) from the respective temporary storage space, thereby said filters are short-distance flights, however the another location is located at least 1 (one) kilometer from the bus stations, thereby necessitating said usage of the another bus to transport the container from the respective bus station associated with the first exchange station to the another location.

2. A method for using an exchange network to transport cargo between different locations, comprising:
    planning, by an exchange network, a propagation scheme for a container, in which the propagation scheme is operative to identify, out of a plurality of exchange stations, at least a first and a second exchange stations to participate in propagating the container; and
    executing, by at least one drone associated with the first exchange station, upon an indication that the container is arriving onboard a first bus to a stopping area of a first bus station associated with the first exchange station, a first tripartite exchange procedure comprising:

flying from the first exchange station toward the first bus;

picking up the container from the first bus that has just arrived and stopped at the stopping area of the first bus station;

flying back to the first exchange station while carrying the container;

releasing the container for temporary storage at the first exchange station;

waiting for an indication that a second bus, which is scheduled to travel between a stopping area of a second bus station associated with the first exchange station to a stopping area of a third bus station associated with the second exchange station, is arriving to the stopping area of the second bus station;

flying from the first exchange station, with the container, toward the second bus; and releasing the container to the second bus that has just arrived and stopped at the stopping area of the second bus station, thereby completing the first tripartite exchange procedure, and facilitating arrival of the container to the stopping area of the third bus station onboard the second on-road vehicle;

in which:

the first and second bus stations are located in close proximity of less than 400 meters (four hundred meters) from the first exchange station, thereby said flights are short-distance flights, however the third bus station is located at least 1 (one) kilometer from both the first and second bus stations, thereby necessitating said usage of the second bus.

3. The method of claim 2, further comprising:

executing, by at least one different drone associated with the second exchange station, upon an indication that the container is arriving onboard the second bus to the third bus station associated with the second exchange station, a second tripartite exchange procedure comprising:

flying from the second exchange station toward the second bus;

picking up the container from the second bus that has just arrived and stopped at the stopping area of the third bus station;

flying back to the second exchange station while carrying the container;

releasing the container for temporary storage at the second exchange station;

waiting for an indication that a third bus, which is scheduled to travel between the stopping area of the third bus station to a destination location, is arriving to the stopping area of the third bus station;

flying from the second exchange station, with the container, toward the third bus; and releasing the container to the third bus that has just arrived and stopped at the stopping area of the third bus station, thereby completing the second tripartite exchange procedure, and facilitating arrival of the container to the destination location onboard the third bus.

4. The method of claim 2, further comprising:

planning, by the exchange network, a plurality of additional propagation schemes for a plurality of additional containers, in which each of the additional propagation schemes is operative to identify, out of the plurality of exchange stations, at least a respective combination of exchange stations to participate in propagating the respective container, thereby resulting is a plurality of different combinations of exchange stations; and executing, by the exchange network, per each of the additional propagation schemes, at least one tripartite exchange procedure in conjunction with the respective combination of exchange stations identified, thereby facilitation the plurality of propagation schemes.

5. The method of claim 2, wherein:

the stopping area of a first bus station is a first portion of a road allocated for busses for picking up and dropping off bus passengers, in which said stopping of the first bus in conjunction with the stopping area of a first bus station is associated with the first bus stopping for picking up and/or dropping off bus passengers;

the indication that the container is arriving onboard the first bus to the stopping area of a first bus station is based, at least in part, on a known bus-schedule of which the first bus is associated with; and the indication that the second bus is arriving to the stopping area of a second bus station is based, at least in part, on a known bus-schedule of which the second bus is associated with.

6. The method of claim 2, wherein:

the indication that the container is arriving onboard the first bus to the stopping area of the first bus station is based, at least in part, on a visual detection by optical sensors onboard one of the drones associated with the first exchange station and currently resting at the first exchange station;

the indication that the second bus is arriving to the stopping area of the second bus station is also based, at least in part, on a visual detection by optical sensors onboard at least one of the drones associated with the first exchange station and currently resting at the first exchange station; and the first exchange station is located in visual proximity to said stopping area of the first bus station and stopping area of the second bus station, thereby facilitating said indications.

7. The method of claim 2, wherein at least one of the exchange stations is associated with at least two drones, and the method further comprises:

assuring, by the exchange network, that at any given time in which said one of the exchange stations is active, at least one, out of the at least two drones, is currently in visual proximity to the associated stopping areas, thereby guaranteeing immediate availability of the drone for initiating a tripartite exchange procedure upon arrival of a respective bus;

wherein the other associated drones that are not currently in visual proximity to the associated stopping areas, are available to the exchange station for delivering containers to clients that are beyond visual proximity to the associated stopping areas.

8. A method for using an exchange network to transport cargo between different locations, comprising:

accessing, by a planning agent of an exchange network, a schedule operative to describe future movement of a plurality of buses between different stopping areas of different bus stops, and further accessing a description of a target location at which a container is scheduled to be delivered;

planning, by the planning agent, according to said schedule and target location, a transport and exchange plan for the container, in which the transport and exchange plan is operative identify at least a first one of the buses scheduled to move from the first of the stopping areas associated with a first bus stop to a second of the stopping areas associated with a second bus stop, and a second one of the busses scheduled to move from a third of the stopping areas associated with a third bus stop to a fourth of the stopping areas associated with a fourth bus stop, in which the second and third stopping areas are located in close proximity to each other, and the fourth stopping area is located in close proximity to the target location; and facilitating the transport and exchange plan by at least three different drones, in which said facilitation comprises:

flying, by a first of the drones associated with the first stopping area and currently carrying the container, toward the first stopping area, thereby rendezvousing with the first bus and leaving the container therewith, consequently causing the container to arrive at the second stopping area together with the first bus;

upon said arrival: picking up and flying with the container, by a second of the drones associated with the second and third stopping areas, from the first bus to a temporary landing and storage area located in close proximity to both the second and third stopping areas, and waiting for the second bus to arrive;

upon arrival of the second bus to the third stopping area: flying with the container, by the second drone and/or by a companion drone, from the temporary landing and storage area toward the third stopping area, thereby rendezvousing with the second bus and leaving the container therewith, consequently causing the container to arrive at the fourth stopping area together with the second bus; and upon arrival of the second bus with the container to the fourth stopping area: picking up and flying with the container, by a third of the drones associated with the fourth stopping area, from the second bus to the target location;

wherein:

each of the close proximities is a proximity of less than 400 (four hundred) meters, thereby causing each of said flights to be a short-distance flight, in which the aggregated length through which the container is caned in the air by the at least three drones is under 1 (one) kilometer; and the aggregated length through which the container is transported by the two buses is above 2 (two) kilometers, thereby causing the container to be transported most of the way by the two buses, and thereby minimizing energy needed by the drones.

\* \* \* \* \*

UNITED STATES PATENT AND TRADEMARK OFFICE
CERTIFICATE OF CORRECTION

PATENT NO. : 11,565,807 B1
APPLICATION NO. : 15/931630
DATED : January 31, 2023
INVENTOR(S) : Gal Zuckerman It is certified that error appears in the above-identified patent and that said Letters Patent is hereby corrected as shown below:

In the Claims

Claim 1, Column 86, Line 52, please replace "filters" with "flights".

Claim 8, Column 90, Line 18, please replace "caned" with "carried".

Signed and Sealed this
Twenty-fourth Day of October, 2023

Katherine Kelly Vidal
*Director of the United States Patent and Trademark Office*